(12) United States Patent
Zhitomirsky

(10) Patent No.: US 10,564,013 B2
(45) Date of Patent: Feb. 18, 2020

(54) POSITION SENSOR

(71) Applicant: GDE TECHNOLOGY LTD, Cambridge, Cambridgeshire (GB)

(72) Inventor: Victor Zhitomirsky, Cambridge (GB)

(73) Assignee: GDE TECHNOLOGY LTD, Cambridge, Cambridgeshire (GB)

( * ) Notice: Subject to any disclaimer, the term of this patent is extended or adjusted under 35 U.S.C. 154(b) by 718 days.

(21) Appl. No.: 14/908,489

(22) PCT Filed: Aug. 12, 2014

(86) PCT No.: PCT/GB2014/052460
§ 371 (c)(1),
(2) Date: Jan. 28, 2016

(87) PCT Pub. No.: WO2015/022516
PCT Pub. Date: Feb. 19, 2015

(65) Prior Publication Data
US 2016/0169717 A1  Jun. 16, 2016

(30) Foreign Application Priority Data

Aug. 12, 2013  (GB) .................................. 1314405.0
Jan. 23, 2014  (GB) .................................. 1401167.0

(51) Int. Cl.
*G01D 18/00*  (2006.01)
*G01D 5/20*  (2006.01)
(Continued)

(52) U.S. Cl.
CPC .............. *G01D 18/00* (2013.01); *G01D 5/142* (2013.01); *G01D 5/20* (2013.01); *G01D 5/24* (2013.01)

(58) Field of Classification Search
CPC ...... G01D 5/2073; G01D 5/204; G01D 5/208; G01D 18/00
See application file for complete search history.

(56) References Cited

U.S. PATENT DOCUMENTS 5,734,596 A * 3/1998 Medelius ............. G01D 18/004
                                                              330/124 R
5,841,274 A * 11/1998 Masreliez ............ G01D 5/2053
                                                              324/207.17
(Continued)

FOREIGN PATENT DOCUMENTS

DE    2555485 A1    6/1977
DE    10059880 A1   6/2002
(Continued)

OTHER PUBLICATIONS

International Search Report for PCT/GB2014/052460, dated Mar. 26, 2015 (7 pages).
(Continued)

*Primary Examiner* — Michael J Dalbo
(74) *Attorney, Agent, or Firm* — Merchant & Gould P.C.

(57) ABSTRACT

Position sensors include processing circuits. The processing circuits include first and second measurement circuits that each process at least one common sensor signal. A measurement processing circuitry is arranged to use the measurements from each measurement circuit, typically in a time interleaved manner, so that whilst the measurement processing circuitry is using the measurements from one measurement circuit, measurements obtained in the other measurement circuit can be used to determine calibrations that can be used to calibrate subsequent measurements obtained from that measurement circuit.

15 Claims, 51 Drawing Sheets

(51) Int. Cl.
*G01D 5/14* (2006.01)
*G01D 5/24* (2006.01)

(56) References Cited

U.S. PATENT DOCUMENTS

| | | | |
|---|---|---|---|
| 7,307,595 B2 | 12/2007 | Schantz et al. | |
| 2003/0062889 A1* | 4/2003 | Ely | G01D 5/2073 324/207.17 |
| 2007/0132617 A1* | 6/2007 | Le | H03M 1/1014 341/120 |
| 2009/0058407 A1 | 3/2009 | Kanekawa et al. | |
| 2011/0017194 A1 | 3/2011 | Bronczyk et al. | |
| 2012/0072169 A1 | 3/2012 | Gribble | |
| 2012/0242520 A1* | 9/2012 | Noguchi | H03M 1/0624 341/118 |

FOREIGN PATENT DOCUMENTS

| | | |
|---|---|---|
| EP | 0556991 A1 | 8/1993 |
| EP | 1884746 A2 | 2/2008 |
| JP | 2004-205456 A | 7/2004 |
| JP | 2008-524588 A | 7/2008 |
| JP | 2009-58291 A | 3/2009 |
| JP | 2010-185756 A | 8/2010 |
| JP | 2012-026926 A | 2/2012 |
| JP | 2012-529028 A | 11/2012 |
| JP | 2013-109731 A | 6/2013 |
| WO | 95/31696 A1 | 11/1995 |
| WO | 97/14935 A2 | 4/1997 |
| WO | 2005/085763 A2 | 9/2005 |
| WO | 2008/032008 A1 | 3/2008 |
| WO | 2009/115764 A1 | 9/2009 |

OTHER PUBLICATIONS

UK Search Report for GB 1401167.0, dated Dec. 31, 2014 (6 pages).

UK Search Report for GB 1314405.0, dated Dec. 10, 2013 (4 pages).

Office Action for Japanese Patent Application No. 2016-532743, dated Aug. 24, 2018.

\* cited by examiner f_polarity    2*f_excitation

Fig. 34
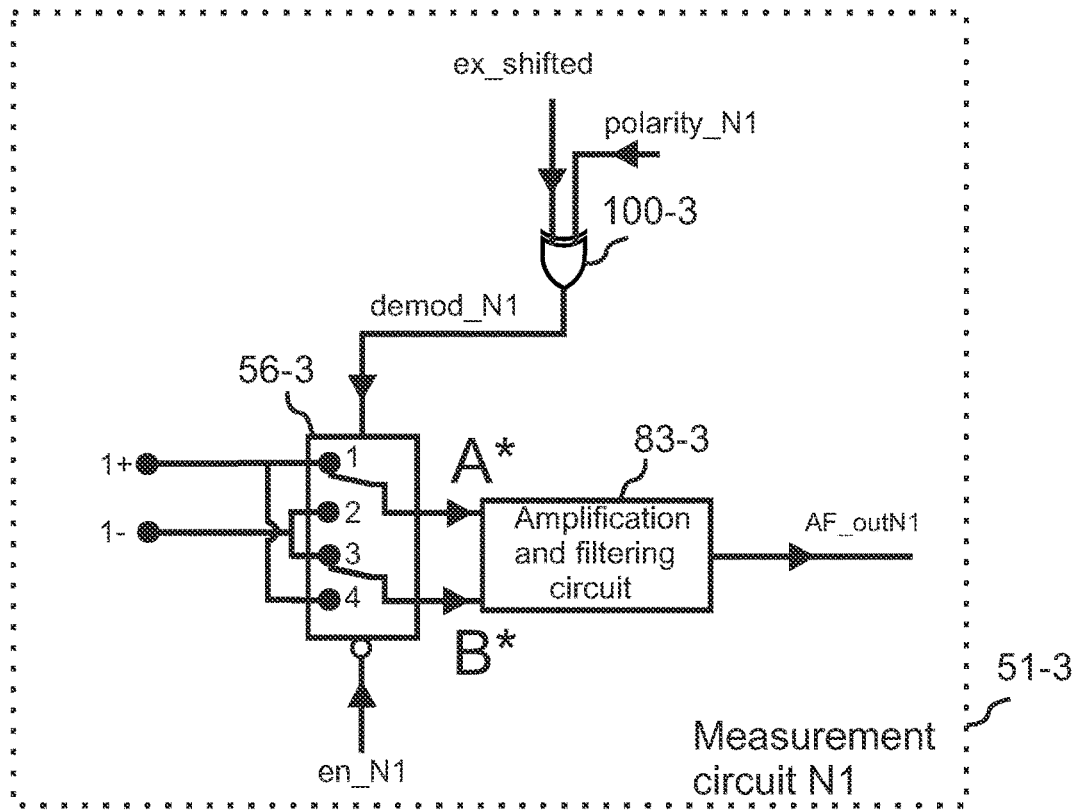
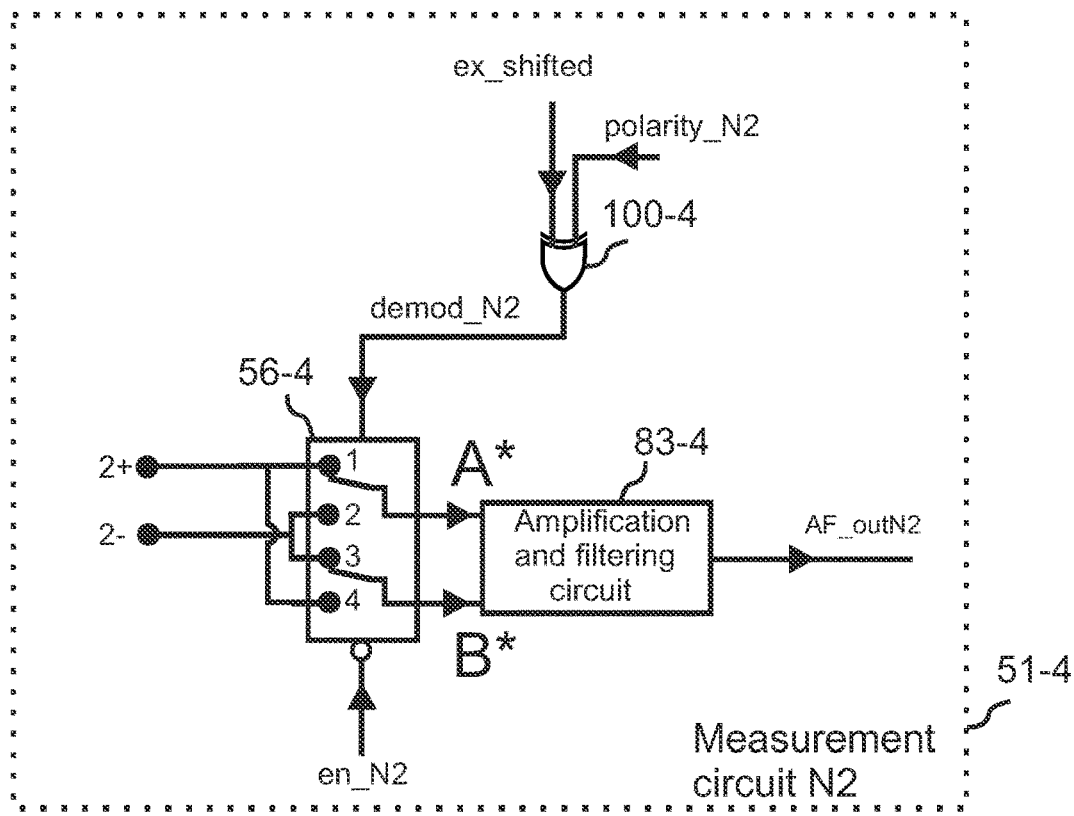

POSITION SENSOR

This application is a National Stage of PCT/GB2014/052460, filed 12 Aug. 2014, which claims benefit of 1314405.0, filed 12 Aug. 2013 in the United Kingdom, and 1401167.0, filed 23 Jan. 2014 in the United Kingdom, which applications are incorporated herein by reference. To the extent appropriate, a claim of priority is made to each of the above disclosed applications.

The present invention relates to position sensors and to apparatus for use in such sensors. The invention has particular, although not exclusive, relevance to inductive position sensors that can be used in linear or rotary applications and to excitation circuitry and processing circuitry used in such position sensors.

Position sensors are used in many industries. Optical encoders are used in many applications and offer the advantages of providing low latency measurements and high update rates. However, optical encoders are expensive and require a clean environment to work correctly.

Inductive position encoders are also well known and typically include a movable target, whose position is related to the machine about which position or motion information is desired, and stationary sensor coils which are inductively coupled to the moving target. The sensor coils provide electrical output signals which can be processed to provide an indication of the position, direction, speed and/or acceleration of the movable target and hence for those of the related machine. In some applications, the target may be stationary and the sensor coils move and in other applications both may move.

Some inductive position encoders employ a magnetic field generator as the target. The magnetic field generator and the sensor coils are arranged so that the magnetic coupling between them varies with the position of the movable member relative to the stationary member. As a result, an output signal is obtained from each sensor coil which varies with the position of the movable member. The magnetic field generator may be an active device such as a powered coil; or a passive device, such as a field concentrating member (e.g. a ferrite rod), a conductive screen or a resonator. When a passive device is used, the magnetic field generator is typically energised by an excitation coil which can be mounted on the stationary member.

Whilst inductive position encoders are much cheaper than optical encoders, they typically have a higher latency and a lower update rate compared to optical encoders which make them less reliable for use in applications where the moving object is moving quickly.

The present invention aims to provide alternative position encoders and to provide novel components therefor. Embodiments of the invention provide new processing circuitry and new excitation circuitry that can be used with, for example, an inductive position encoder to reduce its latency and improve its accuracy.

According to one aspect, the present invention provides processing circuitry for use in processing sensor signals, the processing circuitry comprising: a first measurement circuit configured to receive a first plurality of sensor signals from a plurality of sensor inputs and configured to pass the first plurality of sensor signals through the first measurement circuit in a time division manner in a sequence of time intervals to generate a first time division sequence of sensor measurements in response thereto; a second measurement circuit configured to receive at least one sensor signal from a sensor input and configured to pass the at least one sensor signal through the second measurement circuit to generate sensor measurements in response thereto; and measurement processing circuitry configured to process the sensor measurements generated by the first and second measurement circuits to determine and output sensor results; wherein the first and second measurement circuits are both configured to receive a sensor signal from at least one common sensor input and to output respective common sensor measurements in response thereto; and wherein the measurement processing circuitry is configured to determine and output sensor results using the common sensor measurements obtained from the first and second measurement circuits. By providing two (or more) measurement circuits in this way, where each measurement circuit can process a common sensor signal, the processing circuitry can detect errors in the measurements and can also continuously calibrate one or more of the measurement circuits.

The measurement processing circuitry can determine various different calibration data including:
  calibration data that maps the signal amplitude measured in one measurement channel to the signal amplitude measured in another measurement channel in order to remove the difference in the gain and offset between measurement channels;
  calibration data determined by measuring the amplitude and phase of a reference signal that is used for breakthrough offset correction in the sensor signals measured by electronics;
  calibration data determined by measuring the phase of the reference signal to actively tune its value to a predetermined phase stored in the memory of the electronics;
  calibration data corresponding to the phase shift introduced in the amplification and filtering circuitry in order to correct the measurement provided by the measurement circuit;
  calibration data that removes any remaining differences between sensor results obtained from different measurement circuits so that substantially the same sensor result is output from either measurement circuit.

The measurement processing circuitry may determine and output a sensor result using the common sensor measurement obtained from the first measurement circuit and the common sensor measurement obtained from the second measurement circuit. In one embodiment, the measurement processing circuitry determines calibration data using the common sensor measurement from the first measurement circuit and determines a sensor result using the common sensor measurement from the second measurement circuit and the calibration data determined using the common sensor measurement from the first measurement circuit. The measurement processing circuitry may be arranged to determine mapping data that relates measurements made by the first measurement circuit to measurements made by the second measurement circuit using the common sensor measurements from the first and second measurement circuits.

In some embodiments, the measurement processing circuitry switches between determining sensor results using sensor measurements from the first measurement circuit and sensor measurements obtained from the second measurement circuit and determines calibration data to smooth changes in the sensor results when performing said switching using the common sensor measurement from the first measurement circuit and the common sensor measurement from the second measurement circuit.

Typically, each input sensor signal has a first frequency and the first and second measurement circuits are configured to receive and down convert the sensor signals to a sensor signal having a second frequency that is lower than the first frequency. In some embodiments, the measurement processing circuitry may control the switching of the sensor signals through said first measurement circuit in a time division multiplexed manner so that said common sensor signal passes through said first and second measurement circuits at different times. Preferably, the common sensor signal is switched through said first and second measurement circuits at a third frequency that is higher than said second frequency as this allows measurements of the common signal to be obtained at around the same point in time, without requiring any buffer amplifiers that would allow the common sensor signal to be input to both measurement circuits at the same time.

In one embodiment, the plurality of sensor inputs includes main sensor inputs and auxiliary sensor inputs and the first measurement circuit is configured to receive auxiliary sensor signals from the auxiliary sensor inputs and to output auxiliary sensor measurements and wherein said measurement processing circuitry is configured to process said auxiliary sensor measurements to determine calibration data for use in calibrating sensor results.

The plurality of sensor inputs typically includes at least one main sensor input and at least one auxiliary sensor input, wherein the first measurement circuit is configured to receive auxiliary sensor signals from the at least one auxiliary sensor input and to output auxiliary sensor measurements.

The measurement processing circuitry may be arranged to determine mapping data that relates measurements made by the first measurement circuit to measurements made by the second measurement circuit using the common sensor measurements from the first and second measurement circuits and may be arranged to determine a breakthrough correction for a sensor result using at least one auxiliary sensor measurement and the determined mapping data.

The second measurement circuit may also be configured to receive a plurality of sensor signals from a plurality of sensor inputs and to pass the plurality of sensor signals through the second measurement circuit in a time division manner in a sequence of time intervals to generate a second time division sequence of sensor measurements.

In this case, the plurality of sensor inputs may include at least one main sensor input and at least one auxiliary sensor input, wherein the first measurement circuit is configured to receive auxiliary sensor signals from the at least one auxiliary sensor input and to output auxiliary sensor measurements, wherein the second measurement circuit is configured to receive auxiliary sensor signals from the at least one auxiliary sensor input and to output auxiliary sensor measurements. The first and second measurement circuits may be configured: i) so that during time intervals when the first measurement circuit is passing the auxiliary sensor signals there through, the second measurement circuit is passing sensor signals from the at least one main sensor input there through; and ii) so that during time intervals when the second measurement circuit is passing the auxiliary sensor signals there through, the first measurement circuit is passing the sensor signals from the at least one main sensor input there through.

The measurement processing circuitry may be configured to determine a breakthrough correction for the first measurement circuit using an auxiliary sensor measurement obtained from the first measurement circuit and to determine a breakthrough correction for the second measurement circuit using an auxiliary sensor measurement obtained from the second measurement circuit and may be configured to correct main sensor measurements obtained from the first measurement circuit using the breakthrough correction for the first measurement circuit and to correct main sensor measurements obtained from the second measurement circuit using the breakthrough correction for the second measurement circuit.

In some embodiments, the first and second measurement circuits overlap the passing of the signals from the at least one main sensor input there through, so that during some time intervals, both the first and second measurement circuits generate sensor measurements of the sensor signals received from the at least one main sensor input.

The processing circuitry may further comprise excitation circuitry for generating an excitation signal for energising a target and the sensor signals are received from the sensor inputs in response to the energising of target. In this case, each measurement circuit may include demodulating circuitry for multiplying the sensor signal passing through the measurement circuit with a demodulation signal comprising a phase shifted version of the excitation signal and phase shift circuitry can be provided for varying the phase of the excitation signal or the phase shifted version of the excitation signal forming part of the demodulation signal. In this case, the plurality of sensor inputs may include an auxiliary sensor input, and the phase shift circuitry may vary the phase in dependence upon a control signal determined using a sensor measurement obtained from the sensor signal received at said auxiliary sensor input.

In one embodiment, each measurement circuit is arranged to output a first main sensor measurement corresponding to a sensor signal received from a first main sensor input and to output a second main sensor measurement corresponding to a sensor signal received from a second main sensor input and wherein the measurement processing circuitry is configured: i) to perform a ratiometric calculation of the first main sensor measurement and the second main sensor measurement obtained from the first measurement circuit, to determine a first ratiometric result; ii) to perform a ratiometric calculation of the first main sensor measurement and the second main sensor measurement obtained from the second measurement circuit, to determine a second ratiometric result; and iii) to determine and output sensor results using the first and second ratiometric results.

The measurement processing circuitry may be arranged to determine a difference between sensor results obtained using sensor measurements from the first measurement circuit and corresponding sensor results obtained using sensor measurements from the second measurement circuit and may determine a correction to be applied to the sensor measurements obtained from at least said first measurement circuit using said difference so that sensor results obtained using measurements from said first and second measurement circuits in relation to the same sensor signals are substantially the same. In this case, the measurement processing circuitry may also determine a correction to be applied to the sensor measurements obtained from said second measurement circuit using said difference.

A speed measure relating to a rate of change of the sensor results may also be determined and used to determine a compensation to be applied to the sensor results to compensate for motion of a sensor target. The compensation to be applied to a sensor result may depend on the value of the uncompensated sensor result. In a preferred embodiment, the measurement processing circuitry determines a sensor result using a first sensor measurement of a sensor signal obtained from a first main sensor input during a first time interval by the first measurement circuit and a second sensor measurement of a sensor signal obtained from a second main sensor input during a second time interval by the first measurement circuit; and the measurement processing circuitry applies a first compensation to the sensor result if the first time interval is before the second time interval and applies a second, different, compensation to the sensor result if the second time interval is before the first time interval. An acceleration measure may also be used to determine the compensation measure.

In one embodiment, the first and second measurement circuits are configured, during an overlap period, to overlap the passing of sensor signals from the at least one main sensor input there through, so that during some time intervals, both the first and second measurement circuits generate sensor measurements of the sensor signals received from the at least one main sensor input, wherein the measurement processing circuitry is arranged: i) to determine a first sensor result using sensor measurements obtained from the first measurement circuit during said overlap period; ii) to determine a second sensor result using sensor measurements obtained from the second measurement circuit during said overlap period; iii) to determine a difference between the first and second sensor results; and iv) to apply a compensation to subsequent sensor results using said difference to compensate for dynamic errors caused by motion of a sensor target.

In this case, the measurement processing circuitry may determine a sensor result using a first sensor measurement of a sensor signal obtained from a first main sensor input during a first time interval by the first measurement circuit and a second sensor measurement of a sensor signal obtained from a second main sensor input during a second time interval by the first measurement circuit, wherein the measurement processing circuitry is arranged may apply a first compensation using said difference to the sensor result if the first time interval is before the second time interval, and may apply a second, different, compensation using said difference to the sensor result if the second time interval is before the first time interval.

In one embodiment, each measurement circuit has an auxiliary mode of operation and a main sensor mode of operation, wherein when the first measurement circuit is configured to operate in the main sensor mode of operation, the second measurement circuit is configured to operate in the auxiliary mode of operation and vice versa. When operating in the main sensor mode of operation, a measurement circuit is configured to pass the sensor signals obtained from the at least one main sensor input there through without passing the sensor signals from the auxiliary sensor inputs there through and when operating in the auxiliary mode of operation, a measurement circuit is configured to pass the signals obtained from the auxiliary sensor inputs and sensor signals obtained from the at least one main sensor input there through in a time division manner. In this case, the measurement processing circuitry may determine calibration data for a measurement circuit using sensor measurements of the sensor signals obtained from the at least one main sensor input when the measurement circuit is operating in said auxiliary mode of operation and may apply the calibration data to sensor results obtained from the measurement circuit when operating in said main sensor mode of operation. Again, the calibration data determined for one measurement circuit may depend on a speed (an acceleration) measure determined from sensor results obtained using sensor measurements from the other measurement circuit. Typically, the determined calibration data for a measurement circuit is for cancelling a phase offset introduced into the sensor results by the measurement circuit.

In one embodiment, analogue to digital converter, ADC, circuitry is provided for converting sensor measurements obtained from the first measurement circuit to digital data and second analogue to digital converter circuitry is provided for converting sensor measurements obtained from the second measurement circuit, wherein the measurement processing circuitry dynamically adjusts a timing of a conversion performed by the first ADC circuitry in dependence upon a speed measure determined using sensor measurements obtained from the second measurement circuit. Similarly, the measurement processing circuitry may dynamically adjust a timing of a conversion performed by the second ADC circuitry in dependence upon a speed measure determined using sensor measurements obtained from the first measurement circuit.

In one embodiment, each measurement circuit is configured to multiplex a pair of sensor signals there through during each time interval to generate a sensor measurement signal whose phase varies with the ratio of the pair of sensor signals. In this case, the measurement processing circuitry may include a zero crossing detector for detecting zero crossings of the sensor measurement signal. The measurement circuitry may also include an analogue to digital converter, ADC, for obtaining an amplitude measure of an amplitude of the sensor measurement signal between a pair of adjacent detected zero crossing events and wherein the measurement processing circuitry is configured to use the amplitude measure to identify which of the pair of adjacent zero crossing events is a rising zero crossing event and which is a falling zero crossing event.

In one embodiment, the measurement processing circuitry is configured to report sensor results using the sensor measurements from the first measurement circuit during a first part of a detection cycle and is configured to report sensor results using the sensor measurements from the second measurement circuit in a second part of the detection cycle; and wherein the measurement processing circuitry is configured to ignore or add sensor results when switching between reporting using the sensor measurements obtained from the first measurement circuit and reporting using the sensor measurements from the second measurement circuit. For example, the measurement processing circuitry may ignore a first sensor result after switching to the sensor measurements obtained from the second measurement circuit in the event that a first sensor result obtained from the second measurement circuit is obtained within a defined time period of a last reported sensor result obtained using the sensor measurements of the first measurement circuit. Similarly, the measurement processing circuitry may add a sensor result after switching to the sensor measurements obtained from the second measurement circuit if a sensor result was determined using the sensor measurements from the second measurement circuit within a defined time period before switching over to reporting sensor results using the sensor measurements of the second measurement circuit. When adding a new sensor result, the measurement processing circuitry may extrapolate a sensor result made using sensor measurements obtained from the second measurement circuit in a previous time interval in accordance with a measure of a speed of motion of a sensor target (and optionally in accordance with a measure of the acceleration as well).

In one embodiment, the first measurement circuit comprises a first multiplexor for multiplexing a sensor signal with a modulation control signal having a fundamental frequency within a pass band of amplification and filtering circuitry forming part of the first measurement circuit, wherein the switching of the first multiplexor injects unwanted charge injection into the sensor signals at around said fundamental frequency, wherein an output from the first multiplexor is passed through a second multiplexor of the first measurement circuit and a chopper signal, having a frequency that is a multiple of said fundamental frequency, is used to enable and disable the second multiplexor in order to inject additional charge into the sensor signals, and wherein transition points of said chopper signal are time aligned with transition points of said modulation control signal so that the total charge injection into the sensor signals is at the higher frequency of said chopper signal, which higher frequency is outside the pass band of said amplification and filtering circuitry, whereby said charge injection is substantially attenuated in a sensor measurement signal output from the first measurement circuit.

The chopper signal and said modulation control signal may be generated from a common clock signal in order to time align the transition points of the chopper signal and the transition points of the modulation control signal. For example, control signal logic may be provided for generating said chopper signal and said modulation control signal from a master clock signal.

In one embodiment, one of the first and second measurement circuits provides sensor measurements for use in determining main sensor results and the other one of the first and second measurement circuits provides auxiliary measurements and wherein the roles of the first and second measurement circuits is reversed depending on a value of the sensor result.

In an embodiment, the measurement processing circuitry may use the sensor measurements from the first measurement circuit to determine first sensor results that vary with a sensor variable according to a first function and to use the sensor measurements from the second measurement circuit to determine second sensor results that vary with the sensor variable according to a second function that is different from the first function; and wherein the measurement processing circuitry is configured to determine a value of the sensor variable using the first and second sensor results. The measurement processing circuitry may use the first sensor results to determine the value of the sensor variable or may use the second sensor results to determine the value of the sensor variable depending on the value of the sensor variable. The measurement processing circuitry may to use the first sensor results to determine a first value of the sensor variable and to use the second sensor results to determine a second value of the sensor variable and may combine the first and second values in accordance with a weighting function. The weighting function used may depend on the value of the sensor variable.

In one embodiment, the plurality of sensor inputs include auxiliary sensor inputs, wherein the first and second measurement circuits are configured to obtain sensor measurements of the sensor signals from the at least one main sensor input more frequently than they obtain sensor measurements of the sensor signals from the auxiliary sensor inputs; and wherein sensor inputs that are defined as being main sensor inputs and sensor inputs that are defined as being the auxiliary sensor inputs change in dependence upon sensor results determined by the measurement processing circuitry. In this case, the measurement processing circuitry may use the sensor results to determine a value of a sensor variable and when the sensor variable falls within a first range of values the main sensor inputs correspond to a first set of the sensor inputs and the auxiliary sensor inputs correspond to a second set of the sensor inputs and when the sensor variable falls within a second range of values the main sensor inputs correspond to the second set of the sensor inputs and the auxiliary sensor inputs correspond to the first set of the sensor inputs.

According to another aspect, the present invention also provides a position sensor comprising: a plurality of detection elements and a target, at least one of: i) the detection elements; and ii) the target, being moveable relative to the other such that signals are generated in the detection elements that depend on the relative position of the target and the detection elements; and any of the processing circuitry described above for processing the signals from the detection elements and for determining and outputting position information relating to the relative position of the target and the detection elements. The position sensor may be, for example, a linear or rotary position sensor or a proximity sensor. The sensor may use inductive detection elements, capacitive detection elements or Hall effect detection elements.

According to another aspect, the present invention provides a sensor board carrying: an excitation coil comprising a first set of one or more substantially planar conductor loops and a second set of one or more substantially planar conductor loops, wherein the loops of the first set are substantially concentric and are connected in series and wound in the same sense, wherein the one or more conductor loops of the second set are connected in series and wound in the same sense, the one or more conductor loops of the first set being grouped together between a first inner diameter and a first outer diameter and the conductor loops of the second set being grouped together between a second inner diameter and a second outer diameter and wherein the second outer diameter is smaller than the first inner diameter; and a first detection coil comprising a third set of one or more substantially planar conductor loops and a fourth set of one or more substantially planar conductor loops, the conductor loops of the first detection coil being substantially concentric with each other and with the conductor loops of the excitation coil;

wherein the one or more conductor loops of the third set are connected in series and wound in the same sense, wherein the one or more conductor loops of the fourth set are connected in series and wound in the same sense, wherein the one or more conductor loops of the third set are connected in series and wound in the opposite sense with the one or more conductor loops of the fourth set; wherein the one or more conductor loops of the third set are grouped together between a third inner diameter and a third outer diameter; wherein the one or more conductor loops of the fourth set are grouped together between a fourth inner diameter and a fourth outer diameter, wherein the fourth outer diameter is less than the third inner diameter; wherein the number of conductor loops in, and the respective inner and outer diameters of, the third and fourth sets of conductor loops are selected so that the first detection coil is substantially insensitive to background electromagnetic signals; and wherein the number of conductor loops in, and the respective inner and outer diameters of, the first, and second conductor loops are selected so that the detection coil is substantially balanced with respect to the excitation coil.

In one embodiment, the one or more conductor loops of the third set are located in closer proximity to the one or more conductor loops of the first set than the proximity of the one or more conductor loops of the fourth set to the one or more conductor loops of the first set. Alternatively, the one or more conductor loops of the fourth may be located in closer proximity to the one or more conductor loops of the second set than the proximity of the one or more conductor loops of the third set to the one of more conductor loops of the first set. Alternatively still, the one or more conductor loops of the third set may be located in closer proximity to the one or more conductor loops of the second set than the proximity of the one or more conductor loops of the fourth set to the one of more conductor loops of the second set.

According to another aspect, the present invention provides processing circuitry for use in processing sensor signals, the processing circuitry comprising: a first measurement circuit configured to receive a plurality of sensor signals from a plurality of sensor inputs and configured to pass the plurality of sensor signals through the first measurement circuit in a time division manner in a sequence of time intervals to generate a first time division sequence of sensor measurements in response thereto; a second measurement circuit configured to receive at least one sensor signal and configured to pass the at least one sensor signal through the second measurement circuit to generate sensor measurements in response thereto; and measurement processing circuitry configured to process the sensor measurements generated by the first and second measurement circuits to determine and output sensor results; wherein the first and second measurement circuits are both configured to receive a sensor signal from at least one common sensor input and to output respective common sensor measurements in response thereto; and wherein the measurement processing circuitry is configured to use said common sensor measurements to determine first mapping data that relates sensor measurements obtained from said second measurement circuit to sensor measurements obtained from said first measurement circuit.

According to another aspect, the present invention provides processing circuitry for use in processing sensor signals, the processing circuitry comprising: a first measurement circuit configured to receive a plurality of sensor signals from a plurality of sensor inputs and configured to pass the plurality of sensor signals through the first measurement circuit in a time division manner in a sequence of time intervals to generate a first time division sequence of sensor measurements in response thereto; a second measurement circuit configured to receive a plurality of sensor signals from a plurality of sensor inputs and configured to pass the plurality of sensor signals through the second measurement circuit in a time division manner in a sequence of time intervals to generate a second time division sequence of sensor measurements in response thereto; and measurement processing circuitry configured to process the first and second time division sequences of sensor measurements to determine and output sensor results; wherein during first time periods, the measurement processing circuitry is arranged to determine sensor results using sensor measurements from the first measurement circuit and during second time periods, the measurement processing circuitry is arranged to determine sensor results using sensor measurements from the second measurement circuit; wherein during at least one first time period, the measurement processing circuitry is arranged to determine calibration data for use in determining the sensor results using the sensor measurements generated by the second measurement circuit.

According to another aspect, the present invention provides processing circuitry for use in processing sensor signals, the processing circuitry comprising: a first measurement circuit configured to receive and down convert an input sensor signal having a first frequency to a sensor signal having a second frequency that is lower than the first frequency and to generate therefrom sensor measurements; a second measurement circuit configured to receive and down convert an input sensor signal having said first frequency to a sensor signal having said second frequency and to generate therefrom sensor measurements; wherein the first and second measurement circuits are both configured to receive a common sensor signal from at least one common sensor input; control circuitry for causing said common sensor signal to be switched through said first and second measurement circuits in a time division multiplexed manner so that said common sensor signal passes through said first and second measurement circuits at different times; wherein said control circuitry is arranged to cause said common sensor signal to be switched through said first and second measurement circuits at a third frequency that is higher than said second frequency; and measurement processing circuitry configured to process the sensor measurements obtained from said first and second measurement circuits to determine sensor results.

According to another aspect, the present invention provides processing circuitry for use in processing sensor signals, the processing circuitry comprising: a first measurement circuit configured to receive a plurality of sensor signals from a plurality of sensor inputs, including at least one main sensor input and at least one auxiliary sensor input, and configured to pass the plurality of sensor signals through the first measurement circuit in a time division manner in a sequence of time intervals to generate a first time division sequence of sensor measurements in response thereto; a second measurement circuit configured to receive a plurality of sensor signals from a plurality of sensor inputs, including said at least one main sensor input and said at least one auxiliary sensor input, and configured to pass the plurality of sensor signals through the second measurement circuit in a time division manner in a sequence of time intervals to generate a second time division sequence of sensor measurements in response thereto; and measurement processing circuitry configured to process the first and second time division sequences of sensor measurements to determine and output sensor results; wherein each measurement circuit has an auxiliary mode of operation and a main sensor mode of operation; wherein when the first measurement circuit is configured to operate in the main sensor mode of operation, the second measurement circuit is configured to operate in the auxiliary mode of operation and when the second measurement circuit is configured to operate in the main sensor mode of operation, the first measurement circuit is configured to operate in the auxiliary mode of operation; wherein when operating in the main sensor mode of operation, a measurement circuit is configured to pass the sensor signals obtained from the at least one main sensor input there through and when operating in the auxiliary mode of operation, a measurement circuit is configured to pass the signals obtained from the at least one auxiliary sensor input there through; and wherein said measurement processing unit is configured: i) to determine sensor results using sensor measurements obtained from a measurement circuit when operating in said main sensor mode of operation; ii) to determine calibration data for a measurement circuit using sensor measurements obtained from the measurement circuit when the measurement circuit is operating in said auxiliary mode of operation; and iii) to use the calibration data for a measurement circuit when determining the sensor results using the sensor measurements obtained from that measurement circuit when operating in said main sensor mode of operation.

According to another aspect, the present invention provides processing circuitry for use in processing sensor signals, the processing circuitry comprising: measurement circuitry configured to receive a first plurality of sensor signals from a first plurality of sensor inputs, including a first main sensor input and a second main sensor input and configured to pass the first plurality of sensor signals through the measurement circuitry in a time division manner in a sequence of time intervals to generate at least one time division sequence of sensor measurements in response thereto; and measurement processing circuitry configured to process the sensor measurements generated by the measurement circuitry to determine and output sensor results; wherein the measurement processing circuitry is configured to determine a sensor result using a first sensor measurement of a sensor signal obtained from said first main sensor input during a first time interval and a second sensor measurement of a sensor signal obtained from said second main sensor input during a second time interval, and is arranged to apply a first compensation when determining the sensor result if the first time interval is before the second time interval and is arranged to apply a second, different, compensation when determining the sensor result if the second time interval is before the first time interval.

According to another aspect, the present invention provides processing circuitry for use in a position sensor, the processing circuitry comprising: an input for receiving a sensor signal from a sensor input, the sensor signal being generated in response an excitation signal being applied to an excitation element; wherein the excitation signal has an excitation frequency and an excitation signal phase that can vary during use and wherein the sensor signal has the excitation frequency and a sensor signal phase that depends on the excitation signal phase; a demodulator for multiplying the sensor signal with a demodulating clock signal having said excitation frequency and a demodulating clock signal phase, to generate a demodulated sensor signal; control circuitry for processing the demodulated sensor signal to determine position information for a sensor target; and phase tracking circuitry for maintaining a desired phase relationship between the excitation phase and the demodulating clock phase, the phase tracking circuitry comprising: logic circuitry for generating a first square wave clock signal having a fundamental frequency that is a multiple of the excitation frequency; a filter circuit for filtering the square wave clock signal to produce a filtered signal having the fundamental frequency; a comparator circuit for comparing the filtered signal with a reference value to generate a digital signal at the fundamental frequency, with a duty ratio of the digital signal depending on the reference value; and a frequency divider circuit for receiving the digital signal output from the comparator circuit and for dividing the frequency of the digital signal to generate a square wave clock signal having the excitation frequency and a phase that depends on the reference value; and wherein the square wave clock signal generated by the frequency divider circuit is for use in generating said excitation signal or the demodulating clock signal; and wherein the control circuitry is configured to vary the reference value used by said comparator to adjust the phase of the square wave clock signal generated by the frequency divider circuit to maintain the desired phase relationship between the excitation signal phase and the demodulating clock signal phase.

The frequency divider circuit may be arranged to generate first and second demodulating clock signals that are separated in phase by substantially 90 degrees and wherein the demodulator is configured to multiply the sensor signal with the first and second demodulating clock signals in a time interleaved manner. The control circuitry may vary the reference value in dependence upon a sensor signal received from an auxiliary sensor input.

According to another aspect, the present invention provides processing circuitry for use in a position sensor, the processing circuitry comprising first and second measurement circuits that each process at least one common sensor signal and provide corresponding measurements; and measurement processing circuitry that is arranged to use the measurements from each measurement circuit, in a time interleaved and cyclic manner, to determine sensor results so that whilst the measurement processing circuitry is using the measurements from one measurement circuit to determine sensor results, measurements obtained from the other measurement circuit are used to determine correction data that is used to correct subsequent measurements obtained from that measurement circuit. Typically, the measurement processing circuitry will repeatedly update the correction data for a measurement circuit each time the measurement processing circuitry is using measurements from the other measurement circuit to determine sensor results.

As those skilled in the art will appreciate, these various aspects of the invention may be provided separately or they may be combined together in one embodiment. Similarly, the modifications and alternatives described above are applicable to each aspect of the invention and they have not been repeated here for expediency.

These and other aspects of the invention will become apparent from the following detailed description of embodiments and alternatives that are described by way of example only, with reference to the following drawings in which.

Figure 2A:
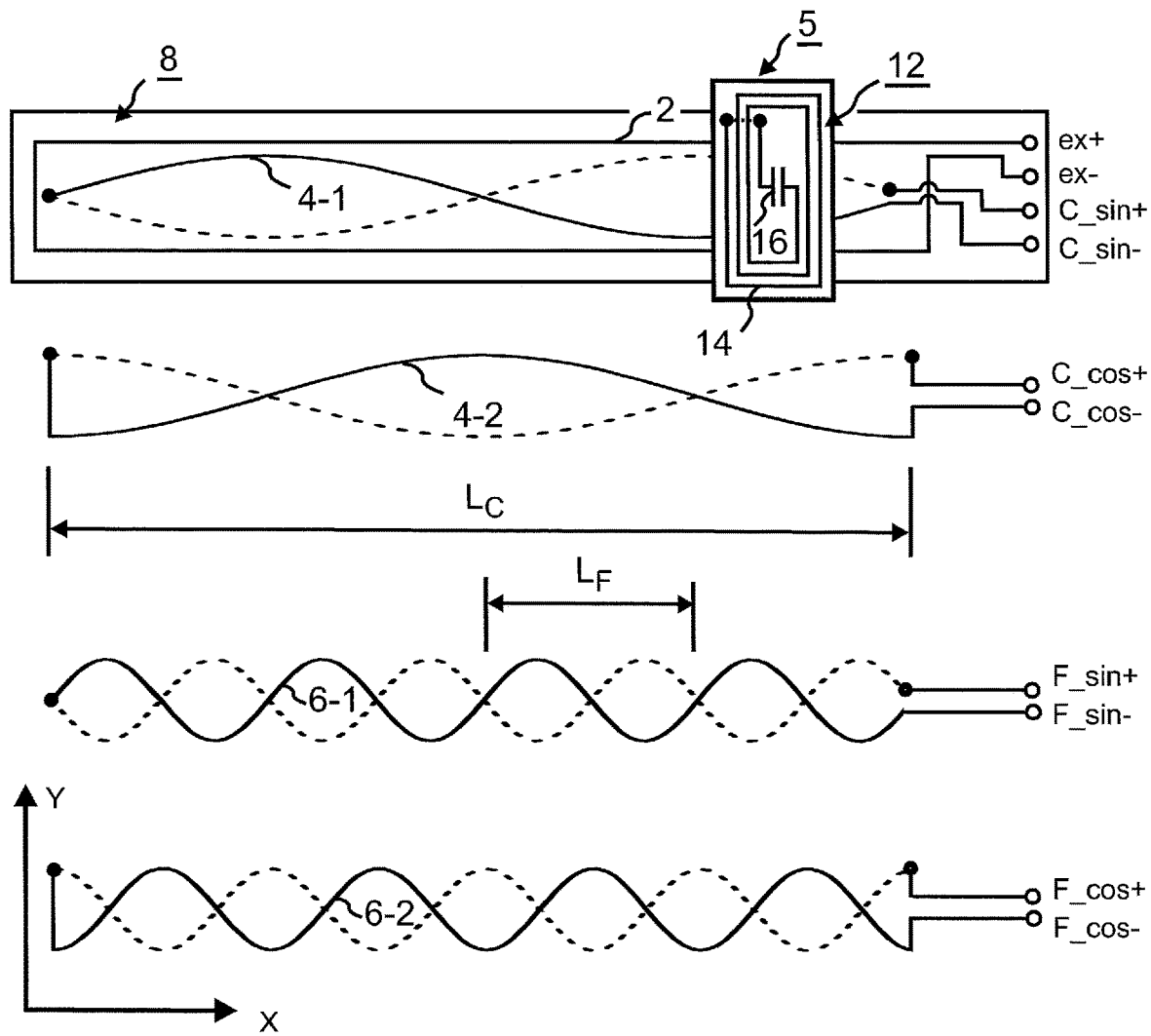
FIG. 2a illustrates an excitation coil, coarse cosine and coarse sine detection coils and fine cosine and fine sine detection coils forming part of a sensor board that is connected to the circuitry shown in FIG. 1.
Figure 2B:
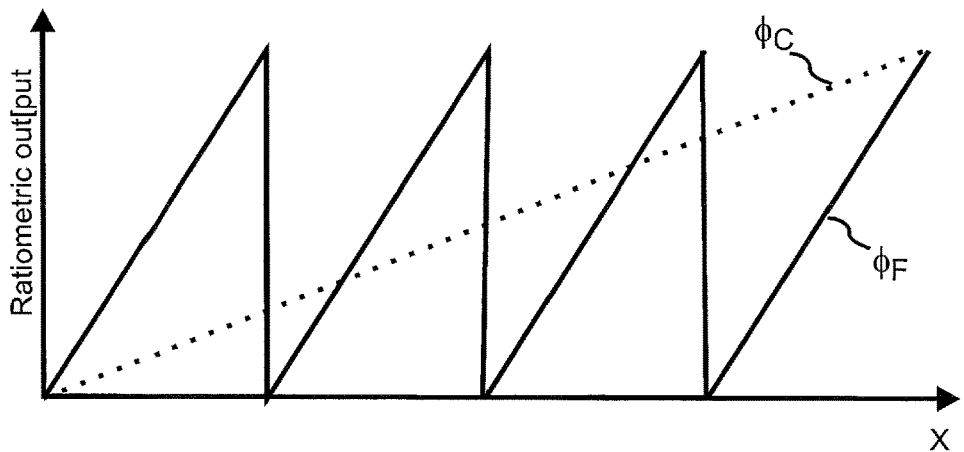
FIG. 2b is a plot illustrating the way in which ratiometric measurements obtained from the coarse and fine detection coils vary with position.
Figure 3:
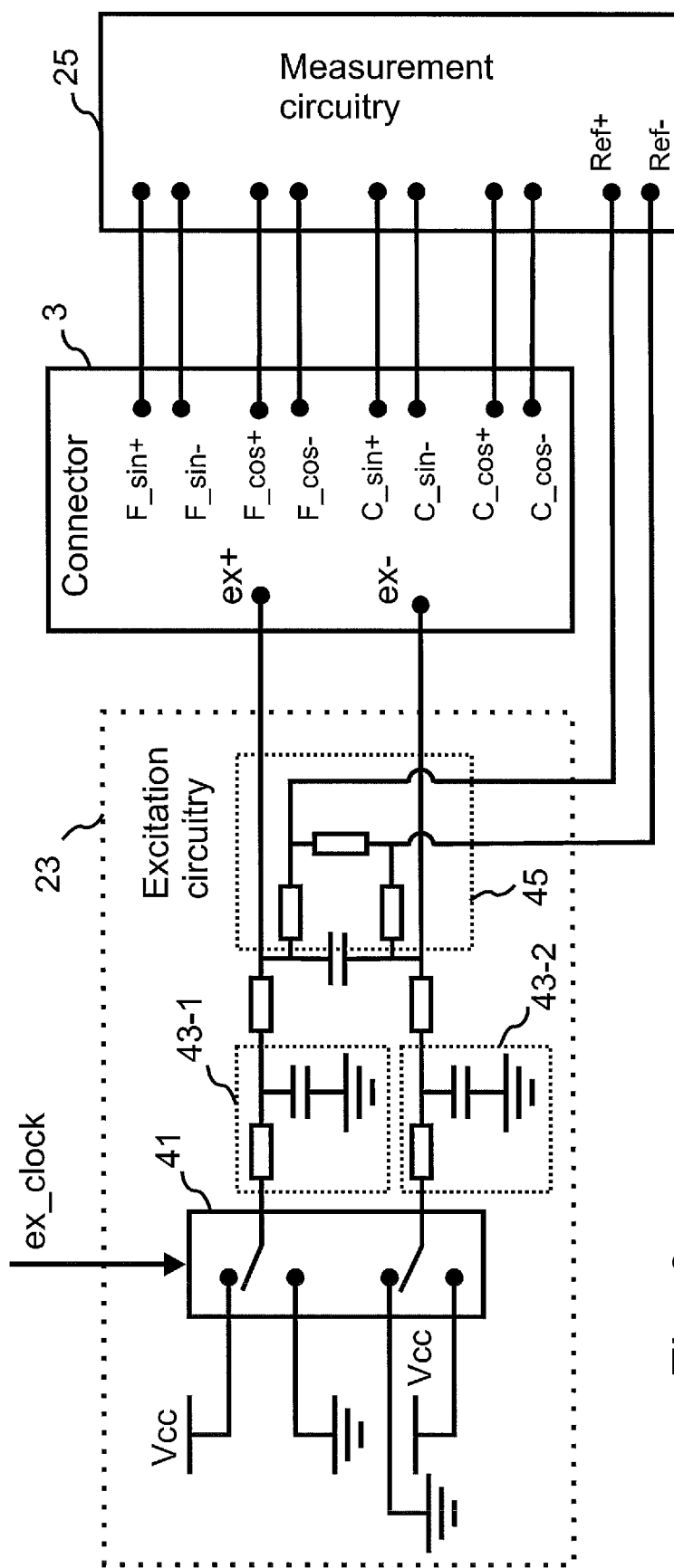
Figure 4:
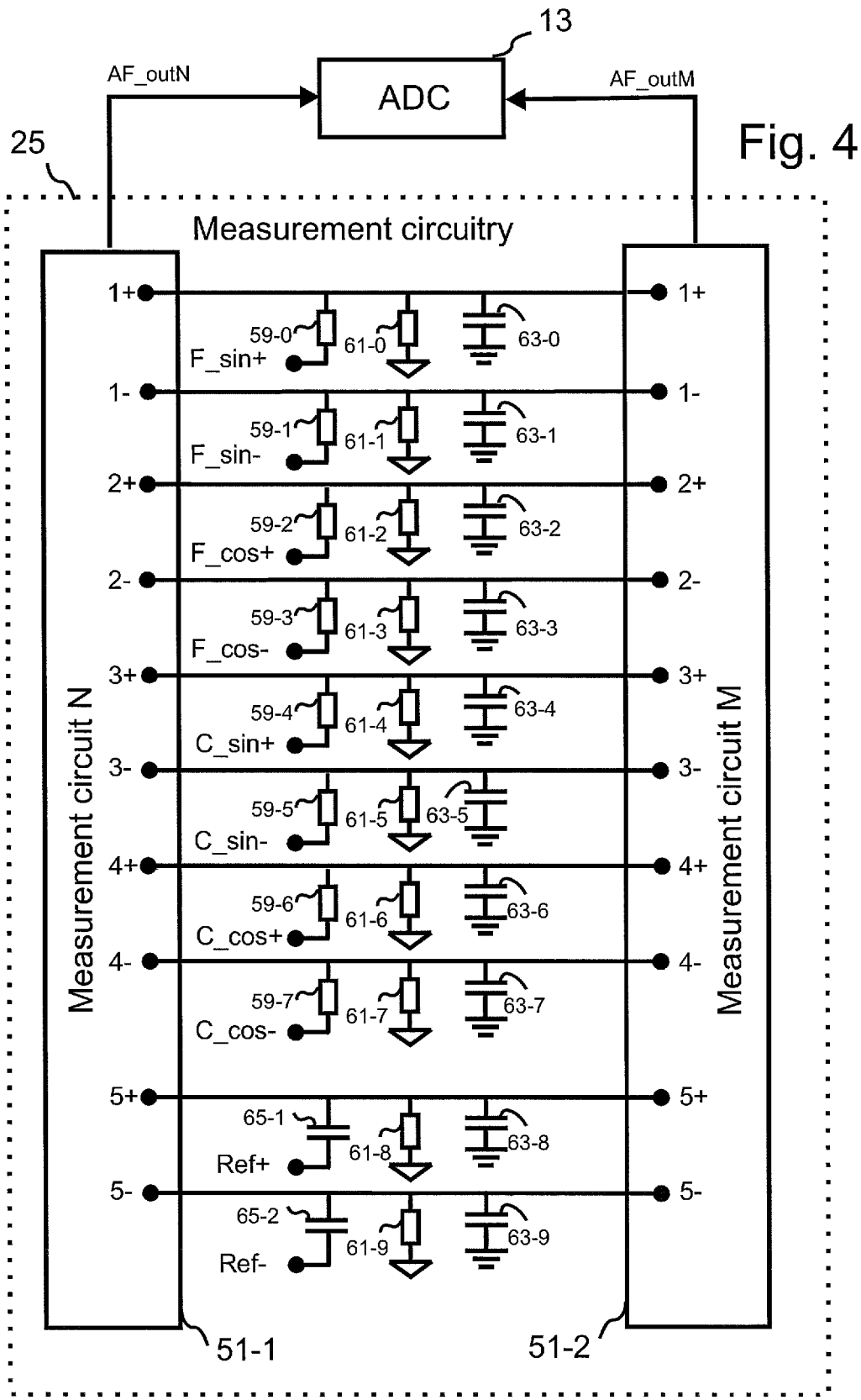
Figure 5:
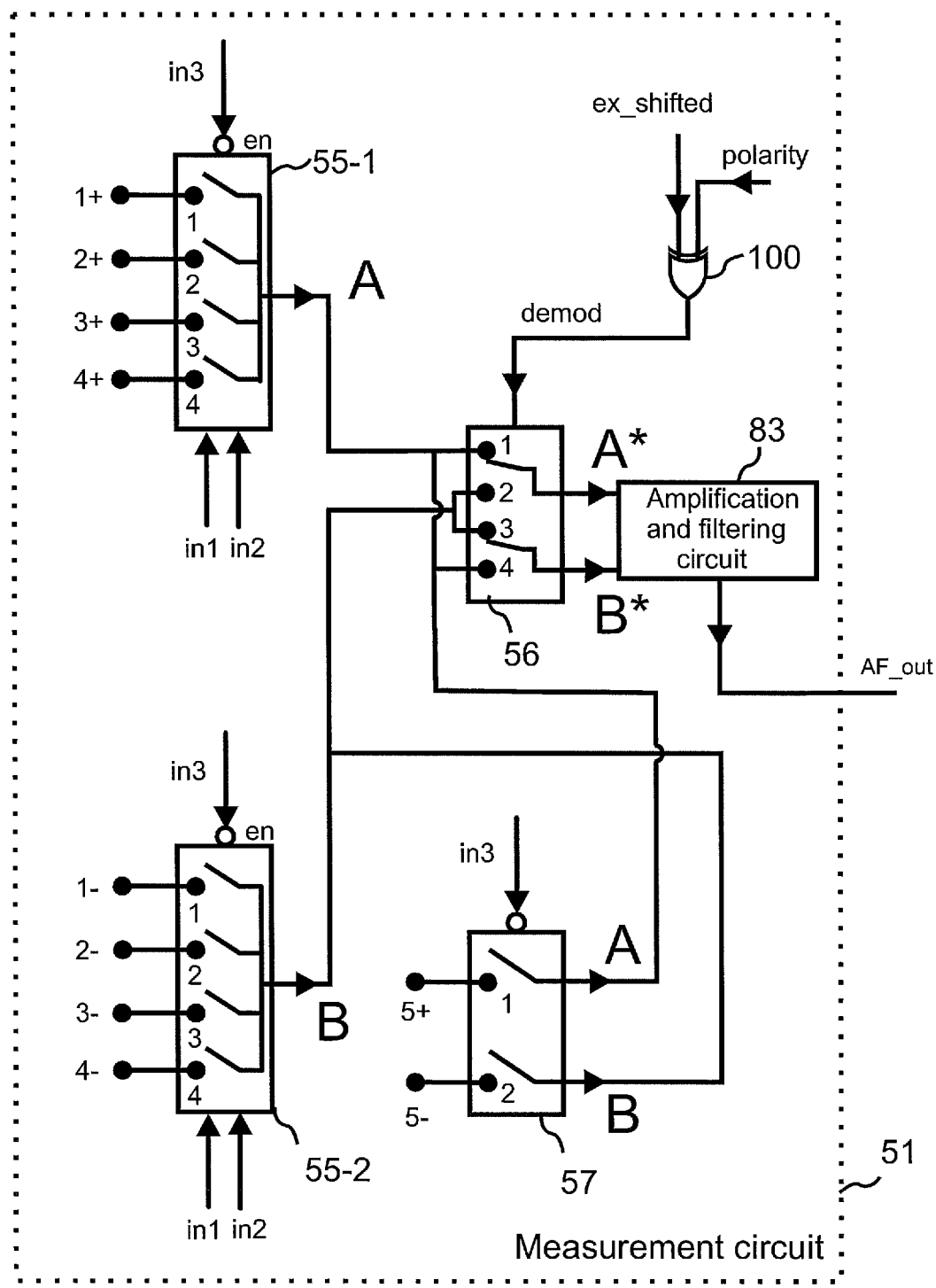
Figure 6:
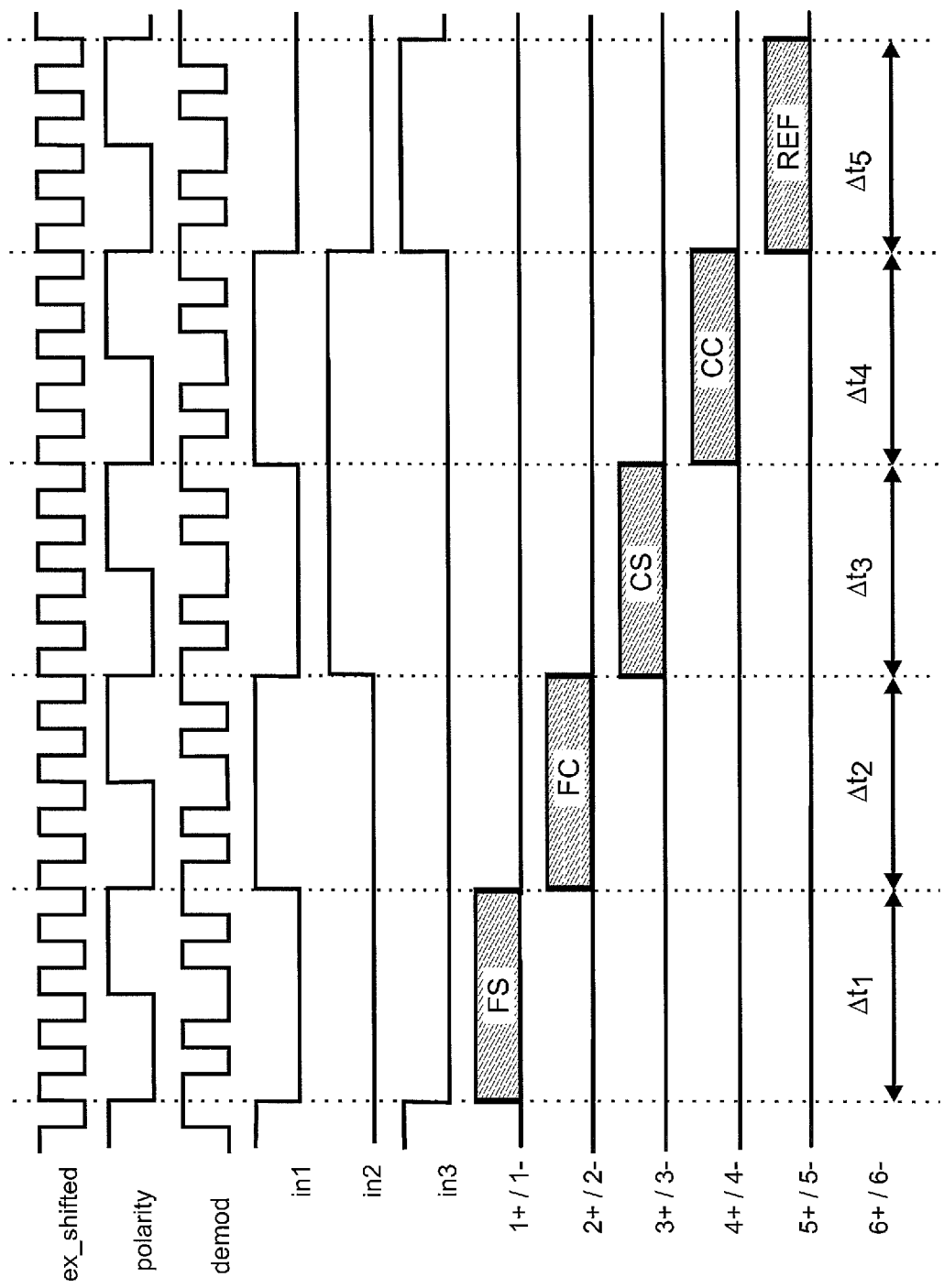
Figure 7A:
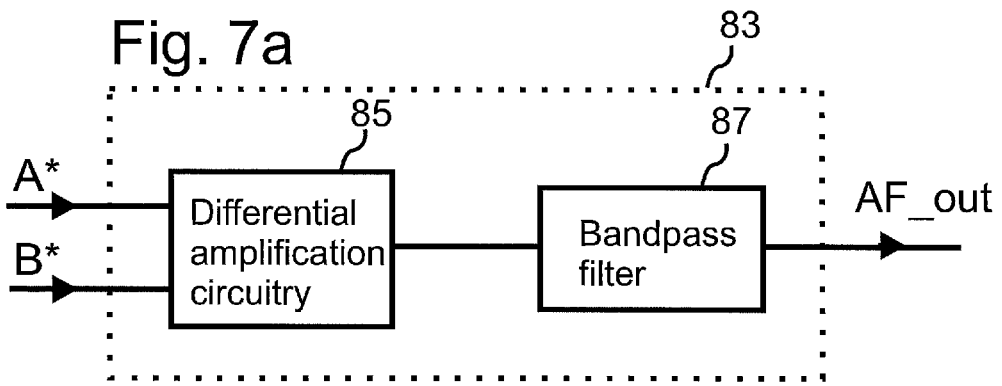
Figure 7B:
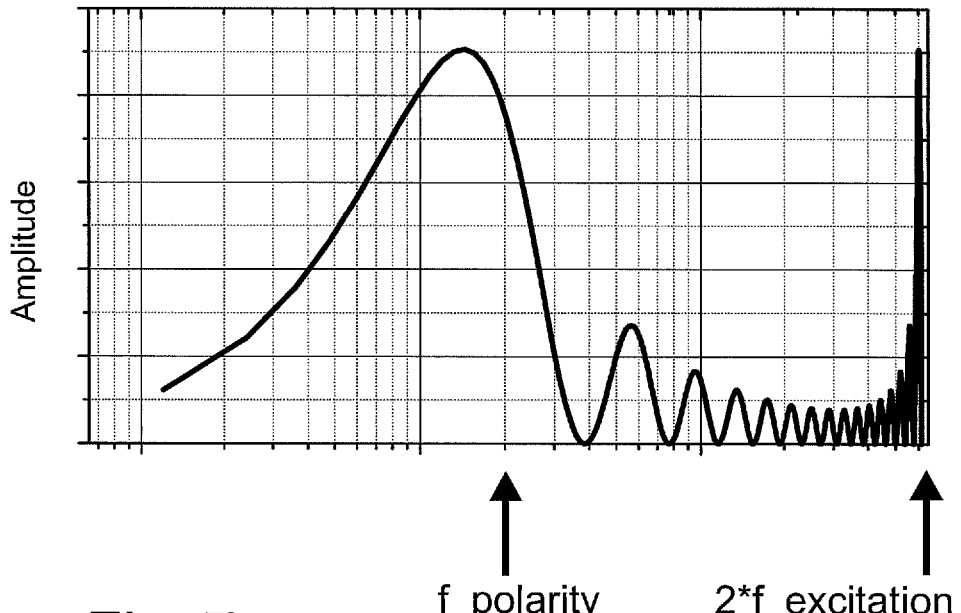
Figure 7C:
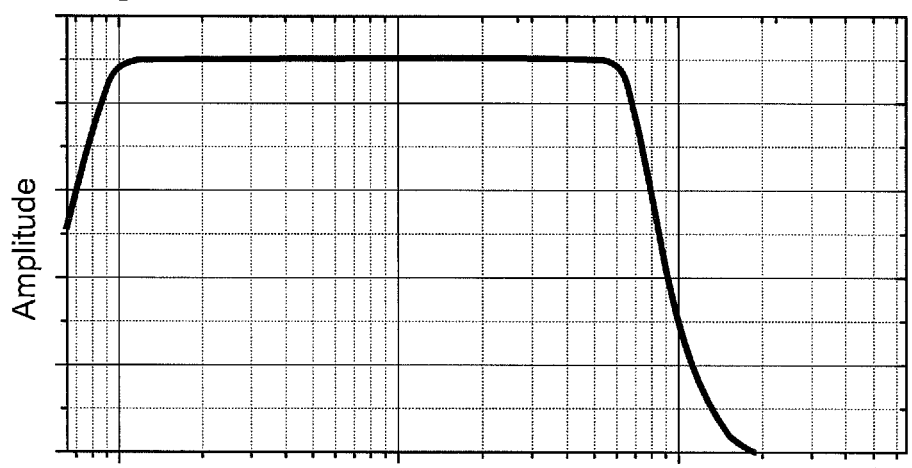
Figure 8:
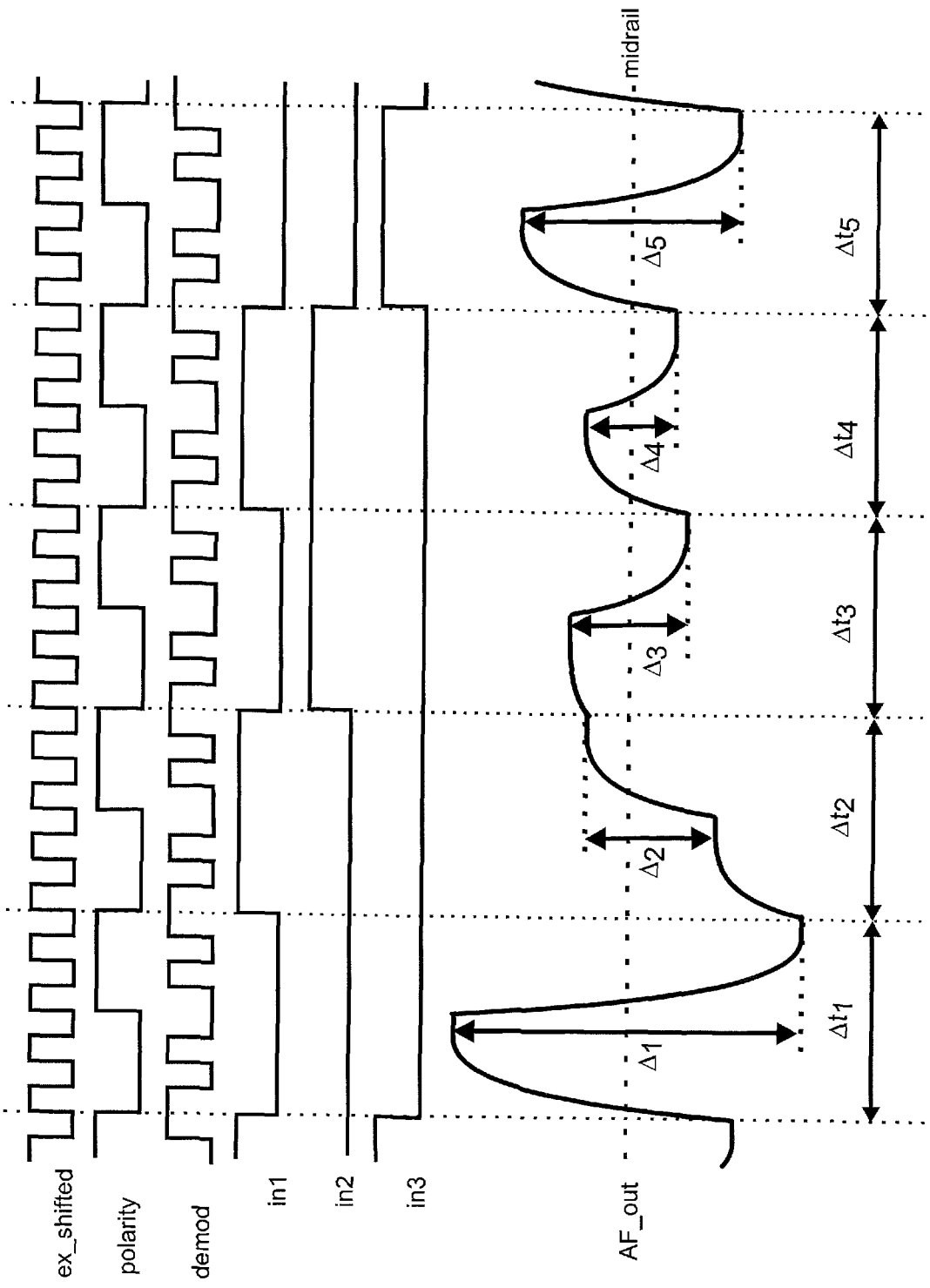
Figure 9:
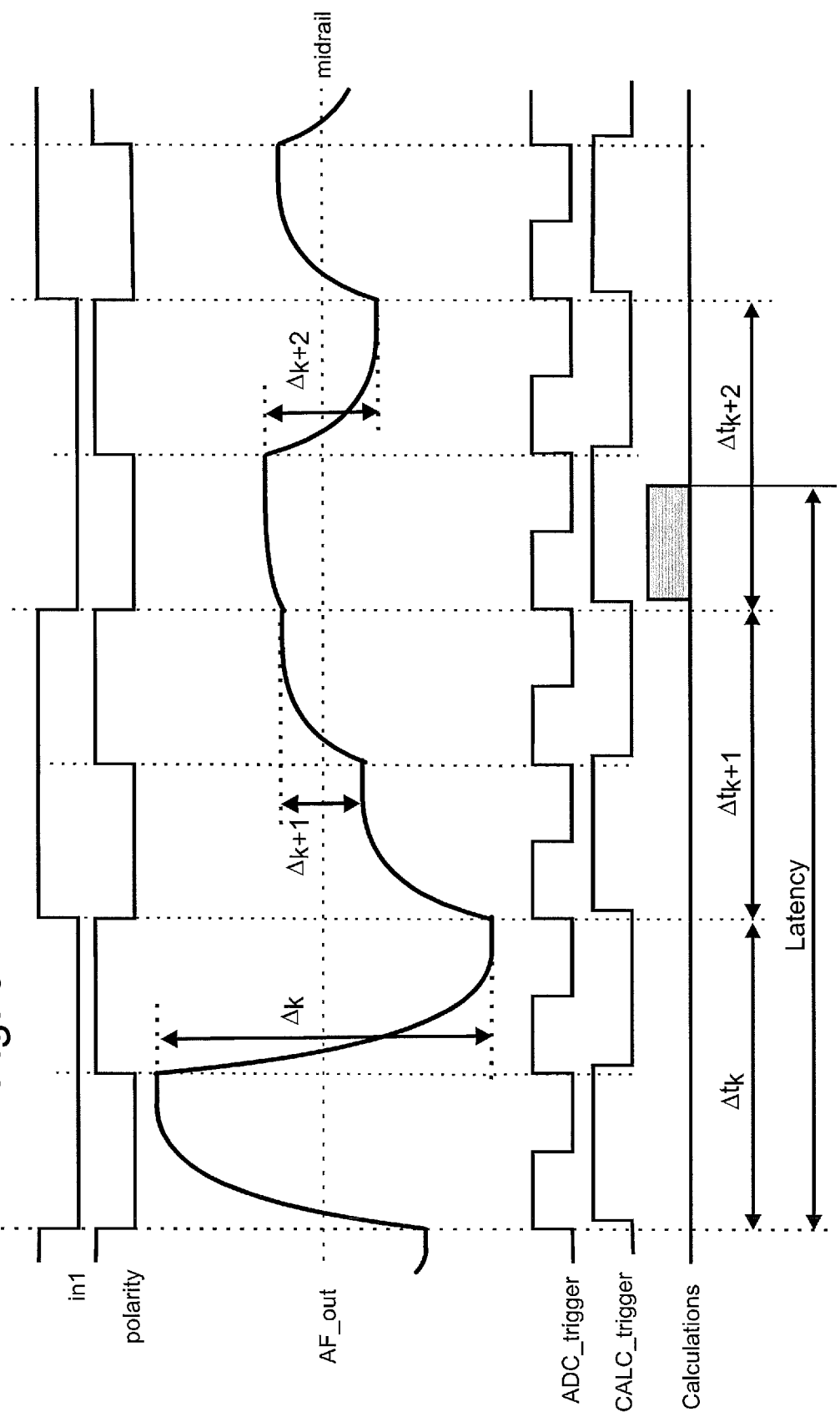
Figure 10:
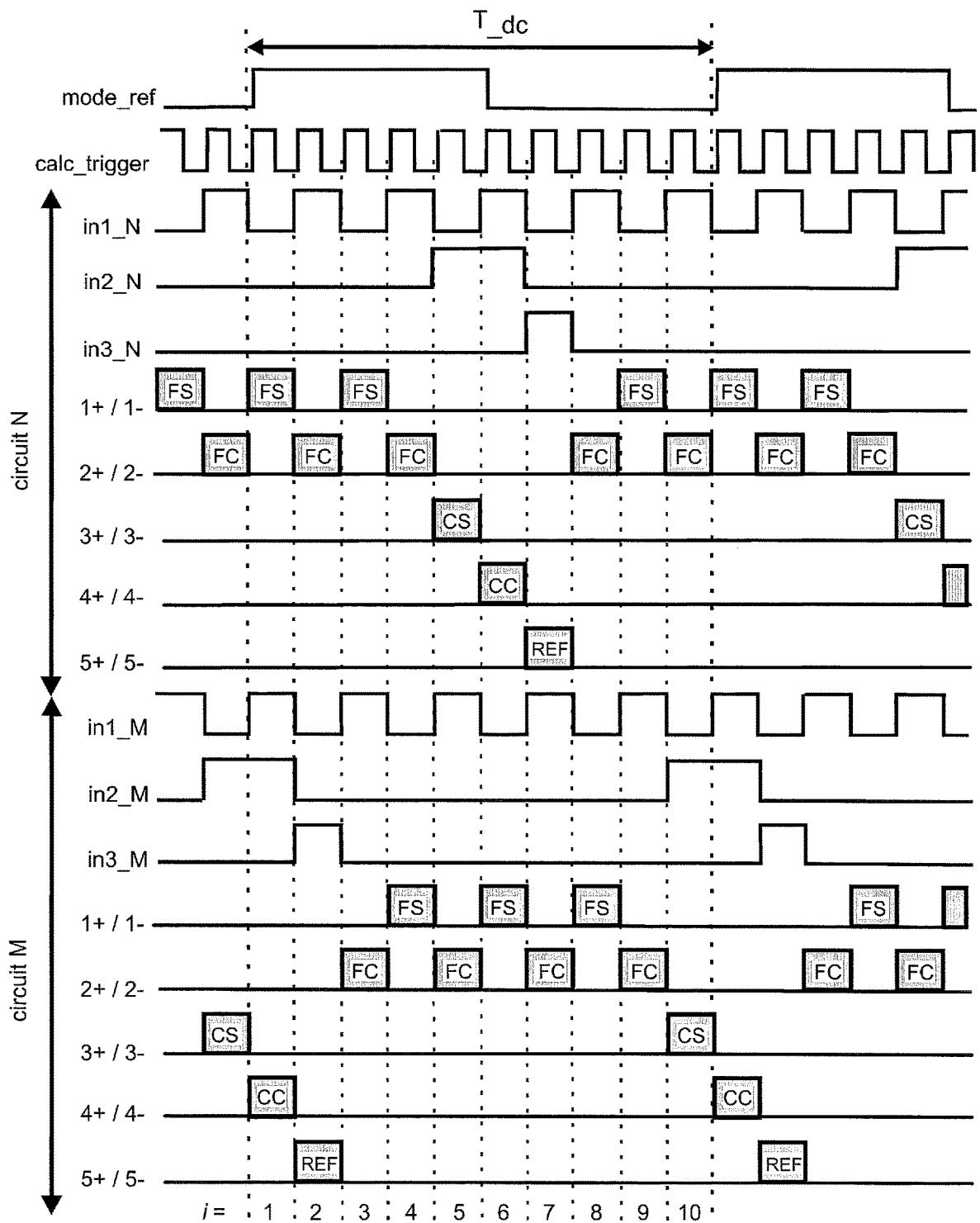
Figure 11:
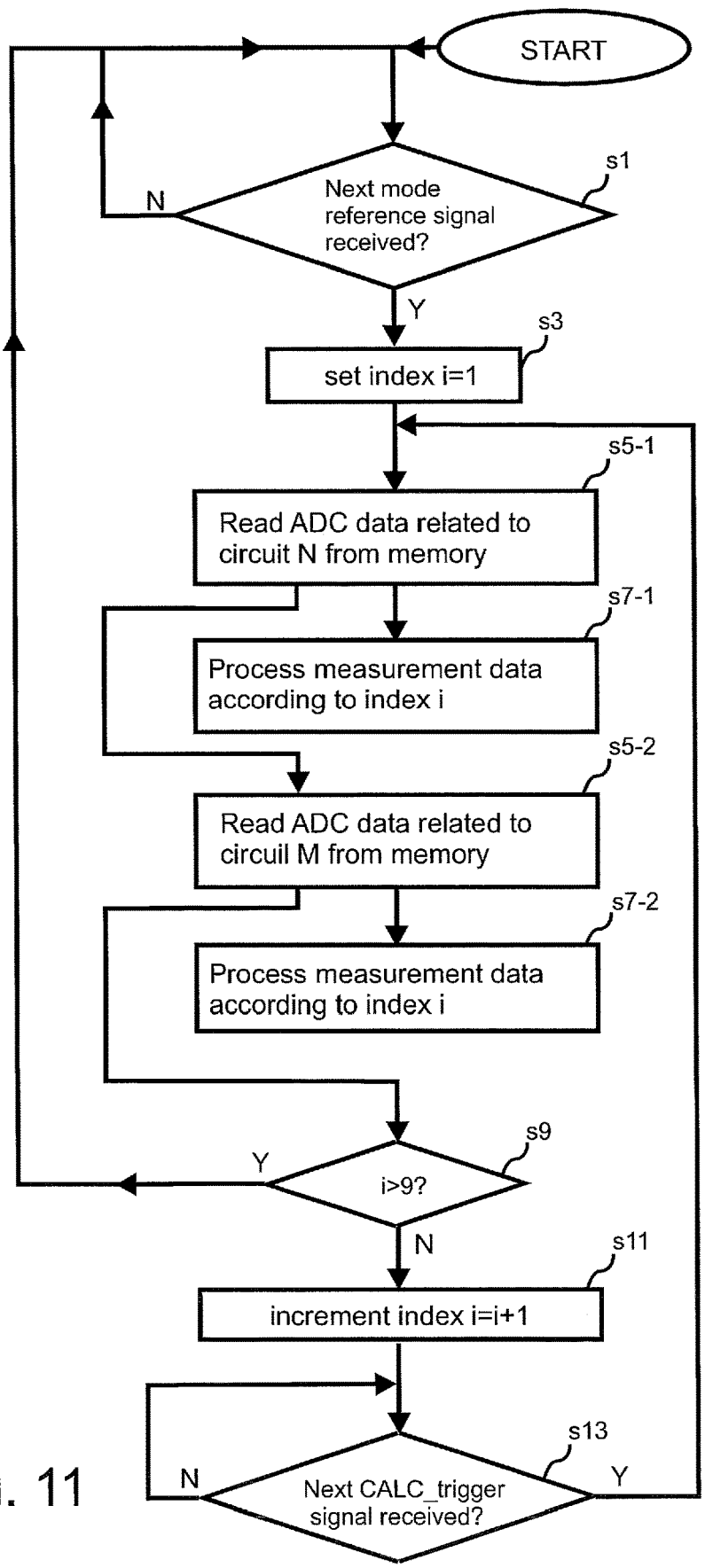
Figure 12A:
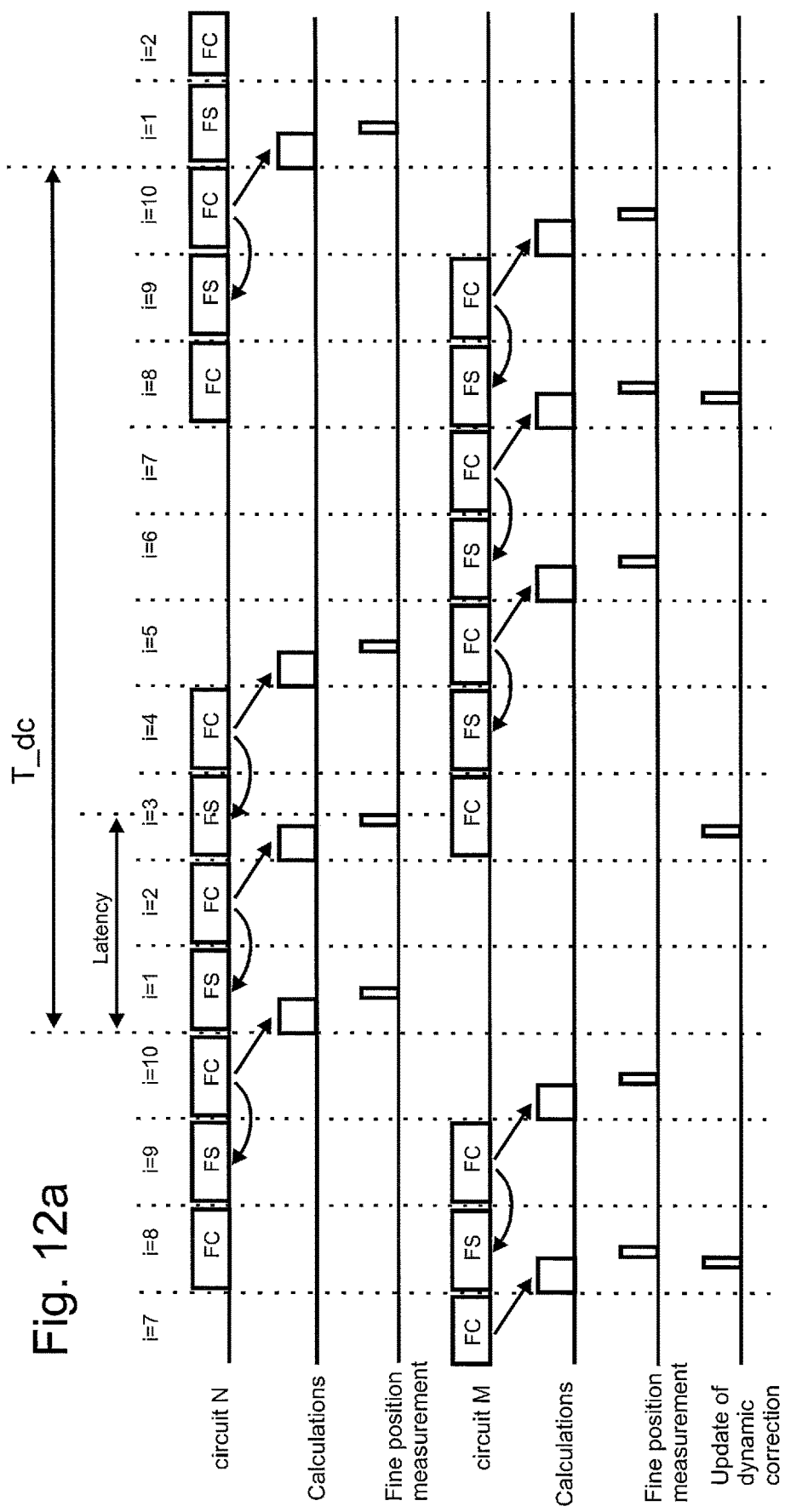
Figure 12B:
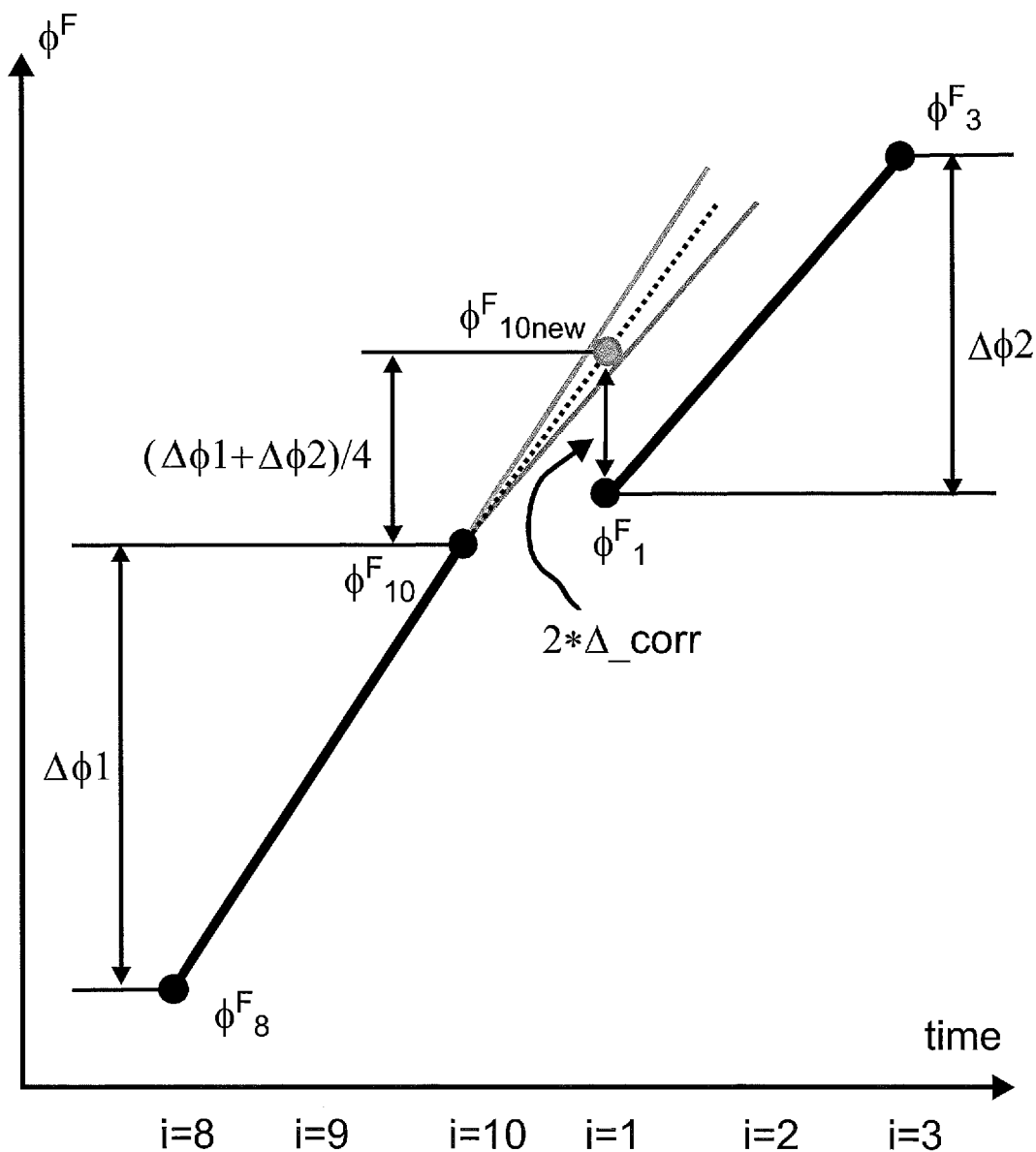
Figure 13:
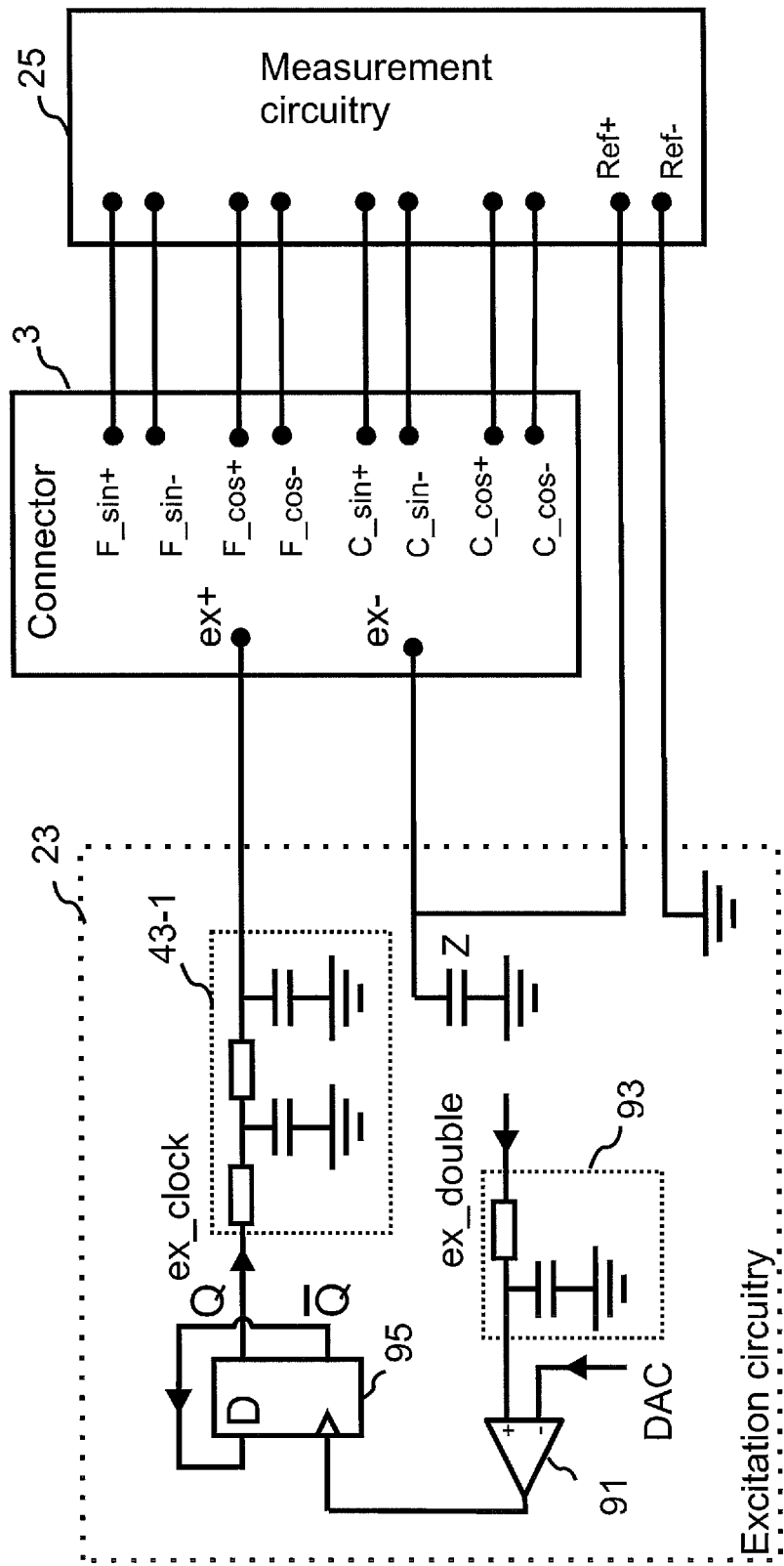
Figure 14A:
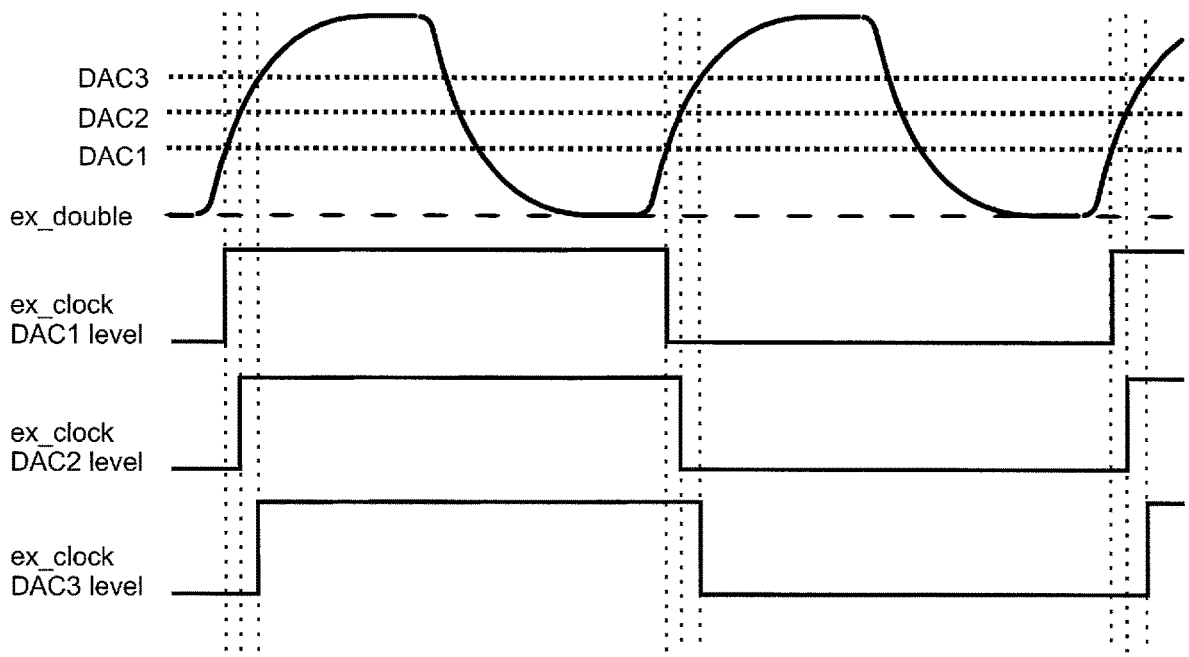
Figure 14B:
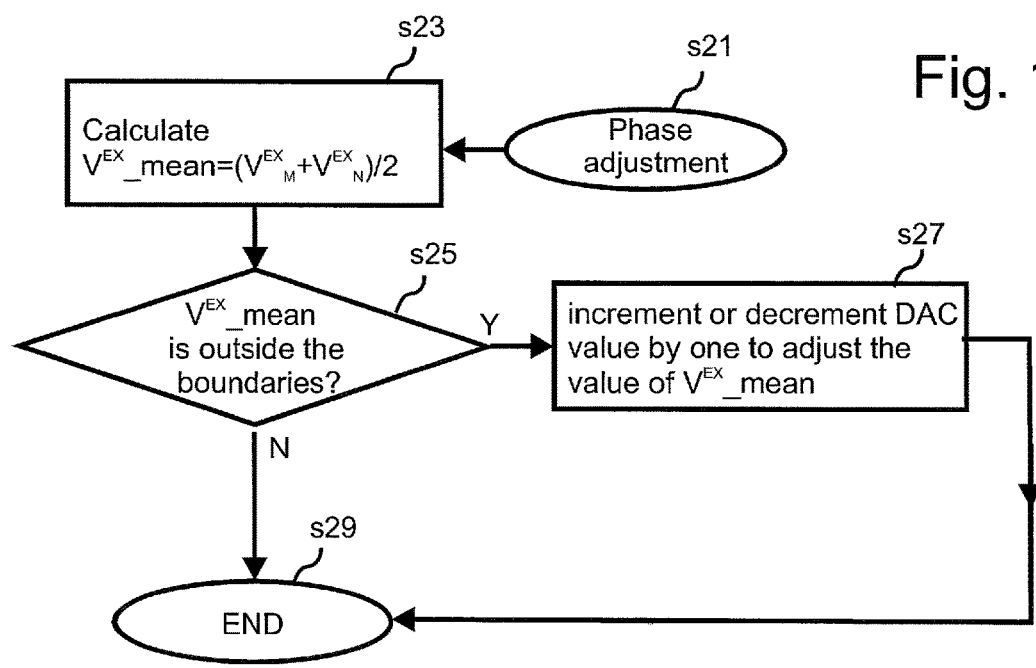
Figure 15:
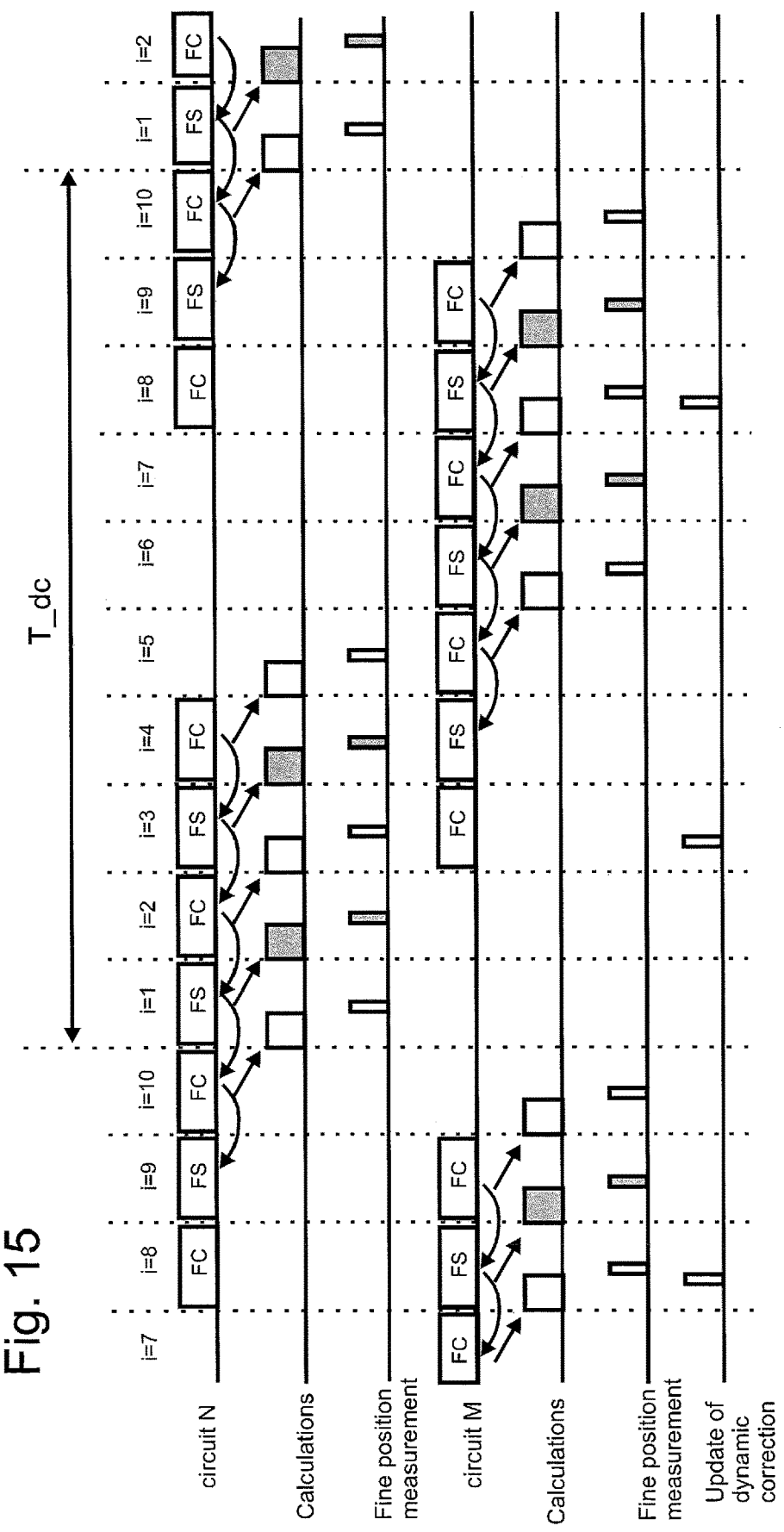
Figure 16:
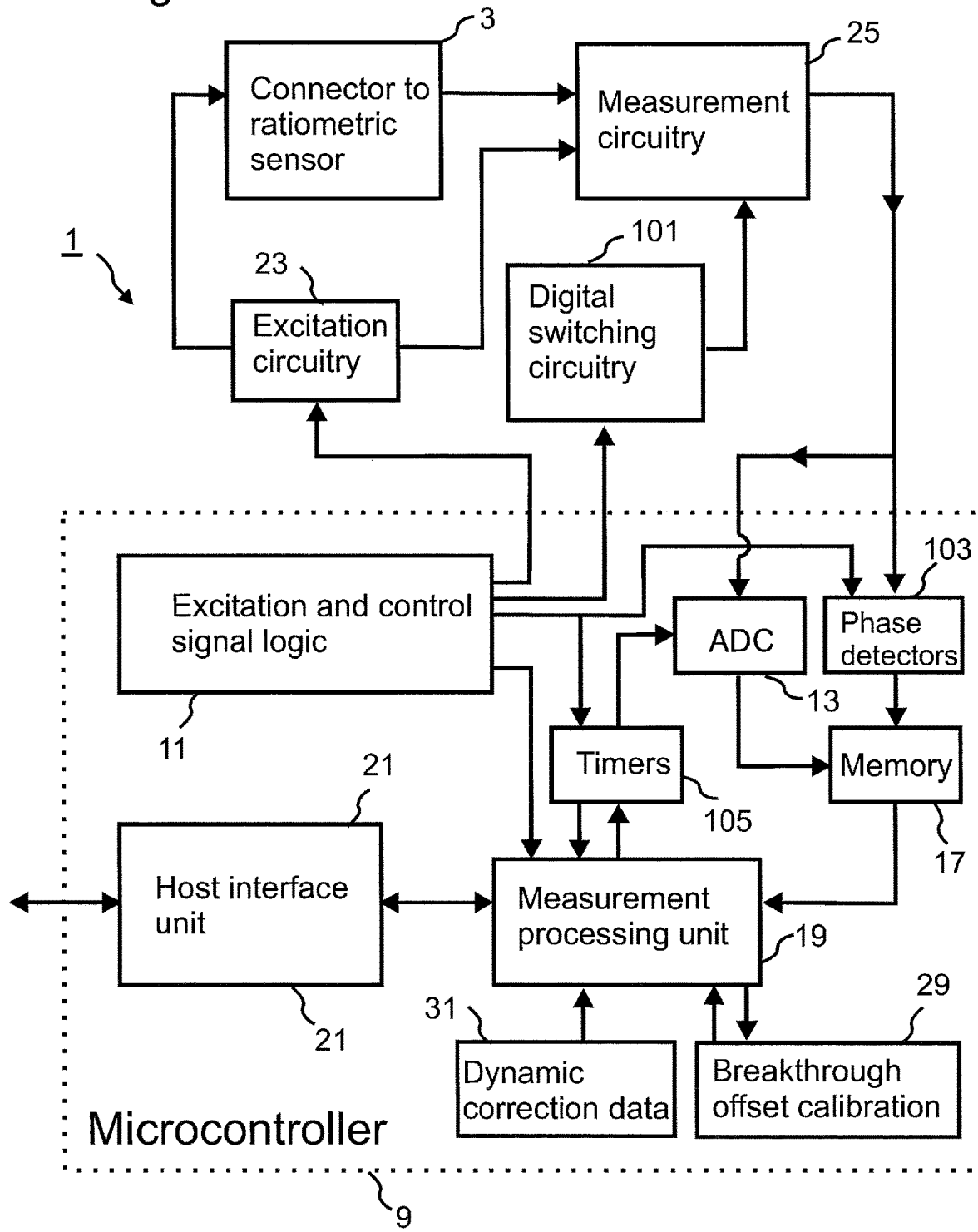
Figure 17:
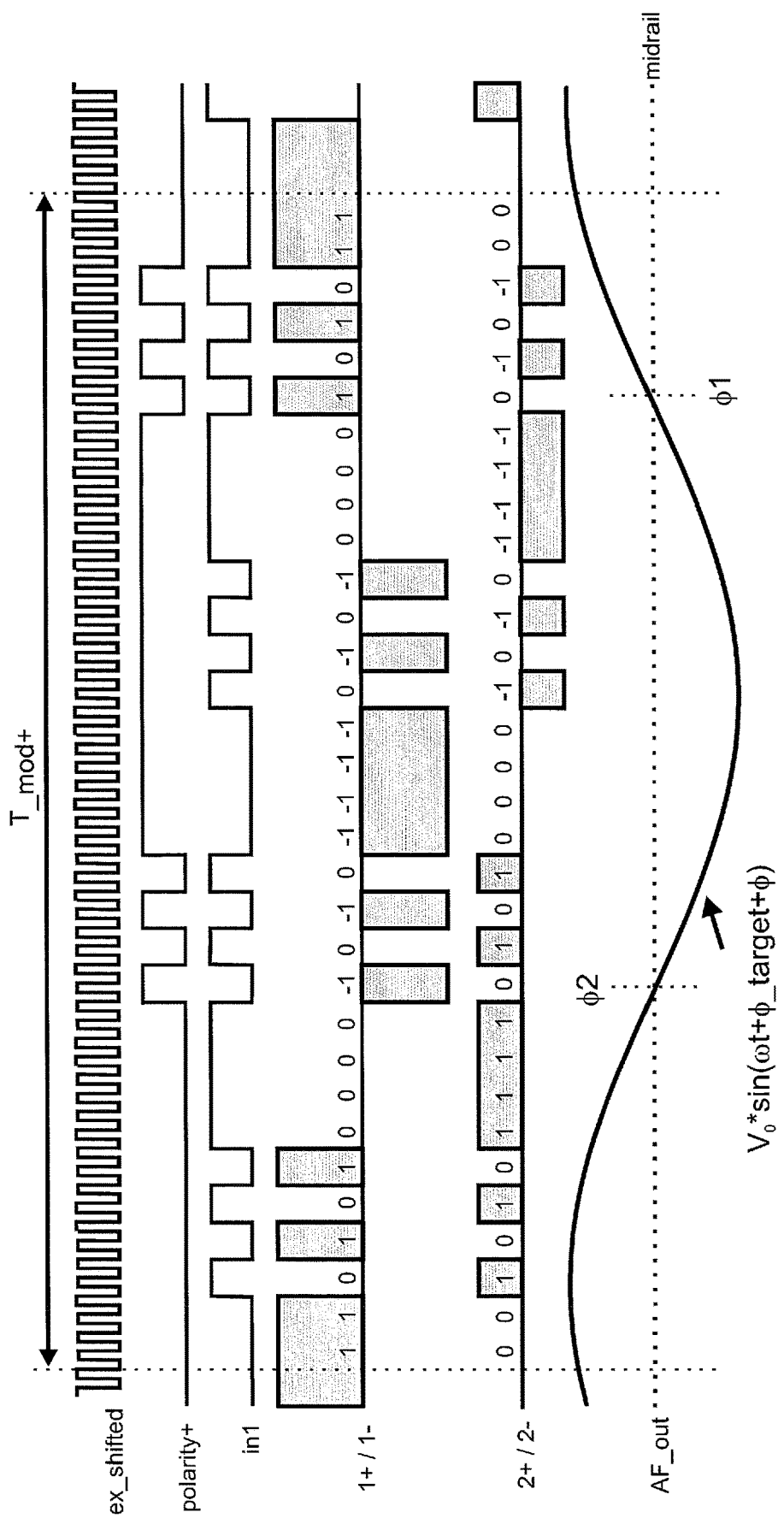
Figure 18:
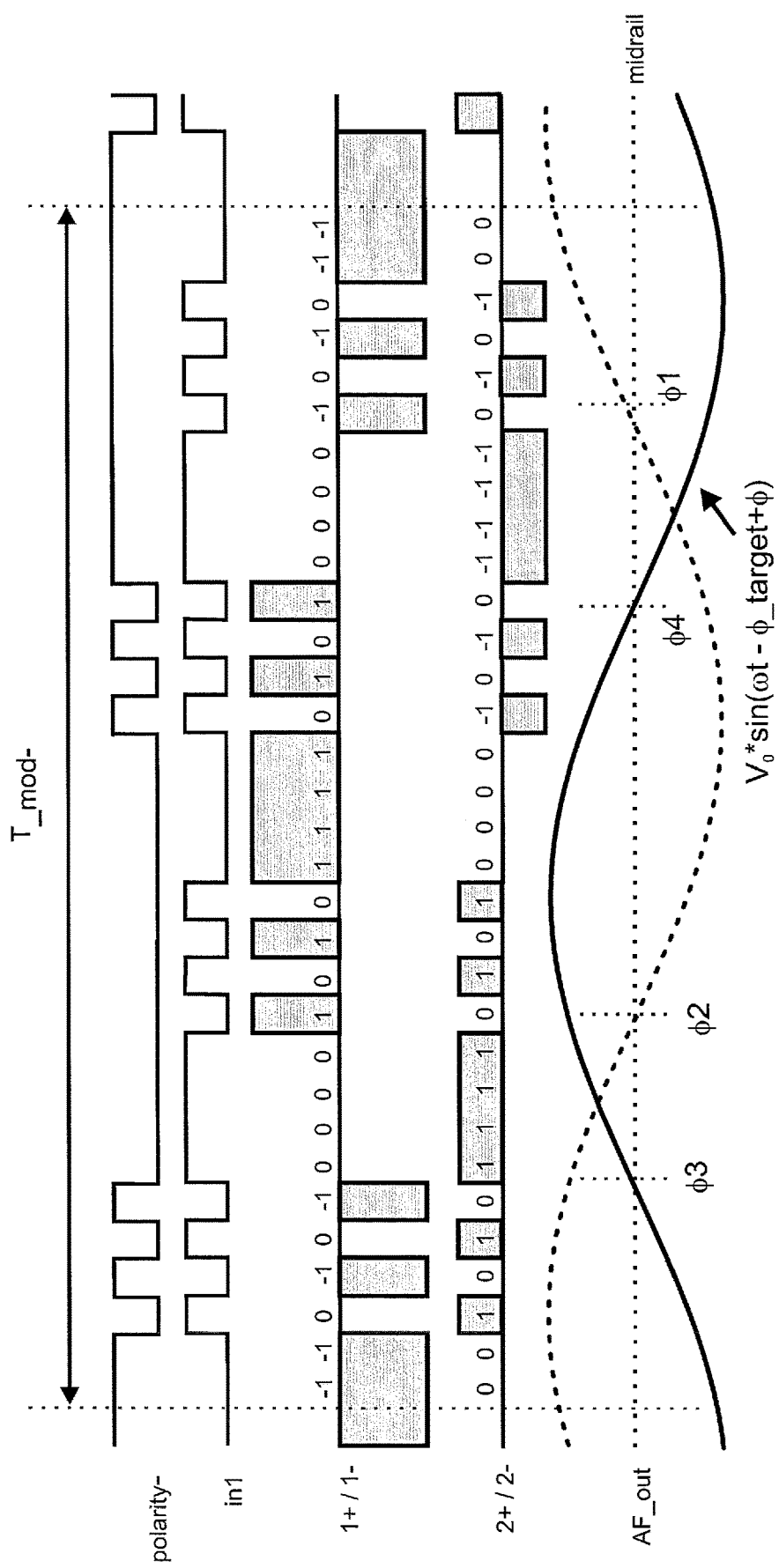
Figure 19A:
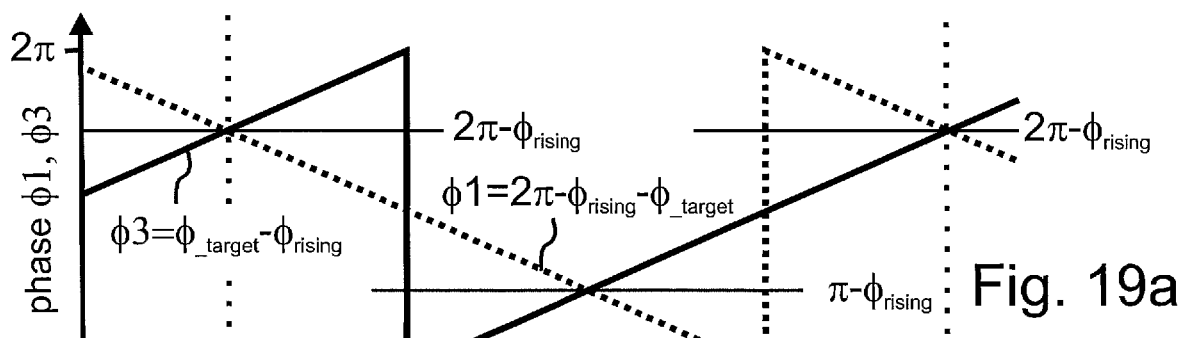
Figure 19B:
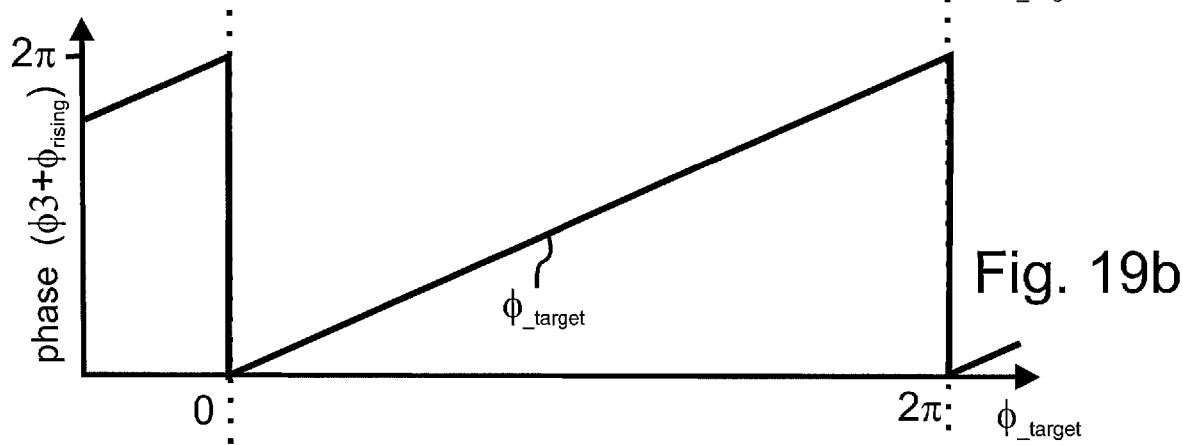
Figure 19C:
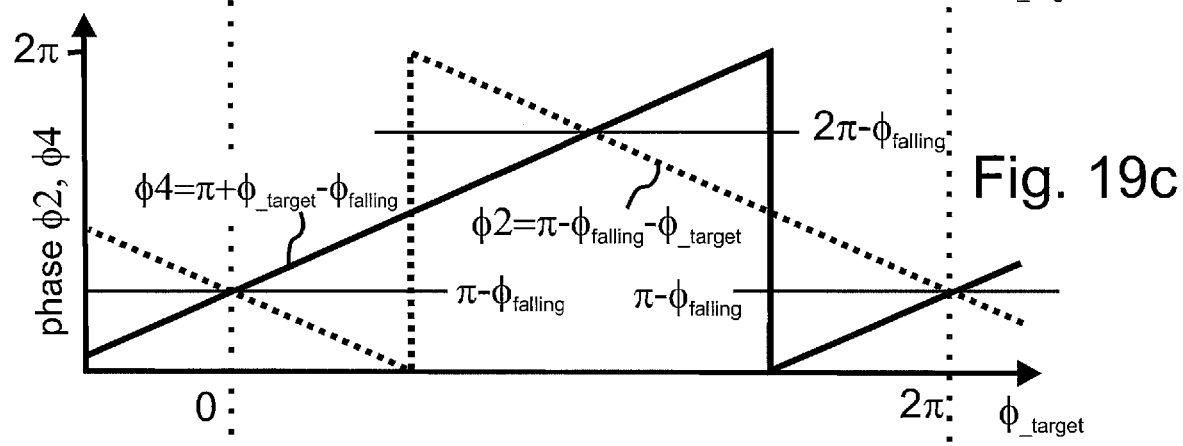
Figure 19D:
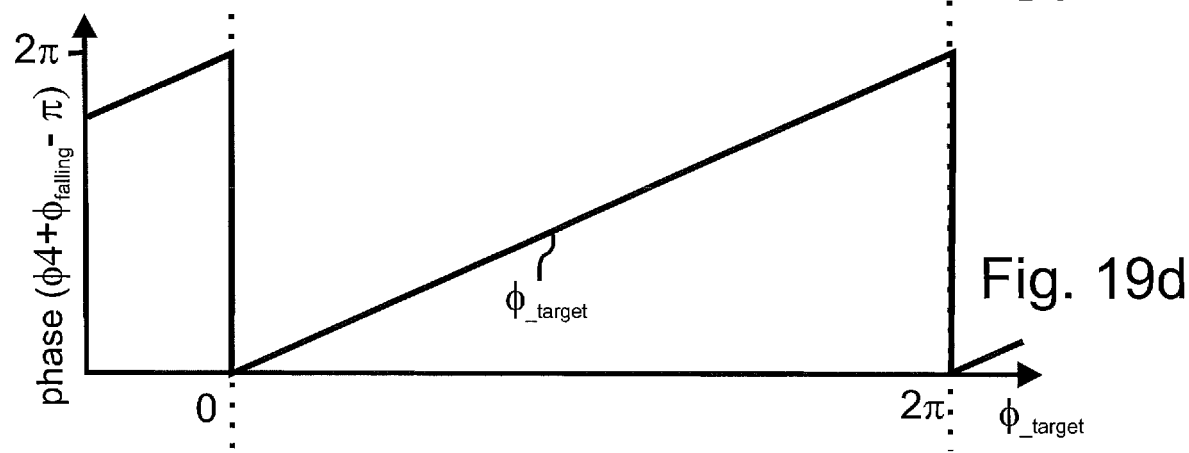
Figure 20:
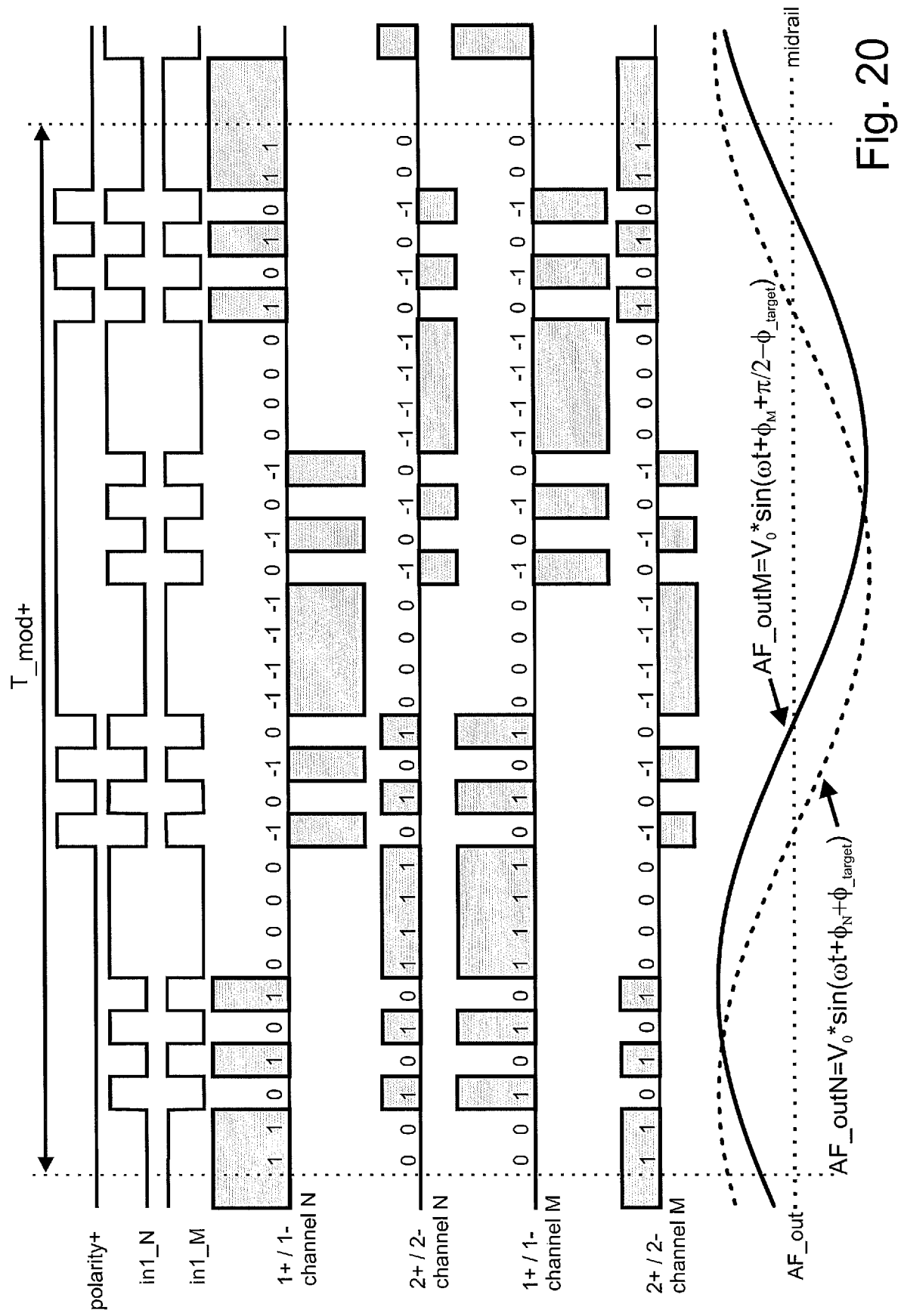
Figure 21:
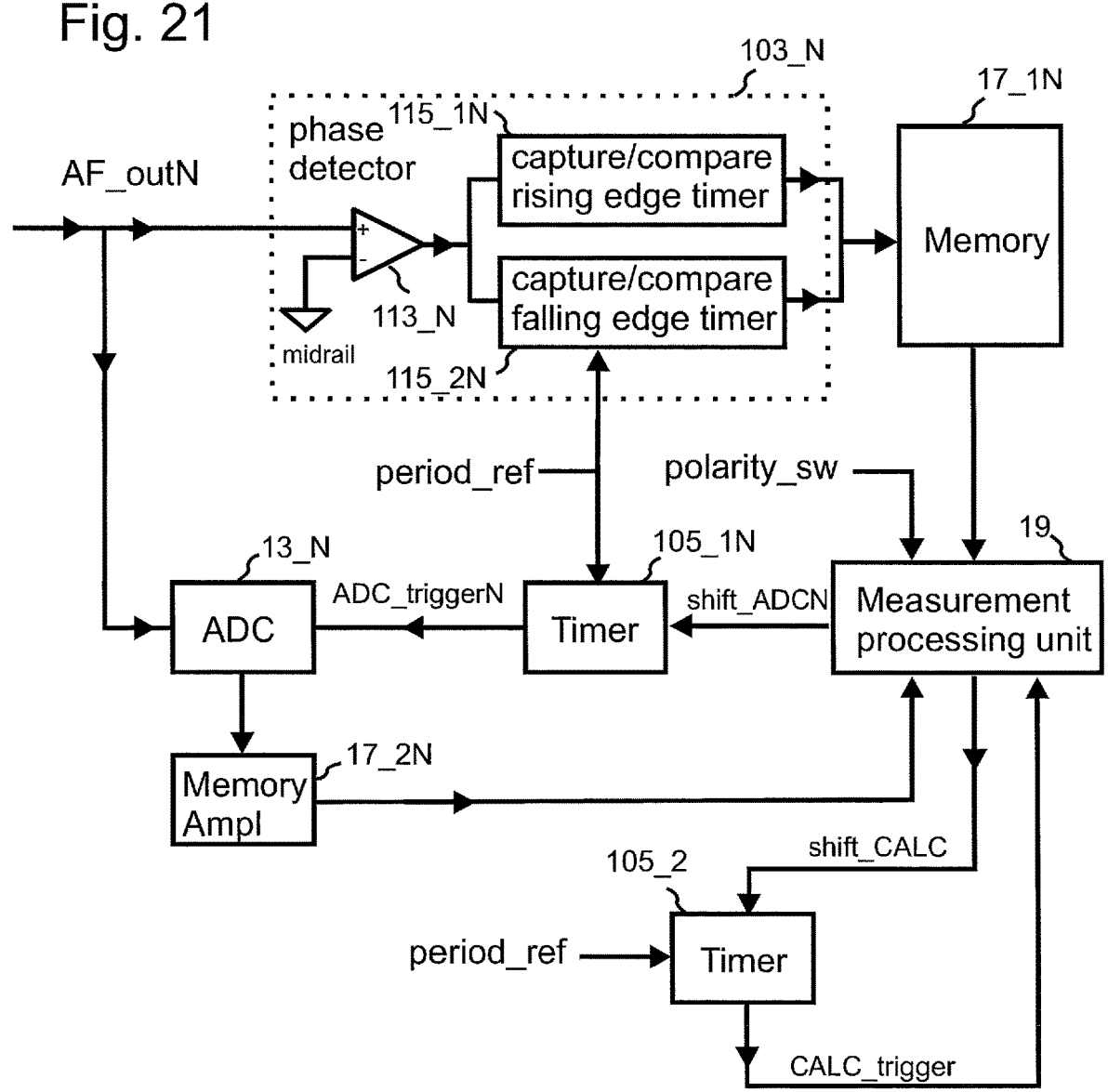
Figure 22:
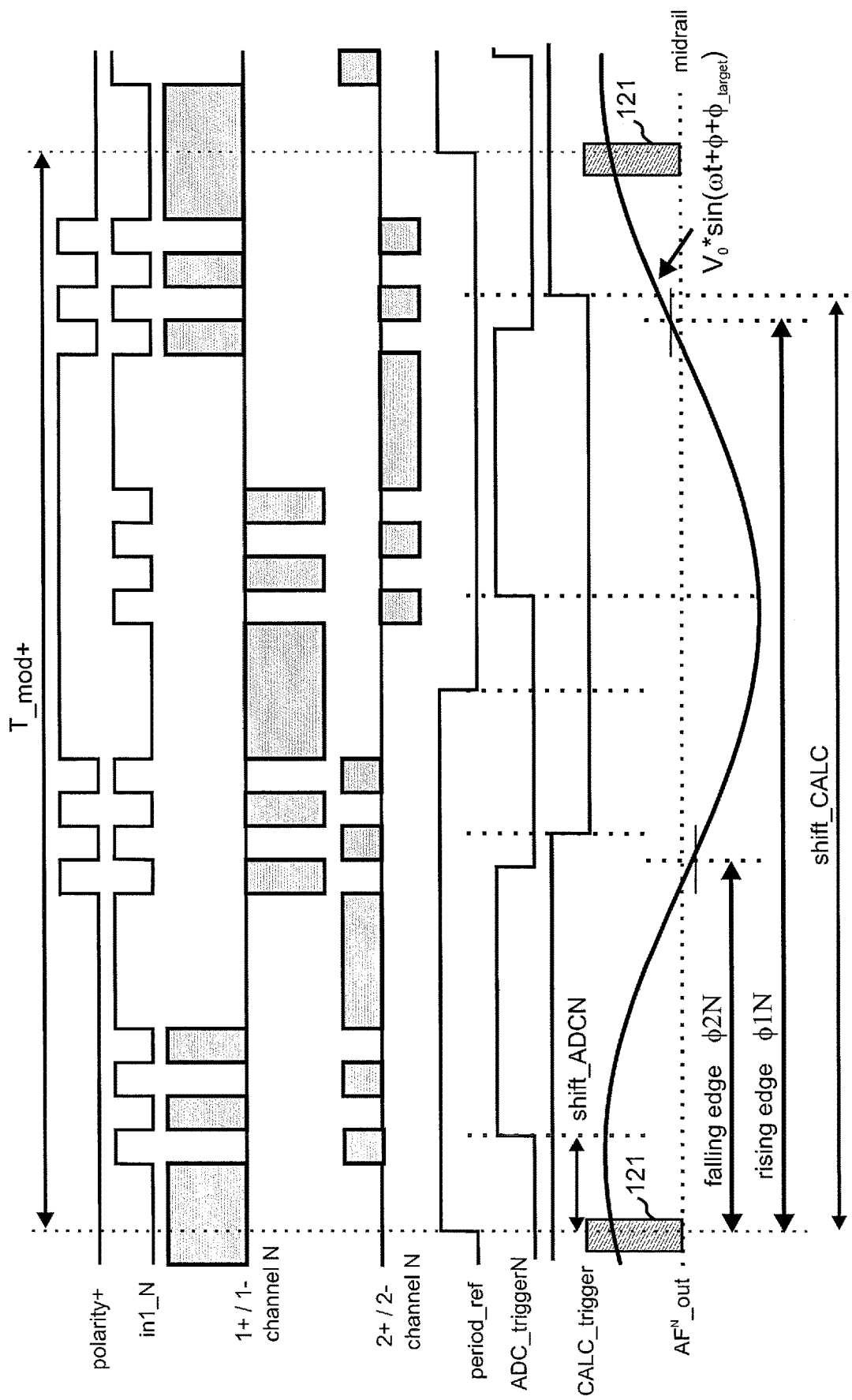
Figure 23:
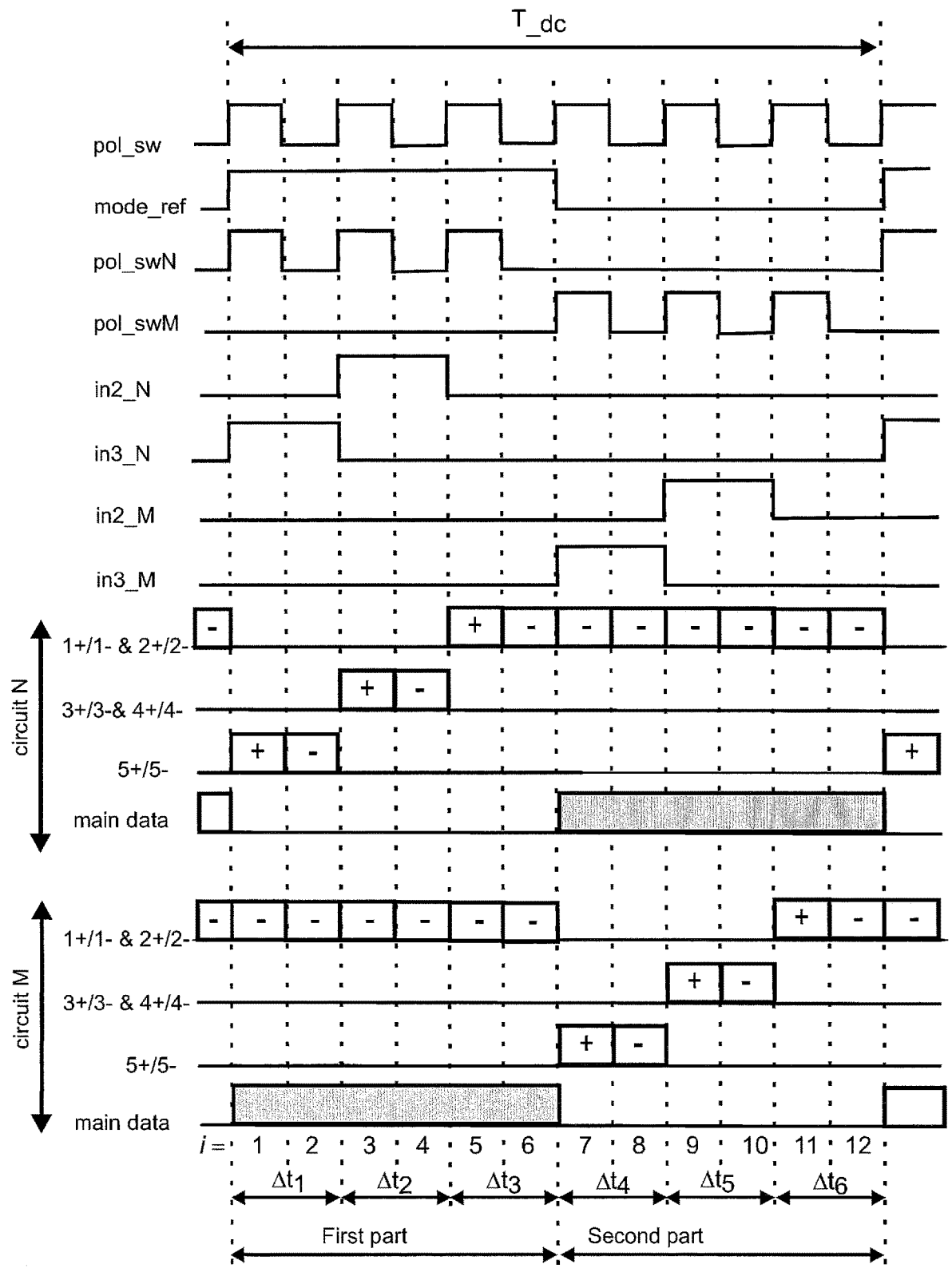
Figure 24:
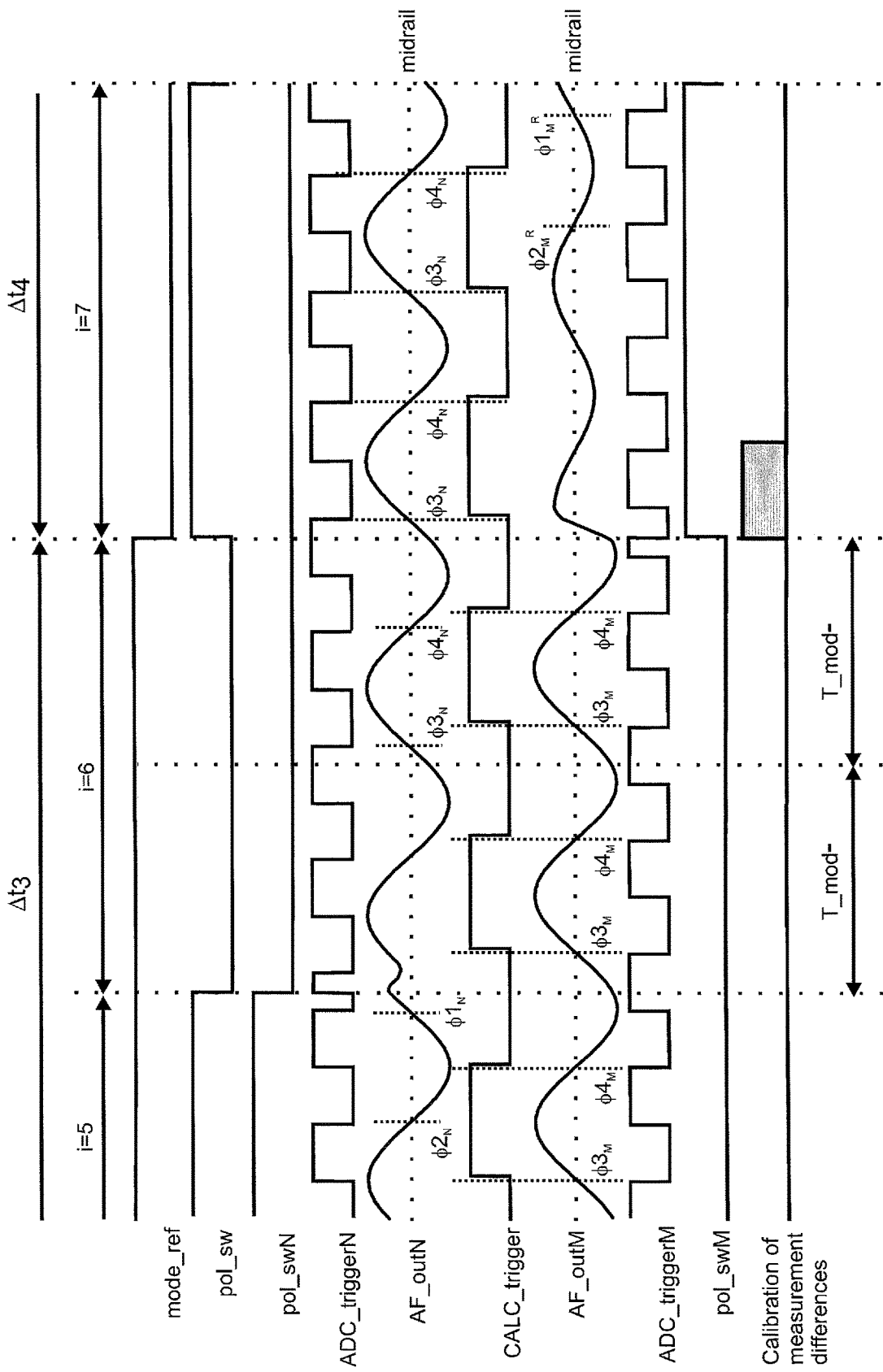
Figure 25:
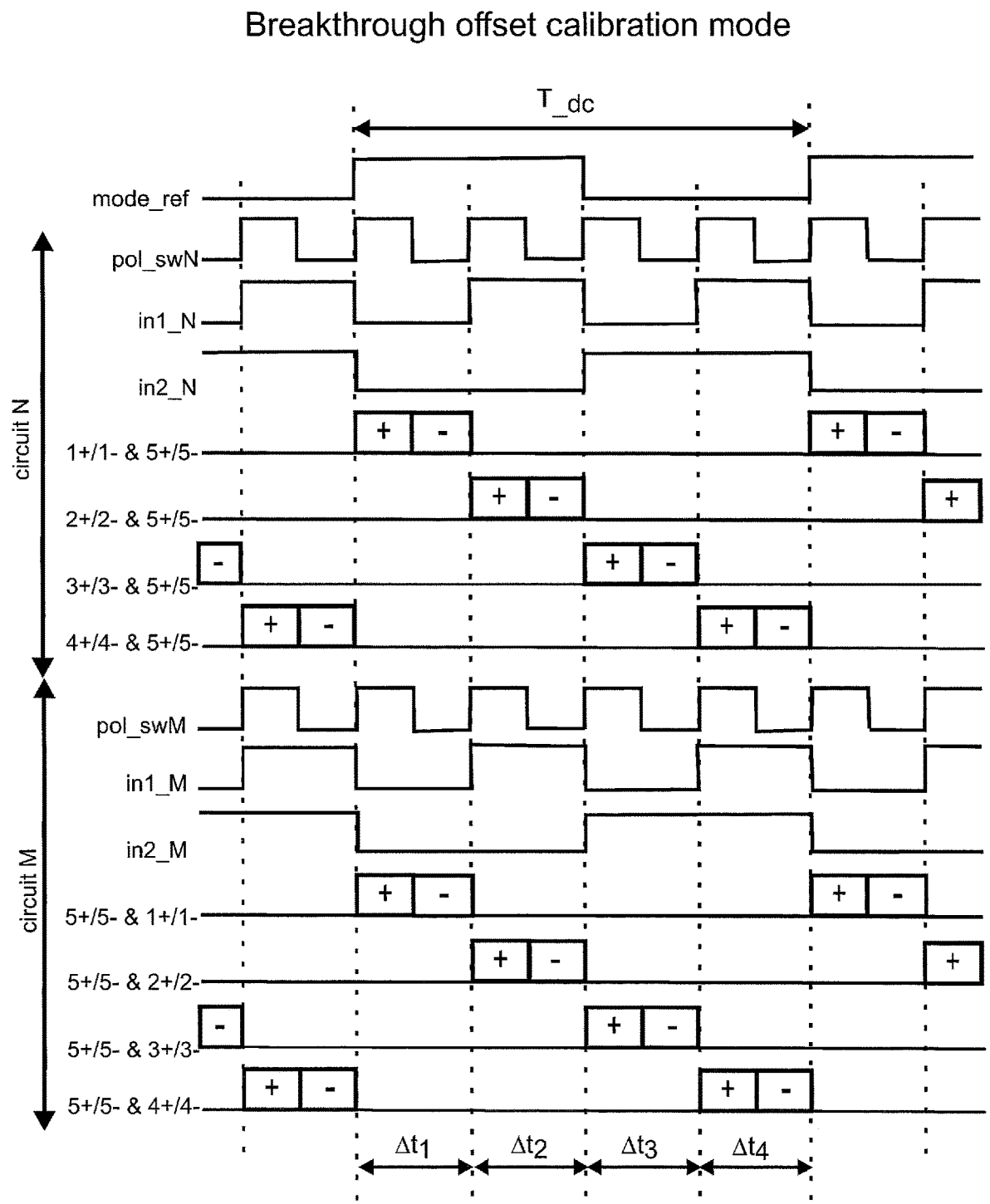
Figure 26:
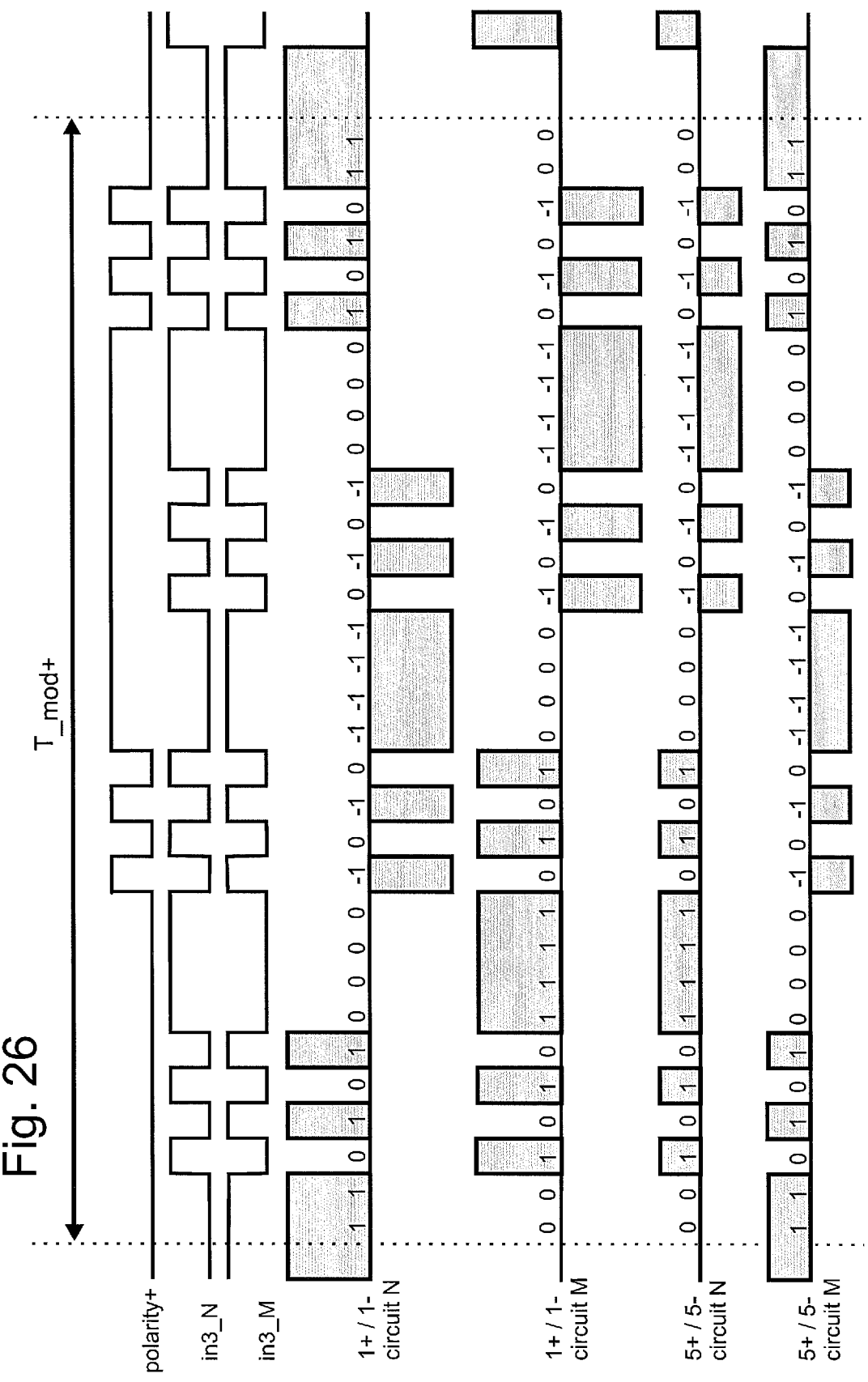
Figure 27:
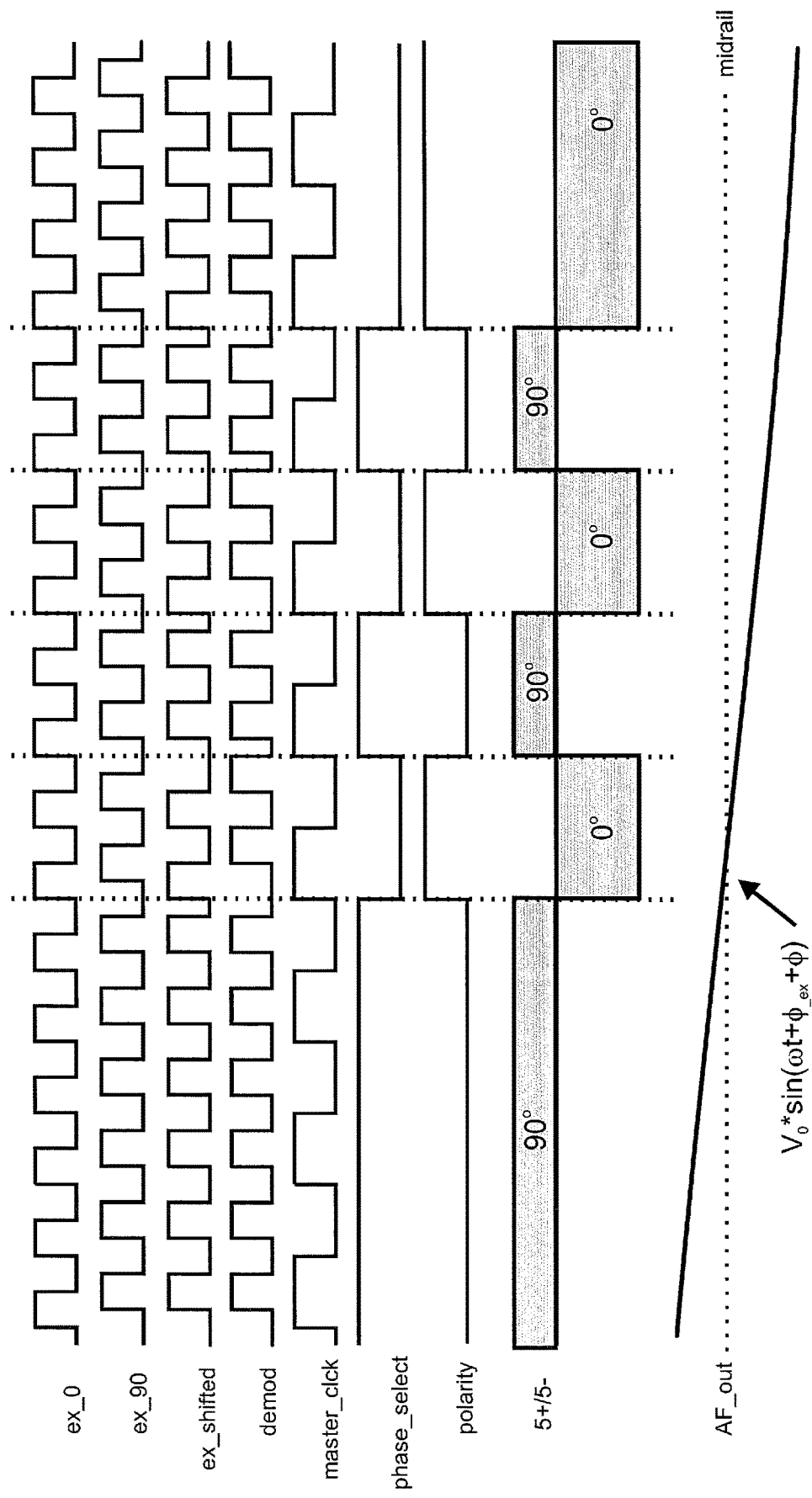
Figure 28:
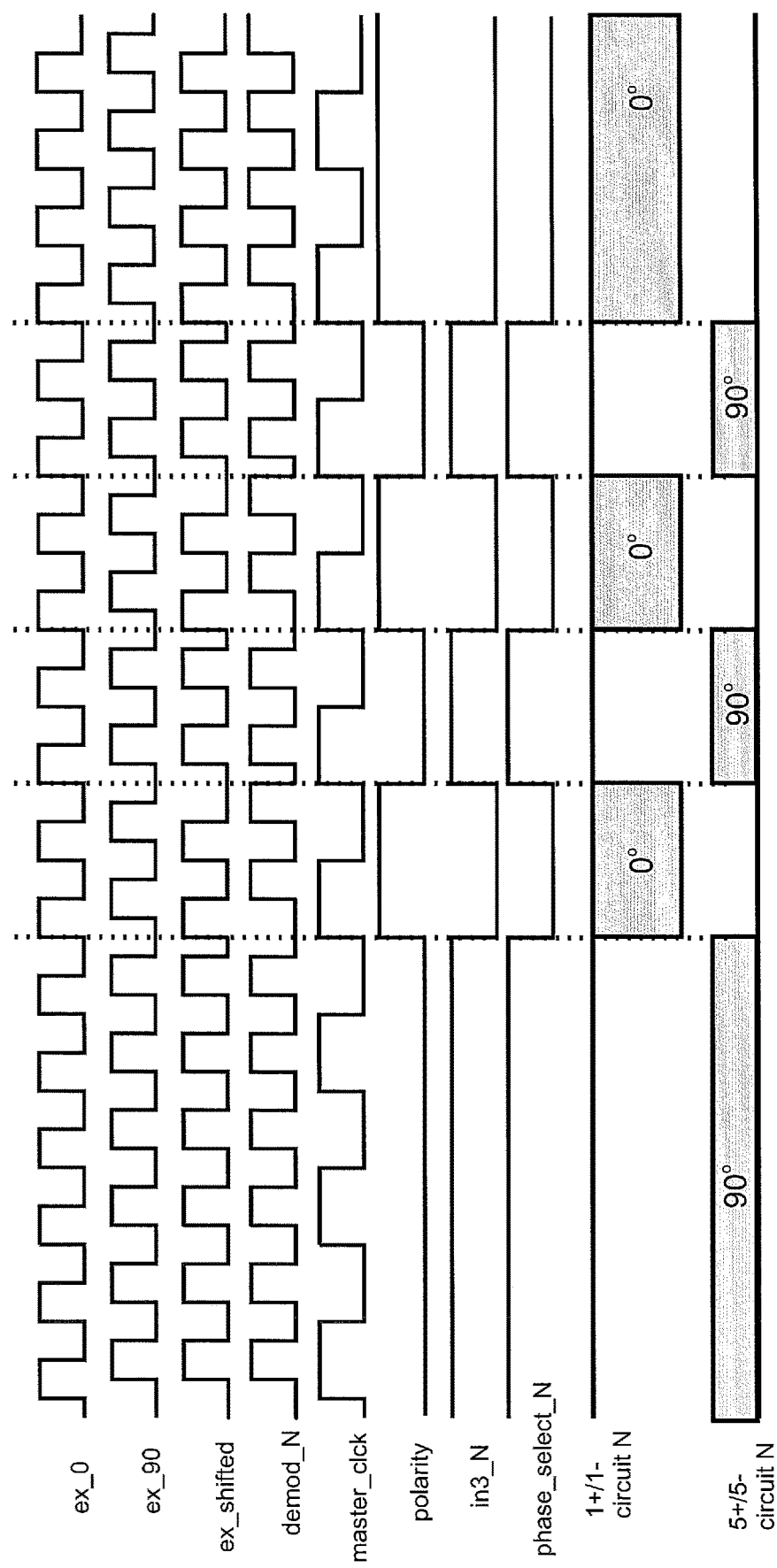
Figure 29:
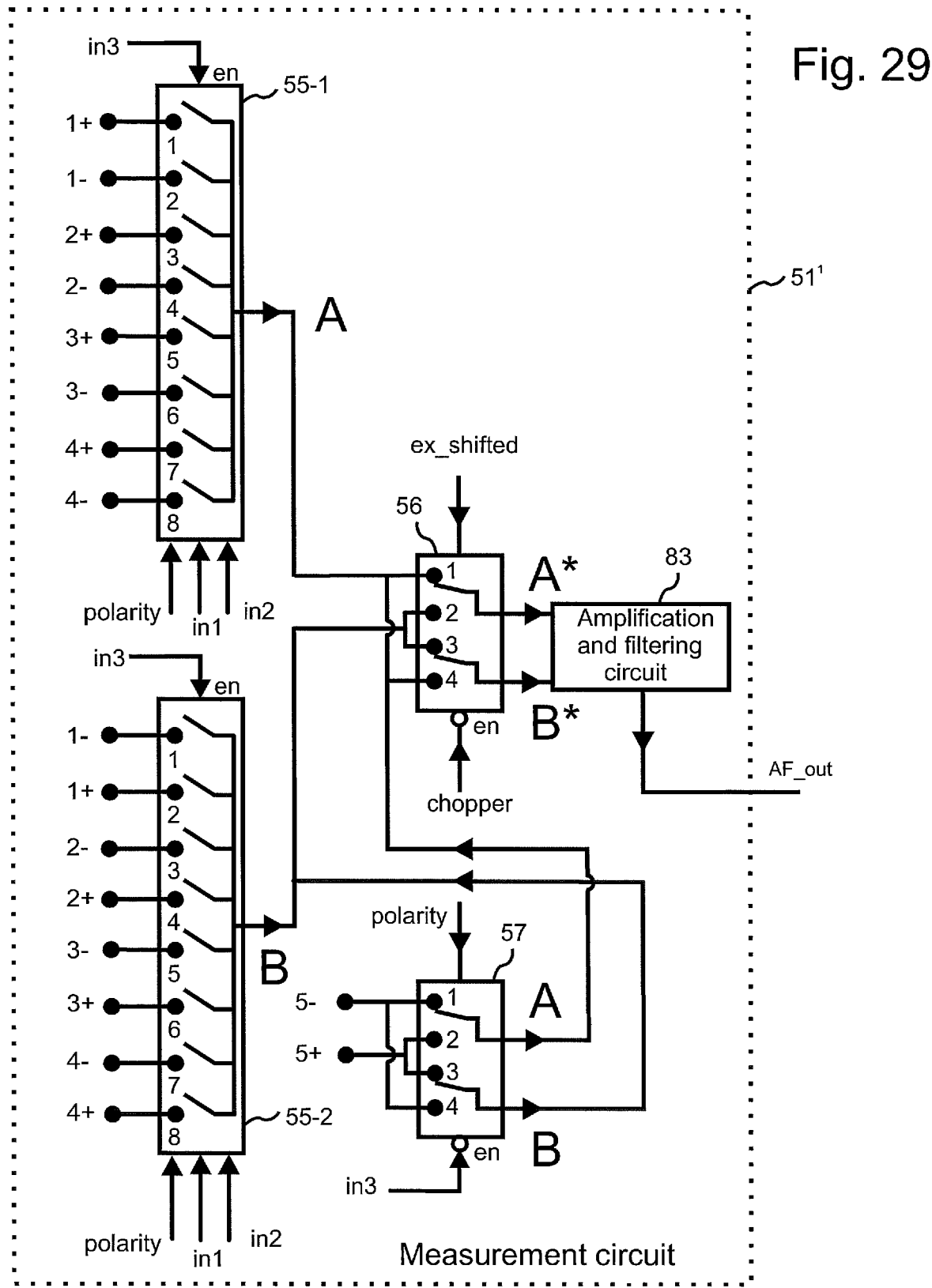
Figure 30:
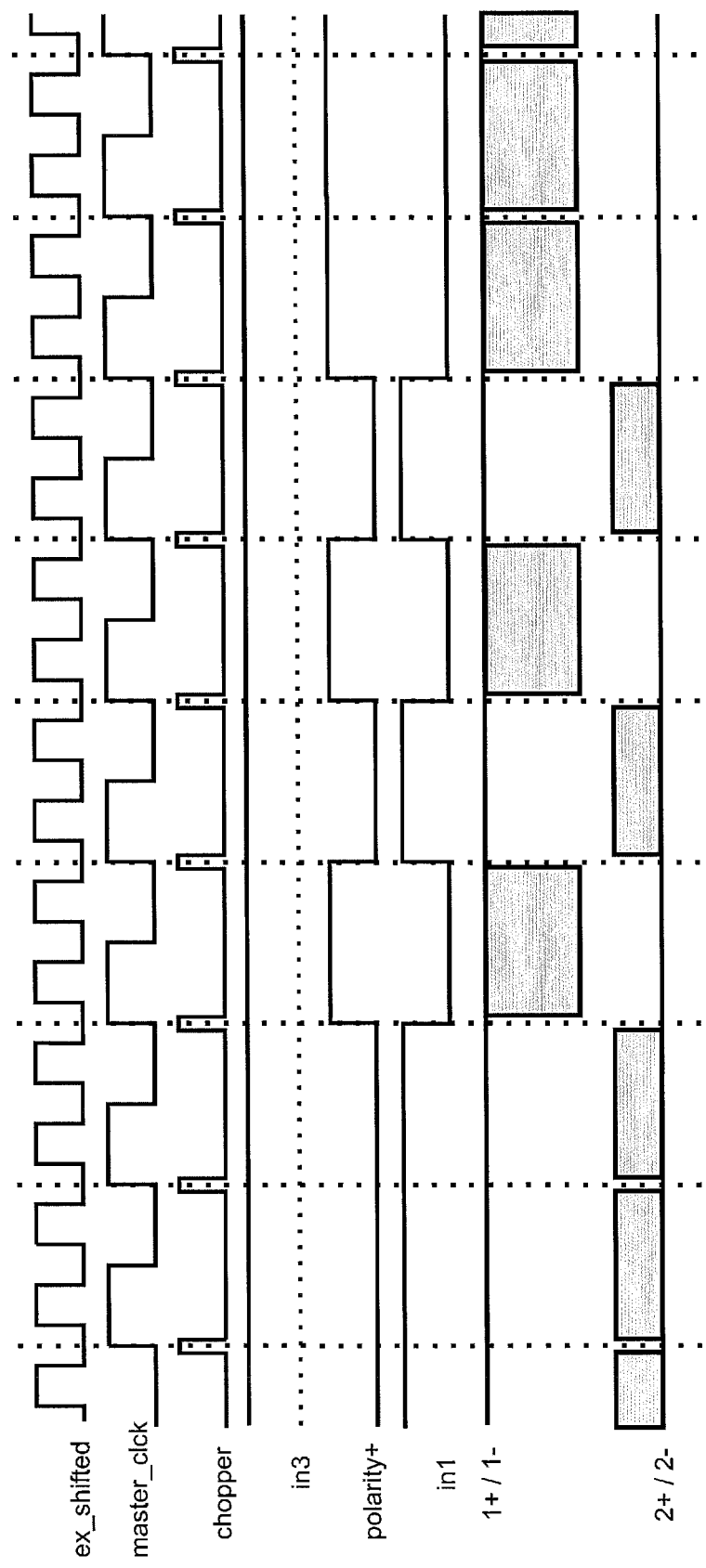
Figure 31:
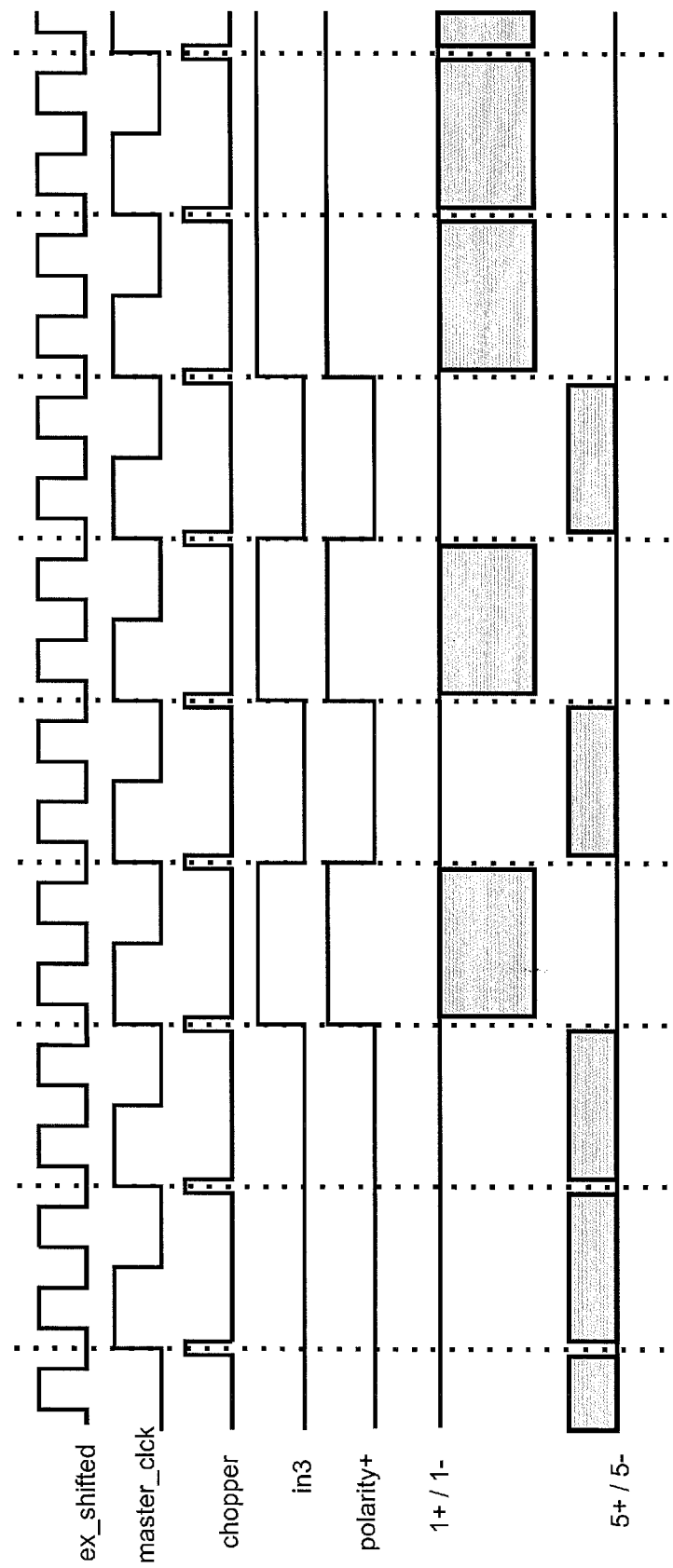
Figure 32:
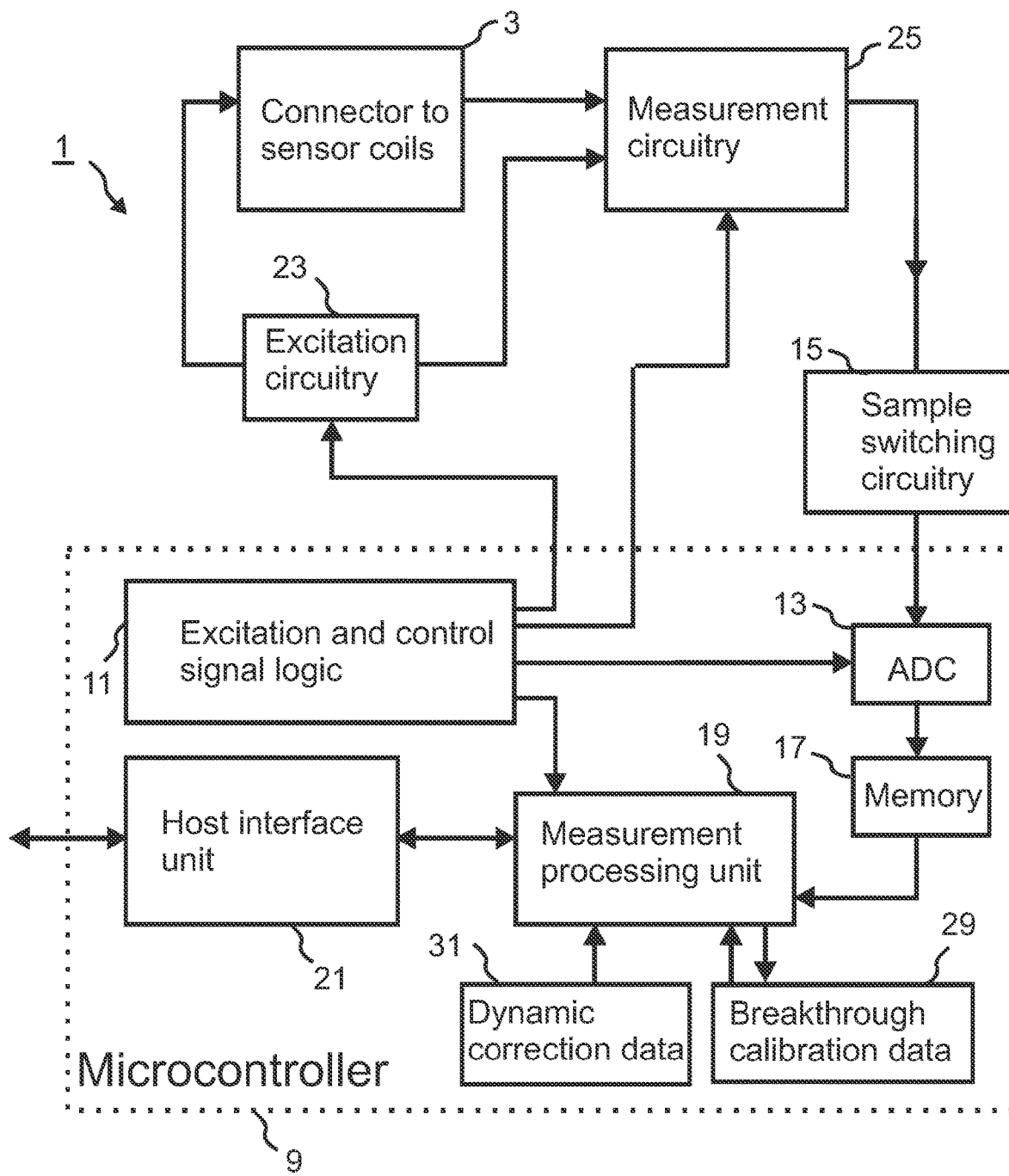
Figure 33:
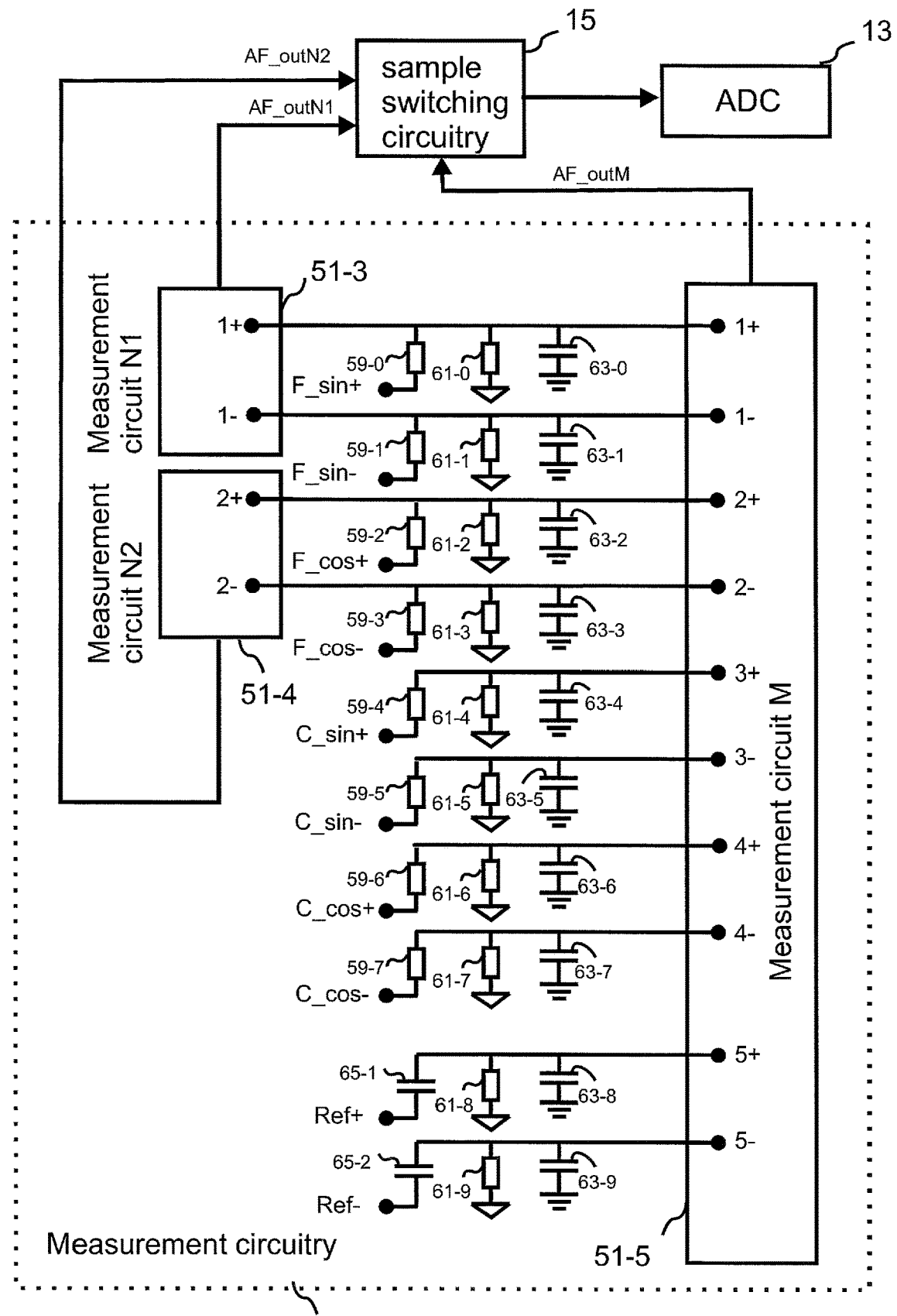
Figure 35:
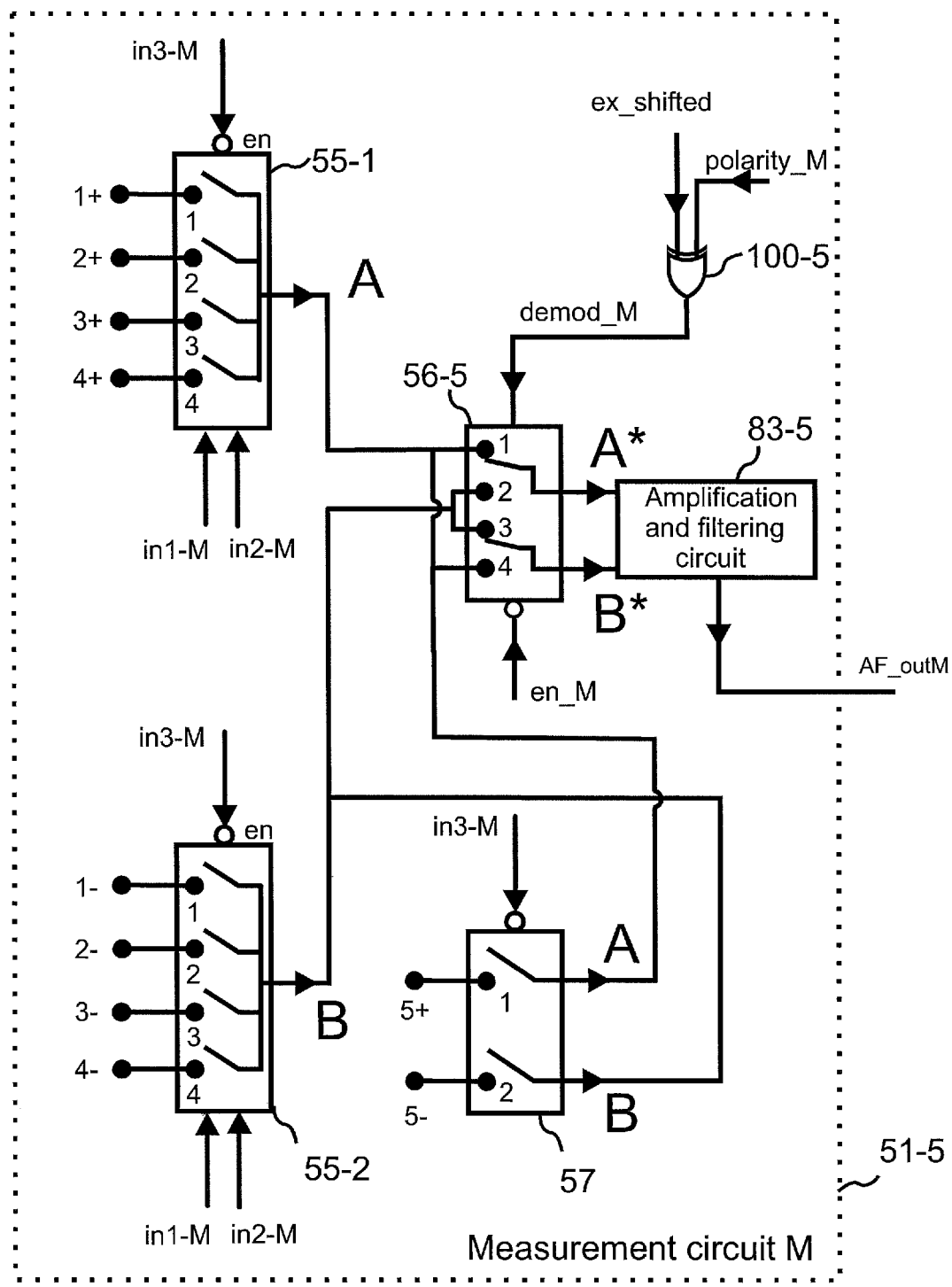
Figure 36:
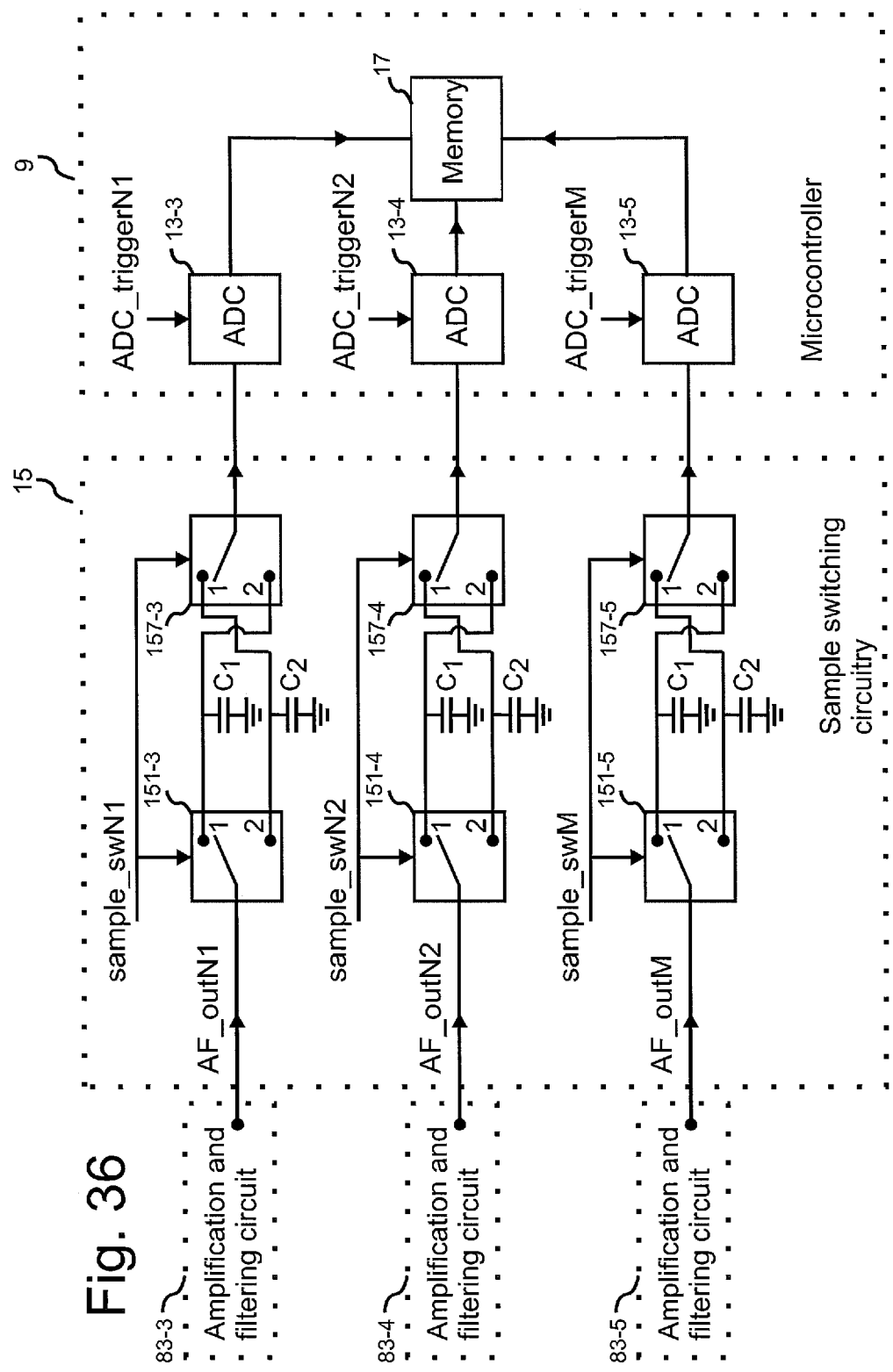
Figure 37:
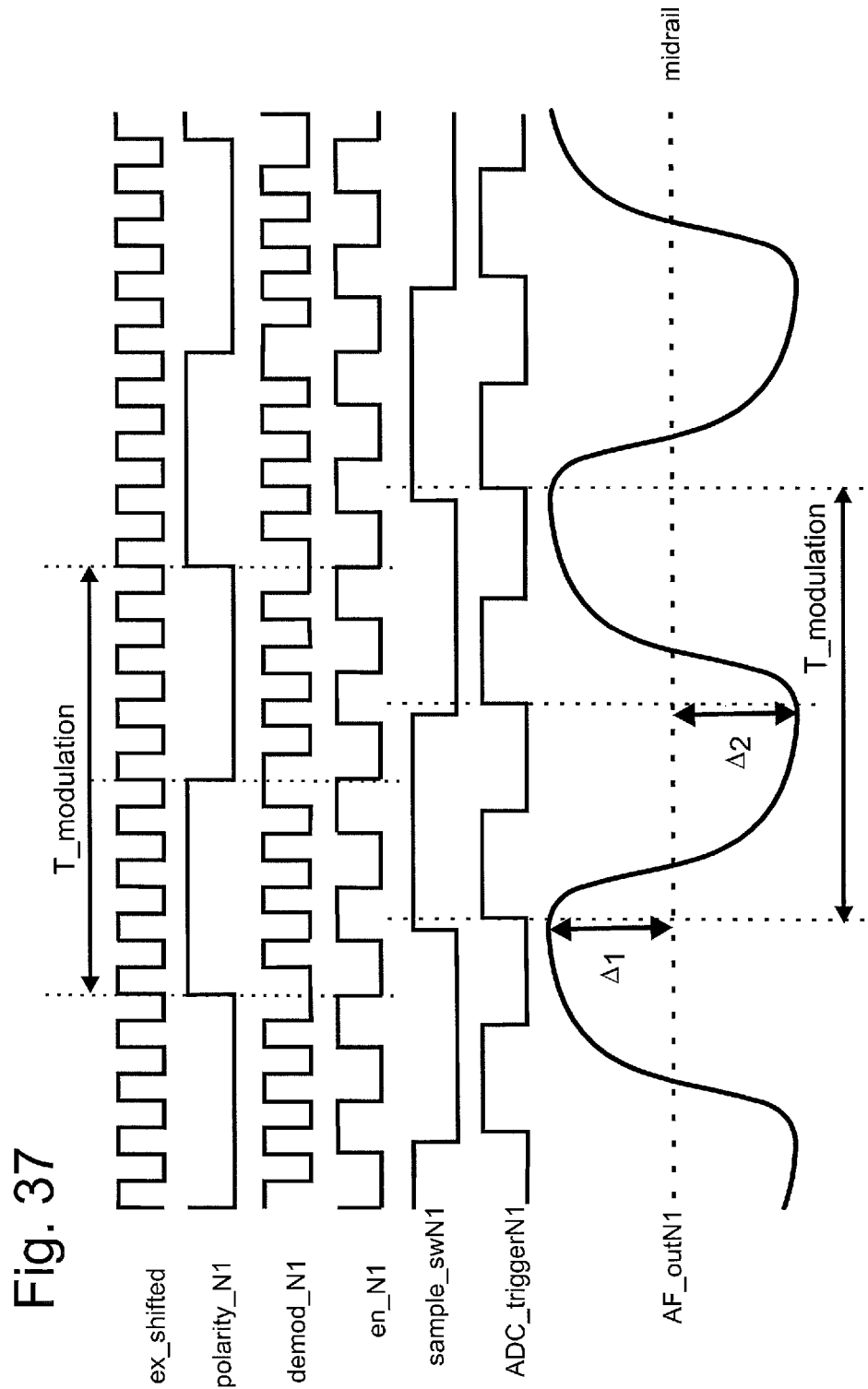
Figure 38:
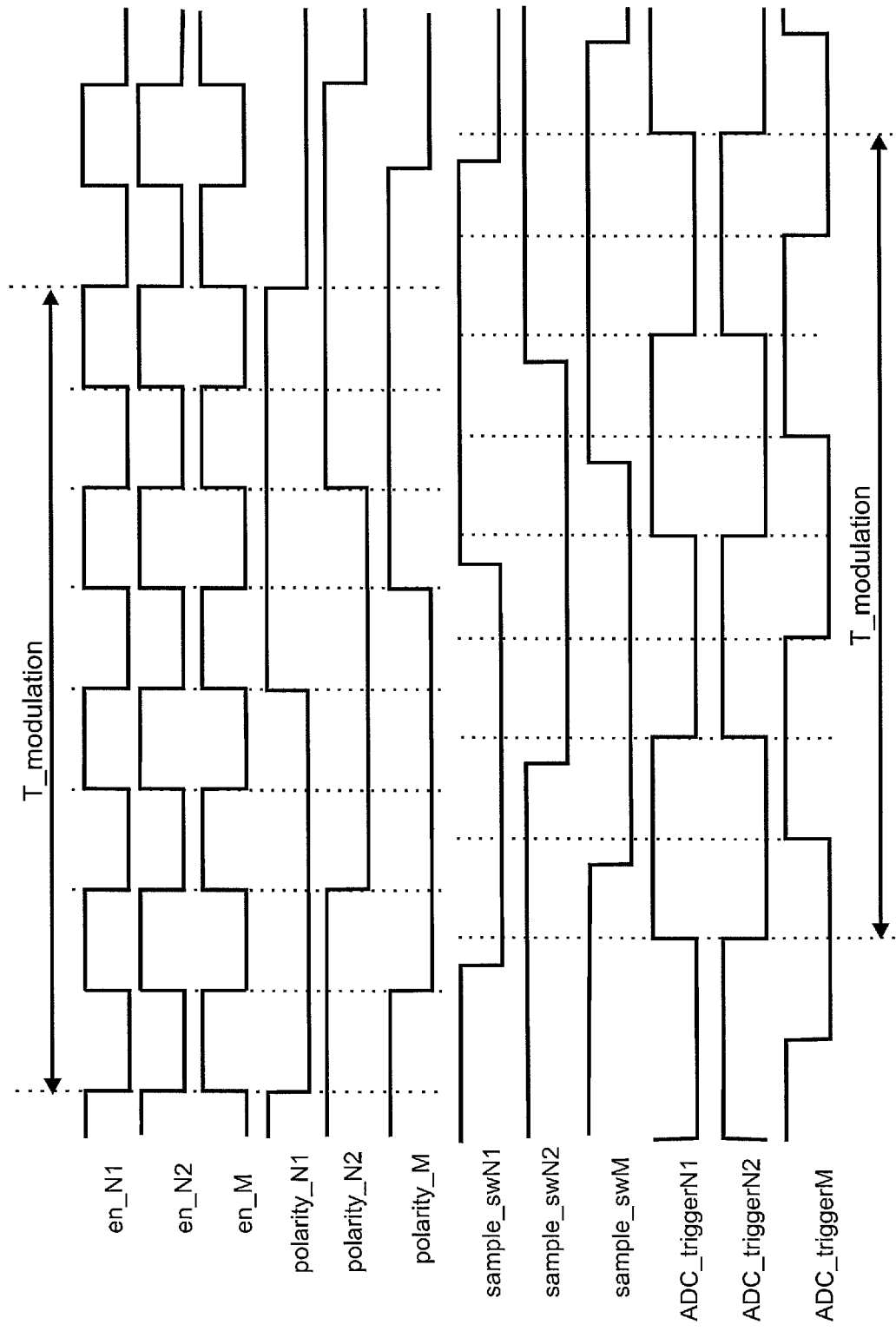
Figure 39:
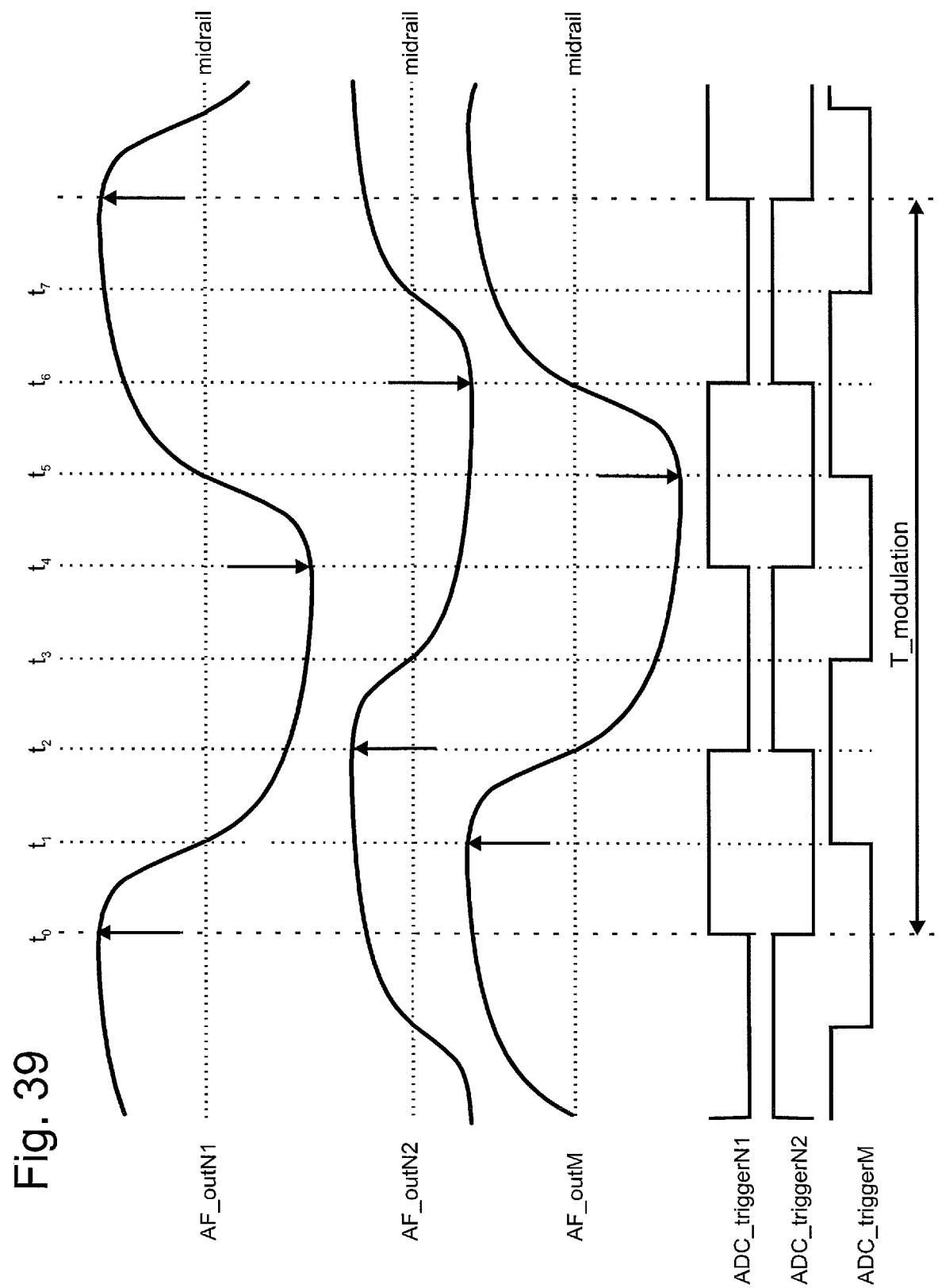
Figure 40:
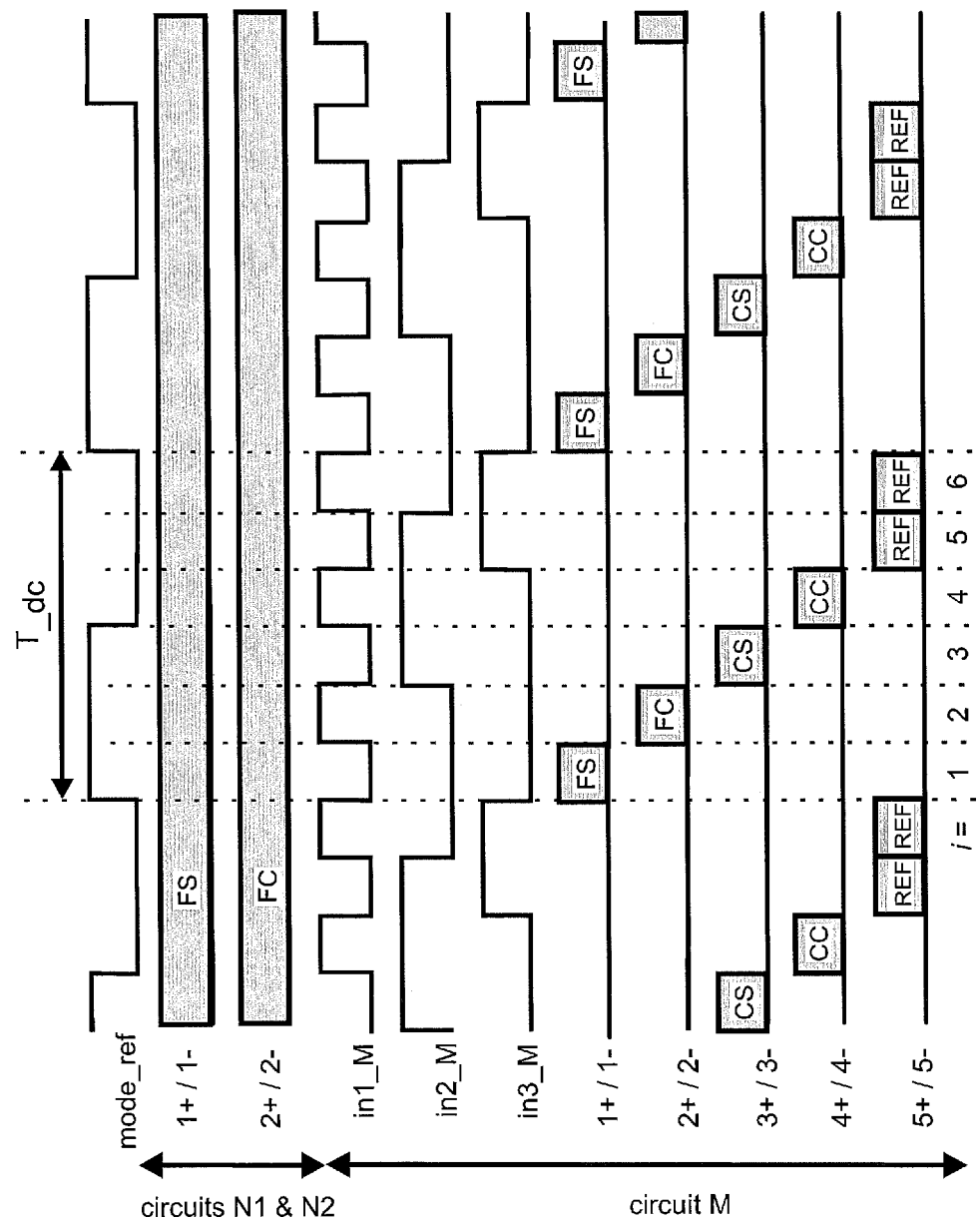
Figure 41:
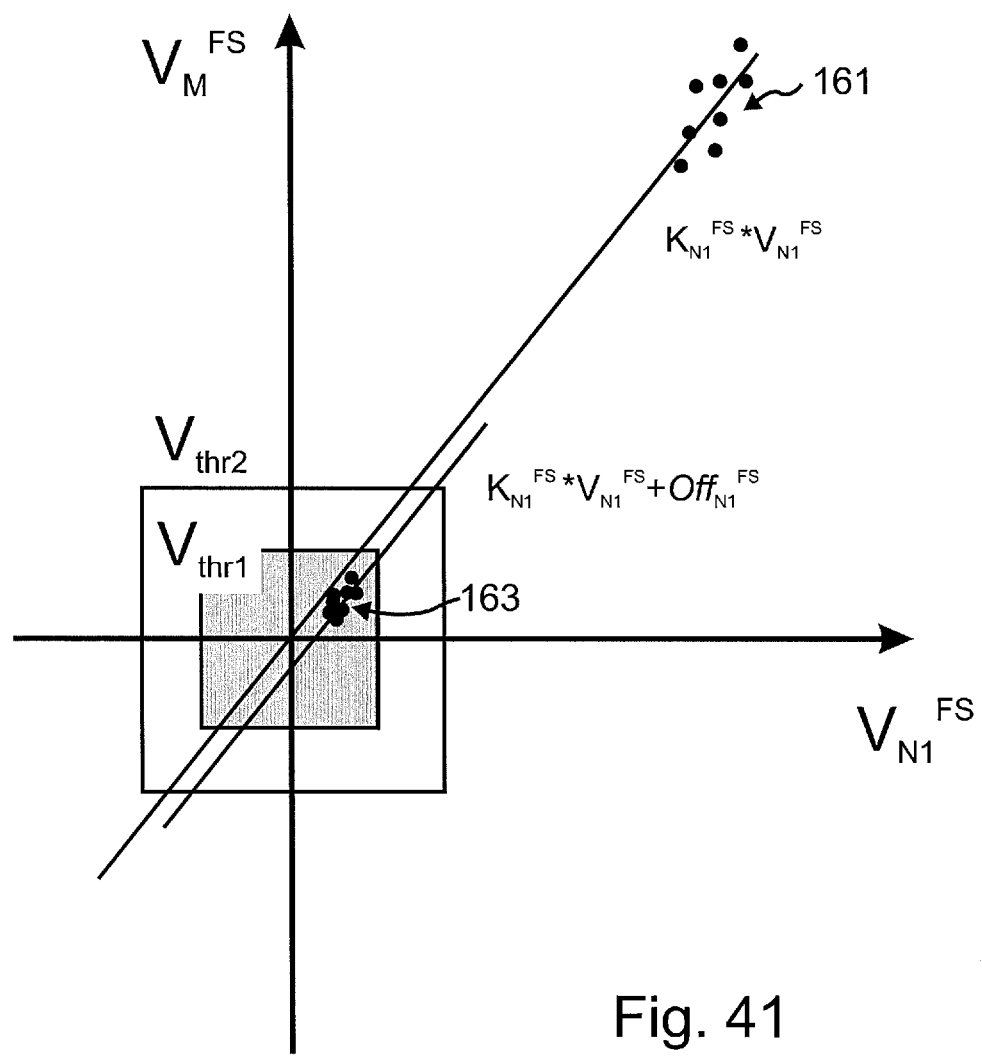
Figure 42:
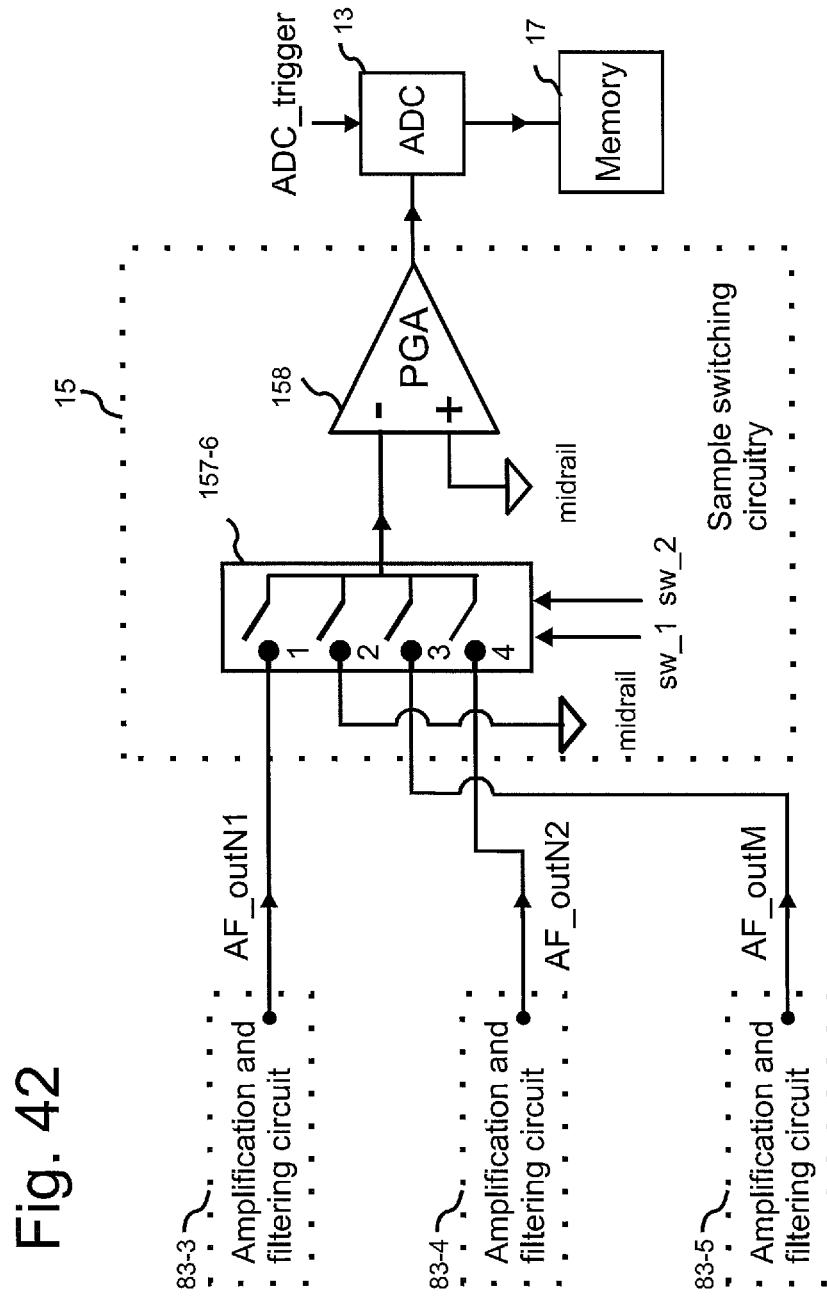
Figure 43:
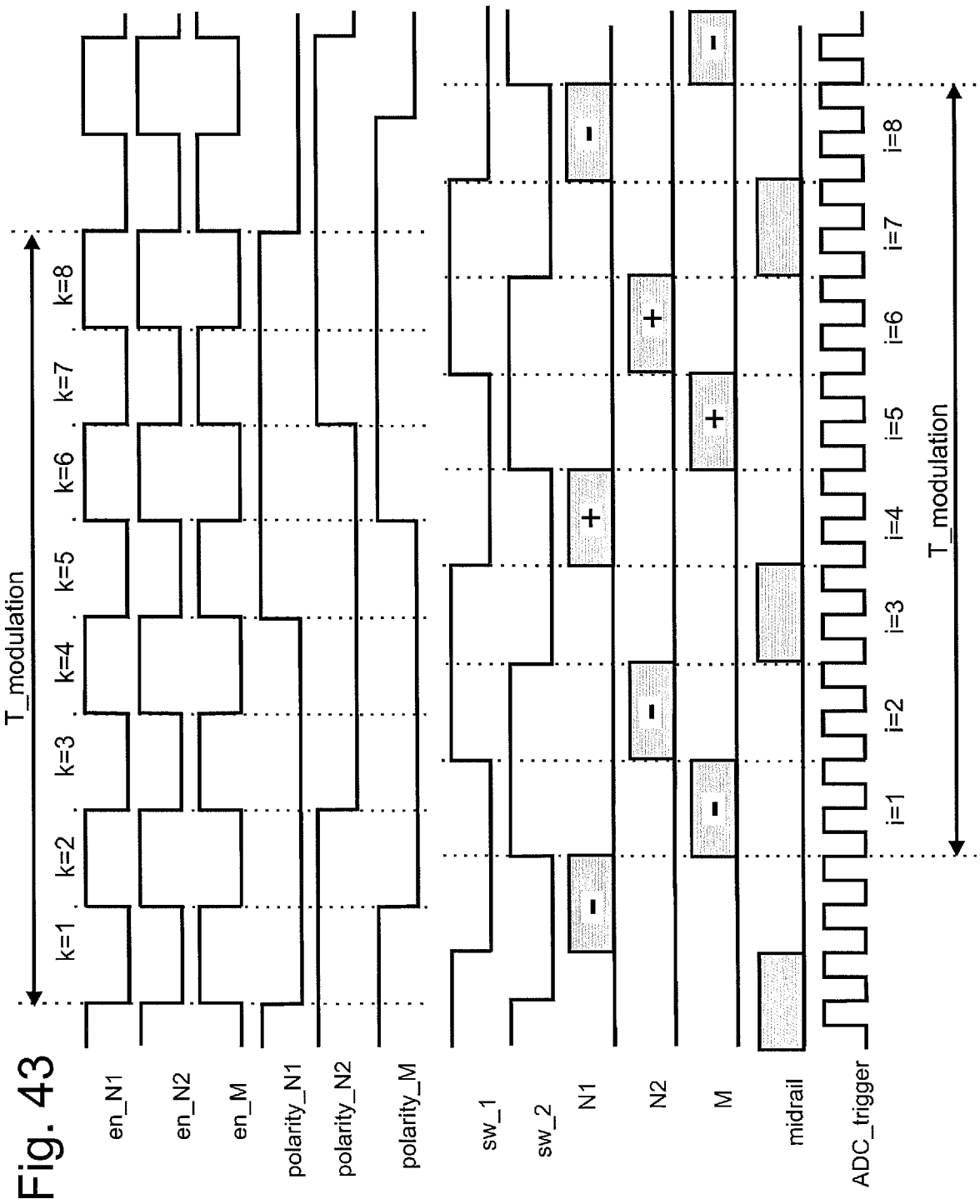
Figure 44A:
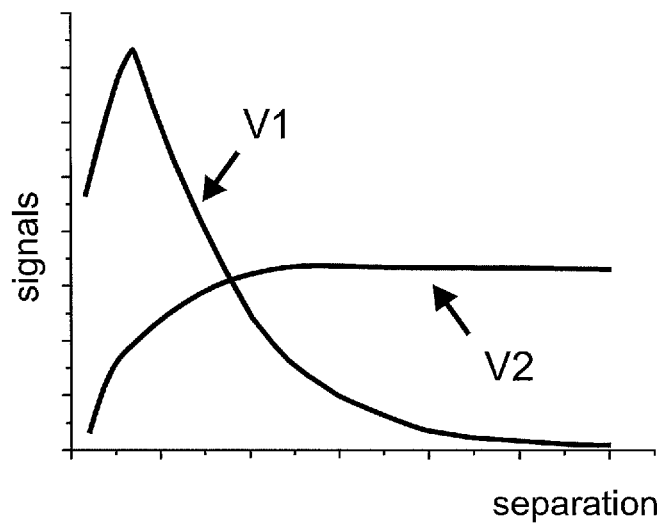
Figure 44B:
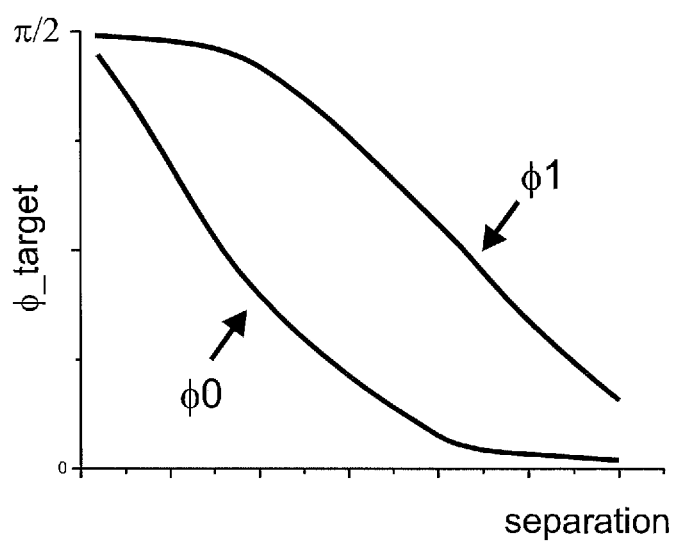
Figure 45A:
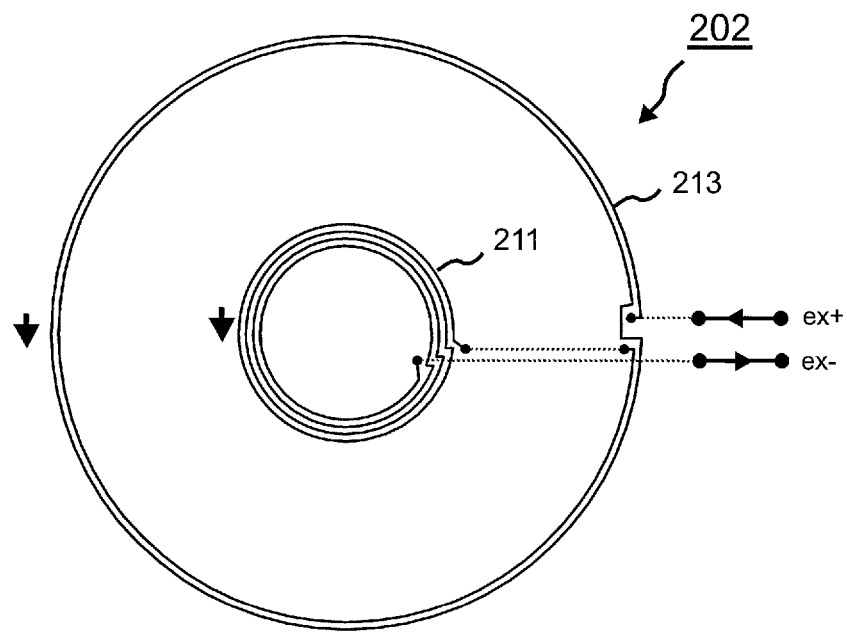
Figure 45B:
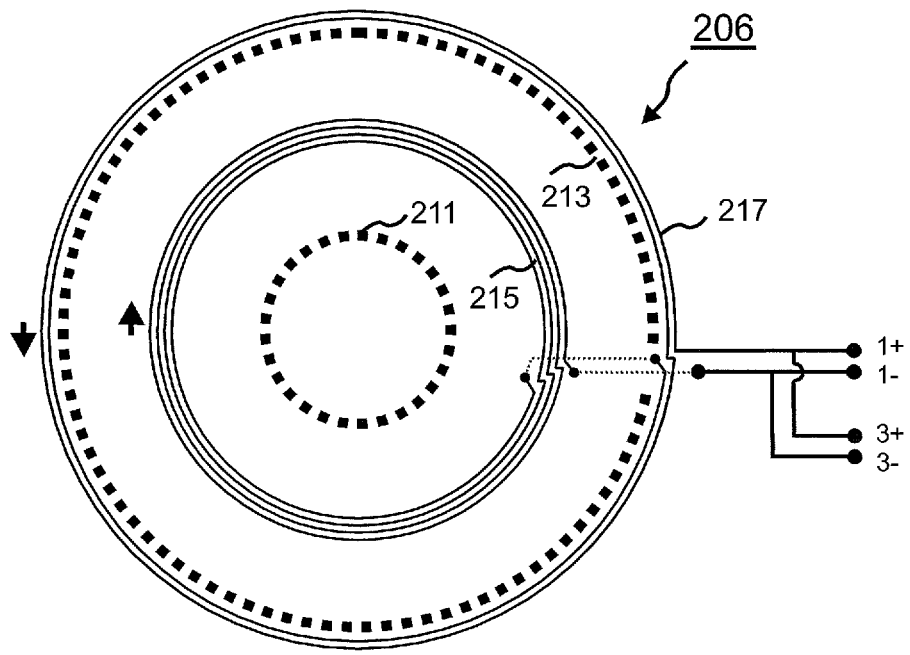
Figure 45C:
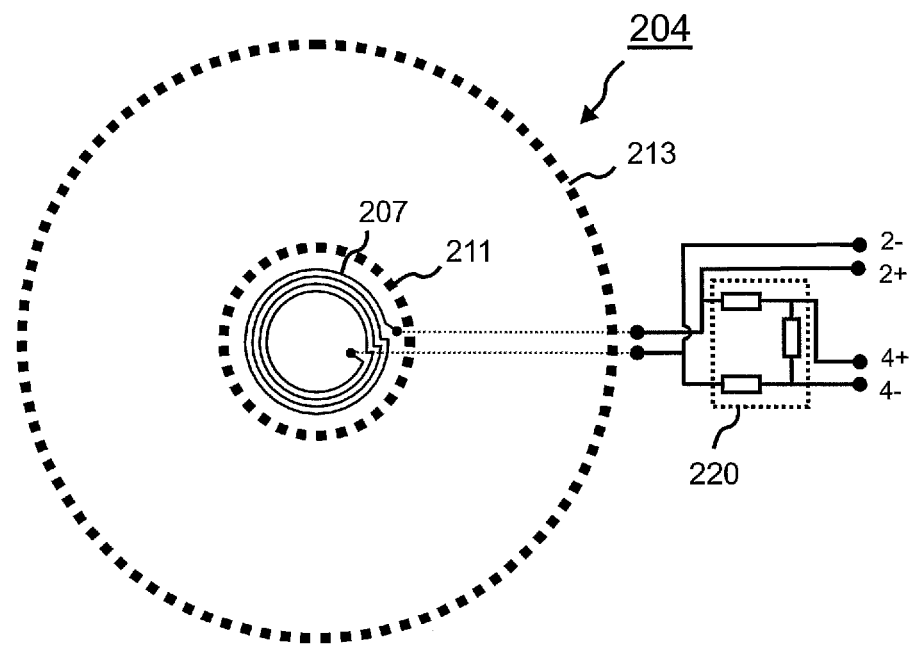
Figure 45D:
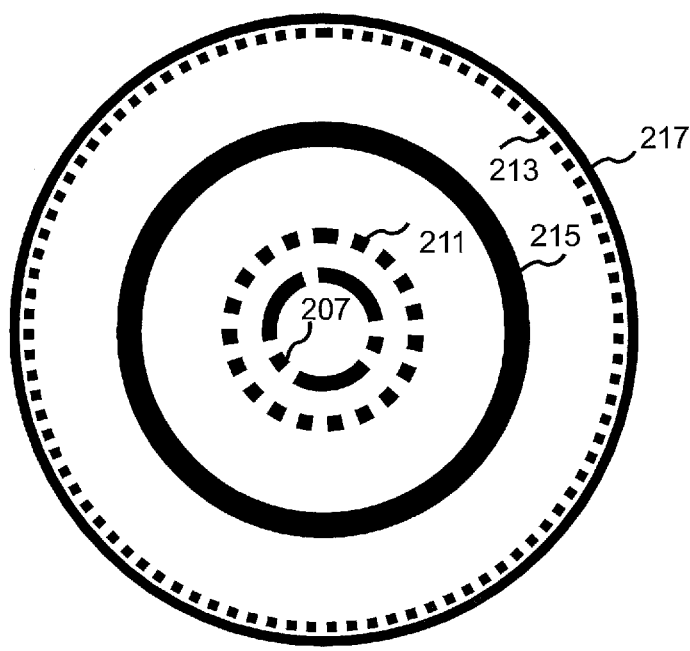
Figure 46:
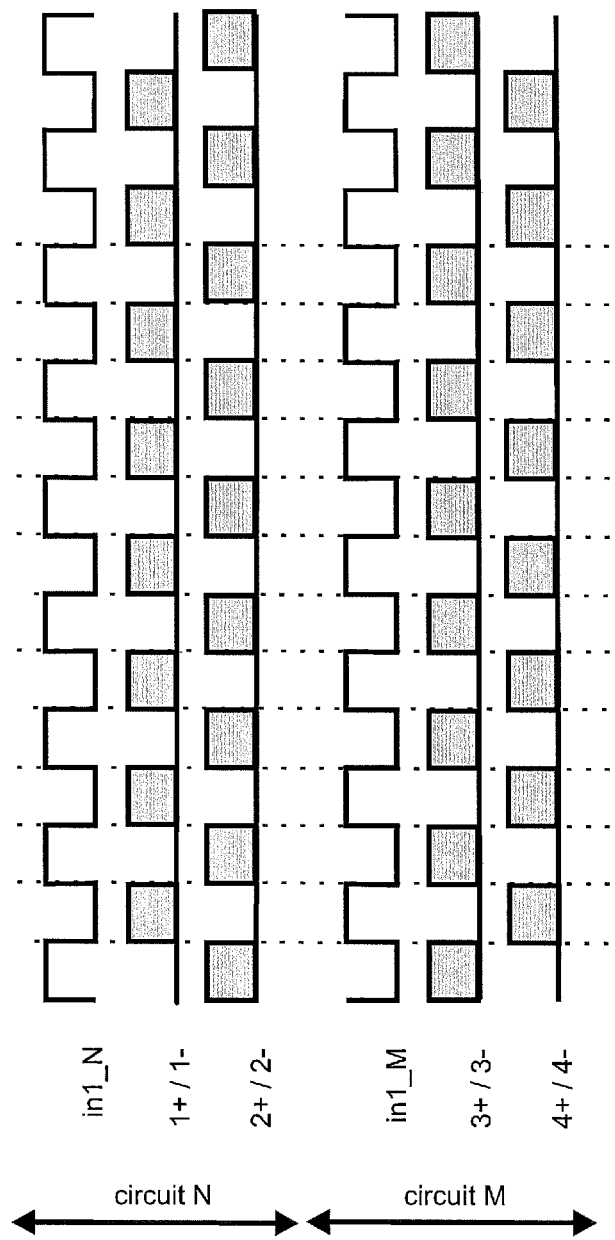
Figure 47:
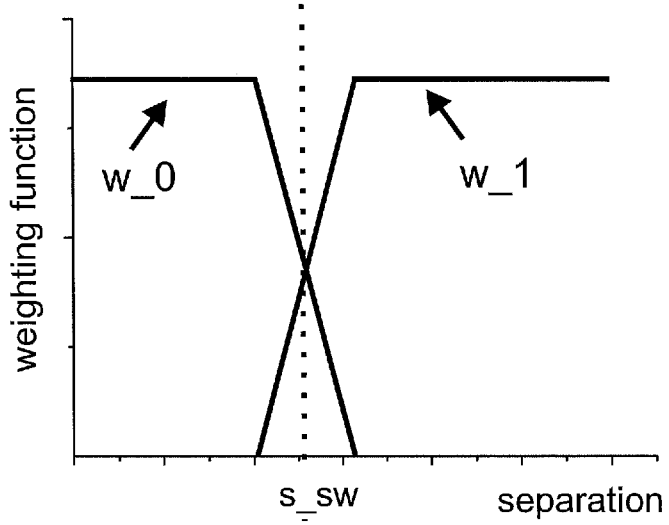
Figure 48:
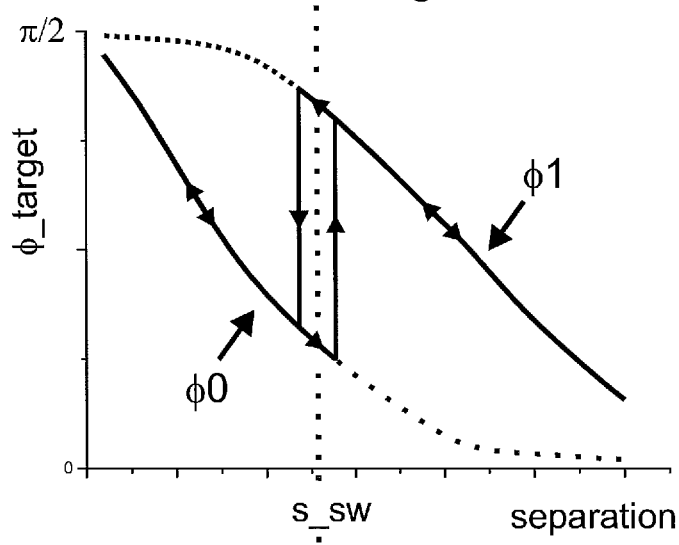
Figure 49:
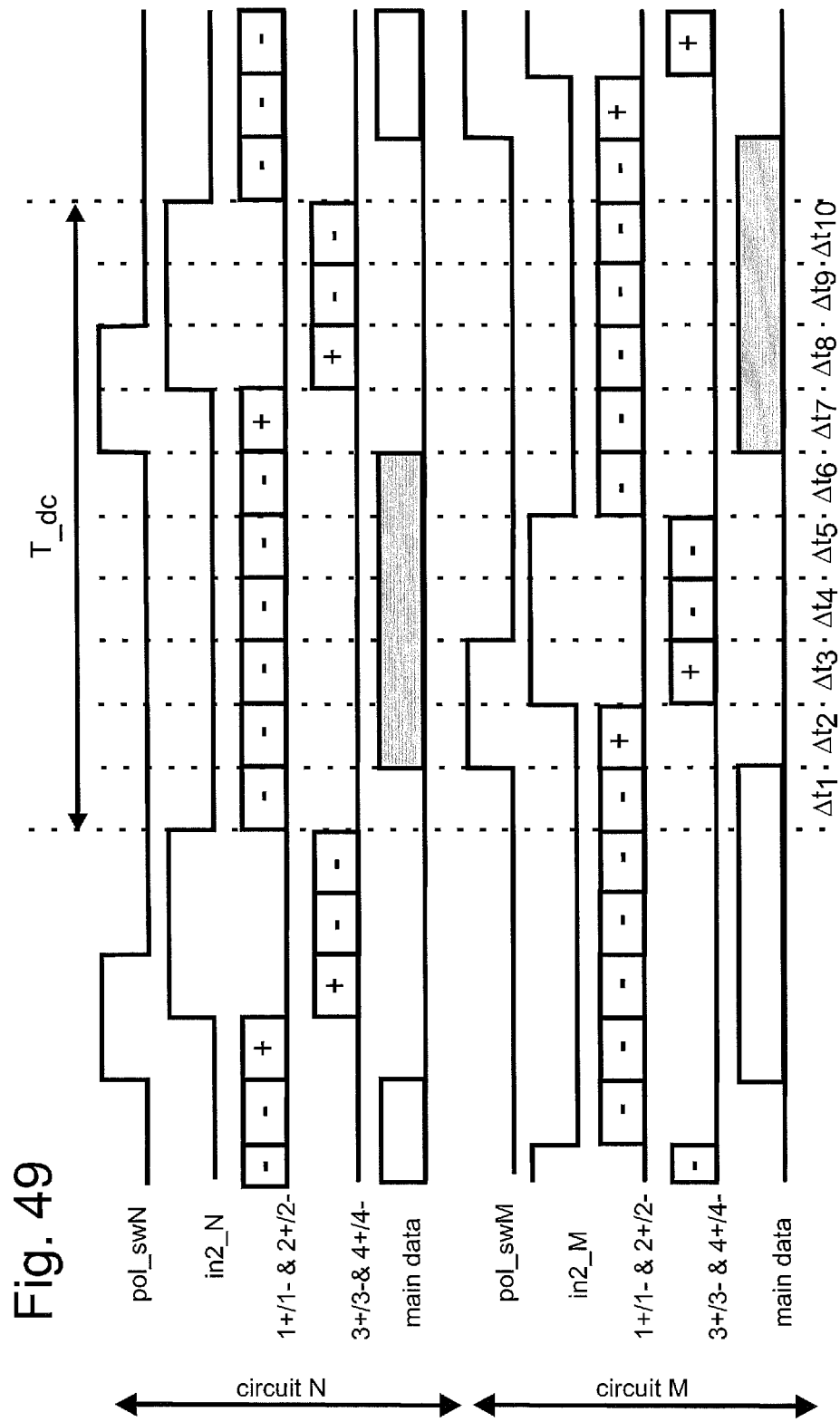
Figure 50:
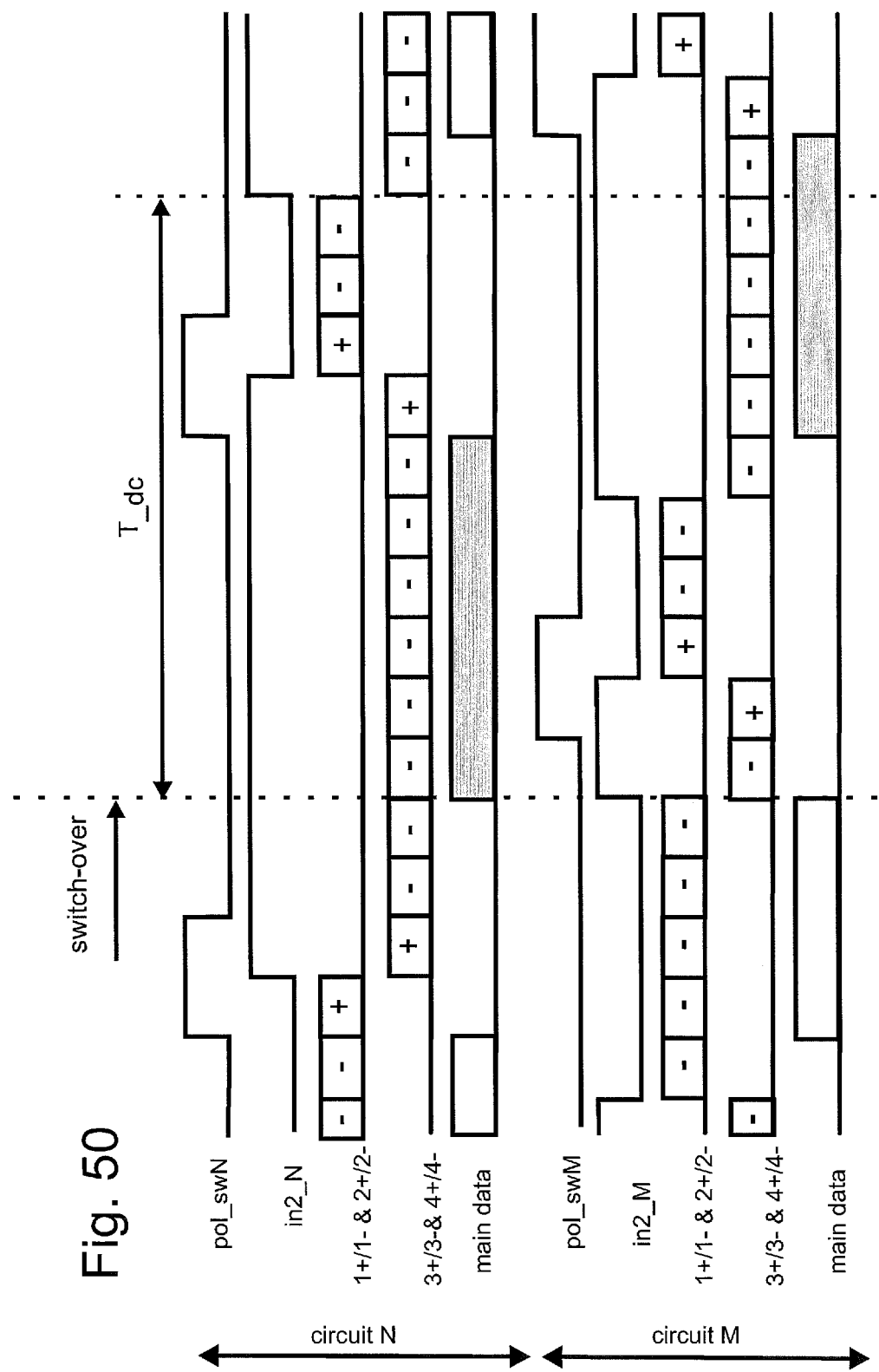

FIG. 3 schematically illustrates in more detail the excitation circuitry used to apply excitation signals to the excitation coil shown in FIG. 2a and measurement circuitry used to process signals obtained from the coarse and fine detection coils shown in FIGS. 2a and 2b;

FIG. 4 illustrates two measurement circuits forming part of the measurement circuitry shown in FIG. 3 and illustrating the way in which different inputs of each measurement circuit are connected to the detection coils;

FIG. 5 illustrates in more detail the components in each of the two measurement circuits;

FIG. 6 is a timing diagram illustrating the way in which signals from the inputs to a measurement circuit may be switched through the measurement circuit;

FIG. 7a is illustrates amplification and filtering circuitry that forms part of each measurement circuit and that is used to amplify and filter signals obtained from the detection coils;

FIG. 7b schematically illustrates a spectrum of the signal that is to be amplified and filtered by the amplification and filtering circuit shown in FIG. 7a;

FIG. 7c illustrates a desired filter response for the amplification and filtering circuit shown in FIG. 7a that can be used to filter the signal to remove the high frequency demodulation components whilst maintaining signal components that will vary with the position to be sensed;

FIG. 8 illustrates the way in which an output signal from the amplification and filtering circuit may vary during the five detection intervals illustrated in FIG. 6;

FIG. 9 is a timing diagram illustrating in more detail the timing of when the output signal from the amplification and filtering circuit is converted to digital values and illustrating a measurement latency associated with the measurements;

FIG. 10 is a timing diagram illustrating a sequence of measurements that are obtained using the two measurement circuits during a detection cycle and illustrating the way in which measurements from the two measurement circuits are interleaved with one another;

FIG. 11 is a flow chart illustrating the processing performed by the microcontroller to process the signals obtained during a detection cycle;

FIG. 12a is a timing diagram illustrating the way in which the microcontroller combines measurements to determine a position measurement and the way in which the processing of the fine sine and cosine signals is overlapped between the two measurement circuits;

FIG. 12b is a plot illustrating the way in which a correction value is determined to correct for different phase shifts associated with the two measurement channels;

FIG. 13 schematically illustrates alternative excitation circuitry that allows for a dynamic change of the phase of the excitation signal;

FIG. 14a schematically illustrates the way in which the phase of the excitation signal can be varied using the circuitry shown in FIG. 13;

FIG. 14b is a flow chart illustrating a procedure performed by the microcontroller to vary a DAC control signal used to vary the phase of the excitation signal;

FIG. 15 is a timing diagram illustrating the way in which fine position measurements can be obtained during each detection interval;

FIG. 16 is a block diagram illustrating components of excitation and processing circuitry used in an inductive position sensor;

FIG. 17 is a timing diagram illustrating the way in which signals from two inputs are combined together to form an intermediate signal whose phase varies with the position to be measured;

FIG. 18 is a timing diagram illustrating the way in which signals from two inputs are combined together to form a further intermediate signal whose phase varies with the position to be measured;

FIG. 19a is a phase plot illustrating the way in which first and third phase measures vary with the position being measured;

FIG. 19b is a phase plot illustrating the way in which a corrected third phase measure varies with the position being measured;

FIG. 19c is a phase plot illustrating the way in which second and fourth phase measures vary with the position being measured;

FIG. 19d is a phase plot illustrating the way in which a corrected fourth phase measure varies with the position being measured;

FIG. 20 is a timing diagram illustrating the way in which signals from two inputs are combined together with different control signals to form two intermediate signals whose phases vary with the position to be measured;

FIG. 21 is a block diagram illustrating some of the timers and control signals used to measure the phases of the intermediate signals illustrated in FIG. 20;

FIG. 22 is a timing diagram illustrating the way in which some of the control signals are determined using the circuitry shown in FIG. 21;

FIG. 23 illustrates the way in which signals from the different inputs can be multiplexed through two measurement circuits;

FIG. 24 is a timing diagram illustrating the phase measurements made using the circuitry shown in FIG. 21 to obtain fine target position information;

FIG. 25 is a timing diagram illustrating measurements made during a breakthrough offset calibration measurement mode;

FIG. 26 is a timing diagram illustrating the way in which the signal from a fine detection coil can be multiplexed together with an excitation reference signal through the measurement circuits;

FIG. 27 is a timing diagram illustrating the way in which two demodulation clocks of different phases can be used during measurement of an excitation reference signal;

FIG. 28 is a timing diagram illustrating the way in which the signal from a fine detection coil can be multiplexed together with an excitation reference signal through the measurement circuits when using demodulation clocks having different phases;

FIG. 29 illustrates in more detail the components in each of two measurement circuits used in an alternative embodiment that uses a chopper signal to enable and disable a demodulating switch;

FIG. 30 is a timing diagram illustrating the effect of introducing the chopper signal to increase charge injection during the operation of the circuitry shown in FIG. 29;

FIG. 31 is a timing diagram illustrating the way in which the signal from a fine detection coil can be multiplexed together with an excitation reference signal through the measurement circuits when using the chopper signal shown in FIG. 29;

FIG. 32 schematically illustrates alternative excitation circuitry and measurement circuitry that may be used to process signals obtained from the detection coils;

FIG. 33 illustrates in more detail the three measurement circuits forming part of measurement circuitry shown in FIG. 32;

FIG. 34 illustrates the content of measurement circuit N1 and measurement circuit N2 shown in FIG. 33;

FIG. 35 illustrates the content of measurement circuit M shown in FIG. 33;

FIG. 36 illustrates sample switching circuitry forming part of the circuitry shown in FIG. 32 and showing the way in which the outputs from the measurement circuits are connected to respective inputs of a three channel ADC;

FIG. 37 is a timing diagram illustrating some of the control signals used to control the operation of measurement circuit N1 shown in FIG. 34;

FIG. 38 is a timing diagram illustrating the different control signals used to control the three measurement circuits used in the circuitry shown in FIG. 32;

FIG. 39 is a plot illustrating the relative timings of when the signals output from the three measurement circuits are sampled by the ADC;

FIG. 40 is a timing diagram illustrating the way in which the different sensor signals input to measurement circuit M are multiplexed there through in a time division manner;

FIG. 41 is a plot illustrating different calibration data sets and different mapping data that is generated for the different calibration data sets;

FIG. 42 is a block diagram illustrating an alternative sample switching circuitry that can be used to connect the outputs from the measurement circuits to the ADC;

FIG. 43 is a timing diagram illustrating the way in which the signals from the three measurement circuits are multiplexed through the ADC;

FIG. 44a is a plot showing the way in which first and second detection signals vary with separation of a target from sensor coils of a proximity sensor;

FIG. 44b is a plot showing the way in which first and second phase measures vary with the position of the separation of the target from the sensor coils of the proximity sensor:

FIG. 45a illustrates the form of an excitation coil that can be used in the proximity sensor;

FIG. 45b illustrates the form of a balanced detection coil that can be used in the proximity sensor;

FIG. 45c illustrates the form of unbalanced detection coil that can be used in the proximity sensor;

FIG. 45d schematically illustrates all of the proximity coils superimposed on each other, illustrating the relative locations of the excitation coil and the two detection coils;

FIG. 46 is a timing diagram illustrating the way in which the signals from the two detection coils of the proximity sensor can be passed through the two measurement circuits of the processing circuitry used in earlier embodiments;

FIG. 47 is a plot illustrating the way in which two weighting functions vary with the separation of the target from the sensor coils;

FIG. 48 is a plot illustrating the way in which the microcontroller of the proximity sensor may switch between two different measurements depending on the determined separation;

FIG. 49 is a timing plot illustrating the way in which the different measurements can be switched through the two measurement circuits to allow for a fast update rate of the target separation; and FIG. 50 is a timing plot illustrating the way in which the two measurement circuits can switch between the two measurements that are used as the main measurement using the two measurement circuits.

FIRST EMBODIMENT

Overview

Figure 1:
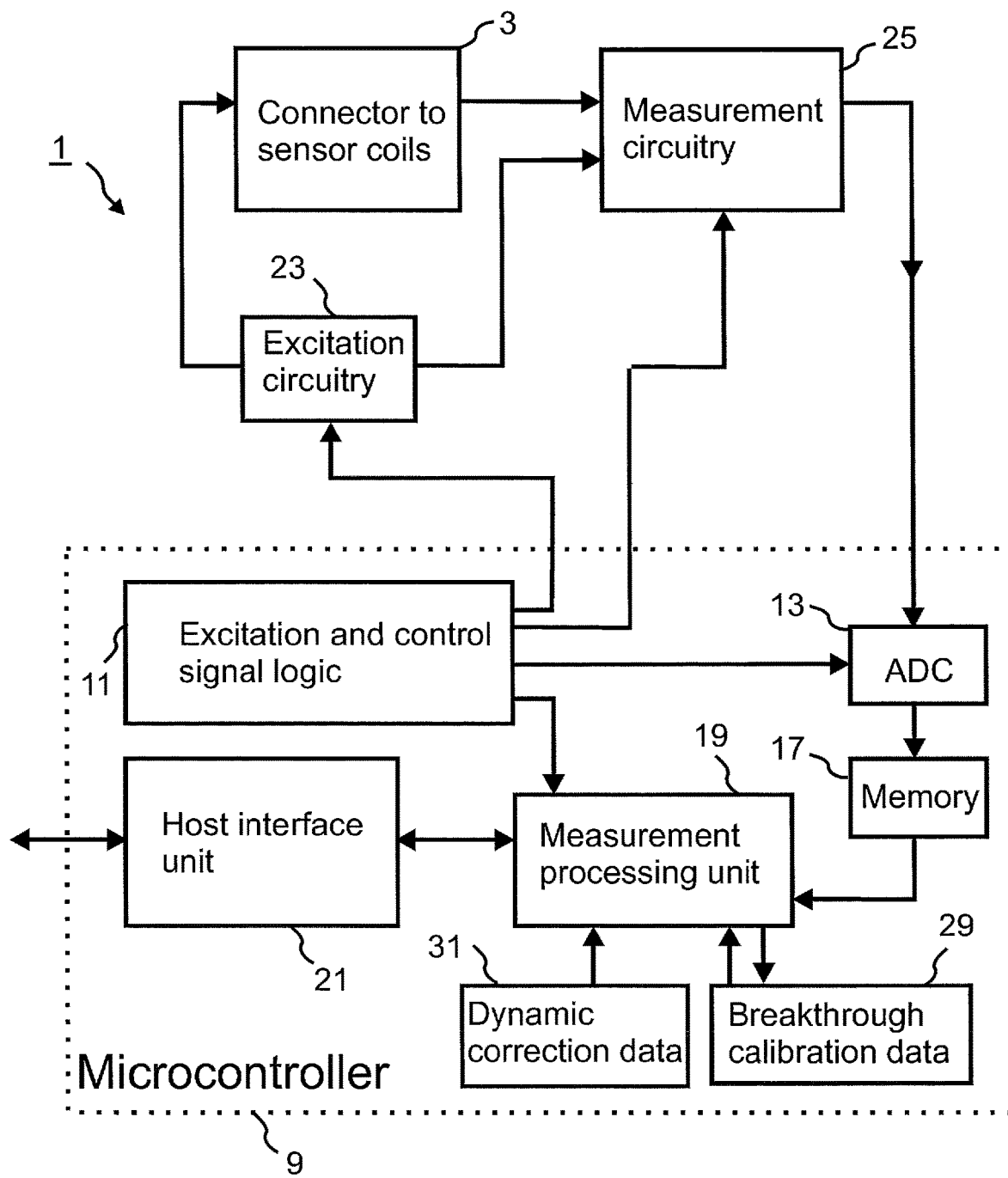
FIG. 1 is a block diagram illustrating components of excitation and processing circuitry used in an inductive position sensor.

FIG. 1 is a schematic block diagram illustrating the main components of a position sensor 1 used in this embodiment to sense the position of a target (not shown). The position sensor 1 has a connector 3 for connection to sensor coils (not shown). As will be described in more detail below with reference to FIG. 2, in this embodiment the sensor coils include an excitation coil and coarse and fine detection coils. The connector 3 is connected to a microcontroller 9 that controls the application of excitation signals to the excitation coil and that processes the signals obtained from the detection coils. As shown in FIG. 1, the microcontroller 9 includes excitation and control signal logic 11 that generates the control signals used to control the excitation and processing of the excitation and sensor coils. In particular, the excitation and control signal logic 11 controls excitation circuitry 23 to apply an excitation signal to the excitation coil via the connector 3 and controls measurement circuitry 25 to measure the signals obtained from the detection coils via the connector 3. The microcontroller 9 also includes an analogue to digital converter (ADC) 13 which converts analogue measurements into digital values which are then stored in memory 17. The microcontroller 9 also includes a measurement processing unit 19 which processes the digital measurements stored in memory 17 to determine the position of the target relative to the sensor coils and which then reports this position to a host device (not shown) via a host interface unit 21. Breakthrough calibration data 29 is provided that is used to reduce errors caused by direct inductive coupling between the excitation coil and the detection coils; and dynamic correction data 31 is maintained and used dynamically to correct for systematic errors introduced because measurements are being calculated using different measurement circuits and/or because of target movement during the measurement process.

As will be explained in more detail below, the fine detection coils provide more accurate (but ambiguous) position information and the coarse detection coils provide less accurate (but non-ambiguous) position information that can be used to disambiguate the accurate position information from the fine detection coils. Further, the measurement circuitry 25 has two measurement circuits that are used to process the signals obtained from the fine detection coils in an overlapped time division multiplexed manner to maximise the rate at which accurate position information can be obtained from the position sensor 1 whilst also allowing measurements to be obtained from the coarse detection coils.

Sensor Coils

The circuitry shown in FIG. 1 can be used with a wide range of different sensor coils, such as those described in WO95/31696, WO97/14935, WO2005/085763 or WO2009/115764, the contents of which are hereby incorporated by reference. FIG. 2 schematically illustrates the different sensor coils used in this embodiment for sensing the position of the target 5 along the X direction illustrated. In particular, FIG. 2a shows an excitation coil 2, a coarse sine detection coil 4-1 and a coarse cosine detection coil 4-2. FIG. 2a also shows a fine sine detection coil 6-1 and a fine cosine detection coil 6-2. Although FIG. 2a illustrates the sensor coils in a side by side arrangement (for ease of illustration), they are all mounted (superimposed) on top of each other on a sensor board 8. In this embodiment, the sensor board 8 is a printed circuit board, with the conductors forming the sensor coils being defined by conductive tracks on different layers of the printed circuit board 8 so that the different sensor coils are electrically insulated from each other. FIG. 2a also shows the target 5 that is arranged to move along the X direction relative to the sensor coils. A number of different types of target 5 may be used. Typically the target 5 will be a short circuit coil, a conductive screen (for example made of a piece of aluminium or steel) or, as illustrated in FIG. 2a, an electromagnetic resonator 12 that is formed by a coil 14 and a capacitor 16. The excitation coil 2 and the target 5 are arranged so that when the excitation circuitry 23 applies an excitation signal to the excitation coil 2, the excitation magnetic field generates a signal in the target 5 that creates its own electromagnetic field. In the case of a resonant target 5, the signal is a current flowing in the resonator coil 14 and in the case of a metallic screen, the signal is in the form of Eddy currents flowing on the surface of the metallic screen. The detection coils 4 and 6 are geometrically patterned along the X direction (the measurement path) as a result of which, the electromagnetic coupling between each detection coil 4 and 6 and the target 5 varies as a function of position along the measurement path. Therefore, the signal generated by the target 5 in each of the detection coils will vary with position along the measurement path. As will be explained in further detail below, since the geometric patterning of each of the detection coils is slightly different, the signal obtained from each detection coil will vary in a slightly different manner with the position of the target 5.

In this embodiment, the excitation and detection coils are geometrically arranged on the PCB 8 so that, in the absence of the target 5, there is substantially no electromagnetic (inductive) coupling between them. In other words, in the absence of the target 5, when an AC excitation current is applied to the excitation coil 2, substantially no signal is induced in each of the detection coils 4, 6. This is not however essential.

As shown, the coarse sine detection coil 4-1 is formed from a conductor that defines two loops which are connected together in the opposite sense in a figure of eight configuration. As a result of the figure of eight connection EMFs (electromotive forces) induced in the first loop by a common background magnetic field will oppose the EMFs induced in the second loop by the same common background magnetic field. The coarse sine detection conductor 4-1 has a pitch ($L_c$) that approximately corresponds to the measurement range over which the target 5 can move. As those skilled in the art will appreciate, the coarse cosine detection coil 4-2 is effectively formed by shifting the coarse sine detection coil 4-1 by a quarter of the pitch ($L_c$) along the X direction. As shown, the coarse cosine detection coil 4-2 has three loops, with the first and third loops being wound in the same direction as each other but opposite to the winding direction of the second (middle) loop. The fine sine and cosine detection coils 6-1 and 6-2 are similar to the coarse detection coils 4, except that they have a smaller pitch ($L_f$) so that, in this embodiment, there are four repeats or periods along the measurement range over which the target 5 can move.

The excitation coil 2 is wound around the outside of the detection coils 4 and 6 and is arranged so that (in the absence of the target 5) it generates a magnetic field which is substantially symmetric along an axis which is parallel to the Y axis and which passes through the middle of the excitation coil 2. This axis of symmetry is also an axis of symmetry for the detection coils 4 and 6. Therefore, as a result of the figure of eight arrangement of the detection coils 4 and 6 and as a result of the common symmetry between the excitation coil 2 and the detection coils 4 and 6, there is minimal direct inductive coupling between the excitation coil 2 and the detection coils 4 and 6. Further, as a result of the figure of eight configuration of the detection coils 4 and 6, the coupling between each detection coil 4, 6 and the target 5 is approximately sinusoidal, with the period of the sinusoidal variation being defined by ($L_c$) for the coarse detection coils 4 and with the period of the sinusoidal variation being defined by ($L_f$) for the fine detection coils 6. The EMFs induced in the detection coils 4 and 6 by the target 5 may therefore be represented by the following:

$$V^{CS} = A_C \sin\left[\frac{2\pi d_c}{L_c}\right] \cos\omega t \quad (1)$$

$$V^{CC} = A_C \cos\left[\frac{2\pi d_c}{L_c}\right] \cos\omega t \quad (2)$$

$$V^{FS} = A_F \sin\left[\frac{2\pi d_f}{L_f}\right] \cos\omega t \quad (3)$$

$$V^{FC} = A_F \cos\left[\frac{2\pi d_f}{L_f}\right] \cos\omega t \quad (4)$$

where $d_C$ is the coarse position of the target 5 along the measurement direction, $d_f$ is the fine position of the target 5 along the measurement direction, $A_C$ and $A_F$ are amplitude terms and ω represents the angular frequency of the excitation signal applied to the excitation coil 2. As those skilled in the art will appreciate, the equations above are approximate in that the peak amplitudes of the signals obtained from the detection coils do not vary exactly sinusoidally with the position of the target 5. This is an approximation to the actual variation, which will depend upon edge effects, positions of via holes on the printed circuit board and other effects that introduce non-linearities into the system. If the detection coils 4 and 6 were ideal, then $d_c$ and $d_f$ would be the same value. After demodulation and filtering to remove the excitation frequency component, the coarse position ($d_C$) of the target 5 can be determined from:

$$\varphi^C = \left[\frac{2\pi d_c}{L_c}\right] = \arctan\left(\frac{V^{CS}}{V^{CC}}\right) \quad (5)$$

and the fine position ($d_f$) of the target 5 can be determined from:

$$\varphi^F = \left[\frac{2\pi d_f}{L_f}\right] = \arctan\left(\frac{V^{FS}}{V^{FC}}\right) \quad (6)$$

The determination of the position of the target 5 as a function of the ratio of the peak amplitudes of the signals induced in the detection coils makes the system less sensitive to variations in the amplitude of the excitation current and variations in the distance between the target 5 and the sensor coils.

FIG. 2b illustrates the way in which the phases $\varphi^F$ and $\varphi^C$ vary with the position of the target 5 along the measurement path (X). As can be seen, the coarse measurement ($\varphi^C$) varies monotonically with the position of the target along the measurement range, whilst the fine measurement ($\varphi^F$) repeats four times along the measurement range. Thus whilst the fine position measurement is more accurate, it is ambiguous. However, the coarse position information can be used to resolve the period ambiguity associated with the fine position measurement.

Connections to the Sensor Coils

FIG. 3 illustrates in more detail the way in which the excitation circuitry 23 connects to the excitation coil 2 at the connections labelled ex+ and ex− of the connector 3. FIG. 3 also shows that the coarse sine detection coil 4-1 is connected to the measurement circuitry 25 at the connections labelled C_sin+ and C_sin− of the connector 3; that the coarse cosine detection coil 4-2 is connected to the measurement circuitry 25 at the connections labelled C_cos+ and C_cos− of the connector 3; that the fine sine detection coil 6-1 is connected to the measurement circuitry 25 at the connections labelled F_sin+ and F_sin− of the connector 3; and that the fine cosine detection coil 6-2 is connected to the measurement circuitry 25 at the connections labelled F_cos+ and F_cos− of the connector 3.

Excitation Circuitry

FIG. 3 also shows in more detail the excitation circuitry 23 used in this embodiment which is most suited for use with sensors that use non-resonant targets 5, such as targets formed from a short circuit coil or from a piece of metal (as systems that use non-resonant targets 5 are more susceptible to the effects of direct breakthrough from the excitation coil 2 to the detection coils 4 and 6). As shown, the excitation circuitry has a symmetrical drive circuit formed by multiplexor 41 that applies VCC to ex+ and ground to ex− or that applies VCC to ex− and ground to ex+ in accordance with the control signal ex_clock (supplied from the excitation and control signal logic 11). Such a symmetric drive is useful to reduce the amplitude of any common mode current which can be established via capacitive coupling from the excitation coil 2 into conductive objects in the vicinity of the sensor coils. The excitation signal output from the multiplexor 41 is filtered by R-C low pass filters 43-1 and 43-2 to remove higher frequency harmonics from the excitation signal.

FIG. 3 also shows a simple resistor divider 45 that is used to provide a fraction of the excitation voltage to the Ref+ and Ref− inputs of the measurement circuitry 25. As will be explained in more detail below, this reference signal is used to reduce the amount of direct breakthrough noise in the measurement resu lts.

Measurement Circuitry

FIG. 4 is a block diagram illustrating the way in which the inputs to the measurement circuitry 25 are connected to the inputs of two separate measurement circuits labelled measurement circuit N 51-1 and measurement circuit M 51-2. As can be seen from FIG. 4, each sensor coil connection and each reference signal connection is connected to the following inputs of both measurement circuits 51-1 and 51-2 as follows:

Input 1+=F_sin+
Input 1−=F_sin−
Input 2+=F_cos+
Input 2−=F_cos−
Input 3+=C_sin+
Input 3−=C_sin−
Input 4+=C_cos+
Input 4−=C_cos−
Input 5+=Ref+
Input 5−=Ref−

As will be explained in more detail below, this allows each measurement circuit 51 to be able to process the signal from each detection coil or to process the reference signal. As shown in FIG. 4, measurement circuit N 51-1 outputs processed signal $AF^N$_out and measurement circuit M 51-2 outputs processed signal $AF^M$_out to the ADC 13 of the microcontroller 9. Therefore, the microcontroller 9 can obtain signal measurements relating to any of the detection coils or relating to the reference input from each of the two measurement circuits 51.

The resistors 59-0 to 59-7 and capacitors 63-0 to 63-9 are provided to reduce noise and to reduce electromagnetic emissions from the sensor coils. The capacitors 65-0 and 65-2 provide a DC decoupling of the excitation circuitry 23 and the measurement circuitry 25. Finally, the resistors 61-0 to 61-9 are used to condition the DC level on each conductor to the mid-rail voltage.

Measurement Circuit

Each of the measurement circuits 51 has the same structure, although they are controlled by different control signals to ensure that at any point in time the two measurement circuits 51 are processing different input signals. FIG. 5 is a block diagram illustrating the components of each of the measurement circuits 51. As shown, the positive inputs 1+ to 4+ are applied to multiplexor 55-1 and the negative inputs 1− to 4− are applied to multiplexor 55-2. Multiplexors 55 are used to select the ends of one of the detection coils 4 or 6 and connect them through to a demodulating switch 56. Thus when the 1+ input is selected by multiplexor 55-1 the 1− input is selected by multiplexor 55-2 and therefore the signal induced in detector coil 6-1 is passed through to the demodulating switch 56. This is similarly true for the selection of the signals from the other detection coils. The particular input that is selected by each of the two multiplexors 55 is defined by the control signals in1 and in2 which are generated by the excitation and control signal logic 11. In this embodiment, the control of the connection through each multiplexor 55 is defined by the following truth table:

| in1 | in2 | Selected o/p |
|---|---|---|
| 0 | 0 | ±1 |
| 0 | 1 | ±3 |
| 1 | 0 | ±2 |
| 1 | 1 | ±4 |

The reference signal inputs are applied to the multiplexor 57 and an enable signal in3 is used to ensure that multiplexor 57 is disabled when multiplexors 55 are enabled and vice versa. When multiplexor 57 is enabled, the reference signal applied to inputs 5+ and 5− are passed directly through to the demodulating switch 56.

The output labelled A from the multiplexor 55-1 or from the multiplexor 57, is input to terminals 1 and 4 of the demodulating switch 56 and the output labelled B from the multiplexor 55-2 or from the multiplexor 57, is input to terminals 2 and 3 of the demodulating switch 56. The demodulating switch 56 acts to multiply a "demod" signal with the input signal applied to the demodulating switch 56. As shown in FIG. 5, the demod signal is obtained by combining (in this example using an exclusive OR (XOR) gate 100) a polarity control signal and an ex_shifted control signal, both of which are generated by the excitation and control signal logic 11. The ex_shifted control signal is a phase shifted version of ex_clock and thus acts to effectively demodulate the incoming signal to a "baseband" (quasi DC) signal whose amplitude depends on the position of the target 5. The polarity control signal is used to periodically change the polarity of the ex_shifted clock so that the signal being processed by the measurement circuit 51 during the current detection interval is demodulated an equal amount of time with a positive polarity of ex_shifted and with a negative polarity of ex_clock. This results in the signal that is applied to the amplification and filtering circuit 83 having a zero DC component. This allows a high pass filter to be used in the amplification and filtering circuit 83 which helps to remove DC offsets caused by the amplifiers as well as lower frequency noise associated with such DC offsets.

When the demod signal has a value of one, the input labelled A passes through multiplexor terminal 1 to the A* input of the amplification and filtering circuit 83; and the input labelled B passes through the multiplexor terminal 3 to the B* input of the amplification and filtering circuit 83. When the demod signal is zero the demodulating switch 56 changes position such that the input labelled A passes through multiplexor terminal 4 to the B* input of the amplification and filtering circuit 83; and the input labelled B passes through the multiplexor terminal 2 to the A* input of the amplification and filtering circuit 83. As will be explained in more detail below, the amplification and filtering circuit 83 amplifies the difference between A* and B*. Thus, the demodulating switch 56 and the amplification and filtering circuit 83 act to demodulate and amplify A−B or B−A, depending on the value (1 or 0) of the polarity control signal. Hence positive and negative measurements can be obtained from each individual detection coil.

Timing Diagrams

FIG. 6 is a timing diagram illustrating the way in which the signals from the different inputs of a measurement circuit 51 can be selected in a time division manner using the control signals in1, in2 and in3. FIG. 6 also shows ex_shifted and the polarity control signal and the resulting demod signal that is applied to the demodulating switch 56. FIG. 6 shows that during detection interval $\Delta t_1$ the signals from the 1+/1− inputs (fine sine detection coil 6-1) are selected and processed by the measurement circuit 51; that during detection interval $\Delta t_2$ the signals from the 2+/2− inputs (fine cosine detection coil 6-2) are selected and processed by the measurement circuit 51; that during detection interval $\Delta t_3$ the signals from the 3+/3− inputs (coarse sine detection coil 4-1) are selected and processed by the measurement circuit 51; that during detection interval $\Delta t_2$ the signals from the 4+/4− inputs (coarse cosine detection coil 4-2) are selected and processed by the measurement circuit 51; and that during detection interval $\Delta t_5$ the signals from the 5+/5− inputs (reference signal) are selected and processed by the measurement circuit 51.

As can be seen from FIG. 6, if the signals from the different inputs are multiplexed through the measurement circuit 51 in this consecutive manner, then the update rate (the time between measurements of the same signal) is five times the period of the polarity control signal. Using the two measurement circuits this update rate can easily be increased to 2.5 times the period of the polarity control signal. Further, as will be described in more detail later, it is possible to increase this update rate further through a more complex interleaving of the measurements through the two measurement circuits 51.

Amplification and Filtering Circuit

The amplification and filtering circuit 83 amplifies and filters the signals output from the demodulating switch 56, to remove high frequency demodulation signals and to remove the low frequency DC offsets. As shown in FIG. 7a, the amplification and filtering circuit 83 has differential amplification circuitry 85 that amplifies the difference between A* and B*. As discussed above, this results in amplifying A−B or B−A, depending on the value (1 or 0) of the polarity control signal. The output from the differential amplification circuitry 85 is filtered by a bandpass filter 87 to remove the unwanted frequency components from the amplified signal.

FIG. 7b illustrates the spectrum of the signal output from the differential amplification circuitry 85. Most of the desired signal components are around the frequency corresponding to the polarity control signal. The higher frequency components correspond to the high frequency demodulation harmonics generated by the demodulating switch 56.

FIG. 7c illustrates the desired frequency response of the bandpass filter 87 shown in FIG. 7a to filter the signals output from the differential amplification circuitry 85. As shown, the high corner frequency of the filter 87 can be kept quite close to the frequency of the polarity control signal. In this embodiment, the high corner frequency has been set at 4 times the frequency of the polarity signal. This allows the amplification and filtering circuit 83 to filter out almost all the high frequency harmonics generated by the demodulating switch 56. The low corner frequency of the filter 87 cannot be set very close to the frequency of the polarity signal. This is evident from the spectrum of the input signal shown in FIG. 7b, which contains quite a long tail at the low frequency end; and filtering out this part of the spectrum will alter substantially the measured signal output by introducing low frequency transients in the response of the amplification and filtering circuit 83. In this embodiment, the low corner frequency of the amplification and filtering circuit 83 has been set at 100 times lower than the high corner frequency. This still allows the amplification and filtering circuit 83 to filter out the DC offsets of the differential amplification circuitry 85 as well as most of the unwanted low frequency noise caused by the measurement circuitry 25 and allows for a well defined gain for the measured signals within the pass band of the filter 87.

Example Signals

FIG. 8 illustrates the way in which the output (AF_out) from measurement circuit 51 varies during the five detection intervals illustrated in FIG. 6. This AF_out signal is passed to the ADC 13, where it is converted into a digital value. As shown, during each detection interval $\Delta t_k$ the AF_out signal settles to a quasi DC level towards the end of each half period of the polarity control signal. The ADC 13 is triggered to sample AF_out during each detection interval at each of the two quasi DC levels and the difference in the levels is determined to provide a peak to peak voltage level (marked $\Delta_1$, $\Delta_2$, $\Delta_3$, $\Delta_4$ and $\Delta_5$ in FIG. 8) as the measurement for the currently selected detection coil (or reference signal). FIG. 9 shows in more detail the control signals used to trigger the ADC conversion and to trigger the processing of the raw data by the measurement processing unit 19 (shown in FIG. 1). In particular, the ADC 13 is triggered by the control signal ADC_trigger. The frequency of the ADC_trigger signal is exactly two times the frequency of the polarity control signal. The ADC 13 is triggered to perform a conversion on the rising edge of the ADC_trigger control signal so that each of the two quasi DC levels reached during a detection interval is converted into a digital value and stored in memory 17.

Another control signal, CALC_trigger, is used to interrupt the microcontroller 9 so that the digital values can be read from memory 17 into the measurement processing unit 19. As shown, the CALC_trigger control signal has the same frequency as the polarity signal but is slightly delayed from the edges of the ADC_trigger signal to ensure that the results of the ADC conversion are already stored in memory 17 before the CALC_trigger signal forces the microcontroller 9 to read the values obtained from a detection interval from memory 17 into the measurement processing unit 19.

Each peak to peak voltage measurement calculated by the measurement processing unit 19 corresponds either to a measurement of the reference signal or to the signal from one of the detection coils and in order to calculate a position measurement, an arctangent function is calculated using the measurements from a sine and a cosine detection coil. If adjacent detection intervals are arranged to measure the signal from a sine detection coil and a cosine detection coil, then a position calculation can be determined after the second detection interval. This is illustrated in FIG. 9, which shows that if one measurement is calculated for detection interval $\Delta t_k$ and another one is measured for detection interval $\Delta t_{k+1}$ then position information can be calculated using those measurements during detection interval $\Delta t_{k+2}$. This results in a measurement latency of just over two times the period of the polarity control signal.

Optimisation of Measurement Circuit Switching

An optimised switching scheme for switching the different signals from the detection coils (and the reference signal) through the two measurement circuits 51 will now be described. This switching scheme allows an improved update rate for position measurements. FIG. 10 shows the timeline of the control signals used to switch the measurement circuit inputs ±1, ±2, ±3, ±4, and ±5 through measurement circuit N 51-1 and measurement circuit M 51-2. The detection cycle is periodic with a period (T_dc) corresponding to ten detection intervals $\Delta t_i$ (for index i=1 to 10). FIG. 10 also shows a periodic mode_ref control signal that is generated by the excitation and control signal logic 11 and used to define the start of a detection cycle. As shown in FIG. 10, the measurement circuit inputs selected during each of these ten detection intervals is given in the following table:

| Index (i) | Measurement Circuit N | Measurement Circuit M |
|---|---|---|
| 1 | ±1 (FS) | ±4 (CC) |
| 2 | ±2 (FC) | ±5 (Ref) |
| 3 | ±1 (FS) | ±2 (FC) |
| 4 | ±2 (FC) | ±1 (FS) |
| 5 | ±3 (CS) | ±2 (FC) |
| 6 | ±4 (CC) | ±1 (FS) |
| 7 | ±5 (Ref) | ±2 (FC) |
| 8 | ±2 (FC) | ±1 (FS) |
| 9 | ±1 (FS) | ±2 (FC) |
| 10 | ±2 (FC) | ±3 (CS) |

Where FS is the fine sine detection coil 6-1; FC is the fine cosine detection coil 6-2; CS is the coarse sine detection coil 4-1; CC is the coarse cosine detection coil 4-2 and Ref is the excitation reference signal.

As can be seen from the above table and from FIG. 10, during each detection interval the two measurement circuits 51 are processing different input signals. FIG. 10 also shows that during each detection interval at least one of the two measurement circuits 51 is processing a signal from one of the fine detection coils. Additionally, the fine sine and the fine cosine signals are processed in a time interleaved manner in each of the two measurement circuits and in an overlapping manner between the two measurement circuits. During each detection cycle, each measurement circuit 51 also processes the signals from the coarse detection coils 4 and the reference signal. Whilst one measurement circuit is processing the signals from the coarse detection coils and the reference signal, the other measurement circuit 51 is processing the signals from the fine detection coils. With this arrangement, an updated fine position measurement can be obtained at least every second detection interval.

As shown in FIG. 10, the interleaved manner of selecting signals through the two measurement circuits 51 is achieved by applying opposite polarity control signals in1_N and in1_M to the respective multiplexors 55 in the measurement circuit N and the measurement circuit M; and by phase shifting control signal in2_M and in3_M relative to in2_N and in3_N (by half the detection cycle) that are applied to the respective multiplexors 55 in the measurement circuit N and the measurement circuit M. As a result, during the detection interval Δtk when channel 1+ and 1− is selected by the measurement circuit N, channel 2+ and 2− is selected by measurement circuit M. During the next detection interval Δtk+1, channel 2+ and 2− is selected by measurement circuit N and channel 1+ and 1− is selected by measurement circuit M. This avoids unwanted collisions in which the same input (channel) is selected simultaneously by measurement circuit N and measurement circuit M.

Measurement Processing Unit

FIG. 11 is a flow chart illustrating the processing performed by the measurement processing unit 19. As shown, in step s1, the measurement processing unit 19 waits until it receives the next mode_ref signal (rising edge of the mode_ref signal shown in FIG. 10). In response to receiving this rising edge (interrupt), the measurement processing unit 19 sets, in step s3, the index (i) to the value 1. In step s5-1, the measurement processing unit 19 reads the ADC data related to measurement circuit N from memory 17 and in step s7-1 the measurement processing unit 19 processes the retrieved data according to the current value of the index (i). In particular (and as will be described in more detail below), the processing that the measurement processing unit 19 does on the retrieved data depends on what that data relates to—whether it relates to a signal from a fine detection coil, a signal from a coarse detection coil or if it relates to the reference signal. Similarly, in step s5-2, the measurement processing unit 19 reads the ADC data related to measurement circuit M from memory 17 and in step s7-2 the measurement processing unit 19 processes the retrieved data according to the current value of the index (i). In this embodiment, the ADC data from the two measurement circuits 51 is written into separate portions of the memory 17 in a sequential manner—so that the ADC data from measurement circuit N for detection interval $\Delta t_{k+1}$ is written into the corresponding portion of memory 17 after the ADC data from measurement circuit N obtained for detection interval $\Delta t_k$.

After step s5-2, the processing continues to step s9, where the measurement processing unit 19 checks to see if the index (i) has a value greater than nine. If it does not, then the processing proceeds to step s11, where the index value (i) is incremented by one. The processing then proceeds to step s13, where the measurement processing unit 19 waits for the next rising edge of the CALC_trigger signal (from the excitation and control signal logic 11) indicating that the ADC values for the next detection interval will have been written into the relevant part of the memory 17. The processing then returns to step s5-1 so that these next ADC values can be read from memory and processed by the measurement processing unit 19. Once step s9 determines that the index value (i) is greater than nine, the processing returns to the start where the measurement processing unit 19 waits for the next mode_ref interrupt signal and the process is repeated.

As those skilled in the art will appreciate, the measurement processing unit 19 is operating independently and asynchronously relative to the excitation and control signal logic 11, only receiving the control signals mode_ref and CALC_trigger from the excitation and control signal logic 11 to ensure that it processes the data arriving into the memory 17 at the appropriate timing.

Fine Detection Coil Measurements

FIG. 12a is a timing diagram illustrating what inputs are being passed through each of the measurement circuits 51 and the calculations that the measurement processing unit 19 performs in steps s7 shown in FIG. 11 when processing the signals obtained from the fine detection coils 6. The processing of the signals from the coarse detection coils 4 and the processing of the reference signal is not illustrated in FIG. 12a to reduce the complexity of the figure. As shown in FIG. 12a when the index i=1, the signal on the fine sine detection coil 4-1 (FS) is passed through measurement circuit N. During this detection interval, the measurement processing unit 19 reads the ADC data obtained from measurement circuit N during the previous two detection intervals (when i=9 and 10 in the previous detection cycle) and calculates the above described peak to peak voltage levels (Δk) for the previous two detection intervals. As shown in FIG. 12a, during the detection interval corresponding to i=9, the signal from the fine sine detection coil (FS) was passed through measurement circuit N; and during the detection interval corresponding to i=10, the signal from the fine cosine detection coil (FC) was passed through measurement circuit N. These raw peak to peak values are then processed to reduce breakthrough noise (described in more detail later) and then the breakthrough corrected values are applied to an arctangent function that converts the peak to peak measures into fine position information ($\varphi^F$) which is then processed to balance phase offsets introduced by the measurement circuits 51-1 and 51-2 (described in more detail later).

As can be seen from FIG. 12a, the measurement processing unit 19 determines such fine position information using signals obtained from measurement circuit N during detection intervals corresponding to index values i=1, 3 and 5. Similarly, the measurement processing unit 19 determines such fine position information using signals from measurement circuit M during detection intervals corresponding to index values i=6, 8 and 10. Thus, during the detection interval corresponding to index value i=1, the measurement processing unit 19 switches over from using the data obtained from measurement circuit M to using the data from measurement circuit N to calculate the fine position information. Similarly, during the detection interval corresponding to index value i=6, the measurement processing unit 19 switches over from using the data obtained from measurement circuit N to using the data from measurement circuit M to calculate the fine position information. Therefore, with this switching arrangement, the measurement processing unit 19 can provide updated fine position measurements at an update rate of six times per ten detection intervals.

Although the signal (FC) from the fine cosine detection coil 6-2 is passed through measurement circuit N during the detection interval corresponding to index i=8, the measurement processing unit 19 does not use this data to determine any position information—as it has fine position data from measurement channel M. Similarly, although the signal (FC) from the fine cosine detection coil 6-2 is passed through measurement circuit M during the detection interval corresponding to index i=3, the measurement processing unit 19 does not use this data to determine any position information—as it has fine position data from measurement channel N. Having these extra measurements of the fine cosine signal makes it easier to generate the control signals used to select the signals through the measurement circuits M and N.

Although not illustrated in FIG. 12a, the measurement processing unit 19 also updates the coarse position information for measurement circuit N during the detection interval corresponding to index value i=7 using the ADC values obtained from measurement circuit N during detection intervals corresponding to i=5 and 6. Similarly, the measurement processing unit 19 updates the coarse position information for measurement circuit M during the detection interval corresponding to index value i=2 using the ADC values obtained from measurement circuit M during detection intervals corresponding to i=10 and 1. During the detection interval corresponding to index value i=8, the measurement processing unit 19 updates the breakthrough calibration data 29 stored for measurement circuit N using the ADC data obtained from measurement circuit N during the detection interval corresponding to index value i=7 (i.e. using the excitation reference signal as measured by measurement circuit N). Similarly, during the detection interval corresponding to index value i=3, the measurement processing unit 19 updates breakthrough calibration data 29 stored for measurement circuit M using the ADC data obtained from measurement circuit M during the detection interval corresponding to index value i=2 (i.e. using the excitation reference signal as measured by measurement circuit M).

Thus whilst the measurement processing unit 19 is using the data from measurement circuit N for fine position measurements, the measurement processing unit 19 is using the data from measurement circuit M for obtaining coarse position measurements and for measuring the excitation reference signal (Ref); and whilst the measurement processing unit 19 is using the data from measurement circuit M for fine position measurements, the measurement processing unit 19 is using the data from measurement circuit N for obtaining coarse position measurements and for measuring the excitation reference signal (Ref).

Breakthrough Calibration Data

As discussed above, the peak to peak voltages calculated by the measurement processing unit 19 are corrected for any direct breakthrough between the excitation coil 2 and the corresponding detection coil using the stored breakthrough calibration data 29 and the latest measurement for the reference signal (corresponding to the fraction of the excitation signal applied at input 5 of the measurement circuits).

The equations below illustrate the breakthrough corrections that are performed in this embodiment on the peak to peak voltage measurement ($V^{FS}_N$) calculated for the signal obtained from the fine sine detection coil 6-1 that is passed through measurement circuit N and on the peak to peak voltage measurement ($V^{FC}_N$) calculated for the signal obtained from the fine cosine detection coil 6-2 that is passed through measurement circuit N:

$$V_{Ncorr}^{FS} = V_N^{FS} - O_N^{FS} \times V_N^{EX} \tag{7}$$

$$V_{Ncorr}^{FC} = V_N^{FC} - O_N^{FC} \times V_N^{EX} \tag{8}$$

Where $O^{FS}_N$ is offset calibration data 29 (stored in non-volatile memory) associated with measurement circuit N and the fine sine detection coil 6-1; $O^{FC}_N$ is offset calibration data 29 associated with measurement circuit N and the fine cosine detection coil 6-2; and $V^{EX}_N$ is the latest measurement for the excitation reference signal (corresponding to the fraction of the excitation signal applied at input 5 of measurement circuit N). Similar breakthrough calibrations are performed on the measurements obtained from measurement circuit M as follows:

$$V_{Mcorr}^{FS} = V_M^{FS} - O_M^{FS} \times V_M^{EX} \tag{9}$$

$$V_{Mcorr}^{FC} = V_M^{FC} - O_M^{FC} \times V_M^{EX} \tag{10}$$

These breakthrough corrected measurements from each measurement circuit N and M for the fine sine and fine cosine detection coils 4 can then be used to calculate the fine position information using an arctangent function as follows:

$$\varphi_N^F = \arctan\left(\frac{V_{Ncorr}^{FS}}{V_{Ncorr}^{FC}}\right) \tag{11}$$

$$\varphi_M^F = \arctan\left(\frac{V_{Mcorr}^{FS}}{V_{Mcorr}^{FC}}\right) \tag{12}$$

This arctangent function can also be calculated approximately using the following arithmetic approach:

if $V^{FS}_{corr} > 0$ and $V^{FC}_{corr} \leq 0$ if $|V^{FS}_{corr}| < |V^{FC}_{corr}| \varphi^F = \pi + \pi/4 * V^{FS}_{corr}/V^{FC}_{corr}$ else $\varphi^F = \pi/2 - \pi/4 * V^{FC}_{corr}/V^{FS}_{corr}$ if $V^{FS}_{corr} > 0$ and $V^{FC}_{corr} \leq 0$ if $|V^{FS}_{corr}| < |V^{FC}_{corr}| \varphi^F = \pi + \pi/4 * V^{FS}_{corr}/V^{FC}_{corr}$ else $\varphi^F = \pi/2 - \pi/4 * V^{FC}_{corr}/V^{FS}_{corr}$ if $V^{FS}_{corr} \le 0$ and $V^{FC}_{corr} \le 0$ if $|V^{FS}_{corr}| < |V^{FC}_{corr}| \varphi^F = \pi + \pi/4 * V^{FS}_{corr}/V\_FC\_corr$ else $\varphi^F = 3\pi/2 - \pi/4 * V^{FC}_{corr}/V^{FS}_{corr}$ if $V^{FS}_{corr} \le 0$ and $V^{FC}_{corr} > 0$ if $|V^{FS}_{corr}| < V^{FC}_{corr}| \varphi^F = 2\pi + \pi/4 * V^{FS}_{corr}/V^{FC}_{corr}$ else $\varphi^F = 3\pi/2 - \pi/4 * V^{FC}_{corr}/V^{FC}_{corr}$ (13)

The results of such arithmetic calculations will deviate from the true arctangent function by about 1% and this deviation can be further compensated by using look-up table correction. The phase ambiguity associated with the fine position information ($\varphi^F$) can then be resolved using the coarse position information ($\varphi^C$) calculated in a similar manner using the signals obtained from the coarse detection coils 4. Optionally, the breakthrough correction of the coarse signal measurements can be omitted as the coarse position information is only being used to resolve the period ambiguity problem associated with the fine position measurements. However, when the period of the fine scale detection coils 6 is rather dissimilar to the period of the coarse scale detection coils 4, a much better accuracy might be required for the coarse scale output. In this case, therefore, a similar breakthrough correction can be applied to the signals measured in the coarse scale coils 4 in order to improve the accuracy of the coarse position information.

Calibration of the Direct Breakthrough Offset Values

The direct breakthrough offset from the excitation coil 2 into the detection coils 4 and 6 can vary from sensor to sensor and also can depend on the installation environment—especially to the location of various metallic objects in the close vicinity of the sensor coils. The set of offset calibration data $O^{FS}_N$, $O^{FC}_N$, $O^{CS}_N$, $O^{CC}_N$, $O^{FS}_M$, $O^{FC}_M$, $O^{CS}_M$ and $O^{CC}_M$, should be determined after the sensor is packaged and preferably after the sensor is installed in the final application but prior to the target 5 being mounted near the sensor coils.

When performing the calibration, typically the host interface unit 21 will provide a signal to the measurement processing unit 19 to inform it that the subsequent measurements are for calibration purposes. The measurement processing unit 19 is configured in such case to measure differences between consecutive results of the conversions performed by the ADC 13, as peak-to-peak voltages:
$V^{FS}_N$, $V^{FC}_N$, $V^{CS}_N$, $V^{CC}_N$, $V^{EX}_N$
and
$V^{FS}_M$, $V^{FC}_M$, $V^{CS}_M$, $V^{CC}_M$, $V^{EX}_M$
and to accumulate the running average for each voltage without trying to calculate any ratiometric functions. This calibration measurement cycle is finished by a command from the host interface unit 21. At this time, the measured values of the averaged voltages above are used to calculate the offset calibration data 29:

$$O^{FS}_N = \left(\frac{V^{FS}_N}{V^{EX}_N}\right) \quad (14)$$

$$O^{FC}_N = \left(\frac{V^{FC}_N}{V^{EX}_N}\right) \quad (15)$$

$$O^{CS}_N = \left(\frac{V^{CS}_N}{V^{EX}_N}\right) \quad (16)$$

$$O^{CC}_N = \left(\frac{V^{CC}_N}{V^{EX}_N}\right) \quad (17)$$

and $$O^{FS}_M = \left(\frac{V^{FS}_M}{V^{EX}_M}\right) \quad (18)$$

$$O^{FC}_M = \left(\frac{V^{FC}_M}{V^{EX}_M}\right) \quad (19)$$

$$O^{CS}_M = \left(\frac{V^{CS}_M}{V^{EX}_M}\right) \quad (20)$$

$$O^{CC}_M = \left(\frac{V^{CC}_M}{V^{EX}_M}\right) \quad (21)$$

This offset calibration data 29 is then written to the non-volatile memory of the microcontroller 9 and is used in the manner described above to correct the raw data for direct breakthrough between the excitation coil 2 and the detection coils 4 and 6.

Dynamic Correction—Oscillation Removal

The fine position information ($\varphi^F$) thus calculated still has an error associated with slightly different properties of each measurement circuit N and M. This means that for the same target position, the fine position information ($\varphi^F_N$) obtained using the data measured with measurement circuit N will be slightly different from the fine position information ($\varphi^F_M$) obtained using the data measured with measurement circuit M. As the measurement processing unit 19 is calculating fine position measurements from each measurement circuit M and N three times per detection cycle (T_dc), this will cause the appearance of micro-oscillations in the position calculations which will reduce the effective resolution of the measurement set-up below its actual accuracy capabilities. In order to reduce such micro-oscillations, the measurement processing unit 19 performs a phase correction to compensate for the difference in the systematic error between the two measurement circuits N and M. FIG. 12b illustrates the problem. In particular, FIG. 12b is a plot showing the way in which the measured fine position ($\varphi^F$) changes over time between the detection interval corresponding to index i=8 in one detection cycle and the detection interval corresponding to index i=3 in the next detection cycle. As shown, between detection intervals corresponding to index i=8 to i=10, the fine position measurement ($\varphi^F_M$) is calculated by measurement circuit M and it changes in value by $\Delta\varphi1$. As the two measurements calculated during these detection intervals are determined from signals passed through the same measurement circuit M, the change in fine position will be due to motion of the target 5. When the measurement processing unit 19 starts to determine fine position measurements using the signals obtained from measurement circuit N (in detection interval i=1), there is a change in the measured fine position due to the motion of the target 5 but also because the measurements are being determined using signals that have been processed by a different measurement circuit N. To compensate, the position measurement obtained at index i=10 is extrapolated to detection time interval at index i=1;

this extrapolated value is then used to determine a suitable correction value that should be applied to the fine position measurements from the two measurement circuits. More specifically, the following procedure is used:

The difference between the fine position measurements ($\varphi^F$) calculated during the detection intervals $\Delta t_i$ with index 10 and 8 is assigned to $\Delta\varphi1$:

$$\Delta\varphi1 = \varphi^F_{10} - \varphi^F_8 \quad (22)$$

The difference between the fine position measurements ($\varphi^F$) calculated during the detection intervals $\Delta t_i$ with index 1 and 3 is assigned to $\Delta\varphi2$:

$$\Delta\varphi2 = \varphi^F_3 - \varphi^F_1 \quad (23)$$

The value of the fine position measurement $\varphi^F_{10}$ is extrapolated to detection interval $\Delta t_i$ with index $i=1$:

$$\varphi^F_{10new} = \varphi^F_{10} + 1/4*(\Delta\varphi1 + \Delta\varphi2) \quad (24)$$

This extrapolated value $\varphi^F_{10new}$ should be very close to the measured fine position $\varphi^F_1$. The difference between these two values represents the systematic error caused by differences between the measurement circuits (M and N) used to determine the different fine position measurements. A correction value is then defined by dividing this difference by two:

$$\Delta\varphi_{corr} = (\varphi^F_{10new} - \varphi^F_1)/2 \quad (25)$$

This dynamic correction value is determined during the detection interval corresponding to index value $i=3$.

A similar switch over in using the signals obtained from the two measurement circuits M and N is performed during detection interval $\Delta t_i$ with index $i=6$ and a similar correction value is determined during detection interval corresponding to $i=8$ as follows:

$$\Delta\varphi1 = \varphi^F_5 - \varphi^F_3 \quad (26)$$

$$\Delta\varphi2 = \varphi^F_8 - \varphi^F_6 \quad (27)$$

$$\varphi^F_{5new} = \varphi^F_5 + 1/4*(\Delta\varphi1 + \Delta\varphi2) \quad (28)$$

$$\Delta\varphi_{corr} = (\varphi^F_6 - \varphi^F_{5new})/2 \quad (29)$$

The value of $\Delta\varphi_{corr}$ can be averaged over several detection cycles (T_dc) to reduce noise levels and is used by the microcontroller 9 as part of the dynamic correction. The last line of FIG. 12a illustrates the detection intervals when this dynamic correction value is updated. Then for all data points calculated for channel N the $\varphi^F$ values are corrected by:

$$\varphi^F_{corr} = \varphi^F_N + \Delta\varphi_{corr} \quad (30)$$

And for all data points calculated for channel M the $\varphi^F$ values are corrected by $$\varphi^F_{corr} = \varphi^F_M - \Delta\varphi_{corr} \quad (30)$$

Whilst the fine position measurements corrected in this way may still contain some degree of systematic error, the fine position measurements will now be practically free from the micro-oscillations at the moments of switching the ratiometric calculations using the signals obtained from measurement circuit N to using the signals obtained from measurement circuit M and vice versa. As those skilled in the art will appreciate, other extrapolations and other correction values could be calculated. For example, a single correction could be applied to the output from just one of the measurement circuits, with no correction being applied to the output from the other measurement circuit.

Dynamic Correction—Velocity Compensation

As illustrated in FIG. 12b, the phase measurements obtained during consecutive detection intervals change due to motion of the target 5. This causes a systematic error in the position measurements because all four measurements made by the ADC controller 13 that are used to calculate the ratiometric answer $\varphi^F$ are measurements taken at consecutive moments in time in which the instantaneous value of $\varphi^F$ is changing. One way to dynamically correct for such motion, is to calculate a mean rate of change of $\varphi^F$ as a running average $\Delta_{mean}$ of the following differences:

$$\Delta\varphi^F_{3-1} = \varphi^F_3 - \varphi^F_1$$

$$\Delta\varphi^F_{5-3} = \varphi^F_5 - \varphi^F_3$$

$$\Delta\varphi^F_{8-6} = \varphi^F_8 - \varphi^F_6$$

$$\Delta\varphi^F_{10-8} = \varphi^F_{10} - \varphi^F_8$$

Assuming that the value of $\varphi^F$ is changing by a constant amount between each measurement, then the shift in phase measurement between adjacent measurements output by the ADC 13 is equal to the following speed parameter:

$$s = \frac{\Delta_{mean}}{4} \quad (31)$$

This speed parameter is not exactly equal to the speed of movement of the target 5, as it represents the average rate of change of the measured phase. However, as the measured phase is substantially linearly related to the position of the target 5 (see FIG. 2), the rate of change of the measured phase will be substantially proportional to the rate of change of the target position (=speed).

As illustrated in FIG. 12a, in this embodiment, position information is determined using measurements that are taken of the signals from the fine sine detection coil 6-1 and then from the fine cosine detection coil 6-2. Therefore, accounting for the motion of the target 5, the peak to peak voltage measurements determined by the measurement processing unit 19 using the raw data obtained from the ADC 13 can be written as:

$$\hat{V}^{FS} = A_F \sin[(\varphi^F - 3s] + A_F \sin[\varphi^F - 2s] \quad (32)$$

$$\hat{V}^{FC} = A_F \cos[\varphi^F - s] + A_F \cos[\varphi^F] \quad (33)$$

and from this we can determine the following compensation to be applied to $\varphi^F_{corr}$:

$$\varphi^F_{comp} = \varphi^F_{corr} + s(3/2 + \cos(2\varphi^F_{corr})) \quad (34)$$

As can be seen, the compensation that is applied to $\varphi^F_{corr}$ depends itself on the value of $\varphi^F_{corr}$ and thus different compensations are performed depending on the position of the target 5 relative to the sensor coils. This compensation is performed on either the fine position measurement using the data from measurement circuit M or using the data from measurement circuit N and can significantly reduce (by as much as 50 times) the dynamic error in the determined position of the target 5 due to using measurements taken at consecutive times. There is no need to perform this dynamic compensation on the coarse position measurements as they are only being used to resolve the period ambiguity of the fine position measurements.

The above compensation is specific to the situation where the signals from the fine sine detection coil 6-1 are measured before the signals from the fine cosine detection coil 6-2. If the signals from the fine cosine detection coil 6-2 are measured before the signals from the fine sine detection coil 6-1, then, accounting for the motion of the target 5, the peak to peak voltage measurements determined by the measurement processing unit 19 using the raw data obtained from the ADC 13 can be written as:

$$\hat{V}^{FC} = A_F \cos[\varphi^F - 3s] + A_F \cos[\varphi^F - 2s] \quad (35)$$

$$\hat{V}^{FS} = A_F \sin[\varphi^F - s] + A_F \sin[\varphi^F] \quad (36)$$

from which we can determine the following compensation to be applied to $\varphi^F_{corr}$:

$$\varphi^F_{comp} = \varphi^F_{corr} + s(3/2 - \cos(2\varphi^F_{corr})) \quad (37)$$

Thus different compensations are performed depending on the order in which the signals from the two fine detection coils are measured by the measurement circuit.

This movement compensation can be calculated arithmetically or, in order to speed-up the calculations, can be determined in advance and stored in a look-up table. For instance, compensation can be written as $$\varphi^F_{comp} = \varphi^F_{corr} + K0(\varphi^F_{corr}) * s$$

$$\varphi^F_{comp} = \varphi^F_{corr} + K1(\varphi^F_{corr}) * s \quad (38)$$

in which either coefficient K0 or K1 is used for the dynamic correction according to which sine or cosine detection coil was measured first; the values of K0 and K1 are determined from the look-up table using $\varphi^F_{corr}$ to determine the index to the table, for example as follows:

$$\text{index} = \text{round}\left(\frac{\varphi^F_{corr} \times 1024}{2\pi}\right) \quad (39)$$

where the look-up table has a length of 1024 with coefficients K0 in a first column and coefficients K1 in a second column. This look-up-table would be stored in the non-volatile memory of the microcontroller 9 as part of the dynamic correction data 31. The values of K0 and K1 for the different entries in the look-up-table can be determined in advance from the following:

$$K0(j) = \frac{3}{2} + \cos\left(\frac{4\pi j}{1024}\right) \quad (40)$$

$$K1(j) = \frac{3}{2} - \cos\left(\frac{4\pi j}{1024}\right) \quad (41)$$

As a further possibility, the values of K0 and K1 in the look-up-table can be determined experimentally. For example a set of experimental measurements from the sensor are collected together with the readings from a much faster sensor (e.g. from a fast incremental optical encoder) at different speeds of the target 5. The look-up table correction coefficients K0 and K1 can be found for each value of $\varphi^F_{corr}$ as the best parameters for the parabolic fit to the experimental data ($\varphi^{opt} - \varphi^F_{corr}$) measured for different speeds of the target 5. Different correction coefficients K0 and K1 are determined depending on whether the signals from the fine sine detection coil 6-1 are measured before the signals from the fine cosine detection coil 6-2 or if the signals from the fine cosine detection coil 6-2 are measured before the signals from the fine sine detection coil 6-1. The above compensation assumes that the target is moving with constant speed. Even better accuracy for the dynamic compensation for the consecutive nature of the measurements can be obtained if the acceleration of the target 5 is taken into account. In this case instantaneous measures of the speed and acceleration can be determined at each calculation time as follows:

For detection interval corresponding to i=3

$$s = (\Delta\varphi^F_{3-1})/4 = (\varphi^F_3 - \varphi^F_1)/4 \quad (43)$$

$$\text{Acc} = (\Delta\varphi^F_{3-1} - \Delta\varphi^F_{10-8})/6; \quad (44)$$

For detection interval corresponding to i=5

$$s = (\Delta\varphi^F_{5-3})/4 = (\varphi^F_5 - \varphi^F_3)/4 \quad (45)$$

$$\text{Acc} = (\Delta\varphi^F_{5-3} - \Delta\varphi^F_{3-1})/4; \quad (46)$$

For detection interval corresponding to i=8

$$s = (\Delta\varphi^F_{8-6})/4 = (\varphi^F_8 - \varphi^F_6)/4 \quad (47)$$

$$\text{Acc} = (\Delta\varphi^F_{8-6} - \Delta\varphi^F_{5-3})/6; \quad (48)$$

For detection interval corresponding to i=10

$$s = (\Delta\varphi^F_{10-8})/4 = (\varphi^F_{10} - \varphi^F_8)/4 \quad (49)$$

$$\text{Acc} = (\Delta\varphi^F_{10-8} - \Delta\varphi^F_{8-6})/4; \quad (50)$$

As there is a switch over of the measurement circuit (from measuring circuit M to measuring circuit N and vice versa) at detection intervals corresponding to i=1 and 6, and as calculations are performed in adjacent detection intervals at the switch over time, instantaneous speed and acceleration values are not calculated during detection intervals corresponding to i=1 and 6 (as different equations would need to be used). Instead, the speed measurement and the acceleration measurement determined for the detection interval corresponding to i=10 is also used during detection interval corresponding to i=1; and the speed measurement and the acceleration measurement determined for the detection interval corresponding to i=5 is also used during detection interval corresponding to i=6.

When determining the speed measurement and the acceleration measurement, the phase values $\varphi^F$ may be used (as per the equations above) or the phase values ($\varphi^F_{corr}$) after correction for oscillations may be used instead.

The speed value (s) determined at the given calculation time point can then be adjusted based on the corresponding acceleration value (Acc); for example as follows:

$$s_{adj} = s - \frac{2}{3}\text{Acc} \quad (51)$$

This adjusted speed value can then be used in place of speed (s) in the above calculations for dynamically compensating $\varphi^F_{corr}$. Experiments have shown that there is very little to be gained by taking into account even higher derivatives.

In the case when the compensation coefficients are determined from a large set of experimental data measured at different positions, speeds and accelerations of the target 5, compensation can be achieved using the following:

$$\varphi^F_{comp} = \varphi^F_{corr} + K0 \times s + K0^{Acc} \times (\text{Acc})$$

$$\varphi^F_{comp} = \varphi^F_{corr} + K1 \times s + K1^{Acc} \times (\text{Acc}) \quad (52)$$

where the values of K0, K1, $K0^{Acc}$, and $K1^{Acc}$ are determined from the relevant look-up-table using $\varphi^F_{corr}$ in the manner discussed above.

SECOND EMBODIMENT

Phase Adjustment of the Excitation Signal

For many types of ratiometric sensors the phase of the measured signal from the target 5 and the phase of the breakthrough offset voltage from the excitation coil are equal to each other (or 180 degrees out of phase with each other). This happens for example when the target 5 is not resonant and is, for example formed from a short circuit coil or a conductive (metallic) plate in which Eddy currents caused by the excitation coil 2 induce voltages in the detection coils via an electromagnetic coupling. Simultaneously the non-exact balance between the excitation coil and the detection coils causes direct breakthrough coupling due to the electromagnetic field created by the excitation current flowing in the excitation coil. In such sensors the exact phase difference between the excitation current and the demodulation control signal ex_shifted is not particularly important, as long as this phase difference does not lead to a significant reduction in the measured signal amplitudes.

However, with a resonant target 5 as illustrated in FIG. 2a, there is approximately a 90 degree phase shift between the signals induced in the detection coils 4 and 6 caused by the magnetic field generated by the resonator 12 when it is energised by the excitation coil 2 and the direct breakthrough signal induced in the detection coils 4 and 6 directly from the excitation coil 2. The 90 degree phase shift is achieved by choosing the ex-clock signal to have a fundamental frequency corresponding in frequency to the resonant frequency of the resonator 12. In order to obtain the best possible performance out of such resonant target 5 sensors, a precise phase tuning of the measurement circuit is required. In particular, as will be explained below, it is possible to precisely phase tune the sensor to align the demodulation control signal ex_shifted so that it becomes orthogonal (90 degrees phase shifted) to the direct breakthrough signal from the excitation coil 2.

FIG. 13 illustrates the excitation circuitry 23 that is used in this second embodiment with a resonant target 5. The other components of this embodiment are the same as those in the first embodiment described above except as discussed below. The reference voltage in this embodiment is measured by the measurement circuitry 25 by passing the excitation current via a complex impedance Z. In practical applications the complex impedance Z is constructed as either a parallel or serial combination of a resistor and a capacitor whose values are chosen in order that there is a desired phase relationship between the phase of the measured excitation reference signal and the phase of the direct breakthrough signals induced in the detection coils 4 and 6 by the excitation coil 2. In the preferred embodiment, the impedance Z is chosen (at the design stage of the sensor) so that the phase of the measured excitation reference signal is close to the phase of the direct breakthrough signal induced from the excitation coil 2 into the detection coils 4 and 6 and thus is about 90 degrees out of phase with the signals induced in the detection coils 4 and 6 by the resonator 12. As a result of the chosen phase of ex_shifted applied to the incoming signal at the demodulation switch 56, the measured excitation reference value should, in theory, be close to zero. However, during sensor operation, the phase characteristics of the sensor will change (for example due to changing impedance values caused by temperature changes of the circuit components etc) and as a result, the phase of the ex_shifted control signal will not be 90 degrees out of phase with the direct breakthrough signal and so more of the direct breakthrough signal will pass through the amplification and filtering circuit 83. By arranging the impedance Z so that the phase of the measured excitation reference signal is close to that of the direct breakthrough signal, the microcontroller 9 can use a simple zero tuning approach to vary the phase of the excitation signal applied to the excitation coil 2 in order to keep the measured excitation reference value close to zero (and thereby also minimising the direct breakthrough signal).

As will be explained below, the phase of the excitation signal ex_clock applied to the excitation coil 2 is controlled by the comparator 91. The input control signal ex_double is at twice the desired excitation frequency. This double frequency signal is low pass filtered by the R-C filter 93 to smooth its edges. Then the rising and falling edges of ex_double are compared, by the comparator 91, with a DAC voltage level generated by the microcontroller 9. The signal at the output of the comparator 91 will have a variable duty cycle depending on the exact level of the DAC voltage. In order to generate a desired 50% duty cycle for the ex_clock signal, the output of the comparator 91 is passed through a latch circuit 95, which also halves the frequency of the input signal and provides an output which has rising or falling edges at the rising edges of the comparator output, as shown in FIG. 14a. In particular, as can be seen from FIG. 14a, by changing the DAC voltage, the microcontroller 9 changes the phase of the excitation signal ex_clock without modifying the 50% duty cycle. The excitation circuitry 23 shown in FIG. 13 has the advantage of being able to tune the phase of the excitation signal (ex_clock) with very high resolution exceeding 10 ps using an ordinary microcontroller 9 having a clock speed of tens of MHz.

FIG. 14b is a flow chart illustrating the procedure used by the microcontroller 9 to determine the DAC voltage to apply to the comparator 91. As shown, in step s21, the microcontroller 9 determines that phase adjustments should be made. The microcontroller 9 makes this determination when new excitation reference voltages ($V^{EX}_N$ and $V^{EX}_M$) become available. In step s23, the microcontroller 9 updates the mean excitation reference value using the latest excitation reference values that have just been determined in the current detection cycle. In step s25, the microcontroller 9 determines if the updated mean excitation reference value is outside defined boundaries. As the impedance Z shown in FIG. 13 has been chosen to minimise the excitation reference signal in line with minimising the direct breakthrough signal in the detection coils 4 and 6, the mean value for the measured excitation reference value should be around zero. By increasing or decreasing the DAC value generated by the microcontroller 9, it is possible to maintain the measured excitation value close to the zero level. Thus, if the measured mean value of the measured excitation reference signal exceeds a positive or negative threshold, then the microcontroller 9 increments or decrements, in step s27, the DAC value output to the comparator 91. The continual adjustment of the DAC value in this way ensures a fixed relationship between the demodulation clock signal ex_shifted and the phase of the signals being sensed in the measurement circuits N and M. As those skilled in the art will appreciate, in this case where the excitation reference signal is being reduced to zero it is not essential to perform the direct breakthrough corrections discussed above.

In most sensing applications the ability to automatically tune continuously to zero the value of the measured reference excitation voltage (measured from the Z-impedance) allows the microcontroller 9 to minimise the direct breakthrough in the signals obtained from the detection coils 4 and 6 and no further breakthrough corrections are required. However in the case of sensors designed for the most accurate measurements, the remaining level of the direct breakthrough offset should be compensated by the microcontroller 9. In this case measurements are taken with the sensor when the target 5 is removed far away from the sensor coils. The microcontroller 9 actively controls the level of the measured reference excitation signal and keeps it close to zero (in the manner discussed above). The signals induced in each detection coil 4 and 6 are measured, averaged and stored in the non-volatile memory of the microcontroller 9 as breakthrough calibration data 29:

$$B_N^{FS} = \frac{1}{P}\sum_{r=1}^{P} V_N^{FS}(r) \tag{53}$$

$$B_N^{FC} = \frac{1}{P}\sum_{r=1}^{P} V_N^{FC}(r) \tag{54}$$

$$B_N^{CS} = \frac{1}{P}\sum_{r=1}^{P} V_N^{CS}(r) \tag{55}$$

$$B_N^{CC} = \frac{1}{P}\sum_{r=1}^{P} V_N^{CC}(r) \tag{56}$$

and $$B_M^{FS} = \frac{1}{P}\sum_{r=1}^{P} V_M^{FS}(r) \tag{57}$$

$$B_M^{FC} = \frac{1}{P}\sum_{r=1}^{P} V_M^{FC}(r) \tag{58}$$

$$B_M^{CS} = \frac{1}{P}\sum_{r=1}^{P} V_M^{CS}(r) \tag{58}$$

$$B_M^{CC} = \frac{1}{P}\sum_{r=1}^{P} V_M^{CC}(r) \tag{60}$$

where P is the number of measurements of each signal that are averaged.

This breakthrough calibration data 29 can then be applied to actual measurements obtained when the target 5 is being sensed as follows:

$$V_{Ncorr}^{FS} = V_N^{FS} - B_N^{FS} \tag{61}$$

$$V_{Ncorr}^{FC} = V_N^{FC} - B_N^{FC} \tag{62}$$

$$V_{Ncorr}^{CS} = V_N^{CS} - B_N^{CS} \tag{63}$$

$$V_{Ncorr}^{CC} = V_N^{CC} - B_N^{CC} \tag{64}$$

$$V_{Mcorr}^{FS} = V_M^{FS} - B_M^{FS} \tag{65}$$

$$V_{Mcorr}^{FC} = V_M^{FC} - B_M^{FC} \tag{66}$$

$$V_{Mcorr}^{CS} = V_M^{CS} - B_M^{CS} \tag{67}$$

$$V_{Mcorr}^{CC} = V_M^{CC} - B_M^{CC} \tag{68}$$

THIRD EMBODIMENT

In the first and second embodiments, the measurement processing unit 19 obtained position information approximately once every two periods of the polarity control signal. In this third embodiment, the measurement processing unit 19 is arranged to update the fine position measurement during each detection interval. This is illustrated in FIG. 15, which shows that a fine position measurement is obtained during each detection interval ($\Delta tk$) either using measurements from measurement circuit M or using measurements from measurement circuit N. As illustrated in FIG. 15, during the detection interval corresponding to the index value i=1, the position information is calculated using fine sine and fine cosine measurements when the fine sine measurement is obtained before the fine cosine measurement. During the detection interval corresponding to the index value i=2, the position information is obtained using fine sine and fine cosine measurements when the fine cosine measurement is obtained before the fine sine measurement. As explained above, in order to compensate for the movement of the target 5 between the times that the measurements are taken, different compensations should be used depending on whether the sine measurement or the cosine measurement is measured first. This is illustrated in FIG. 15 by the shading used in the boxes showing the calculations that are performed, to illustrate that different compensations are being applied to these measurements compared with the non-shaded boxes. The compensation to the $\varphi_{corr}^F$ value will have a positive sign when the signals from the fine sine detection coil 6-1 are measured before the signals from the fine cosine detection coil 6-2. More specifically, during detection intervals corresponding to index values i=1, 3, 5, 6, 8 and 10 the measurement processing unit 19 performs the dynamic compensation for movement of the target 5 using:

$$\varphi_{comp}^F = \varphi_{corr}^F + s(3/2 + \cos(2\varphi_{corr}^F)) \tag{69}$$

The compensation to the $\varphi_{corr}^F$ value will have a negative sign when the signals from the fine cosine detection coil 6-2 are measured before the signals from the fine sine detection coil 6-1. More specifically, during detection intervals corresponding to index values i=2, 4, 7 and 9 the measurement processing unit 19 performs the dynamic compensation for movement of the target 5 using:

$$\varphi_{comp}^F = \varphi_{corr}^F + s(3/2 - \cos(2\varphi_{corr}^F)) \tag{70}$$

As explained above in the first embodiment, instead of using such arithmetic compensations, the measurement processing unit 19 may use different look-up-tables instead to store the relevant correction coefficients (K0, K1 etc) for the two types of compensation.

Like in the first embodiment, instead of assuming a fixed speed of the target 5, the measurement processing unit 19 may also consider acceleration of the target 5. In this case, instantaneous speed and acceleration values for the different detection intervals can be determined as follows:

For detection interval corresponding to i=1

$$s = (\Delta\varphi_{1-10}^F)/2 = (\varphi_1^F - \varphi_{10}^F)/2 \tag{71}$$

$$\text{Acc} = (\Delta\varphi_{1-10}^F - \Delta\varphi_{10-8}^F)/3; \tag{72}$$

For detection interval corresponding to i=3

$$s = (\Delta\varphi_{3-1}^F)/4 = (\varphi_3^F - \varphi_1^F)/4 \tag{73}$$

$$\text{Acc} = (\Delta\varphi_{3-1}^F - \Delta\varphi_{1-10}^F)/3; \tag{74}$$

For detection interval corresponding to i=4

$$s = (\Delta\varphi_{4-2}^F)/4 = (\varphi_4^F - \varphi_2^F)/4 \tag{75}$$

$$\text{Acc} = (\Delta\varphi_{4-2}^F - \Delta\varphi_{3-1}^F)/2; \tag{76}$$

For detection interval corresponding to i=5

$$s = (\Delta\varphi_{5-3}^F)/4 = (\varphi_5^F - \varphi_3^F)/4 \tag{77}$$

$$\text{Acc} = (\Delta\varphi_{5-3}^F - \Delta\varphi_{4-2}^F)/2; \tag{78}$$

For detection interval corresponding to i=6

$$s = (\Delta\varphi^F_{6-5})/2 = (\varphi^F_6 - \varphi^F_5)/2 \quad (79)$$

$$\text{Acc} = (\Delta\varphi^F_{6-5} - \Delta\varphi^F_{5-3})/3; \quad (80)$$

For detection interval corresponding to i=8

$$s = (\Delta\varphi^F_{8-6})/4 = (\varphi^F_8 - \varphi^F_6)/4 \quad (81)$$

$$\text{Acc} = (\Delta\varphi^F_{8-6} - \Delta\varphi^F_{6-5})/3; \quad (82)$$

For detection interval corresponding to i=9

$$s = (\Delta\varphi^F_{9-7})/4 = (\varphi^F_9 - \varphi^F_7)/4 \quad (83)$$

$$\text{Acc} = (\Delta\varphi^F_{9-7} - \Delta\varphi F_{8-6})/2; \quad (84)$$

For detection interval corresponding to i=10

$$s = (\Delta\varphi^F_{10-8})/4 = (\varphi^F_{10} - \varphi^F_8)/4 \quad (85)$$

$$\text{Acc} = (\Delta\varphi^F_{10-8} - \Delta\varphi^F_{9-7})/2; \quad (86)$$

(As before, $\varphi^F_{corr}$ values may be used instead of the $\varphi^F$ values in the above calculations for speed and acceleration.)

As can be seen from the above equations and FIG. 15, the speed and acceleration values are determined using consecutive values of $\varphi^F$ from earlier detection intervals where the same order of processing the sine and cosine signals is performed. Thus, for example, in detection time interval corresponding to i=3, the measurement processing unit 19 calculates target position when the sine measurement is obtained before the cosine measurement and therefore uses the position measurement from earlier detection intervals where the sine measurement is obtained before the cosine measurement to calculate the instantaneous speed. As can be seen from FIG. 15, the closest earlier detection interval where the sine measurement is obtained before the cosine measurement, is the detection interval corresponding to i=1. Consequently, the instantaneous speed is determined from the difference in position between the measurements in these two detection intervals ($\Delta\varphi^F_{3-1}$). The acceleration measure is also determined using signals obtained when the sine measurement are measured before the cosine measurement.

As there is a switch over of the measurement circuit (from measuring circuit M to measuring circuit N and vice versa) at detection intervals corresponding to i=1 and 6, and in order not to overcomplicate the calculations of the speed and acceleration measures during detection time intervals corresponding to i=2 and 7, the acceleration measurement determined for the detection interval corresponding to i=1 is also used during the detection interval corresponding to i=2; and the speed measurement and the acceleration measurement determined for the detection interval corresponding to i=6 is also used during the detection interval corresponding to i=7.

Like in the first embodiment, each speed value is then adjusted in view of the corresponding acceleration value:

$$s_{adj} = s - \tfrac{2}{3}\text{Acc} \quad (87)$$

This adjusted speed value can then be used in place of speed (s)(in the above calculations to dynamically compensate $\varphi^F_{corr}$. The thus compensated phase values can then be mapped to a position of the target 5 through an appropriate look-up-table correction and the period ambiguity associated with the fine position measurements can be corrected using the latest coarse position measurement. The final position is then sent to the host Interface unit 21 for reporting to the host. As shown in FIG. 15, in this embodiment, the fine position information is updated once per period of the polarity control signal, i.e. once per detection interval.

FOURTH EMBODIMENT

In the third embodiment, a fine position measurement was obtained during every detection interval. Signals from the fine detection coils are processed in two measurement circuits M and N in an overlapping manner. As a result of the overlapping, it is possible to calculate two position measurements using the data obtained from the two measurement circuits. For example, during the detection interval corresponding to i=10, the third embodiment calculated a position measurement using the fine sine data from measurement circuit M obtained in detection interval corresponding to i=8 and the fine cosine data from measurement circuit M obtained in detection interval corresponding to i=9. However, during detection interval corresponding to i=10 another position measurement can be calculated using the fine cosine data from measurement circuit N obtained in detection interval corresponding to i=8 and the fine sine data from measurement circuit N obtained in detection interval corresponding to i=9.

These two position measurements would be calculated as follows:

$$V^{FS}_{Ncorr} = V^{FS}_N - O^{FS}_N \times V^{EX}_N \quad (88)$$

$$V^{FC}_{Ncorr} = V^{FC}_N - O^{FC}_N \times V^{EX}_N \quad (89)$$

$$\varphi^F_N = \arctan\left(\frac{V^{FS}_{Ncorr}}{V^{FC}_{Ncorr}}\right) \quad (90)$$

$$\varphi^F_{Ncorr} = \varphi^F_N + \Delta\varphi_{corr} \quad (91)$$

and $$V^{FS}_{Mcorr} = V^{FS}_M - O^{FS}_M \times V^{EX}_M \quad (92)$$

$$V^{FC}_{Mcorr} = V^{FC}_M - O^{FC}_M \times V^{EX}_M \quad (93)$$

$$\varphi^F_M = \arctan\left(\frac{V^{FS}_{Mcorr}}{V^{FC}_{Mcorr}}\right) \quad (94)$$

$$\varphi^F_{Mcorr} = \varphi^F_M + \Delta\varphi_{corr} \quad (95)$$

The resulting position measurements ($\varphi^F_{Mcorr}$ and $\varphi^F_{Ncorr}$) will deviate from each other due to the dynamic error terms related to the speed of the target movement, as discussed above. However, the mean value of these two position measurements $$\varphi^F_{mean} = (\varphi^F_{Mcorr} + \varphi^F_{Ncorr})/2 \quad (96)$$

will have much smaller dynamic error and any remaining dynamic error will have very little, if any, dependence on the determined position measurement. Thus, by calculating during the detection interval with i=10 the instantaneous value of the parameter:

$$\Delta\varphi^F_{comp} = \varphi^F_{Mcorr} - \varphi^F_{mean} = (\varphi^F_{Mcorr} - \varphi^F_{Ncorr})/2 \quad (97)$$

we can remove a significant part of the dynamic error caused by the movement of the target in the measurements performed during detection intervals with i=1, 3 and 5 (fine sine measured before fine cosine) using formula:

$$\varphi^F_{Ncorr} = \varphi^F_N + \Delta\varphi_{corr} - \Delta\varphi^F_{comp} \quad (98)$$

and during detection intervals with i=2 and 4 (fine sine is measured after fine cosine) using formula:

$$\varphi^F_{Ncorr} = \varphi^F_N + \Delta\varphi_{corr} + \Delta\varphi^F_{comp} \quad (99)$$

During the detection time interval with i=5, the instantaneous value of the parameter $\Delta\varphi^F_{comp}$ can be updated using the two position measurements obtained using the data measured simultaneously in measurement circuits N and M. Namely, the position measurement obtained using the fine sine data from measurement circuit N obtained in detection interval corresponding to i=3 and the fine cosine data from measurement circuit N obtained in detection interval corresponding to i=4; and the position measurement using the fine cosine data from measurement circuit M obtained in detection interval corresponding to i=3 and the fine sine data from measurement circuit M obtained in detection interval corresponding to i=4. This updated value of $\Delta\varphi^F_{comp}$ can then be used to compensate for movement of the target as follows during the position calculations performed in detection intervals with i=6, 8 and 10 (fine sine is measured before fine cosine) using formula:

$$\varphi^F_{Mcorr} = \varphi^F_M - \Delta\varphi_{corr} - \Delta\varphi^F_{comp} \quad (100)$$

and during detection intervals with i=7 and 9 (fine sine is measured after fine cosine) using formula:

$$\varphi^F_{Mcorr} = \varphi^F_M - \Delta\varphi_{corr} + \Delta\varphi^F_{comp} \quad (101)$$

The sign with which the velocity compensation factor $(\Delta\varphi^F_{comp})$ is applied to the position measurement changes depending on which of the two signals fine sine or fine cosine was measured first. This compensation technique will cause the position measurements to change smoothly between adjacent measurements. As discussed above, this speed compensation removes the dependence on the position measurement itself and so any remaining dynamic error can be compensated using a simple formula like:

$$\varphi^F_{comp} = \varphi^F_{corr} + \frac{3s}{2} \quad (102)$$

FIFTH EMBODIMENT

In the above embodiments, the measurement circuits 51 were arranged to demodulate the signals obtained from the selected detection coil 4, 6. The measurement circuits 51 also multiplied the incoming signal with a polarity control signal that allowed a positive and a negative measure of the amplitude of the demodulated signal from each detection coil to be obtained. In the first embodiment, the update rate can be improved by increasing the frequency of the polarity control signal. However, if there is a limit on the excitation frequency (for example because the excitation coil has high inductance), then this will limit the available update rate. Also, even if the excitation frequency can be significantly increased, there is a practical upper limit on the frequency of the polarity control signal the signals must be filtered to remove external noise, but also the signals being measured must be allowed to settle to the quasi dc level before the ADC 13 converts the voltage into a corresponding digital value. This means that in practice, the upper limit on the frequency of the polarity control signal is about 150 kHz.

In the fifth embodiment that is described below, the measurement architecture is based on the fast multiplexing of voltages from two detection coils through the same measurement circuit 51 multiple times during the same polarity modulation period, so that a ratiometric measurement of the signals from the two detection coils is achieved with minimum latency. In particular, in this embodiment, the measurement circuits 51 demodulate and combine the signals from the fine sine and the fine cosine detection coils 6 with a polarity modulation signal to produce a signal whose phase varies with the target position ($\varphi^F$) to be measured. The measurement circuits 51 also perform a similar processing of the signals from the coarse sine and cosine detection coils 4. The position of the target 5 is then determined from zero crossing positions of the filtered output signal from the measurement circuits 51.

This embodiment is ideally suited to sensors where the excitation frequency can be much higher than the desired update rate of the sensor which is applicable to sensors having low impedance sensor coils. As will be demonstrated below, the update rate of the fifth embodiment is equal to half of the period of the polarity modulation signal. Further, the requirement of the high corner frequency of the band pass filter 87 can be reduced by about four times for the same period of the polarity modulation signal. This is because in the fifth embodiment, the output from the amplification and filtering circuit 83 does not need to settle to a quasi dc level for conversion by the ADC 13. This helps to reduce significantly the level of the internal and external noise in the results of the measurements. Additionally, the latency of the fifth embodiment is defined by the filtering time and the calculation time of the microcontroller 9, which is less than half the period of the polarity modulation signal. So this represents a four-fold improvement in the latency.

FIG. 16 is a block diagram of the main components used in this fifth embodiment. As shown, the implementation of this embodiment is similar to the embodiments described above using a general purpose microcontroller and measurement circuitry 25. The same reference numerals have been used to designate similar components. The main difference with this embodiment is that it requires a more complex measurement process and the generation of more complex control signals to control the measurement process. The new components include digital switching circuitry 101, which is shown here as being outside the microcontroller 9, although it may form part of the excitation and control signal logic 11. In addition to the digital switching circuitry 101, this embodiment also has phase detectors 103 and timers 105 both of which are implemented inside the microcontroller 9. The phase detectors 103 detect zero crossings of the signals output from the measurement circuitry 51 and the timers 105 provide control signals which trigger the ADC 13 and provide an interrupt for the microcontroller 9 to start processing the converted data by the measurement processing unit 19. The phase of the timers 105 is controlled by the measurement processing unit 19.

The measurement circuitry 25 that is used in this embodiment has the same two measurement circuits 51 that were used in the first embodiment and shown in FIG. 5. However, the timeline of the control signals (in1, in2) used for selecting the signals from the different detection coils 4, 6 through to the demodulation switch 56; and the timeline of the polarity modulation signal are very different. FIG. 17 shows example control signals that can be used in this embodiment and illustrates the effect of the two control signals Int and polarity on the selection of the signals from the 1+/1− input (corresponding to the fine sine detection coil 6-1) and on the selection of the signals from the 2+/2− input (corresponding to the fine cosine detection coil 6-2). As shown, when the polarity modulation signal is low and in1 is low, the signal from the 1+/1 input is passed through to the amplification and filtering circuitry 83. When the polarity modulation signal is low and in1 is high, the signal from the 2+/2− input is passed through to the amplification and filtering circuitry 83. When the polarity modulation signal is high and in1 is low, the signal from the 1+/1− input is inverted and passed through to the amplification and filtering circuitry 83. Finally, when the polarity modulation signal is high and in1 is high, the signal from the 2+/2− input is inverted and passed through to the amplification and filtering circuitry 83. The in1 and polarity signals are periodic and have a repeat period of $T_{mod}$. As shown in FIG. 17, the effect of using these in1 and polarity signals is to multiply the signal from the 1+/1− input with the following periodic sequence of 32 numbers (although other numbers could be used):

1 1 0 1 0 1 0 0 0 0 −1 0 −1 0 −1 −1 −1 −1 0 −1 0 −1 0 0 0 0 1 0 1 0 1 1 and to multiply the signal from the 2+/2− input with the following periodic sequence of 32 numbers:

0 0 1 0 1 0 1 1 1 1 0 1 0 1 0 0 0 0 −1 0 −1 0 −1 −1 −1 −1 0 −1 0 −1 0 0

These two periodic sequences of 32 numbers are related in that one is a phase shifted version of the other. In particular, one is shifted by a quarter of the period ($T_{mod}$). Therefore, the output from the demodulating switch 56 when the signal from the 1+/1− input (corresponding to the signal from the fine sine detection coil 6-1) is selected can be represented as:

$$A_F \sin\varphi^F \cos\left(\frac{2\pi}{T_{mod}}\right)t + \text{harmonics} \tag{103}$$

and the output from the demodulating switch 56 when the signal from the 2+/2− input (corresponding to the signal from the fine cosine detection coil 6-2) is selected can be represented as:

$$A_F \sin\varphi^F \sin\left(\frac{2\pi}{T_{mod}}\right)t + \text{harmonics} \tag{104}$$

The two sequences of 32 numbers are also organized in a time division multiplexed manner, so that whenever one of them corresponds to zero the other one corresponds to either one or minus one. The time division multiplexing of the two inputs achieved with this approach leads to the interposing of the signals from the two detection coils which, after passing through the amplification and filtering circuit 83 for filtering out the harmonics, can be represented as a combined signal of the form:

$$AF_{out} = GA_F \sin\varphi^F \cos\left(\left(\frac{2\pi}{T_{mod}}\right)t + \varphi\right) + GA_F \cos\varphi^F \sin\left(\left(\frac{2\pi}{T_{mod}}\right)t + \varphi\right) \tag{105}$$

where G represents the gain of the amplification and filtering circuit 83, $\varphi^F$ is the phase to be determined that corresponds to the desired target position information, and $\varphi$ is an unknown phase shift introduced by the processing circuitry (mainly the bandpass filter 87 in the amplification and filtering circuit 83). This expression can be rewritten as:

$$AF_{out} = V_0 \sin\left(\left(\frac{2\pi}{T_{mod}}\right)t + \varphi + \varphi^F\right) \tag{106}$$

Thus the phase of the $AF_{out}$ signal varies with the target position information ($\varphi^F$). The time points or phases when $AF_{out}$ crosses zero can be determined by comparing $AF_{out}$ with zero in a comparator. Thus, the signal $AF_{out}$ will cross zero at the rising edge when $$\left(\frac{2\pi}{T_{mod}}\right)t + \varphi_1 \tag{107}$$

as measured from the beginning of the modulation period $T_{mod}$. Therefore, $$\varphi_1 + \varphi_{rising} + \varphi^F = 2\pi \therefore \varphi_1 = 2\pi - \varphi_{rising} - \varphi^F \tag{108}$$

Similarly, the signal $AF_{out}$ will cross zero at the falling edge when $$\left(\frac{2\pi}{T_{mod}}\right)t = \varphi_2 \tag{109}$$

as measured from the beginning of the modulation period $T_{mod}$. Therefore, $$\varphi_2 + \varphi_{falling} + \varphi^F = \pi \therefore \varphi_2 = \pi - \varphi_{falling} - \varphi^F \tag{110}$$

In practice the phase shift introduced by the measurement circuits ($\varphi$) will be different for the rising and the falling edges for various reasons, for instance due to the hysteresis in the comparator used to detect the zero crossing. The above equations represent these different measurement circuit phase shifts as $\varphi_{rising}$ and $\varphi_{falling}$. These measurement circuit phase shifts are relatively stable parameters, although they can slowly drift, for example with temperature. It is possible to measure and then remove these unwanted phase shifts by obtaining a new measurement with a new polarity modulation signal that, when combined with the in1 control signal, results in the polarity reversal of one of the sequences of 32 numbers whilst leaving the other sequence of 32 numbers unchanged. For example, the signal from the 1+/1− input can be multiplied with the following periodic sequence of 32 numbers:

−1 −1 0 −1 0 −1 0 0 0 0 1 0 1 0 1 1 1 1 0 1 0 1 0 0 0 0 −1 0 −1 0 −1 −1 and the signal from the 2+/2− input can be multiplied with the same periodic sequence of 32 numbers as before:

0 0 1 0 1 0 1 1 1 1 0 1 0 1 0 0 0 0 −1 0 −1 0 −1 −1 −1 −1 0 −1 0 −1 0 0

FIG. 18 shows an example of the new polarity modulation signal that can achieve this result when combined with the in1 control signal. FIG. 18 also shows the $AF_{out}$ signal that is obtained as a result of using this new polarity modulation signal. FIG. 18 also shows (in phantom) the $AF_{out}$ signal obtained with the polarity modulation signal shown in FIG. 17. In order to distinguish the two polarity modulation signals, the polarity modulation signal used in FIG. 17 is labelled polarity+ and in FIG. 18 it is labelled polarity−. The other control signals remain the same. In this case, the $AF_{out}$ signal can be represented as:

$$AF_{out} = -GA_F \sin\varphi^F \cos\left(\left(\frac{2\pi}{T_{mod}}\right)t + \varphi\right) + GA_F \cos\varphi^F \sin\left(\left(\frac{2\pi}{T_{mod}}\right)t + \varphi\right) \quad (111)$$

$$AF_{out} = V_0 \sin\left(\left(\frac{2\pi}{T_{mod}}\right)t + \varphi - \varphi^F\right) \quad (112)$$

This new signal $AF_{out}$ will cross zero at the rising edge when $$\left(\frac{2\pi}{T_{mod}}\right)t = \varphi_3 \quad (113)$$

as measured from the beginning of the modulation period $T_{mod}$. Therefore, $$\varphi_3 + \varphi_{rising} - \varphi^F = 0 \therefore \varphi_3 = \varphi^F - \varphi_{rising} \quad (114)$$

Similarly, the signal $AF_{out}$ will cross zero at the falling edge when $$\left(\frac{2\pi}{T_{mod}}\right)t = \varphi_4 \quad (115)$$

as measured from the beginning of the modulation period $T_{mod}$. Therefore, $$\varphi_4 + \varphi_{falling} - \varphi^F = \pi \therefore \varphi_4 = \pi - \varphi_{falling} + \varphi_F \quad (116)$$

Consequently, if the measured phases $\varphi_1$ and $\varphi_3$ are added together, we can obtain a measure of $\varphi_{rising}$ as follows:

$$\varphi_1 + \varphi_3 = (2\pi - \varphi_{rising} - \varphi^F) + (\varphi^F - \varphi_{rise}) \quad (117)$$

$$\varphi_{rising} = \pi - \left(\frac{\varphi_1 + \varphi_3}{2}\right) \quad (118)$$

Similarly, by adding the measured phases $\varphi_2$ and $\varphi_4$ together, we can obtain a measure of $\varphi_{falling}$ as follows:

$$\varphi_{falling} = \pi - \left(\frac{\varphi_2 + \varphi_4}{2}\right) \quad (119)$$

However, the phases $\varphi_1$ and $\varphi_3$ are defined only from 0 to $2\pi$ and so (as can be seen from FIG. 19a), $\varphi_{rising}$ can also be equal to:

$$\varphi_{rising} = 2\pi - \left(\frac{\varphi_1 + \varphi_3}{2}\right) \quad (120)$$

and similarly (as can be seen from FIG. 19c), $\varphi_{falling}$ can also be equal to:

$$\varphi_{falling} = 2\pi - \left(\frac{\varphi_2 + \varphi_4}{2}\right) \quad (121)$$

In particular, FIG. 19a is a phase plot showing the way in which the phases $\varphi_1$ and $\varphi_3$ vary with the target position phase $\varphi^F$ and show (with the horizontal lines) the values that $(\varphi_1+\varphi_3)/2$ can take. FIG. 19c illustrates the corresponding phase plots for phases $\varphi_2$ and $\varphi_4$ and showing (with the horizontal lines) the values that $(\varphi_2+\varphi_4)/2$ can take.

It is easy to deal with two possible answers for $\varphi_{rising}$—in particular, the microcontroller 9 can determine:

$$\varphi_{rising} = \pi - \left(\frac{\varphi_1 + \varphi_3}{2}\right) \quad (122)$$

and if the answer is negative then the microcontroller 9 can add $\pi$ to the answer. A similar calculation can be performed in respect of $\varphi_{falling}$.

Now that $\varphi_{rising}$ has been calculated, the microcontroller 9 can add this to $\varphi_3$ in order to determine $\varphi^F$. FIG. 19b is a plot showing that $\varphi_3+\varphi_{rising}$ varies linearly with the target position phase ($\varphi^F$). Similarly, now that $\varphi_{falling}$ has been calculated, the microcontroller 9 can add this to $\varphi_4$ in order to determine $\varphi^F$. FIG. 19d is a plot showing that $\varphi_4+\varphi_{falling}-\pi$ varies linearly with the target position phase ($\varphi^F$). In this way, the microcontroller 9 can determine two measurements of the target position phase ($\varphi^F$).

The description above deals with the measurements made in a single measurement circuit 51. However, as discussed above, the measurement circuitry 25 has two parallel measurement circuits 51-1 and 51-2 (M and N). To avoid the situation where the same measurement inputs (detection coil) are selected simultaneously in both measurement circuits N and M, the control signal in1_N applied to the multiplexers 55-1 and 55-2 of measurement circuit N is inverted and used as the control signal in1_M applied to the multiplexors 55-1 and 55-2 of the measurement circuit M. In the following description the suffix "_N" or "_M" will be added to the reference numbers of the components to signify in which measurement circuit (M or N) the corresponding component belongs. FIG. 20 illustrates the way in which the fine sine detection coil (connected to inputs 1+/1−) and the fine cosine detection coil (connected to inputs 2+/2−) can be switched through both measurement circuits N and M in the above manner. As shown, during the moment in time when the fine sine detection coil 6-1 is selected by the multiplexers 55_N in measurement circuit N, the fine cosine detection coil 6-2 is selected by the multiplexers 55_M in the measurement circuit M. Similarly, during the moment in time when the fine cosine detection coil 6-2 is selected by the multiplexers 55_N in measurement circuit N, the fine sine detection coil 6-1 is selected by the multiplexers 55_M in the measurement circuit M.

The value of the target position phase ($\varphi^F$) measured in measurement circuit M will deviate (by $\pi/2$) from the value of the target position phase ($\varphi^F$) measured in measurement circuit N because the order of the selected measurement inputs is interchanged. This change of phase can be seen from the $AF^M_{out}$ signal and the $AF^N_{out}$ signal which are given by:

$$AF^N_{out} = V_0 \sin\left(\left(\frac{2\pi}{T_{mod}}\right)t + \varphi_N + \varphi^F\right) \quad (123)$$

$$AF^M_{out} = GA_F \cos\varphi^F \cos\left(\left(\frac{2\pi}{T_{mod}}\right)t + \varphi\right) + GA_F \sin\varphi^F \sin\left(\left(\frac{2\pi}{T_{mod}}\right)t + \varphi\right) \quad (124)$$

$$AF^M_{out} = V_0 \sin\left(\left(\frac{2\pi}{T_{mod}}\right)t + \varphi_m + \frac{\pi}{2} - \varphi^F\right) \quad (125)$$

These equations also show that the phases of the $AF_{out}$ signals output from the two measurement circuits move in different directions for a changing position of the target 5. Therefore, the microcontroller 9 can determine the value of the target position phase ($\varphi^F$) from each measurement circuit N and M and, by measuring both the rising zero crossing and the falling zero crossing, the microcontroller 9 can obtain four independent results for the same measurement ($\varphi^F$). Of course the microcontroller 9 only needs to use one of these measurements at any given time.

Phase Detection & Timing Control

FIG. 21 is a block diagram illustrating the operation of the phase detector 103_N and the timers 105_1N and 105_2N used to process the $AF^N_{out}$ signal from measurement circuit N. The components marked with the subscripts _N indicate that the circuit component is associated with measurement circuit N and that a corresponding circuit component (not shown) is provided separately for measurement circuit M. It should be understood that whilst the following description of FIG. 21 concentrates on the processing of the signal $AF^N_{out}$, similar processing will be performed on the $AF^M_{out}$ signal output from the other measurement circuit M. As shown, the $AF^N_{out}$ signal from measurement circuit N is input to a comparator 113_N where it is compared with the mid-rail voltage (zero level). The digital signal output from the comparator 113 is used to trigger capture/compare timers 115_1N and 115_2N. Both of these capture/compare timers 115_N are reset (for example to zero) on the rising edge of a period_ref control signal that is generated by the excitation and control signal logic 11. The period_ref control signal is periodic having period $T_{mod}$ and its rising edge is time aligned with the start of the $T_{mod}$ period. Thus at the start of each $T_{mod}$ period, the capture/compare timers 115_N are reset and they then start to count up (or down) until they are stopped by the appropriate trigger output from the comparator 113_N. The rising edge of the digital signal output from the comparator 113 stops the capture/compare timer 115_1N and the falling edge of the digital signal output from the comparator 113_N stops the capture/compare timer 115_2N. The numeric values held by the capture/compare timers 115_N are stored in the memory 17_1N (as the above described values $\varphi_1$ and $\varphi_2$ if the polarity+ modulation signal is being used in the current modulation period or as the above described values $\varphi_3$ and $\varphi_4$ if the polarity− modulation signal is being used in the current modulation period) and used by the measurement processing circuitry 19 to determine the desired target position information $\varphi^F$ in the manner described above. The values held by the capture/compare timers 115_N are stored into the memory 17_1N as soon as the capture/compare timer 115_N is stopped by the output of the comparator 113_N. The resolution of such phase detection measurement is determined by the analogue noise and by the number of the counts in the capture/compare timers 115 which correspond to the period of modulation $T_{mod}$. Typically the capture/compare timers 115_N will use about 11 bits, but in some embodiments may use more than 15 bits.

When using the counts that are stored in the memory 17_1N to calculate the target position information $\varphi^F$, the counts must first be converted into phases. This is achieved by dividing the stored count value by the number of counts corresponding to the period of modulation $T_{mod}$ and by multiplying the result by $2\pi$.

The measurement processing unit 19 uses the last two determined counts ($\varphi_{last}$ and $\varphi_{last-1}$) from the timers 115_N that are stored in memory 17_1N to update the phase of the control signal (ADC_triggerN) used to trigger the ADC 13_N to convert the amplitude of the $AF^N_{out}$ signal. In particular, the last two determined counts stored in memory 17_1N will correspond to a rising edge zero crossing and a falling edge zero crossing. Therefore, the phase half way between these two phases will correspond to the maximum or the minimum of the $AF^N_{out}$ signal. This is illustrated in FIG. 22, which shows the signal $AF^N_{out}$ and the measured phases $\varphi_1$ and $\varphi_2$ that are measured by the timers 115_N. Half way between $\varphi_1$ and $\varphi_2$ corresponds to the minimum peak amplitude of $AF^N_{out}$, which is the optimum time to convert the amplitude of $AF^N_{out}$. As can be seen, the control signal ADC_triggerN has its rising edge aligned with the peak of the $AF^N_{out}$ signal. This is achieved by the measurement processing unit 19 determining the value of shift_ADCN that is used to shift the phase of the timer 105_1N used to generate the ADC_triggerN control signal. As, half way between the last two phase measurements corresponds to the optimum time to trigger the ADC 113N, the measurement processing unit 19 can determine this optimum time from:

$$\varphi_{mean} = \left(\frac{\varphi_{last} + \varphi_{last-1}}{2}\right) \qquad (126)$$

$$\text{If } \varphi_{mean} > \pi, \text{ then } \varphi_{mean} = \varphi_{mean} - \pi \qquad (127)$$

As the ADC 13_N is arranged to sample the positive peak and the negative peak of $AF^N_{out}$, the ADC_triggerN control signal has twice the frequency of the period_ref control signal. Thus, the value of $\varphi_{mean}$ is doubled before writing it to the timer 105_1N to reflect the fact that the period of the ADC_triggerN control signal is two times smaller than the period of $T_{mod}$:

$$\text{shift\_ADC}N = 2\varphi_{mean} \qquad (128)$$

The sampled and ADC converted amplitude values are stored into memory 17_2N. An interrupt at the end of the modulation period $T_{mod}$ is used for moving available data from memory 17-2N to the measurement processing unit 19. However, a precaution is taken to avoid the situation where the ADC 13_N is triggered just before the end of the modulation period $T_{mod}$ such that the conversion result is not ready at the end of the modulation period $T_{mod}$. Similarly, a precaution is taken to ensure that when the interrupt at the end of the modulation period $T_{mod}$ forces the measurement processing unit 19 to read the last set of data from the memory 17-2N, the ADC 13_N is not triggered at the very beginning of the next modulation period $T_{mod}$. To achieve this, a forbidden band is introduced at the start and end of the modulation period $T_{mod}$ so that the ADC 13_N is not triggered during the time $T_{mod}*\varphi_{threshold1}/2\pi$ before the end of the modulation period and also is not triggered during a shorter time $T_{mod}*\varphi_{threshold2}/2\pi$ just after the start of the next modulation period $T_{mod}$. This dead zone with a total width of:

$$\varphi_{forbidden} = \varphi_{threshold1} + \varphi_{threshold2} \qquad (129)$$

should be small enough compared to $\pi$ in order to avoid introducing a significant error in the measurement of the peak-to-peak amplitude performed by the ADC 13_N. For instance, $\varphi_{forbidden}$ should be less than 6% of $\pi$ to provide peak-to-peak amplitude measurements with an error below 2%; $\varphi_{forbidden}$ should be less than 4.5% of $\pi$ to provide peak-to-peak amplitude measurements with an error below 1%. This forbidden zone 121 is illustrated in FIG. 22 and can be defined through the operation of the measurement processing unit 19 when determining shift_ADCN as follows:

If $\varphi_{mean} < \varphi_{threshold2}$ then $\varphi_{mean} = \varphi_{threshold2}$ If $\varphi_{mean} > \pi - \frac{1}{2}(\varphi_{threshold1} - \varphi_{threshold2})$, then $\varphi_{mean} = \varphi_{threshold2}$ If $\varphi_{mean} > \pi - \varphi_{threshold1}$, then $\varphi_{mean} = \pi - \varphi_{threshold1}$ (130)

The ADC conversion is always triggered two times per modulation period $T_{mod}$ and by introducing the dead zone ($\varphi_{forbidden}$) for the ADC_triggerN control signal, it can be assured that both data for the minimum and the maximum values of $AF^N_{out}$ converted by the ADC 13_N are available in the memory 17_2N by the end of the modulation period $T_{mod}$. The signal amplitudes converted by the ADC 13_N can be used to identify, in the sequence of phases stored in the memory 17-1N, the set of phases corresponding to the rising zero crossing values ($\varphi 1$ or $\varphi 3$) and the set of phases corresponding to the falling zero crossing values ($\varphi 2$ or $\varphi 4$). In particular, when the measurement processing unit 19 reads the memories 17_1N and 17_2N at the interrupt aligned with the end of the modulation cycle $T_{mod}$, one of the two last phases read by the measurement processing unit 19 from the memory 17_1N will have its phase close to:

$\varphi = \varphi_{mean} + \pi/4$ (131)

This measurement (for instance, the measurement marked as $\varphi_2$ in FIG. 22) corresponds to the zero crossing which happens between the two consecutive amplitude measurements which the ADC 13_N converted during the last modulation period $T_{mod}$. If the last reading from the ADC 13_N (ADC$_{last}$) is larger than the last but one reading (ADC$_{last-1}$), then the signal $AF^N_{out}$ was rising, and thus the measurement point with the value close to $\varphi_{mean} + \pi/4$ corresponds to the $\varphi 1$ or $\varphi 3$ measurement. However, if the last reading by the ADC 13 (ADC$_{last}$) is smaller than the last but one reading (ADC$_{last-1}$) (as shown in FIG. 22), then the signal $AF^N_{out}$ was falling, and thus the measurement point with the value close to $\varphi_{mean} + \pi/4$ corresponds to either the $\varphi 2$ or $\varphi 4$ measurement.

The peak-to-peak amplitude of the signal $AF^N_{out}$ is calculated as follows:

$A_F^N = |ADC_{last} - ADC_{last-1}|$ (132)

The CALC_trigger control signal interrupts the measurement processing unit 19 and causes it to process the last phase measurement written into memory 17_1N and the last two amplitude measurements written into memory 17_2N. The last two amplitude measurements are processed to update the value of $A_F^N$ and the phase measurement is processed after each zero crossing event (i.e. on the falling and rising edges of the CALC_trigger control signal) in order to update the value of $\varphi^F$. As shown in FIGS. 21 and 22, the CALC_trigger control signal is generated by the timer 105_2 and it has the same frequency as the period_ref control signal, but is phase shifted relative to period_ref by a phase shift (shift_CALC). The phase shift is determined by the measurement processing unit 19 to ensure that the rising and falling edges of CALC_trigger occur a short time period after the zero crossing events to be measured. The duration of this short time period is chosen to ensure that there is sufficient time for the measurements to be written into memory 17_N. As discussed above, the subscripts _N shown in FIG. 21 indicate that the circuit component is associated with measurement circuit N and that a corresponding circuit component is provided separately for measurement circuit M. As can be seen, timer 105_2 does not have this subscript—as there is only one CALC_trigger control signal.

The interrupt at each rising and falling edge of the CALC_trigger signal is used by the measurement processing unit 19 to reload the phase shift values into the timers 105 (shift_CALC into timer 105_2 and shift_ADCN into timer 105_1N (and the corresponding shift_ADCM value into the timer 105_1M used for measurement circuit M)), and then to run the required calculations to update the target position information to the host interface unit 21. When the microcontroller 9 receives an interrupt from the rising edge of the CALC_trigger control signal, it reloads its configuration so that the next interrupt will be triggered by the falling edge of the CALC_trigger control signal. Similarly, when the microcontroller 9 receives an interrupt from the falling edge of the CALC_trigger control signal, it reloads its configuration so that the next interrupt will be triggered by the rising edge of the CALC_trigger control signal. Such an interchanging role of the rising and falling edges of the CALC_trigger control signal, to generate an interrupt event in the microcontroller 9, is important as it allows continuous tuning of the phase of the CALC_trigger control signal without introducing additional false trigger events.

The CALC_trigger adjustment algorithm uses an additional parameter $\varphi_{shift}$—a small phase shift (equivalent to the above short time period) which provides a safety zone to ensure that the data related to the position of the zero crossing will be available in the memory 17-1N at the moment of the interrupt generated by the corresponding edge of the CALC_trigger control signal. The value of shift_CALC can be calculated as follows:

if $\varphi 3 > \varphi 4$ (or $\varphi 1 > \varphi 2$)

shift_CALC = $(\varphi_{last} + \varphi_{last-1})/2 + \pi/4 + \varphi_{shift}$ (133)

if $\varphi 3 < \varphi 4$ (or $\varphi 1 < \varphi 2$)

shift_CALC = $(\varphi_{last} + \varphi_{last-1})/2 - \pi/4 + \varphi_{shift}$ (134)

Overall Detection Cycle

FIG. 23 is a timing diagram illustrating the way in which, in this embodiment, the measurement circuitry 25 selects the different detection coils and the reference signal through the two measurement circuits during one detection cycle (T_dc). FIG. 23 also shows many of the different control signals used in this embodiment to control the operation of the sensor electronics. As shown at the bottom of FIG. 23, the detection cycle is split into two parts a first part having three detection intervals Δtk (k=1 to 3); and a second part having three detection intervals Δtk (k=4 to 6). In this embodiment, each detection interval Δtk is formed from four modulation periods $T_{mod}$, with the polarity modulation signal being the same at least during the first two modulation periods and during the second two modulation periods. (If desired, each detection interval may have more than four modulation periods.) During the first part of the detection cycle, the in2_M and in3_M selection control signals ensure that the signals from the fine detection coils 6 (corresponding to inputs 1+/1− & 2+/2−) are passed through measurement circuit M and used to update the fine position measurements. (Control signal in1_M and in1_N are not shown in FIG. 23 for clarity due to the time scale of the figure.) FIG. 23 also shows the pol_swM signal used in this embodiment to switch the polarity modulation signal used in measurement circuit M. As shown, during the first part of the detection cycle, the pol_swM signal is always at a low value and therefore the polarity− modulation signal (as shown in FIG.

18) is applied continuously to the selected signals passed through measurement channel M. This is represented by the "−" sign in each box corresponding to measurement circuit M during the first part of the detection cycle. Thus during the first part of the detection cycle, measurement circuit M is only calculating fine position measurements from the determined phase shifts φ3M and φ4M.

During this first part of the detection cycle, measurement circuit N is configured: i) to obtain measurements of the reference signal during detection interval Δt1—using the polarity+ modulation signal (FIG. 17) and then the polarity− modulation signal (FIG. 18); ii) to obtain measurements from the coarse detection coils 4 during detection interval Δt2—using the polarity+ modulation signal (FIG. 17) and then the polarity− modulation signal (FIG. 18); and iii) to obtain measurements from the fine detection coils 6 during detection interval Δt3—using the polarity+ modulation signal (FIG. 17) and then the polarity− modulation signal (FIG. 18). The pol_swN control signal controls which polarity modulation signal is used in measurement circuit N during each half of each detection interval. The signals measured in the measurement circuit N during the first part of the detection cycle are used to update breakthrough parameters, the coarse position information $\varphi^C_N$, and to update the phase offsets $\varphi_{fallingN}$ and $\varphi_{risingN}$.

During the second part of the detection cycle, the roles of the two measurement circuits N and M are reversed, so that during the second part, the in2_N and in3_N selection control signals ensure that the signals from the fine detection coils 6 (corresponding to inputs 1+/1− & 2+/2−) are passed through measurement circuit N and used to update the fine position measurements; and so that measurement circuit M is configured: i) to obtain measurements of the reference signal during detection interval Δt4—using the polarity+ modulation signal (FIG. 17) and then the polarity− modulation signal (FIG. 18); ii) to obtain measurements from the coarse detection coils 4 during detection interval Δt5—using the polarity+ modulation signal (FIG. 17) and then the polarity− modulation signal (FIG. 18); and iii) to obtain measurements from the fine detection coils 6 during detection interval Δt6—using the polarity+ modulation signal (FIG. 17) and then the polarity− modulation signal (FIG. 18). The signals measured in the measurement circuit M during the second part of the detection cycle are used to update breakthrough parameters, the coarse position information $\varphi^C_M$, and to update the phase offsets $\varphi_{fallingM}$ and $\varphi_{risingM}$.

Thus as can be seen from the shaded boxes "main data" in FIG. 23, the measurement processing unit 19 will update the fine position information during the first part of the detection cycle using the measurements from measurement circuit M and will update the fine position information during the second part of the detection cycle using the measurements from measurement circuit N. Configuring the two measurement circuits N and M in this way provides the fastest possible update rate of the fine position information to the host interface 21—whilst allowing each measurement circuit M and N to obtain measurements from ancillary channels (such as the reference signal and the coarse detection coils).

The reason for this is illustrated in FIG. 24 which shows in more detail example signals obtained at the end of detection interval Δt3 and the beginning of detection interval Δt4. As shown in FIG. 23, during the time interval corresponding to i=5, measurement circuit N is arranged to obtain measurements (φ1N and φ2N) from the fine detection coils 6 using the polarity+ modulation signal. Then during the time interval corresponding to i=6, measurement circuit N is arranged to obtain measurements (φ3N and φ4N) from the fine detection coils 6 using the polarity− modulation signal. However, because of the change of the polarity modulation signal that is used, the $AF^N_{out}$ signal is perturbed just after the transition from i=5 to i=6 (as shown in FIG. 24); and takes a short time to settle to its new cyclic form. As shown in FIG. 24, after the transition from i=5 to i=6, the $AF^N_{out}$ signal only crosses the zero crossing level once during the first modulation period with the new polarity modulation signal. Therefore, in this embodiment, the measurement processing unit 19 only considers the last two zero crossing events (φ3N and φ4N) of $AF^N_{out}$ at the end of the time interval corresponding to i=6. In contrast, since the polarity modulation signal used in measurement circuit M does not change during detection interval Δt3, the $AF^M_{out}$ signal is stable and the measurement processing unit 19 can use all of the detected zero crossing events to update the fine position information for the target 5 during each of the four modulation periods ($T_{mod}$) corresponding to detection interval Δt3. The measurement processing unit 19 is triggered to do this using the CALC_trigger control signal that is aligned with the zero crossing events φ3M and φ4M to allow interrupts to the measurement processing unit 19 with relatively low latency to the actual zero crossing events detected in the phase detector 103_M.

At the start of the next detection interval (Δt4), measurement circuit M is configured for obtaining measurements of the excitation reference signal firstly using the polarity+ modulation signal (during i=7) and then using the polarity− modulation signal (during i=8). Thus at the end of time interval with i=7, the measurement processing unit 19 obtains the last two zero crossing events of $AF^M_{out}$ to obtain phase measurements for the excitation reference signal $\varphi1^R_M$ and $\varphi2^R_M$; and at the end of time interval with i=8 (which also correspond to the end of detection interval Δt4), the measurement processing unit 19 obtains the last two the zero crossing events of $AF^M_{out}$ to obtain phase measurements for the excitation reference signal $\varphi3^R_M$ and $\varphi4^R_M$. During detection interval Δt4, the fine position measurements are obtained using measurement circuit N—and so the CALC_trigger control signal is realigned with the zero crossings of $AF^N_{out}$. This realignment is achieved using the phase measurements $\varphi3_N$ and $\varphi4_N$ obtained at the end of detection interval Δt3 from measurement circuit N.

Interrupts

As the measurement processing unit 19 reads the measurements from the two measurement circuits at different rates, in this embodiment, two interrupt signals are used to interrupt the measurement processing unit 19 to perform the read operations—the CALC_trigger control signal and the polarity switch control signal (pol_sw).

The edges of the pol_sw signal are aligned with the edges of consecutive pairs of modulation periods $T_{mod}$. The interrupt started by either the rising or the falling edge of the pol_sw control signal is used to move the last two phase measurements and the last two amplitude measurements from the memories 17-1 and 17-2 (associated with the measurement circuit N or M in which the ancillary measurements are currently being made) to the measurement processing unit 19. This interrupt generated by the pol_sw control signal has the highest priority of all other interrupts and so can interrupt active calculations in the measurement processing unit 19 or even the process of moving data from another measurement circuit (started by the CALC_trigger interrupt signal). The measurement processing unit uses the last two phase measurements to update the optimum timing for sampling the amplitude of the incoming signal in that time interval—which it stores in memory for use in the next detection cycle; and then loads a new value into shift_ADCN for use in controlling when the ADC 13_N will make the amplitude measurements during the next time interval. Of course, the same value of shift_ADCN used in the current time interval cannot be used again in the next time interval because the phase of the incoming signal will be very different (due to the use of a different polarity modulation signal and in some cases because the signal being measured is different).

For example, in FIG. 24, at the boundary between intervals marked as i=5 and i=6, the measurement processing unit 19 will read the last two phase measurements stored in memory 17-1N and the last two amplitude measurements stored in memory 17-2N. The measurement processing unit 19 uses the two phase measurements to determine the optimum timing for ADC converting the signal during the time interval corresponding to i=5 which it stores as shift_ADC5 for use in the next detection cycle. The measurement processing unit 19 then retrieves the value of shift_ADC6 that was calculated at the end of the time interval corresponding to i=6 in the previous detection cycle T_dc. However, the signal that is being processed by measurement circuit N in the time interval corresponding to i=6 is the signal from the fine detection coils (see FIG. 23) and so its phase may have changed since the last detection cycle. Therefore, the measurement processing unit 19 determines the value of shift_ADCN to be used during the time interval corresponding to i=6 in the current detection cycle also taking into account the difference between the fine phase measurement value ($\varphi^F_{Mend6}$) recorded at the end of the time interval with i=6 in the previous detection cycle using the data from the other measurement circuit (i.e. from measurement circuit M) and the latest fine phase measurement ($\varphi^F_M$) determined using the data also from measurement circuit M obtained at the end of the time interval with i=5 of the current detection cycle ($\varphi^F_{Mend5}$) In particular, the following shift value is calculated:

$$\text{shift\_ADC}N=\text{shift\_ADC}6+(\varphi^F_{Mend5}-\varphi^F_{Mend6}) \tag{135}$$

In the more general form we can write:

$$\text{shift\_ADC}N=\text{shift\_ADC}_i-(\varphi^F_{Mendi-1}-\varphi^F_{Mendi}) \tag{136}$$

when the value shift_ADCN is updated for channel N utilizing the polarity+ modulation signal; and:

$$\text{shift\_ADC}N=\text{shift\_ADC}_i+(\varphi^F_{Mendi-1}-\varphi^F_{Mendi}) \tag{137}$$

when the value shift_ADCN is updated for channel N utilizing the polarity− modulation signal. The generalized form takes into account the fact that the phases φ2 and φ1 are moving in the opposite direction compared to $\varphi^F$ (see FIG. 19a and FIG. 19c) which accounts for the opposite sign in the calculation.

Similarly, when measurement circuit M is processing the ancillary data (during detection intervals Δt4, Δt5 and Δt6), the measurement processing unit 19 determines the value of shift_ADCM to write into the timer 105_1M as follows:

$$\text{shift\_ADC}M=\text{shift\_ADC}_i+(\varphi^F_{Nendi-1}-\varphi^F_{Nendi}) \tag{138}$$

when the value shift_ADCM is updated for channel M utilizing the polarity+ modulation signal; and:

$$\text{shift\_ADC}M=\text{shift\_ADC}_i-(\varphi^F_{Nendi-1}-\varphi^F_{Nendi}) \tag{139}$$

when the value shift_ADCN is updated for channel M utilizing the polarity− modulation signal. In this case, $\varphi^F_{Nendi-1}$ is the fine phase measurement obtained using the data from measurement circuit N during the previous time interval (i−1); and $\varphi^F_{Nendi}$ is the fine phase measurement obtained using the data from measurement circuit N during the time interval i in the current detection cycle. The change of the sign of the correction applied to shift_ADCM compared to shift_ADCN is related to the different direction of movement of φ1M and φ2M in measurement circuit M compared to the direction of movement of φ1N and φ2N in measurement circuit N.

Such new values of shift_ADC are also corrected to keep the forbidden zone for ADC triggering very near the boundaries of adjacent modulation periods $T_{mod}$ as described above.

After storing the value $\varphi_{endi}=\varphi^F$ and writing the value shift_ADCN in the timer 105_1N or shift_ADCM in the timer 105_1M (depending on which measurement circuit is involved in the ancillary measurements) the measurement processing unit 19 sets a flag which identifies the need to carry out processing of the new ancillary data. Such calculations have the lowest priority and are performed after the calculations (that are performed in response to the interrupt caused by the CALC_trigger control signal), release the required resources of the microcontroller 9.

A more detailed description of the processing performed by the measurement processing unit 19 will now be given for the different time intervals illustrated in FIG. 23. As discussed above, during detection intervals Δt1, Δt2, and Δt3 the measurement circuit N is used in the ancillary measurement mode.

At pol_sw Interrupt between i=12 and i=1:

At this interrupt, the measurement circuit N selects the reference signal to be measured and the polarity+ modulation signal is selected. At this interrupt, the value of shift_ADC12 is updated and stored in memory 17 for use in the next detection cycle (in the manner described above). At this interrupt the phase value of $\varphi^F_N$ calculated with the data measured in the measurement circuit N during the time interval with index i=12 is stored as:

$$\varphi^F_{Nend12}=\varphi^F_N \tag{140}$$

Then shift_ADCN is updated in the timer 105_1N by using the parameter shift_ADCN1 (which is the value of shift_ADCN calculated at the end of the processing of the data obtained in detection interval Δt1 during the previous detection cycle) that is stored in the memory 17:

$$\text{shift\_ADC}N=\text{shift\_ADC}1 \tag{141}$$

Note that in this case as the signal that is being measured in this time interval (i=1) is the excitation reference signal, its value does not change with the position of the target and therefore, there is no need to consider changes to the phase of the measured signal from one detection cycle to the next.

At pol_sw Interrupt between i=1 and i=2:

At this interrupt, the measurement circuit N selects the reference signal (on inputs 5+/5−) and uses the polarity− modulation signal. At this interrupt the data measured during the time interval with the index i=1 are moved from the memories 17_1N and 17_2N into the measurement processing unit 19 and then the value of shift_ADCN is updated in the timer 105_1N by using the parameter shift_ADC2 (which is the value of shift_ADCN calculated at the end of the processing of the data obtained in time interval with i=2 during the previous detection cycle) that is stored in the memory 17:

$$\text{shift\_ADC}N=\text{shift\_ADC}2 \tag{142}$$

At pol_sw Interrupt between i=2 and i=3:

At this interrupt, the measurement circuit N selects the coarse detection coils 4 (inputs 3+/3− and 4+/4−) and uses the polarity+ modulation signal. At this interrupt the data measured during the time interval with index i=2 are moved from the memories 17_1N and 17_2N and the value of $\varphi^F_M$ calculated with the data φ3M or φ4M measured by the measurement circuit M during time interval with index i=2 is stored as:

$$\varphi^F_{Mend2} = \varphi^F_M \quad (143)$$

Then the value of shift_ADCN is updated in timer 105_1N by using the parameter shift_ADC3 that was stored in memory 17 during the previous detection cycle:

$$\text{shift\_ADC}N = \text{shift\_ADC3} - (\varphi^F_{Mend2} - \varphi^F_{Mend3})/NP \quad (144)$$

As can be seen from this calculation, the measurement processing unit 19 adjusts the value of shift_ADCN value calculated using data measured in the previous detection cycle using the change in the measured fine phase between the corresponding point in time of the previous detection cycle and the latest fine phase measurement obtained from the measurement circuit M. As measurement circuit N will be measuring the coarse phase during the time interval corresponding to i=3, the change in the fine phase is scaled down by the value NP, which equals the number of periods of the fine detection coils 6 in one period of the coarse detection coils 4.

After updating the shift_ADCN value at the boundary between time intervals with i=2 and i=3, the measurement processing unit 19 sets a flag to identify that the data measured for the excitation reference signal during detection interval Δt1 are ready for further processing. The measurement processing unit 19 then returns back from the pol_sw interrupt to continue with other tasks related to serving interrupts with a lower priority introduced by the CALC_trigger control signal, which is used in order to process the φ3M or φ4M data measured during the First part of the detection cycle by the measurement circuit M. After the end of each interrupt induced by the edges of the CALC_trigger control signal, the measurement processing unit 19 checks whether the flag for the further processing of the ancillary measurement data is set. If the flag is set, the measurement processing unit 19 starts the further processing of the stored ancillary data and after the further processing is finished, it clears the value of the flag.

Further Processing of Ancillary Data obtained during detection interval Δt1

During the further processing of the ancillary data obtained during detection interval Δt1, the new best value for the shift_ADCN is calculated using values of φ1N and φ2N detected during the time interval with index i=1 and the parameter shift_ADC1 is updated and saved to the operation memory 17_N. Then the new best value for the shift_ADCN is calculated using values of φ3N and φ4N detected during the time interval with index i=2 and the parameter shift_ADC2 is updated and saved to the operation memory 17_N. The data for $\varphi^N_{rising}$ and $\varphi^N_{falling}$ are updated and if necessary averaged together with the previous data for detection interval Δt1 from the previous detection cycle T_dc. Then the value of $\varphi^{Ref}_N$ is calculated and compared with the value of π/4. Indeed, when the reference signal is being switched through the measurement circuit N or M, it is only the reference signal that is being switched through the demodulating switch 56 and so the value of $\varphi^{Ref}_N$ is given by:

$$\varphi^{Ref}_N = \arctan\left(\frac{V^{Ref}_M}{V^{Ref}_{Mf}}\right) = \frac{\pi}{4} \quad (145)$$

If a substantial deviation from the value of π/4 is found, the measurement processing unit 19 outputs an error message to the host interface 21 and stops updating the fine phase measurements to the host interface 21 until the next detection cycle when this error is cleared if the measurement returns back to being close to π/4. At the end of this data processing, the last two amplitude values obtained from ADC 13_N ($ADC_{last}$ and $ADC_{last-1}$) during each of the time intervals with i=1 and i=2 are used to calculate the average value of the peak-to-peak reference amplitude ($V^{EX}$).

At pol_sw Interrupt between i=3 and i=4:

At this interrupt, the measurement circuit N starts mixing the signals from the coarse detection coils (on inputs 3+/3− and 4+/4−) using the polarity− modulation signal. At this interrupt the data measured during the time interval with index i=3 are moved from the memory 17_1N and 17_2N and the value of $\varphi^F_M$ calculated with the data φ3M or φ4M measured in the measurement circuit M during time interval with i=3 is stored as:

$$\varphi^F_{Mend3} = \varphi^F_M \quad (146)$$

Then the value of shift_ADCN is updated in timer 105_1N by using the parameter shift_ADC4 stored in the memory:

$$\text{shift\_ADC}N = \text{shift\_ADC4} + (\varphi^F_{Mend3} - \varphi^F_{Mend4})/NP \quad (147)$$

At pol_sw Interrupt between i=4 and i=5:

At this interrupt, the measurement circuit N starts mixing the signals from the fine detection coils (on inputs 1+/1− and 2+/2−) using the polarity+ modulation signal. At this interrupt the data measured during the time interval with the index i=4 are moved from the memory 17_1N and 17_2N and the value of $\varphi^F_M$ calculated with the data φ3M or φ4M measured in the measurement circuit M during time interval with i=4 is stored as:

$$\varphi^F_{Mend4} = \varphi^F_M \quad (148)$$

Then the value shift_ADCN is updated in the timer 105_1N by using the parameter shift_ADC5 stored in the memory:

$$\text{shift\_ADC}N = \text{shift\_ADC5} - (\varphi^F_{Mend4} - \varphi^F_{Mend5}) \quad (149)$$

After updating the shift_ADCN value, the measurement processing unit 19 sets the flag to indicate that the data measured for the coarse scale channels during the detection interval Δt2 are ready for further processing. The measurement processing unit 19 then returns back from the pol_sw interrupt to continue with other tasks related to serving interrupts with a lower priority introduced by the CALC_trigger control signal, which is used in order to process the φ3M or φ4M data measured during the First part of the detection cycle in the measurement circuit M. After the end of each interrupt induced by the edges of the CALC_trigger control signal, the measurement processing unit 19 checks whether the flag for the further processing of the ancillary measurement data is set. If the flag is set, the measurement processing unit 19 starts the further processing of the ancillary data and after the processing is finished, it clears the value of the flag.

Further Processing of Ancillary Data Obtained During Detection Interval ΔT2

During the further processing of the ancillary data obtained during detection interval Δt2 the new best value for the shift_ADCN is calculated using values of φ1N and φ2N detected during the time interval with index i=3 and the parameter shift_ADC3 is updated and saved to the operation memory 17. Then the new best value for the shift_ADCN is calculated using values of φ3N and φ4N detected during the time interval with index i=4 and the parameter shift_ADC4 is updated and saved to the operation memory 17. The data for $\varphi^N_{rising}$ and $\varphi^N_{falling}$ are updated and if necessary averaged together with the previous data for the time interval Δt2 from previous detection periods T_dc. Then the coarse target position information ($\varphi^C$) is calculated using the φ3N and the φ4N phase measurements obtained during time interval i=4. The last two amplitude measurements from the ADC 13_N ($ADC^N_{last}$ and $ADC^N_{last-1}$) obtained for each time interval with i=3 and i=4 are used to calculate the average value of the peak-to-peak amplitude of $AF^N_{out}$ when the coarse detection coils are selected ($A_C^N$). The obtained values are then used to correct the coarse phase measurements for breakthrough offset and to update the coarse position measurement of the target 5 relative to the coarse detection coils 4 and, together with the latest fine position measurement ($\varphi^F_M$), confirm the current absolute position of the target 5.

At Pol_sw Interrupt Between i=5 and i=6:

At this interrupt, the measurement circuit N starts mixing the signals from the fine detection coils (on inputs 1+/1− and 2+/2−) using the polarity− modulation signal. At this interrupt the data measured during the time interval with index i=5 are moved from the memory 17-1N and 17_2N and the value of $\varphi^F_M$ calculated with the data φ3M or φ4M measured in the measurement circuit M during time interval with i=5 is stored as:

$$\varphi^F_{Mend5} = \varphi^F_M \qquad (150)$$

Then the value shift_ADCN is updated in timer 105_1N by using the parameter shift_ADC6 stored in the memory:

$$\text{shift\_ADC}N = \text{shift\_ADC6} + (\varphi^F_{Mend5} - \varphi^F_{Mend6}) \qquad (151)$$

At Pol_sw Interrupt Between i=6 and i=7

At this interrupt, the measurement circuit N continues mixing the signals from the fine detection coils (on inputs 1+/1− and 2+/2−) again using the polarity− modulation signal. At this interrupt the data measured during the time interval with the index i=6 are moved from the memory 17-1N and 17_2N and the value of $\varphi^F_M$ calculated with the data φ3M or φ4M measured in the measurement circuit M during time interval with i=6 is stored as:

$$\varphi^F_{Mend6} = \varphi^F_M \qquad (152)$$

As discussed above, in detection interval Δt4, measurement circuit M starts to obtain the ancillary measurements and measurement circuit N starts to obtain the fine position measurements. Therefore, at this time point, the measurement processing unit 19 updates the value of shift_ADCM applied to timer 105_1M by using the parameter shift_ADC7 stored in the memory.

$$\text{shift\_ADC}M = \text{shift\_ADC7} \qquad (153)$$

Again as measurement circuit M will measure the excitation reference signal during the time interval corresponding to i=7, the phase of the incoming signal will not have changed with the position of the target 5 and so, at this point, there is no need to modify shift_ADCM to account for movement of the target. After updating the shift_ADCM value, the measurement processing unit 19 sets the flag to identify that the data measured from the fine detection coils by measurement circuit N during the detection interval Δt3 are ready for the further processing.

During this interrupt, as a result of the switch over of the roles of the two measurement circuits, an additional adjustment of the shift_CALC parameter is made to align the edges of the CAL_trigger control signal near (just after) the zero crossing events of the $AF^N_{out}$ signal obtained from measurement circuit N. Indeed, in order to lock the CAL-C_trigger control signal to the zero events in the measurement circuitry N, the timer 105_2 has to be reloaded with a new value of shift_CALC calculated from the phase data φ3N and φ4N measured during the time interval with index i=6 that have just been read from the memory 17-1N into the measurement processing unit 19 at the pol_sw signal interrupt event. As a result of this change to the CALC_trigger control signal, it will jump and thus an additional edge can be introduced in the CALC_trigger control signal at this particular moment in time. In order to ignore any such extra edge of the CALC_trigger control signal, the interrupt events associated with the edges of the CALC_trigger control signal are disabled during the reloading of the timer 105_2 and are then enabled again once the timer 105_2 has been reloaded.

The measurement processing unit 19 then returns back from the pol_sw interrupt to continue with other tasks related to serving interrupts with a lower priority introduced by the CALC_trigger control signal, which from this time interval (until the end of the detection cycle) will now be used in order to process the φ3N or φ4N data obtained from measurement circuit N during the Second part of the detection cycle T_dc. As discussed above, after the end of each interrupt caused by the CALC_trigger control signal, the measurement processing unit 19 checks whether the flag for the further processing of the ancillary measurement data is set. If the flag is set, the measurement processing unit 19 starts the further processing of the ancillary data and after the processing is finished, it clears the value of the flag.

Further Processing of Ancillary Data Obtained During Detection Interval Δt3

During the further processing of the ancillary data obtained during detection interval Δt3, the new best value for shift_ADCN is calculated using the values of φ1N and φ2N detected during the time interval with index i=5 and the parameter shift_ADC5 is updated and saved to the operation memory 17. Then the new best value for the shift_ADCN is calculated using the values of φ3N and φ4N detected during the time interval with index i=6 and the parameter shift_ADC6 is updated and saved to the operation memory 17. The data for $\varphi^N_{rising}$ and $\varphi^N_{falling}$ are updated and if necessary averaged together with previous data obtained for time interval Δt3 from previous detection periods T_dc. The last two amplitude measurements from the ADC 13_N ($ADC^N_{last}$ and $ADC^N_{last-1}$) obtained in each of the time intervals with i=5 and i=6 are used to calculate the average value of the peak-to-peak amplitude of $AF^N_{out}$ when the fine detection coils are selected ($A_F^N$).

Subsequent Pol_sw Interrupts

After switching over between measurement circuits N and M for fine position measurements, the procedure discussed above for obtaining and processing the ancillary data is repeated for measurement circuit M with a shift of the index i by 6 positions (index i=1 is replaced with index i=7, index i=2 is replaced with an index i=8, etc.). All dynamic corrections described above for the value of the shift_ADCN are applied with an opposite sign to the shift_ADCM, reflecting the fact that the zero crossing values φ1N, φ2N are moving in the opposite direction to the φ1M, φ2M values with the change of target position, and the zero crossing values φ3N, φ4N are moving in the opposite direction to the φ3M, φ4M with the change of target position.

Processing Performed at CALC_Trigger Interrupt

As discussed above, the CALC_trigger control signal interrupts the measurement processing unit 19 and causes it to process the last phase measurement written into memory 17_1 and the last two amplitude measurements written into memory 17_2. The last two amplitude measurements are processed to update the peak to peak measure of the $AF_{out}$ signal value of ($A_F^N$ or $A_F^M$) and the phase measurement is processed after each zero crossing event (i.e. on the falling and rising edges of the CALC_trigger control signal) in order to update the value of $\varphi^F$. During the first part of the detection cycle, the measurement processing unit 19 uses the signals from measurement circuit M to update the phase and amplitude measures ($\varphi^F_M$ and $A_F^M$); and during the second part of the detection cycle, the measurement processing unit 19 uses the signals from measurement circuit N to update the phase and amplitude measures ($\varphi^F_N$ and $A_F^N$). In the first part of the detection cycle the phase of the CALC_trigger control signal and the phase of the ADC_triggerM signal are constantly fine tuned after each interrupt generated by the CALC_trigger control signal. The fine position information $\varphi^F_M$ is then recalculated to an absolute position of the target 5 using various adjustments including applying look-up table corrections, and by shifting the fine position measurement in accordance with the latest coarse position measurement. In the second part of the detection cycle the phase of the CALC_trigger control signal and the phase of the ADC_triggerN signal are constantly fine tuned after each interrupt generated by the CALC_trigger control signal. The fine position information $\varphi^F_N$ is then recalculated to an absolute position of the target 5.

During the transition from continuous measurement of φ3M and φ4M in measurement circuit M to the same type of continuous measurement of φ3N and φ4N in measurement circuit N, the update events to the host interface, which are typically separated by about half of the modulation period $T_{mod}$, might experience a jump by about ±half of the modulation period $T_{mod}$. So, while the system on average will provide a small latency which is not going to be affected by the switching between measurement circuits N and M, the actual update events are affected and might show a sudden slip in the update time between adjacent measurements. For some switching events the separation between them can become close to zero instead of $(T_{mod})/2$, and for other switching events the separation between adjacent update events can become as large as $T_{mod}$ instead of $(T_{mod})/2$. All other update events will be spaced equidistantly by about $(T_{mod})/2$.

Breakthrough Calibration Data

Most ratiometric sensors work on the assumption that the detection coils are well balanced with respect to the excitation coil—so that there is no coupling between them. In such ratiometric sensors the signals generated in the detection coils are mainly caused by the presence of the moving target 5 and therefore the accurate position of the target 5 can be obtained from two ratiometric channels if they show different dependencies of the induced signals against the actual position of the target. In real systems, however, the strength of the signal induced by the target 5 in the detection coils can be relatively small, so that even a small amount of direct breakthrough from the excitation coil can affect the accuracy of the ratiometric output. It is desirable to provide a sensor that has the capability to correct, in software, the output of the ratiometric sensor to account for the breakthrough between the excitation coil and the detection coil in order to improve the accuracy achievable by the sensor. Such breakthrough correction was described above in the first embodiment and a similar breakthrough correction is performed in this embodiment.

The correction of the data measured by the sensor can be achieved if the breakthrough offset coefficients are measured in a separate calibration step and stored in the memory 29 of the microcontroller 9. Below we show the required calculations which can be used to correct the raw measured data for the breakthrough offset from the excitation coil using calibrated coefficients $O^{FS}$ and $O^{FC}$ describing the breakthrough offset signal in the fine sine detection coil 6-1 and in the fine cosine detection coil 6-2 respectively. From equations (3), (4) and (6) above, the amplitude of the signals induced in each fine detection coil 6 by the target 5 is ideally given by:

$$V^{FS} = A_F \sin(\varphi^F) \qquad (154)$$

$$V^{FC} = A_F \cos(\varphi^F) \qquad (155)$$

However, the actual voltages that are measured contain both the desired signal due to the position of the target 5 in close proximity to the fine detection coils 6 as well as the direct breakthrough offset signal from the excitation coil 2; and can therefore be corrected by using:

$$V^{FS}_{corr} = A_F \sin(\varphi^F) - O^{FS} \times V^{EX} \qquad (156)$$

$$V^{FC}_{corr} = A^F \cos(\varphi^F) - O^{FS} \times V^{EX} \qquad (157)$$

where $V^{EX}$—is the peak-to-peak amplitude of the $AF_{out}$ signal obtained when the reference signal is selected by the multiplexer 57 in the measurement circuit 51 (detection interval Δt1 for measurement circuit N and detection interval Δt4 for measurement circuit M). Thus, the breakthrough corrected fine position of the target 5 can be determined from:

$$\varphi^F_{corr} = \arctan\left(\frac{V^{FS}_{corr}}{V^{FC}_{corr}}\right) = \arctan\left(\frac{\left(\sin(\varphi^F) - \frac{O^{FS} \times V^{EX}}{A_F}\right)}{\left(\cos(\varphi^F) - \frac{O^{FC} \times V^{EX}}{A_F}\right)}\right) \qquad (158)$$

Where $\varphi^F$ is the raw fine position measurement obtained by processing the phases determined from the timers 115 (shown in FIG. 21), OFS and OFC are the stored calibration breakthrough offset coefficients 29, $V^{EX}$ is the current value of the peak-to-peak amplitude of the reference signal, and $A_F$ is the peak-to-peak amplitude of the signals used to determine $\varphi^F$. Similar breakthrough corrections can be performed on the coarse position measurements using coarse breakthrough offsets $O^{CS}$ and $O^{CC}$.

The above formula (equation 158) for the corrected value of $\varphi^F_{corr}$ has two correction terms which are proportional to the ratio between $V^{EX}$ and $A_F$ and thus the correction for breakthrough offset is independent of the actual gain of the measurement circuit N or M as well as the exact phase tuning of the demodulation performed by the demodulating switch 56. What is important is that both peak-to-peak amplitudes $V^{EX}$ and $A_F$ have been measured via the same analogue measurement circuitry 25 and have been converted using the same ADC 13. In this fifth embodiment, this is achieved by measuring the reference signal, which is a fraction of the excitation voltage, through each of the two measurement circuits N and M which are also used to measure the signals from the fine sine and the fine cosine detection coils 6 and the signals from the coarse sine and the coarse cosine detection coils 4.

In order to speed-up calculations in the microcontroller 9 for the purpose of calculations of sine, cosine, and arc-tangent functions, a set of look-up tables can be used. The size of the required memory 29 for such look-up tables is not excessive because only a 45 degree look-up table section is required for the arc-tangent calculations and only a 90 degree look-up table section is required for calculations of both sine and cosine functions.

It is also worth noting that the measured amplitude $V^{EX}$ is equal to:

$$V^{EX} = \sqrt{2} \times V_0^{Ref} \tag{159}$$

The coefficient $\sqrt{2}$ is related to the fact that when the reference signal is selected by the multiplexor 57, the excitation reference signal is applied to both inputs of the demodulating switch 56 and therefore the composite signal obtained during the reference channel measurement can be represented as:

$$V = V^{Ref} \sin\left[\frac{2\pi}{T_{mod}}\right]t + V^{Ref}\cos\left[\frac{2\pi}{T_{mod}}\right]t = \sqrt{2}\,V^{Ref}\sin\left(\left[\frac{2\pi}{T_{mod}}\right]t + \frac{\pi}{4}\right) \tag{160}$$

After the amplification and filtering circuitry 83 the signal in the measurement circuit becomes equal to:

$$AF_{out} = Gain \times \sqrt{2}\,V^{Ref}\sin\left(\left[\frac{2\pi}{T_{mod}}\right]t + \frac{\pi}{4} + \varphi\right) = \sqrt{2}\,V_0^{Ref}\sin\left(\left[\frac{2\pi}{T_{mod}}\right]t + \frac{\pi}{4} + \varphi\right) \tag{161}$$

Thus, the coefficients $O^{FS}$ and $O^{FC}$ can be written in terms of the breakthrough between the excitation coil 2 and the corresponding sine and cosine detection coil as follows:

$$O^{FS} = \frac{B^{FS}}{\sqrt{2}\,V_0^{Ref}} \tag{162}$$

$$O^{FC} = \frac{B^{FC}}{\sqrt{2}\,V_0^{Ref}} \tag{163}$$

Similarly for the coarse breakthrough offset coefficients:

$$O^{CS} = \frac{B^{CS}}{\sqrt{2}\,V_0^{Ref}} \tag{164}$$

$$O^{CC} = \frac{B^{CC}}{\sqrt{2}\,V_0^{Ref}} \tag{165}$$

Breakthrough Calibration

Before breakthrough corrections can be applied, a calibration mode must be performed to determine the values of the coefficients $O^{FS}$, $O^{FC}$, $O^{CS}$ and $O^{CC}$. This can be achieved by physically removing the target 5 from the vicinity of the detection coils 4, 6 and then measuring the signal induced in the fine sine and the fine cosine coils 6 when the excitation signal is applied to the excitation coil 2 (and similarly by measuring the signal induced in the coarse sine and the coarse cosine detection coils 4 when the excitation signal is applied to the excitation coil 2). Such measurements can be performed during production of the sensor or after the sensor has been installed in the final application.

Unfortunately, it is not practical to mix the $B^{FS}$ and the $B^{FC}$ (or the $B^{CS}$ and the $B^{CC}$) signals together through the measurement circuits N or M as such signals are typically relatively small and the composite signal created by mixing these signals through the measurement circuit 51 will result in an AC amplitude of $AF_{out}$ that is too small to be detected by the comparator 113 of the phase detector 103 (shown in FIG. 21). The ratiometric electronics of this embodiment, however, will work well if each of the breakthrough signals is intermixed with a relatively large signal such as the reference signal. Thus, by intermixing each breakthrough signal (on input 1+/1− or 2+/2−) with the reference signal (from input 5+/5−), it is possible to measure the ratiometric value of $B^{FS}/V^{ref}_0$ and $B^{FC}/V^{ref}_0$ with good resolution and accuracy.

FIG. 25 is a timing diagram illustrating the control signals used to select the different inputs to be intermixed by the demodulating switch 56 during this breakthrough calibration mode. As shown, during the first detection interval $\Delta t1$ the signal from the fine sine detection coil and the reference signal (inputs 1+/1− and 5+/5−) are selected simultaneously in measurement circuits N and M. In the first half of the detection interval $\Delta t1$ the intermixing in the measurement circuit N and in measurement circuit M is performed using the polarity+ modulation signal. FIG. 26 shows the time line for the time division multiplexing of these two signals into the measurement circuits N and M during one modulation period of the first half of the detection interval. As can be seen, while both input signals are intermixed in measurement circuits N and M, there are no collisions when both measurement circuits N and M are selecting the same input signal at exactly the same moment in time. This is achieved by using the opposite polarity for the in3_N and in3_M control signals. By comparing FIGS. 26 and 20, it can be seen that the same waveform used for the control signals in1_N and in1_M in the main measurement mode presented in the FIG. 20 is used now for the control signals in3_N and in3_M in this calibration mode. As a result of this time division multiplexing, when the signal from the fine sine detection coil is selected by the measurement circuit N, the reference signal is selected in the same moment in time by measurement circuit M, and vice versa.

As a result of intermixing the breakthrough signal and the reference signal in this particular manner, the $\varphi_N$ value measured using the data from measurement circuit N can then be related to the desired ratio of the breakthrough signal to the reference signal as follows:

$$\frac{B_N^{FS}}{V_{0N}^{Ref}} = \tan(\varphi_N) \tag{166}$$

And the $\varphi_M$ value measured using the data from measurement circuit M can be related to the desired ratio of the breakthrough signal to the reference signal as follows:

$$\frac{B_M^{FS}}{V_{0M}^{Ref}} = \tan\left(\frac{\pi}{2} - \varphi_M\right) \tag{167}$$

However, as explained above, the phase measurements obtained by the timers 115 include a phase shift introduced by the measurement circuitry 25 and so phase measurements obtained when the polarity− modulation signal is applied must also be obtained and combined with those obtained when the polarity+ modulation signal is used, in order to determine $\varphi_N$ and $\varphi_M$. As shown in FIG. 25, in the next half of detection interval $\Delta t1$ the intermixing in measurement circuits N and M is performed using the polarity− modulation signal. Therefore the phase measurements obtained during detection interval $\Delta t1$ can be used to determine $\varphi_N$ and $\varphi_M$, from which the above ratios can be calculated.

In the next detection interval $\Delta t2$ the same measurements are obtained in respect of the signal from the fine cosine detection coil and the reference signal (inputs 2+/2− and 5+/5−) to allow calculation of:

$$\frac{B_N^{FC}}{V_{0N}^{Ref}} = \tan(\varphi_N) \quad (168)$$

$$\frac{B_M^{FC}}{V_{0M}^{Ref}} = \tan\left(\frac{\pi}{2} - \varphi_M\right) \quad (169)$$

In the next detection interval $\Delta t3$ the same measurements are obtained in respect of the signal from the coarse sine detection coil and the reference signal (inputs 3+/3− and 5+/5−) to allow calculation of:

$$\frac{B_N^{CS}}{V_{0N}^{Ref}} = \tan(\varphi_N) \quad (170)$$

$$\frac{B_M^{CS}}{V_{0M}^{Ref}} = \tan\left(\frac{\pi}{2} - \varphi_M\right) \quad (171)$$

In the final detection interval $\Delta t4$ the same measurements are obtained in respect of the signal from the coarse sine detection coil and the reference signal (inputs 4+/4− and 5+/5−) to allow calculation of:

$$\frac{B_N^{CC}}{V_{0N}^{Ref}} = \tan(\varphi_N) \quad (172)$$

$$\frac{B_M^{CC}}{V_{0M}^{Ref}} = \tan\left(\frac{\pi}{2} - \varphi_M\right) \quad (173)$$

Such measurements are continuously obtained whilst the sensor is in the breakthrough offset measurement mode and a running average of each of the above ratios is determined to reduce the noise in the actual measurements. Once the breakthrough offset measurement mode is stopped, the set of calibration coefficients:

$$O_N^{FS} = \frac{1}{\sqrt{2}} \frac{B_N^{FS}}{V_{0N}^{Ref}} \quad O_M^{FS} = \frac{1}{\sqrt{2}} \frac{B_M^{FS}}{V_{0M}^{Ref}} \quad (174)$$

$$O_N^{FC} = \frac{1}{\sqrt{2}} \frac{B_N^{FC}}{V_{0N}^{Ref}} \quad O_M^{FC} = \frac{1}{\sqrt{2}} \frac{B_M^{FC}}{V_{0M}^{Ref}}$$

$$O_N^{CS} = \frac{1}{\sqrt{2}} \frac{B_N^{CS}}{V_{0N}^{Ref}} \quad O_M^{CS} = \frac{1}{\sqrt{2}} \frac{B_M^{CS}}{V_{0M}^{Ref}}$$

-continued $$O_N^{CC} = \frac{1}{\sqrt{2}} \frac{B_N^{CC}}{V_{0N}^{Ref}} \quad O_M^{CC} = \frac{1}{\sqrt{2}} \frac{B_M^{CC}}{V_{0M}^{Ref}}$$

is calculated and stored in the non-volatile memory of the microcontroller 9 as the breakthrough calibration data 29.

This calibration data 29 is then used in the main measurement mode illustrated in the FIG. 23 for correcting the raw data measured in the presence of the target 5 in order to reduce the breakthrough error and therefore improve the accuracy of the ratiometric sensor output.

Dynamic Correction—Velocity Compensation

Like in the first embodiment, some of the measurements obtained in this embodiment combine phases measured in different time intervals—for example, combining the phase measurements obtained when the polarity+ modulation signal is used with the corresponding phase measurements obtained when the polarity− modulation signal is used. As a result, if the target 5 is moving, then this will introduce errors into the measurements that are obtained. As can be seen from FIG. 23, this is only a problem for the ancillary measurements that are being calculated using data from measurement circuit N during detection intervals $\Delta t1$, $\Delta t2$ and $\Delta t3$ and for the ancillary measurements that are being calculated using data from measurement circuit M during detection intervals $\Delta t4$, $\Delta t5$ and $\Delta t6$. The other measurements (fine position measurements) are calculated using instantaneous data for either $\varphi 3$ or $\varphi 4$—and so they are not subject to this movement error. The error to the final answer $\varphi^F$ is determined mainly by the dynamic error in the value of $\varphi_{rising}$ and $\varphi_{falling}$ calculated from the ancillary measurement data. To calculate a measure of the speed of the target 5, we can look at how much the measured (raw) phases change during one time interval. For example, referring to FIG. 24, during the time interval corresponding to i=6, the timers 115_M will measure four phases—$\varphi 3M$ and $\varphi 4M$ in each of the two modulation periods corresponding to this time interval. If we label these measurements: $\varphi 3M_{previous}$, $\varphi 4M_{previous}$, $\varphi 3M_{new}$ and $\varphi 4M_{new}$, then we can calculate a change in measured phase between $\varphi 3M_{previous}$ and $\varphi 3M_{new}$ and a change in measured phase between $\varphi 4M_{previous}$ and $\varphi 4M_{new}$ as follows:

$$\Delta \varphi 3M = \varphi 3M_{new} - \varphi 3M_{previous} \quad (175)$$

$$\Delta \varphi 4M = \varphi 4M_{new} - \varphi 4M_{previous} \quad (176)$$

Both of these phase differences represent the change in position of the target 5 over one modulation period ($T_{mod}$). In most cases $\varphi 3M_{previous}$ and $\varphi 3M_{new}$ should be relatively close together and therefore this change in phase should be relatively small. However, it is possible that, $\varphi 3M_{previous}$ is determined to be close to zero and that $\varphi 3M_{new}$ is close to $2\pi$ and vice versa. This is similarly true for $\varphi 4M_{previous}$ and $\varphi 4M_{new}$. This is not because the target 5 has moved by a whole period of the fine detection coils ($L_F$ in FIG. 2), but because the measured phases are bound between zero and $2\pi$ and so when the phase is measured close to the value $2\pi$, the next phase measurement may well result in a jump back to a phase close to zero. This can be compensated as follows:

If $\Delta \varphi 3M > \pi$, then $\Delta \varphi 3M = \Delta \varphi 3M - 2\pi$ If $\Delta \varphi 3M < -\pi$, then $\Delta \varphi 3M = \Delta \varphi 3M + 2\pi \quad (177)$ Similarly for $\Delta\varphi 4M$:

If $\Delta\varphi 4M > \pi$, then $\Delta\varphi 4M = \Delta\varphi 4M - 2\pi$

If $\Delta\varphi 4M < -\pi$, then $\Delta\varphi 4M = \Delta\varphi 4M + 2\pi$ \hfill (178)

We can then work out an average change in measured phase during one modulation period as:

$$\Delta\varphi_{mean} = \frac{(\Delta\varphi 3M + \Delta\varphi 4M)}{2} \tag{179}$$

Therefore the rate of change of the measured phase (which is a measure of the speed of the target 5) can be calculated as:

$$s = \frac{(\Delta\varphi_{mean})}{2\pi} \tag{180}$$

This speed parameter can be updated each time zero crossing measurements are made. As the fine position is being updated about twice every modulation period, the position of the target 5 will change by about $\pi \ast s$ between each measurement.

We can also obtain a measure of the acceleration of the target 5 by considering the change of speed between adjacent updates as follows:

$$Acc = \frac{(s_{new} - s_{previous})}{\pi} \tag{181}$$

The acceleration value (Acc) can also be averaged between several updates of the speed to reduce the noise. In this embodiment the speed and acceleration parameters are measured and continuously updated using the measurements from the measurement circuit N or M that is currently being used for fine position measurements. These values are then used to compensate the measurements made by the other measurement circuit M or N—i.e. to compensate the measurements being made by the measurement circuit that is currently in the "auxiliary" mode. For example, during detection interval $\Delta t3$, measurement circuit N is in the auxiliary mode and the signals from the fine detection coils 6 are selected by measurement circuit N and the polarity modulation signal is switched between polarity+ and polarity− so that the phase offsets $\varphi_{falling}$ and $\varphi_{rising}$ can be updated for subsequent use in calculating fine position information using the measurements from measurement circuit N during detection intervals $\Delta t4$, $\Delta t5$ and $\Delta t6$.

As shown in FIG. 24, in this embodiment the polarity+ modulation signal is applied first during the time interval corresponding to i=5 and then the polarity− modulation signal is applied during time interval i=6. In this embodiment, each time interval corresponds to two modulation periods, but in the general case each time interval may correspond to 1+L modulation periods (where L is a non-zero integer). As discussed above, when processing the data from the measurement circuit that is currently in the "ancillary" mode of operation, the measurement processing unit 19 only processes the last two zero crossing events obtained at the end of each time interval. Therefore, the measurement circuit N will obtain phase values $\varphi 1N$ and $\varphi 2N$ at the end of time interval corresponding to i=5; and will obtain phase values $\varphi 3N$ and $\varphi 4N$ at the end of time interval corresponding to i=6. The zero crossing measurements of $\varphi 3N$ and $\varphi 4N$ have been obtained in a period of modulation that is not immediately adjacent the period of modulation from which the phase measurements $\varphi 1N$ and $\varphi 2N$ have been obtained. In the general case when there are 1+L modulation periods in each time interval (i) the zero crossing measurements for $\varphi 1N$ and $\varphi 3N$ are separated in time by:

$$\Delta T_{rising} = (1+L)T_{mod} - \left(\frac{\varphi 1N - \varphi 3N}{2\pi}\right)T_{mod} \tag{182}$$

Or, writing this in terms of a phase:

$$\Delta\varphi^T_{rising} = (1+L)2\pi - \varphi 1N + \varphi 3N \tag{183}$$

However, the measurement processing unit 19 should also take into account the possibility that the zero crossing corresponding to $\varphi 1N$ does not occur in the last period of the time interval corresponding to i=5 and/or the possibility that the zero crossing corresponding to $\varphi 3N$ does not occur in the last period of the time interval corresponding to i=6. If this happens, then the above formula for the separation between the $\varphi 1N$ and $\varphi 3N$ phase measurements becomes incorrect. This is possible because when the target 5 is moving quickly the period of the signal $AF^N_{out}$ will deviate from the modulation period ($T_{mod}$). Recall that during the time interval when the polarity+ modulation signal is applied to the demodulation switch 56, $AF^N_{out}$ is given by:

$$AF_{out} = V_0 \sin\left(\left(\frac{2\pi}{T_{mod}}\right)t + \varphi + \varphi^F\right) \tag{184}$$

and during the time interval when the polarity− modulation signal is applied to the demodulation switch 56, $AF^N_{out}$ is given by:

$$AF_{out} = V_0 \sin\left(\left(\frac{2\pi}{T_{mod}}\right)t + \varphi - \varphi^F\right) \tag{185}$$

Therefore, if $\varphi^F$ is changing with time, then depending on the direction of the target movement, the actual period of $AF^N_{out}$ can become slightly shorter than $T_{mod}$ or slightly longer than $T_{mod}$. For instance, when the period of $AF^N_{out}$ is slightly shorter than $T_{mod}$ when the polarity+ modulation signal is applied, then the period of $AF^N_{out}$ becomes slightly longer than $T_{mod}$ when the polarity− modulation signal is applied. Similarly, when the period of $AF^N_{out}$ is slightly longer than $T_{mod}$ when the polarity+ modulation signal is applied, then the period of $AF^N_{out}$ becomes slightly shorter than $T_{mod}$ when the polarity− modulation signal is applied. When the period of $AF^N_{out}$ is slightly longer than $T_{mod}$, only one zero crossing might be detected during the last period of the interval (i) if the phases of $AF^N_{out}$ and the modulation period become nearly aligned to each other.

The measurement processing unit 19 can detect when this happens and make the appropriate corrections. In particular, as discussed above, the phase measurements obtained by the timers 115_N are written into memory 17_1N in the order in which they are measured—and when processing the measurements, the measurement processing unit 19 retrieves the last two phase measurements from the memory 17_1N. Under normal circumstances, the first phase measurement will be smaller than the second phase measurement (as both are counted from the start of the modulation period). However, if the second phase measurement is smaller than the first phase measurement, then this means that the first (larger) phase measurement was recorded in the last but one modulation period. For instance this can happen if this second (larger) phase measurement is very close to $2\pi$ in the last but one modulation period and so was not detected as a small value close to zero in the next modulation period. A similar analysis is performed for the sequence of $\varphi 3N$ and $\varphi 4N$ measurements written in to memory 17_1N to determine if the zero crossing corresponding to $\varphi 3N$ measurement does not occur in the last period of the time interval corresponding to i=6.

If the measurement processing unit 19 determines that last value for $\varphi 1N$ is detected in the last but one modulation period, then the formula for determining the separation between the zero crossing measurements for $\varphi 1N$ and $\varphi 3N$, should be modified to:

$$\Delta\varphi^T_{rising}=(2+L)2\pi-\varphi 1N+\varphi 3N \tag{186}$$

Similarly, if the measurement processing unit 19 determines that last value for $\varphi 3N$ is detected in the last but one modulation period, then the formula for determining the separation between the zero crossing measurements for $\varphi 1N$ and $\varphi 3N$, should be modified to:

$$\Delta\varphi^T_{rising}=L\times 2\pi-\varphi 1N+\varphi 3N \tag{187}$$

If the measurement processing unit 19 determines that both the last value for $\varphi 1N$ and $\varphi 3N$ are detected in the last but one modulation period, then the formula for determining the separation between the zero crossing measurements for $\varphi 1N$ and $\varphi 3N$, should remain as originally defined:

$$\Delta\varphi^T_{rising}=(1+L)2\pi-\varphi 1N+\varphi 3N \tag{188}$$

Whatever value of $\Delta\varphi^T_{rising}$ is determined, it can then be used to determine the actual change of the target position between the zero crossing corresponding to the last value of $\varphi 1N$ and the zero crossing corresponding to the last value of $\varphi 3N$ from:

$$\Delta\varphi^F_{rising}=(s-\tfrac{1}{2}Acc\times\Delta\varphi^T_{rising})\times\Delta\varphi^T_{rising} \tag{189}$$

where s and Acc are the speed and acceleration values determined using the data from the other measurement circuit (in this case measurement circuit M). This value can then be used to correct for changing values of $\varphi^F_N$ that are used to determine $\varphi^N_{rising}$ Recall that:

$$\varphi 1N=2\pi-\varphi^N_{rising}-\varphi^F_N \tag{190}$$

and $$\varphi 3N=\varphi^F_N-\varphi^N_{rising} \tag{191}$$

Therefore, to account for the delay in the measurement of $\varphi 3N$ compared to the measurement of $\varphi 1N$, this becomes:

$$\varphi 1N=2\pi-\varphi^N_{rising}-\varphi^F_N \tag{192}$$

and $$\varphi 3N=(\varphi^F_N+\Delta\varphi^F_{rising})-\varphi^N_{rising} \tag{193}$$

However, there is a further complication the inventors have found that the value of $\varphi_{rising}$ when the polarity+ modulation signal is used is not the same as $\varphi_{rising}$ when the polarity− modulation signal is used. This is because, as explained above, the apparent frequency of the $AF^N_{out}$ signal in both cases will be slightly different; and the phase shift introduced by the amplification and filtering circuitry 83 will depend on the frequency. More specifically, as the frequency of $AF^N_{out}$ increases the phase shift reduces and as the frequency of $AF^N_{out}$ reduces the phase shift increases. Consequently, this dependence near the working frequency $\omega_0$ corresponding to the period of modulation $T_{mod}$ can be expressed using the dimensionless parameter:

$$q=-\frac{\left(\frac{\Delta\varphi}{\pi}\right)}{\Delta\frac{\omega}{\omega_0}} \tag{194}$$

In typical electronic circuits this parameter q will be close to the value of one and is related to the effective quality factor (Q) of the filters designed for the amplification and filtering circuitry 83. This parameter q can be calculated exactly for a given design of the amplification and filtering circuit 83 or measured experimentally.

Therefore, assuming that the target 5 is moving with constant speed, we can define the corresponding target phase shift ($\varphi^F(t)$) as:

$$\varphi^F_N(t)=\varphi^F_{0,N}+s\times\left(\frac{2\pi t}{T_{mod}}\right)=\varphi^F_{0,N}+s\times\omega_0 t \tag{195}$$

Therefore, the output from measurement circuit N when the polarity+ modulation signal is applied to the demodulation switch 56, is given by:

$$AF^N_{out}=V^N_0\ \sin(\omega_0 t+\varphi+\varphi^F_N(t))=V^N_0\ \sin(\omega_0 t+\varphi+\varphi^F_{0,N}+s\times\omega_0 t) \tag{196}$$

Consequently, the frequency of the signal $AF^N_{out}$ has been increased from $\omega_0$ to $(1+s)\omega_0$ by the amount of $s^*\omega_0$. This allows us to calculate a value for $\varphi_{rising}$ rising when the polarity+ modulation signal is being used as:

$$\varphi_{rising+}^N=\varphi_{rising}^N-\pi\times q\times s \tag{197}$$

Similarly, when the polarity− modulation signal is applied to the demodulation switch 56, the output from measurement circuit N is given by:

$$AF^N_{out}=V^N_0\ \sin(\omega_0 t+\varphi-\varphi^F_N(t))=V^N_0\ \sin(\omega_0 t+\varphi-\varphi^F_{0,N}-s\times\omega_0 t) \tag{198}$$

Consequently, the frequency of the signal $AF_{Nout}$ has been decreased from $\omega_0$ to $(1-s)\omega_0$ by the amount of $s^*\omega_0$. This allows us to calculate a value for $\varphi^N_{rising}$ when the polarity− modulation signal is being used as:

$$\varphi_{rising-}^N=\varphi_{rising}^N+\pi\times q\times s \tag{199}$$

Therefore, by adding the values of $\varphi 1N$ and $\varphi 3N$ together (when determining $\varphi^N_{rising}$), we obtain:

$$\varphi 1N+\varphi 3N=(2\pi-\varphi^N_{rising+}-\varphi^{FN})+((\varphi^{FN}+\Delta\varphi^F_{rising})-\varphi^N_{rising-})= \tag{200}$$
$$2\pi-(\varphi^N_{rising+}+\varphi^N_{rising-})+\Delta\varphi^F_{rising}$$

If the target 5 is moving with constant speed, then the $\pi^*q^*s$ value that is part of $\varphi^N_{rising+}$ will cancel out with the $\pi^*q^*s$ value that is part of $\varphi^N_{rising-}$. However, if the speed has changed between the measurements of $\varphi 1N$ and $\varphi 3N$, then these terms will not cancel. Therefore, if we define the change of speed between measurement φ1N and measurement φ3N as Δs, it follows that:

$$\varphi1N + \varphi3N = 2\pi - (\varphi_{rising+}^N + \varphi_{rising-}^N) - \Delta\varphi_{rising}^F = \qquad (201)$$
$$2\pi - 2\varphi_{rising}^N + \Delta\varphi_{rising}^F - \pi \times q \times \Delta s$$

Or using standard equations of motion, this can be written as:

$$\varphi1N+\varphi3N=2\pi-2\varphi_{rising}^N+\Delta\varphi_{rising}^F-\pi\times q\times\text{Acc}\times\Delta\varphi_{rising}^T \qquad (202)$$

Thus, to summarise the compensation, the measurement processing unit 19 calculates φ1N+φ3N. If φ1N+φ3N>2π, then 2π is subtracted from the calculated value of φ1N+φ3N. The measurement processing unit 19 then calculate $\varphi_{rising}^N$ from:

$$\varphi_{rising}^N = \pi - \left(\frac{\varphi1N + \varphi3N}{2}\right) + \frac{\Delta\varphi_{rising}^F}{2} - \frac{\pi \times q \times \text{Acc} \times \Delta\varphi_{rising}^T}{2} \qquad (203)$$

The measurement processing unit 19 then uses this value of $\varphi_{rising}^N$ to determine the value of $\varphi_{rising-}^N$ as follows:

$$\varphi_{rising}^N = \varphi_{rising}^N + \pi \times q \times s = \qquad (204)$$
$$\pi - \left(\frac{\varphi1N + \varphi3N}{2}\right) + \frac{\Delta\varphi_{rising}^F}{2} + \pi \times q \times \left(s - \frac{\text{Acc} \times \Delta\varphi_{rising}^T}{2}\right)$$

The value of $\varphi_{rising}^N$ is updated every detection cycle during detection interval Δt4, using the φ1N and φ3N values that were obtained during detection interval Δt3. Then when the measurement processing unit 19 is determining fine position measurements using the rising zero crossing events during detection intervals Δt4, Δt5 and Δt6, it determines the target position ($\varphi^F$) using instantaneous value of $\varphi_{rising-}^N$:

$$\varphi_N^F=\varphi3+\varphi_{rising-}^N \qquad (205)$$

The correction to the $\varphi_{rising-}^N$ value (and thus to the $\varphi^F$ value) does depend on the actual properties of the amplification and filtering circuitry 83 described by the parameter q. In an actual implementation it might be advantageous to first average the speed independent value of $\varphi_{rising}^N$ in order to reduce the noise. The instantaneous value of $\varphi_{rising-}^N$ is then calculated using as a correction an instantaneous value for the speed of the target s, as shown above.

A similar dynamic compensation is performed for the falling zero crossing events. In particular, the measurement processing unit 19 calculates φ2N+φ4N from the measurements obtained during detection interval Δt3. If φ2N+φ4N>2π, then 2π is subtracted from the calculated value of φ2N+φ4N. The measurement processing unit 19 then calculates $\varphi_{falling}^N$ from:

$$\varphi_{falling}^N = \pi - \left(\frac{\varphi2N + \varphi4N}{2}\right) + \frac{\Delta\varphi_{falling}^F}{2} - \frac{\pi \times q \times \text{Acc} \times \Delta\varphi_{falling}^T}{2} \qquad (206)$$

where $\Delta\varphi_{falling}^T$ represents the phase separation between the falling zero crossing measurements for φ2N and φ4N obtained from measurement circuit N during detection interval Δt3.

The measurement processing unit 19 then uses this value of $\varphi_{falling}^N$ to determine the value of $\varphi_{falling-}^N$ as follows:

$$\varphi_{falling}^N = \varphi_{falling}^N + \pi \times q \times s = \qquad (207)$$
$$\pi - \left(\frac{\varphi2N + \varphi4N}{2}\right) + \frac{\Delta\varphi_{falling}^F}{2} + \pi \times q \times \left(s - \frac{\text{Acc} \times \Delta\varphi_{falling}^T}{2}\right)$$

The value of $\varphi_{falling}^N$ is updated every detection cycle during detection interval Δt4, using the φ2N and φ4N values that were obtained during detection interval Δt3. Then when the measurement processing unit 19 is determining fine position measurements using the falling zero crossing events during detection intervals Δt4, Δt5 and Δt6, it determines the target position ($\varphi^F$) using instantaneous value of $\varphi_{falling-}^N$ $$\varphi_N^F=\varphi4N+\varphi_{falling-}^N-\pi \qquad (208)$$

Therefore, the corrections applied to the data for the falling and rising zero crossing events are very similar to each other. In both cases the final fine target position information $\varphi_N^F$ can be corrected further for the remaining latency of the calculations performed between updates in the measurement processing unit 19. In particular, there is a latency associated with the time it takes the measurement processing unit 19 to process the fine position information. It is clear from FIG. 24 that the measurement processing unit 19 must calculate the fine position measurement $\varphi_N^F$ in less time than half the modulation period ($T_{mod}$). Whatever, processing time is required, it will be known to the measurement processing unit 16 and can be defined as k*$T_{mod}/4$, where k is a constant that is determined in advance. Therefore, to adjust the determined value of the fine position measurement, to take into account movement of the target 5 during the processing time, the measurement processing unit calculates:

$$\varphi_{Ncomp}^F = \varphi_N^F + \frac{k \times \pi \times s}{2} \qquad (209)$$

This fine target position information will have the lowest possible dynamic error.

So far the discussion above related to dynamic corrections that are applied to the data obtained from measurement circuit N. Similar dynamic corrections are calculated for compensating the measurements obtained from measurement circuit M—except using speed and acceleration measures determined from the measurements from measurement circuit N. As has been explained above, movement of the target 5 results in a change of phase in different directions between the outputs of the two measurement circuits N and M. This means that slightly different compensations will be applied to the measurements obtained from the measurement circuit M. In particular, during detection interval Δt1, the measurement processing unit 19 will calculate the compensation value:

$$\varphi_{rising}^M = \pi - \left(\frac{\varphi1M + \varphi3M}{2}\right) - \frac{\Delta\varphi_{rising}^F}{2} - \pi \times q \times \left(s - \frac{\text{Acc} \times \Delta\varphi_{rising}^T}{2}\right) \qquad (210)$$

from the φ1M and φ3M measurements obtained from measurement circuit M during detection interval Δt6 and will apply that correction to the fine position measurements obtained by measurement circuit M from the rising zero crossing events during detection intervals Δt1, Δt2 and Δt3 as follows:

$$\varphi_M^F = \frac{\pi}{2} - (\varphi 3M + \varphi_{rising-}^M) \tag{211}$$

Similarly, during detection interval Δt1, the measurement processing unit 19 will calculate the compensation value:

$$\varphi_{falling-}^M = \pi - \left(\frac{\varphi 2M + \varphi 4M}{2}\right) - \frac{\Delta \varphi_{falling}^F}{2} - \\ \pi \times q \times \left(s - \frac{Acc \times \Delta \varphi_{falling}^T}{2}\right) \tag{212}$$

from the φ2M and φ4M measurements obtained from measurement circuit M during detection interval Δt6, and will apply that correction to the fine position measurements obtained by measurement circuit M from the rising zero crossing events during detection intervals Δt1, Δt2 and Δt3 as follows:

$$\varphi_M^F = \frac{\pi}{2} - (\varphi 4M + \varphi_{falling}^M - \pi) \tag{213}$$

The same correction for the calculation time of the measurement processing unit 19 can then be performed:

$$\varphi_{Mcomp}^F = \varphi_M^F + \frac{k \times \pi \times s}{2} \tag{214}$$

The procedure described above allows the measurement processing unit 19 to correct the four individual measurements (φ3N, φ4N, φ3M and φ4M) that the measurement circuits N and M measure when they are not operating in the ancillary measurement mode. Corrections related to the acceleration of the target 5 might not be required for some sensing applications (where large acceleration of the target is unlikely to happen), nevertheless the described corrections for dealing with constant speed targets 5 are important in order to reduce the dynamic error of the measurement system.

As those skilled in the art will appreciate, instead of using the above analytically derived corrections, a simpler approximate correction could be determined as follows:

$$\varphi_{comp}^F = \varphi^F + A \times s \tag{215}$$

where the coefficient A is determined experimentally by collecting numerous measurements with different speeds of the target 5 using both the output of the measurement processing unit 19 and the output of a very fast and accurate sensor such as an incremental optical encoder. For example, the coefficient A can be found from experimental data as a best linear fit for the correction which can be used in order to minimize the difference between the outputs of both sensors at different values of the speed of the target 5. Such an approach also allows us to introduce additional coefficients such as:

$$\varphi_{comp}^F = \varphi^F + K0(\varphi^F) \times s + K1(\varphi^F) \times Acc \tag{216}$$

where the values K0($\varphi^F$), and K1($\varphi^F$) are determined from a look-up-table based on the determined target position and would be determined from extensive experimental data collected for different positions of the target 5, for different speeds of the target and for different accelerations of the target. The relevant indexing into such a look-up-table can be achieved using index i:

$$i = \text{round}\left(\frac{\varphi^F \times 256}{2\pi}\right) \tag{217}$$

Such a look-up-table based correction can take into account any remaining issues which are not considered in the analytical model described above. Nevertheless, the phase shifts $\varphi_{falling}$ and $\varphi_{rising}$ are likely to change over the life time of the electronics, and both further depends on the speed of the target. As a result, the simple look-up-table correction will not reduce the dynamic error of the system. If desired, similar dynamic correction can be applied to the calculations of the position of the target 5 using the signals from the coarse detection conductors 4. In this case the speed of the target and the acceleration of the target should be reduced by NP times, where NP—is the number of fine periods in one period of the coarse detection coils. For the detection coils shown in FIG. 2, NP equals 4.

Dynamic Compensation of Trigger Signals

Dynamic corrections related to fast changes of $\varphi^F$ can also be implemented for the value of shift_CALC (described above with reference to FIG. 22) which is used to fine tune the position of the edges of the CALC_trigger signal. The formulas for the calculation of the value of shift_CALC discussed above can be corrected as:

If $\varphi 3 > \varphi 4$(or $\varphi 1 > \varphi 2$) \tag{218}

$$\text{shift\_CALC} = \left(\frac{\varphi_{lastN} + \varphi_{last-1N}}{2}\right) + \frac{\pi}{4} + \varphi_{shift} + \frac{3\pi}{2} \times s$$

when locking the CALC_tirgger signal to zero crossings in measurement circuit N; or $$\text{shift\_CALC} = \left(\frac{\varphi_{lastM} + \varphi_{last-1M}}{2}\right) + \frac{\pi}{4} + \varphi_{shift} - \frac{3\pi}{2} \times s \tag{219}$$

when locking the CALC_tirgger signal to zero crossings in measurement circuit M.

If $\varphi 3 < \varphi 4$(or $\varphi 1 < \varphi 2$) \tag{220}

$$\text{shift\_CALC} = \left(\frac{\varphi_{lastN} + \varphi_{last-1N}}{2}\right) - \frac{\pi}{4} + \varphi_{shift} + \frac{3\pi}{2} \times s$$

when locking the CALC_tirgger signal to zero crossings in measurement circuit N; or $$\text{shift\_CALC} = \left(\frac{\varphi_{lastM} + \varphi_{last-1M}}{2}\right) - \frac{\pi}{4} + \varphi_{shift} - \frac{3\pi}{2} \times s \tag{221}$$

when locking the CALC_tirgger signal to zero crossings in measurement circuit M. The change of the sign of the dynamic correction for measurement circuit N and M is related to the fact that the measurements φ3N and φ4N are changing in the opposite direction to the measurements φ3M and φ4M.

Similarly, it is also possible to make more precise adjustments to the phase of the ADC_trigger signals that are used for triggering the ADC conversions in measurement circuit N during the period of time when it is in the ancillary measuring mode. For example, the measurement processing unit 19 can compensate shift_ADCN as follows:

$$\text{shift\_ADCN} = \text{shift\_ADC}_i - (\varphi^F_{Mendi-1} + (L+1/2)*2\pi*s - \varphi^F_{Mendi}) \quad (222)$$

when shift_ADC is updated for measurement circuit N when the polarity+ modulation signal is used (during time interval corresponding to i=5 shown in FIG. 23); and can compensate shift_ADCN as follows:

$$\text{shift\_ADCN} = \text{shift\_ADC}_i + (\varphi^F_{Mendi-1} + (L+1/2)*2\pi*s - \varphi^F_{Mendi}) \quad (223)$$

when shift_ADC is updated for measurement circuit N when the polarity− modulation signal is used (during time interval corresponding to i=6 shown in FIG. 23). Similarly, the measurement processing unit 19 can compensate shift_ADCM as follows:

$$\text{shift\_ADCM} = \text{shift\_ADC}_i + (\varphi^F_{Nendi-1} + (L+1/2)*2\pi*s - \varphi^F_{Nendi}) \quad (224)$$

when shift_ADC is updated for measurement circuit M when the polarity+ modulation signal is used (during time interval corresponding to i=11 shown in FIG. 23); and can compensate shift_ADCM as follows:

$$\text{shift\_ADCM} = \text{shift\_ADC}_i - (\varphi^F_{Nend-1} + (L+1/2)*2\pi*s - \varphi^F_{Nendi}) \quad (225)$$

when shift_ADC is updated for measurement circuit M when the polarity− modulation signal is used (during time interval corresponding to i=12 shown in FIG. 23). The change of the sign of the correction is related to the different direction of the movement of φ3M and φ4M for a moving target 5 in channel M compared to the direction of the movement of φ3N and φ4N for channel N. Such new values of shift_ADC are then further corrected to maintain the above described forbidden zone in which the ADCs 13 are not triggered near the edges of the modulation period $T_{mod}$.

Stabilizing Separation Between Adjacent Measurements

As discussed above, when one measurement circuit is calculating the fine position measurements and the other is calculating the ancillary measurements, the fine target position information is output regularly—once every half modulation period ($T_{mod}$). However, when the measurement circuits N and M are switched over in their roles, the spacing between fine position measurements can change significantly. Such varying separations in the interval between fine position measurements can cause problems for the host. For example, if the position sensor forms part of a control loop, then such variations in the timing between measurements may destabilize the control loop. A relatively simple approach to stabilize the separation between adjacent update events at the point of switching between measurement circuits N and M will now be described for the measurement circuit crossover event shown in the FIG. 23.

Firstly, the measurement processing unit 19 determines the position of the last CALC_trigger event before switching between the measurement circuits has happened. At the interrupt caused by the pol_sw control signal at the boundaries between time intervals i=6 and i=7 before calculating a new value of the parameter shift_CALC, the measurement processing unit 19 determines:

If shift_CALC<π, then shift_CALC=shift_CALC+π

$$\Delta\text{trigger1} = 2\pi - \text{shift\_CALC} \quad (226)$$

The measurement processing unit 19 then determines a new value of shift_CALC using the data φ3N and φ4N measured during the time interval with index i=6 that have just been read from the memory 17-1N into the measurement processing unit 19 at the pol_sw signal edge interrupt event. With this new value of shift_CALC, the measurement processing unit 19 determines:

Δtrigger 2=shift_CALC

If Δtrigger 2>π, then Δtrigger 2=Δtrigger 2−π

If Δtrigger 2<Δφ, then Δtrigger 2=Δtrigger 2+π  (227)

where Δφ is a parameter introduced in software in order to avoid issues in the case, when the usable triggering event for either the positive or negative edge of the refreshed CALC_trigger control signal will be introduced too close to the moment of reloading the timer 105_2 and thus might be entirely missed because during this moment of time the interrupt associated with the edges of the CALC_trigger control signal is disabled. Then the measurement processing unit 19 calculates:

Δtrigger=Δtrigger1+Δtrigger2  (228)

If Δtrigger>π/4, then the measurement processing unit 19 can reload the timer 105_2 and re-install the interrupt to the rising edge of the CALC_trigger control signal in the case if:

Δφ<shift_CALC<π+Δφ  (229)

or otherwise it can re-install the interrupt event to the falling edge of the CALC_trigger control signal.

In the case where Δtrigger>π+π/4, the measurement processing unit 19 introduces an additional data point φN measured for the zero crossing in measurement circuit N in the preceding detection interval. This can be accomplished by introducing a lower priority interrupt to start the processing of the last data value for the data φ3N and φ4N measured during the time interval with index i=6 and just downloaded from the memory 17-1N into the measurement processing unit 19 at the pol_sw signal edge interrupt event. The processing of this data point will start immediately after the processing of the data related to the last CALC_trigger event (which happened during the time interval with i=6) is finished.

In order to take into account that this data point has been measured too much in advance, it is possible to introduce a correction:

$$\varphi^F_{NComp} = \varphi^F_N + (2\pi - \varphi N_{last})*s \quad (230)$$

Another correction to the same value can be introduced to take into account the required time this interrupt will need to wait until the resources of the microcontroller 9 are released from processing the data related to the last CALC_trigger event (which happened during the time interval with i=6):

$$\text{If } 2\pi - \varphi M_{last} < \frac{k\pi}{2}, \text{ then} \quad (231)$$

$$\varphi^F_{Ncorr} = \varphi^F_{NComp} + \left(\frac{k\pi}{2} - 2\pi + \varphi M_{last}\right) \times s$$

where $k\pi/2$ refers to the time (referenced to the period of $T_{mod}$) required by the measurement processing unit 19 to perform calculations at the CALC_trigger event. In this way, the measurement processing unit 19 can introduce an additional calculation point with the raw data measured and processed asynchronously to the edges of the CALC_trigger signal.

In the case where $\Delta\text{trigger} \leq \pi/4$, instead of adding a measurement data point from the previous time interval with i=6, the measurement processing unit 19 skips the first trigger event in the next time interval corresponding to i=7. This is achieved by reversing the polarity of the first interrupt event for the CALC_trigger signal. Thus when re-installing the interrupt, the measurement processing unit 19 locks it to the falling edge of the CALC_trigger signal for:

shift_CALC<$\pi$ or otherwise the measurement processing unit 19 re-installs the interrupt event to the rising edge of the CALC_trigger control signal.

In all cases, the measurement processing unit 19 also sets the flag to identify that the data measured for the fine detection coils during detection interval $\Delta t3$ are ready for further processing as described above. The processing of this data will happen only when the resources of the microcontroller 9 are free from serving other interrupt requests.

By removing one data point at the switch-over event or by adding a data point measured in the previous detection interval, the measurement processing unit 19 keeps the minimum distance between adjacent updates at the switch-over point to the value of $\pi/4$ ($T_{mod}/8$) and the maximum distance between adjacent updates at the switch-over point at $5/4\pi$ ($5T_{mod}/8$). The usual separation between adjacent updates is very close to $\pi$ (i.e. $T_{mod}/2$ as the phase is referenced to the period of modulation $T_{mod}$). A more stable maximum separation between adjacent updates in the measurement system is important when the position sensor is used as part of a control loop, for example feeding back position information so that the controller can take necessary control actions.

Dynamic Correction—Oscillation Removal

Like in the first embodiment, when changing between measurement circuits N and M, jumps in the measured fine position can lead to micro-oscillations in the output reported to the host. In this embodiment, however, there are four different fine positions that are determined from phase measurements $\varphi 3N$, $\varphi 4N$, $\varphi 3M$ and $\varphi 4M$. The micro-oscillations at the point of switching between the results derived from the different measurements are typically caused by different systematic errors in each of the four measurements that have not been removed by the corrections performed above. In order to reduce these micro-oscillations a further calibration procedure should be performed to determine a base line of the remaining systematic error for each of the four different fine position measurements.

The measurement processing unit 19 determines the appropriate corrections to be applied to each measurement using the fine position measurements obtained when the polarity-modulation signal is applied to each measurement circuit N and M and when both measurement circuits are measuring the signals from the fine detection coils 6. With the switching illustrated in FIG. 23, this means that during detection interval $\Delta t4$ the measurement processing unit 19 processes the measurements ($\varphi 3N$, $\varphi 4N$, $\varphi 3M$ and $\varphi 4M$) obtained from both measurement circuits N and M during time interval i=6, to determine a correction for each measurement. Similarly, during detection interval $\Delta t1$ the measurement processing unit 19 processes the measurements ($\varphi 3N$, $\varphi 4N$, $\varphi 3M$ and $\varphi 4M$) obtained from both measurement circuits N and M during time interval i=12, to determine a correction for each measurement. The measurement processing unit 19 is arranged to maintain a running average value of each of these corrections, which are updated during detection intervals $\Delta t1$ and $\Delta t4$.

For example, during detection interval $\Delta t4$, the measurement processing unit 19 can measure the following four fine position measurements (corrected in the manner described above in the previous sections):

$$\varphi_{3N}^F = \varphi 3N + \varphi_{rising-}^N + \frac{k \times \pi \times s}{2} \quad (232)$$

$$\varphi_{4N}^F = \varphi 4N + \varphi_{falling-}^N - \pi + \frac{k \times \pi \times s}{2} \quad (233)$$

$$\varphi_{3M}^F = \frac{\pi}{2} - (\varphi 3M + \varphi_{rising-}^M) + \frac{k \times \pi \times s}{2} \quad (234)$$

$$\varphi_{4M}^F = \frac{\pi}{2} - (\varphi 4M + \varphi_{falling-}^M - \pi) + \frac{k \times \pi \times s}{2} \quad (235)$$

As discussed above, all four of these fine position measurement values will be different because of the different systematic error in each measurement and also because of dynamic changes due to movement of the target 5 with time. In order to remove the dynamic changes, the measurement processing unit 19 synchronizes all four of these calculated values of $\varphi^F$ to the beginning of the modulation period $T_{mod}$:

$$\varphi_{3N}^F = \varphi_{3N}^F - \varphi 3N \times s \quad (236)$$

$$\varphi_{4N}^F = \varphi_{4N}^F - \varphi 4N \times s \quad (237)$$

$$\varphi_{3M}^F = \varphi_{3M}^F - \varphi 3M \times s \quad (238)$$

$$\varphi_{4M}^{FN} = \varphi_{4M}^F - \varphi 4M \times s \quad (239)$$

If in the sequence $\varphi 3$, $\varphi 4$ the larger phase value is followed by the smaller phase value, and the smaller phase value is the last one recorded in the memory 17-1 at the end of the current modulation cycle $T_{mod}$, then it means that the larger phase value was recorded in the previous modulation cycle $T_{mod}$ and no update for this phase value was captured in the current modulation cycle. For instance, this can happen if this larger value was very close to $2\pi$ in the previous modulation cycle and will be detected as a small value close to zero in the next modulation cycle. Therefore, no zero crossing for this particular phase value will be detected in the current modulation cycle. From the point of synchronizing this larger phase value with other measured values of $\varphi^F$, the measurement processing unit 19 adds the value of $2\pi^*s$ to the result calculated above.

For example, if in the sequence $\varphi 3N$, $\varphi 4N$ the value $\varphi 3N$ is larger than $\varphi 4N$, but $\varphi 4N$ is the last data recorded in the memory 17-1N at the end of the current period, then $\varphi 3N$ was recorded in the previous modulation period and thus instead of the formula for $\varphi_{3N}^F$ above, the measurement processing unit 19 uses:

$$\varphi_{3N}^F = \varphi_{3N}^F + (2\pi - \varphi 3N) \times s \quad (240)$$

In a similar manner, if in the sequence $\varphi 3M$, $\varphi 4M$ the value $\varphi 4M$ is larger than $\varphi 3M$, but $\varphi 3M$ is the last data recorded in the memory 17-1M at the end of the current period $T_{mod}$, then $\varphi 4M$ was recorder in the previous modulation period and thus instead of the formula above for $\varphi^F_{4M}$, the measurement processing unit 19 uses:

$$\varphi_{4M}^F = \varphi_{4M}^F + (2\pi + \varphi 4M) \times s \qquad (241)$$

In this way, each fine position measurement has been calculated for the same moment in time corresponding to the beginning of the current modulation period and so all the differences between them is caused by the different systematic errors.

One systematic error in each channel is related to the breakthrough offset from the excitation coil 2 to each detection coil 6 and the slight difference which this error can cause to the measurements in each separate measurement circuit N and M. As described above, this breakthrough offset can be corrected in the measurements obtained using measurement circuit N using:

$$\varphi^F_{Corr} = \arctan\left(\frac{\left(\sin(\varphi^F) - \frac{O^{FS} \times V^{EX}}{A_F}\right)}{\left(\cos(\varphi^F) - \frac{O^{FC} \times V^{EX}}{A_F}\right)}\right) \qquad (242)$$

where $A_F$ is the peak-to-peak amplitude of the $AF_{out}$ signal obtained when measuring the signals from the fine detection coil in a measurement circuit; and $V^{EX}$ is the peak-to-peak amplitude of the $AF_{outN}$ signal when the excitation reference signal is measured in the same measurement circuit. Accordingly all four fine position measurements are corrected in this way to remove the direct breakthrough offset from the excitation channel:

$$\varphi^F_{Corr3N} = \arctan\left(\frac{\left(\sin(\varphi^F_{3N}) - \frac{O_N^{FS} \times V_N^{EX}}{A_{FN}}\right)}{\left(\cos(\varphi^F_{3N}) - \frac{O_N^{FC} \times V_N^{EX}}{A_{FN}}\right)}\right) \qquad (243)$$

$$\varphi^F_{Corr4N} = \arctan\left(\frac{\left(\sin(\varphi^F_{4N}) - \frac{O_N^{FS} \times V_N^{EX}}{A_{FN}}\right)}{\left(\cos(\varphi^F_{4N}) - \frac{O_N^{FC} \times V_N^{EX}}{A_{FN}}\right)}\right) \qquad (244)$$

$$\varphi^F_{Corr3M} = \arctan\left(\frac{\left(\sin(\varphi^F_{3M}) - \frac{O_M^{FS} \times V_M^{EX}}{A_{FM}}\right)}{\left(\cos(\varphi^F_{3M}) - \frac{O_M^{FC} \times V_M^{EX}}{A_{FM}}\right)}\right) \qquad (245)$$

$$\varphi^F_{Corr4M} = \arctan\left(\frac{\left(\sin(\varphi^F_{4M}) - \frac{O_M^{FS} \times V_M^{EX}}{A_{FM}}\right)}{\left(\cos(\varphi^F_{4M}) - \frac{O_M^{FC} \times V_M^{EX}}{A_{FM}}\right)}\right) \qquad (246)$$

Before processing these values further, the measurement processing unit 19 checks each value in the case a $2\pi$ jump has been introduced in to some measurements. For instance, some measurements calculated above can be positive but close to zero and some can be just slightly below $2\pi$. To correct for this $2\pi$ jump, the measurement processing unit 19 finds the smallest of these four answers $\varphi^F_{min}$ and checks for each corrected fine position measurement $\varphi^F_{corr(j)}$ for j=3N, 4N, 3M and 4M:

$$\text{If } (\varphi_{Corr(j)}^F - \varphi_{min}^F) > \pi, \text{ then } \varphi_{Corr(j)}^F = \varphi_{Corr(j)}^F - 2\pi \qquad (247)$$

The measurement processing unit 19 then determines the largest of these four answers $\varphi^F_{max}$ and the new value of $\varphi^F_{min}$ and then determines the total spread of the four measurements:

$$\Delta_{max} = \varphi_{max}^F - \varphi_{min}^F \qquad (248)$$

If $\Delta_{max}$ is above a threshold value, then this indicates that there has been an error in the measurements and so the measurement processing unit 19 generates and outputs an error flag to the host interface 21 and stops outputting measurements until $\Delta_{max}$ falls below another threshold (which may be the same as the first threshold). The measurement processing unit 19 then determines the mean value of the four measurements and the deviation of each measurement from that mean value:

$$\varphi_{mean}^F = \tfrac{1}{4}(\varphi_{Corr3N}^F + \varphi_{Corr4N}^F + \varphi_{Corr3M}^F + \varphi_{Corr4M}^F) \qquad (249)$$

$$\Delta\varphi_{Corr3N}^F = \varphi_{Corr3N}^F - \varphi_{mean}^F \qquad (250)$$

$$\Delta\varphi_{Corr4N}^F = \varphi_{Corr3N}^F - \varphi_{mean}^F \qquad (251)$$

$$\Delta\varphi_{Corr3M}^F = \varphi_{Corr3M}^F - \varphi_{mean}^F \qquad (252)$$

$$\Delta\varphi_{Corr4M}^F = \varphi_{Corr4M}^F - \varphi_{mean}^F \qquad (253)$$

Once calculated, these deviations are stored as correction values that are then applied to subsequent corresponding measurements obtained in different modulation periods. As discussed above, the measurement processing unit 19 updates these deviation (correction) values during each detection interval $\Delta t1$ and $\Delta t4$ (for example by maintaining a running average of these deviations ($\Delta\varphi^F_{Corr(j)}$) to filter out possible noise). The final corrections for each of the four possible measurements are shown below:

$$\varphi^F_{3N} = \varphi 3N + \varphi^N_{rising-} + \frac{k \times \pi \times s}{2} \qquad (254)$$

$$\varphi^F_{Corr3N} = \arctan\left(\frac{\left(\sin(\varphi^F_{3N}) - \frac{O_N^{FS} \times V_N^{EX}}{A_{FN}}\right)}{\left(\cos(\varphi^F_{3N}) - \frac{O_N^{FC} \times V_N^{EX}}{A_{FN}}\right)}\right) \qquad (255)$$

$$\varphi^F_{Comp3N} = \varphi^F_{Corr3N} - \Delta\varphi^F_{Corr3N} \qquad (256)$$

and/or $$\varphi^F_{4N} = \varphi 4N + \varphi^N_{falling-} - \pi + \frac{k \times \pi \times s}{2} \qquad (257)$$

$$\varphi^F_{Corr4N} = \arctan\left(\frac{\left(\sin(\varphi^F_{4N}) - \frac{O_N^{FS} \times V_N^{EX}}{A_{FN}}\right)}{\left(\cos(\varphi^F_{4N}) - \frac{O_N^{FC} \times V_N^{EX}}{A_{FN}}\right)}\right) \qquad (258)$$

$$\varphi^F_{Comp4N} = \varphi^F_{Corr4N} - \Delta\varphi^F_{Corr4N} \qquad (259)$$

and/or $$\varphi^F_{3M} = \frac{\pi}{2} - (\varphi 3M + \varphi^M_{rising-}) + \frac{k \times \pi \times s}{2} \qquad (260)$$

$$\varphi^F_{Corr3M} = \arctan\left(\frac{\left(\sin(\varphi^F_{3M}) - \frac{O_M^{FS} \times V_M^{EX}}{A_{FM}}\right)}{\left(\cos(\varphi^F_{3M}) - \frac{O_M^{FC} \times V_M^{EX}}{A_{FM}}\right)}\right) \qquad (261)$$

-continued $$\varphi_{Comp3M}^{F} = \varphi_{Corr3M}^{F} - \Delta\varphi_{Corr3M}^{F} \quad (262)$$

and/or $$\varphi_{4M}^{F} = \frac{\pi}{2} - (\varphi 4M + \varphi_{falling-}^{M}) + \frac{k \times \pi \times s}{2} \quad (263)$$

$$\varphi_{Corr4M}^{F} = \arctan\left(\frac{\left(\sin(\varphi_{4M}^{F}) - \frac{O_{M}^{FS} \times V_{M}^{EX}}{A_{FM}}\right)}{\left(\cos(\varphi_{4M}^{F}) - \frac{O_{M}^{FC} \times V_{M}^{EX}}{A_{FM}}\right)}\right) \quad (264)$$

$$\varphi_{Comp4M}^{F} = \varphi_{Corr4M}^{F} - \Delta\varphi_{Corr4M}^{F} \quad (265)$$

Phase Adjustment of the Excitation Signal

As explained above with reference to FIG. 13, for many types of ratiometric sensors the phase of the measured signal from the target and the phase of the breakthrough offset voltage induced in the detection coils directly from the excitation coil are equal to each other (or are separated by π radians). This happens for example when the target is a piece of metal or a short circuit coil or the like. Other types of sensors might aim to introduce a 90 degree phase shift between the signals induced in the detection coil by the target 5 and the breakthrough signals induced in the detection coil by the excitation coil directly. One example of such a sensor is a resonant target inductive sensor in which an additional 90 degree phase shift of the current in the resonant coil of the target at the resonant frequency helps to achieve the required phase shift between the desired signals and the direct breakthrough signals. In order to obtain the best possible performance out of such resonant target sensors, a precise phase tuning of the measurement circuit should be performed. As will be explained below, such precise phase tuning can allow the measurement circuitry 25 to accurately align the phase of the demodulation clock ex_shifted so that it is orthogonal (90 degree phase shifted) to the direct breakthrough offset signal induced in the detection coils 4, 6 by the excitation signal that is applied to the excitation coil 2.

In order to perform such phase tuning in this fifth embodiment, the measurement processing unit 19 first measures the phase shift between the excitation reference signal and the demodulation clock ex_shifted. This is achieved by introducing two demodulation clocks ex_0 and ex_90 shifted between each other by 90 degrees. As shown in the FIG. 27 the ratiometric measurement is organised in such detection interval so that the excitation reference signal is always selected by the multiplexer 57. Instead of selecting two different inputs that are multiplexed together through the demodulating switch 56, only the excitation reference signal is applied to the input of the demodulating switch 56; and at the times when the two inputs were multiplexed, the two different demodulation clocks ex_0 or ex_90 are applied to the demodulating switch 56 as the clock ex_shifted. In this way two ratiometric signals, signal one—Vref demodulated with the demodulation clock ex_90, and signal two—Vref demodulated with the demodulation clock ex_0, are multiplexed in time and mixed together. The demodulation of the signal Vref with the demodulation clock ex_90 gives the amplitude Vref*sin($\varphi^{Ref}$), where $\varphi^{Ref}$ is the phase shift between the input excitation reference signal and the clock ex_0. The demodulation of the signal Vref with the demodulation clock ex_0 gives the amplitude Vref*cos($\varphi^{Ref}$). Thus the composite signal at the input of the amplification and filtering circuitry will be equal to:

$$V^{Ref}\sin(\varphi^{Ref})\cos\left(\left[\frac{2\pi}{T_{mod}}\right]t\right) + V^{Ref}\cos(\varphi^{Ref})\sin\left(\left[\frac{2\pi}{T_{mod}}\right]t\right) = \quad (266)$$

$$V^{Ref}\sin\left(\left[\frac{2\pi}{T_{mod}}\right]t + \varphi^{Ref}\right)$$

After passing through the amplification and filtering circuitry 83, the signal becomes:

$$AF_{out} = Gain \times V^{Ref}\sin\left(\left[\frac{2\pi}{T_{mod}}\right]t + \varphi^{Ref} + \varphi\right) = \quad (267)$$

$$V_{0}^{Ref}\sin\left(\left[\frac{2\pi}{T_{mod}}\right]t + \varphi^{Ref} + \varphi\right)$$

Therefore, by mixing the excitation reference signal through the measurement circuit N or M using these two clocks, the measurement processing unit 19 has determined a much lower intermediate frequency signal (at the frequency corresponding to the modulation period $T_{mod}$) that has the same phase as the input high frequency excitation reference signal applied at the input of the measurement circuit N or M (plus the phase offset (φ) introduced by the measurement circuit). This makes it much easier to measure the phase with the timers 115 rather than trying to measure the phase of the high frequency reference signal directly. The measurement processing unit 19 then determines the value of $\varphi^{Ref}$ by using a phase measurement of $AF_{out}$ obtained when the polarity– modulation signal is being used and a phase measurement of $AF_{out}$ obtained when the polarity+ modulation signal is being used. After the value of the $\varphi^{Ref}$ is measured in each of the two measurement circuits N and M, the measurement processing unit 19 determines the mean value:

$$\varphi_{mean}^{Ref} = \frac{\left(\varphi_{N}^{Ref} + \varphi_{M}^{Ref}\right)}{2} \quad (268)$$

and then the measurement processing unit 19 stabilizes this value close to a desired optimum value $\varphi^{Ref}_{opt}$ using a software feedback loop that controls the value of the DAC voltage that is applied to the comparator 91 (shown in FIG. 13), in a similar manner to the procedure described above with reference to FIGS. 14a and 14b.

At the design stage of the sensor, the impedance Z shown in FIG. 13 should be chosen so that the reference excitation voltage presented to the measurement circuitry 25 has approximately the desired optimum phase with regard to the excitation breakthrough signal. For instance it might be possible to have the phase of the reference excitation signal to be close to the phase of the direct breakthrough signal. In the case when the direct breakthrough signal is about 90 degrees shifted from the signals induced by the resonant target 5 in the detection coils 4 and 6, the $\varphi^{Ref}_{opt}$ value will also be close to 90 degrees. The interplay between the imaginary and real parts of the impedance Z allows the sensor designer to be able to tune the phase of $\varphi^{Ref}_{opt}$ within a large band without affecting the actual phase of the signals in the sensing channels. Thus the most appropriate value for $\varphi^{Ref}_{opt}$ can be selected which achieves the most accurate sensor output.

Errors in measuring the phase $\varphi^{Ref}$ are mainly caused by the inaccuracy of the actual phase shift between the 90 degree demodulation clock ex_90 and the zero degree demodulation clock ex_0. If the misalignment of the orthogonality between ex_0 and ex_90 clocks is given by:

$$\varphi_{error}^{Ref} = \frac{\pi}{2} - (\varphi_{90}^{Ref} - \varphi_0^{Ref}) \qquad (269)$$

then the error of the measurement of $\varphi^{Ref}$ caused by using non orthogonal clocks for demodulating the reference signal is equal to:

$$\Delta\varphi_{error}^{Ref} = \varphi_{meas}^{Ref} - \varphi^{Ref} = \arctan\left(\frac{\sin(\varphi^{Ref} + \varphi_{error}^{Ref})}{\cos(\varphi^{Ref})}\right) - \varphi^{Ref} = \frac{\varphi_{error}^{Ref} \times (1 + \cos(2\varphi^{Ref}))}{2} \qquad (270)$$

Therefore, in order to reduce the absolute error $\Delta\varphi_{error}^{Ref}$ in the measurements of $\varphi^{Ref}$ it is best to tune the impedance Z in the excitation circuitry so that the $\varphi_{opt}^{Ref}$ value is close to 90 degrees. This will reduce the error $\Delta\varphi_{error}^{Ref}$ practically to zero even for relatively large values of $\varphi_{error}^{Ref}$. Essentially in this case the phase of the excitation signal is tuned so that the reference signal Vref measured with the ex_0 demodulation clock is very close to zero and the measurement algorithm becomes very close to the approach with zero voltage tuning described in the second embodiment with reference to the FIG. 14.

In order to identify the most appropriate value of $\varphi_{opt}^{Ref}$, the measurement processing unit 19 can be switched into the breakthrough offset measurement mode shown in the FIG. 26. However this time when selecting the excitation reference signal (i.e. when the in3 control signal shown in FIG. 26 is high) the demodulation clock ex_shifted is switched from the ex_0 demodulation clock to the ex_90 demodulation clock as further shown in FIG. 28. This allows the measurement processing unit to measure the following ratiometric values:

$$Ratio1 = \frac{V^{FS}}{(V^{Ref}\sin(\varphi^{Ref}))} \qquad (271)$$

$$Ratio2 = \frac{V^{FC}}{(V^{Ref}\sin(\varphi^{Ref}))} \qquad (272)$$

$$Ratio3 = \frac{V^{CC}}{(V^{Ref}\sin(\varphi^{Ref}))} \qquad (273)$$

$$Ratio4 = \frac{V^{CC}}{(V^{Ref}\sin(\varphi^{Ref}))} \qquad (274)$$

These ratiometric measurements should be made without the target 5 being present near the excitation coil 2 and the detection coils 4 and 6. A set of these ratiometric measurements can be made with different values of the DAC voltage applied to the excitation circuitry 23 of FIG. 13, which will correspond to the different phases of the excitation signal ex_clock in respect of the demodulation clock ex_0. By plotting all the ratiometric answers obtained as a function of the DAC voltage it is possible to find the optimum value DAC_optimum of the DAC voltage for which the direct breakthrough signals in the different detection coil signals are going through the zero value and are changing sign. Of course this procedure will not work if no actual breakthrough offset is present in the detection coil signals, i.e. when the detection channels of the sensor are well balanced to the excitation channel. In such a case, it might be appropriate to provide asymmetrically some conductive objects near the excitation coil 2 of the sensors in order to break the balance of the detection coils to the excitation coil in order to obtain a more sensitive response to the phase tuning of the ex_clock signal in respect of the demodulation clock ex_0. The microcontroller 9 can tune the value of the DAC voltage in a semi-automatic manner in order to reduce the value of the following breakthrough in the fine detection coil signals in the channels N and M:

$$\text{Breakthrough} = \sqrt{Ratio1_N^2 + Ratio2_N^2 + Ratio1_M^2 + Ratio2_M^2} \qquad (275)$$

The resulting value $DAC_{opt}$ corresponds to the global minimum of this "breakthrough" parameter.

Once the breakthrough offset calibration mode has ended, the value of $\varphi_{opt}^{Ref}$ is measured in the main measurement mode with the corresponding value of $DAC_{opt}$ applied to the excitation circuitry of FIG. 13. If necessary, the real and imaginary parts of the Z-impedance of FIG. 13 can be adjusted to make the value of $\varphi_{opt}^{Ref}$ to be closer to 90 degrees. In this case the calibration procedure to find $DAC_{opt}$ should be repeated again to identify the new $\varphi_{opt}^{Ref}$ value.

The same measurements for determining the $\varphi_{opt}^{Ref}$ value can be performed on similar sensors or for the same sensor with a different arrangement of conductive objects around its sensor head in order to find a common base $\varphi_{opt}^{Ref}$ for all variations in the mechanical sensor build and electronics build for this family of sensors. It may be possible to use the same value of $\varphi_{opt}^{Ref}$ for all sensors of the same family regardless of any small variations from one sensor to another sensor in the family. The finally optimized target value of $\varphi_{opt}^{Ref}$ can be explicitly coded in the main program of the microcontroller 9 or stored in the non-volatile memory of the microcontroller 9. In the main measurement mode the phase $\varphi^{Ref}$ should be continuously tuned to $\varphi_{opt}^{Ref}$ by using the software feedback loop as shown in FIG. 14b. Such sensors can be further produced without fitting the dedicated hardware electronics specifically designed for running the breakthrough offset measurement mode shown in the FIG. 25 and FIG. 28. These sensors can work without any specific recalibration for zero breakthrough offset from the excitation coil. No software compensation for breakthrough offset is applied in such case by software during the normal mode of operation. The phase tuning of $\varphi^{Ref}$ towards the value of $\varphi_{opt}^{Ref}$ is constantly performed to ensure a relatively low level of the direct breakthrough from the excitation coil 2 to the main detection coils 4, 6.

However the possible variation of $\varphi_{opt}^{Ref}$ with the sensor build and electronics build can lead to small non-compensated breakthrough which might affect the accuracy of the sensor in the most demanding applications. It is clearly not appropriate to tune the value of $\varphi_{opt}^{Ref}$ for each sensor again as it can lead to erroneous adjustments for well balanced sensors and will fail to reject breakthrough caused by metallic objects if such objects are located near the sensor head at a later point in time. Therefore, it is more appropriate to determine the values of Ratio1, Ratio2, Ratio3 and Ratio4 shown above in order to use them in a software algorithm for compensation of the breakthrough offset. In particular, the measurement processing unit 19 can remove the direct breakthrough offset using a similar technique to that described above:

$$V^{FS}_{corr} = A_F \sin(\varphi^F) - O^{FS} \times V^{EX} \qquad (276)$$

$$V^{FC}_{corr} = A_F \cos(\varphi_F) - O^{FS} \times V^{EX} \qquad (277)$$

where $A_F$ is the peak-to-peak amplitude of the $AF_{out}$ signal when the signals from the fine sine detection coil 6-1 and the fine cosine detection coil 6-2 are selected by the multiplexer 55-1 in the measurement circuit 51, and $V^{EX}$ is the peak-to-peak amplitude of the $AF_{out}$ signal when the excitation reference signal is selected by the multiplexer 57 in the measurement circuit 51 and the two separate demodulation clocks ex_0 and ex_90 are used as the ex_shifted demodulation clock in a time division multiplexing manner as discussed above. Thus, the breakthrough corrected fine position of the target 5 can be determined from:

$$\varphi^F_{corr} = \arctan\left(\frac{V^{FS}_{corr}}{V^{FC}_{corr}}\right) = \arctan\left(\frac{\left(\sin(\varphi^F) - \frac{O^{FS} \times V^{EX}}{A_F}\right)}{\left(\cos(\varphi^F) - \frac{O^{FC} \times V^{EX}}{A_F}\right)}\right) \qquad (278)$$

It is worth mentioning that in this case the amplitude $V^{EX}$ is equal to:

$$V^{EX} = V_0^{Ref}$$

Thus, the coefficients $O^{FS}$ and $O^{FC}$ can be written in terms of the breakthrough between the excitation coil 2 and the corresponding sine and cosine detection coil as follows:

$$O^{FS} = \frac{B^{FS}}{V_0^{Ref}} = \text{Ratio } 1 \times \sin(\varphi^{Ref}) \qquad (279)$$

$$O^{FC} = \frac{B^{FC}}{V_0^{Ref}} = \text{Ratio } 2 \times \sin(\varphi^{Ref}) \qquad (280)$$

Similarly for the coarse breakthrough offset coefficients:

$$O^{CS} = \frac{B^{CS}}{V_0^{Ref}} = \text{Ratio } 3 \times \sin(\varphi^{Ref}) \qquad (281)$$

$$O^{CC} = \frac{B^{CC}}{V_0^{Ref}} = \text{Ratio } 4 \times \sin(\varphi^{Ref}) \qquad (283)$$

Thus the coefficients $O^{FS}$, $O^{FC}$, $O^{CS}$ and $O^{CC}$ can be determined during the breakthrough offset calibration mode and stored in the non-volatile memory 29 of the microcontroller. The combination of the active tuning of the phase difference between the excitation signal ex_clock and the demodulation clock ex_0 and software compensation of the remaining small breakthrough offset from the excitation coil 2 into the detection coils 4, 6 provides the best balanced ratiometric measurement for resonant target sensors. In such an embodiment the well balanced compensated signals in the measurement channels will be entirely determined by the position of the target 5.

Charge Injection

One of the remaining issues with the fifth embodiment described above is related to the less than ideal properties of the relatively cheap but fast multiplexors 55, 56 and 57 used in the measurement circuits 51. The choice of appropriate multiplexers is further restricted if the sensor electronics is designed for industrial applications where the sensor must be able to operate at temperatures up to 105° C. Multiplexers can introduce a relatively large crosstalk between the digital control signals and the input analogue signals which usually results in a voltage spike induced at the edges of the switching control signals used to switch the multiplexer off and on. The effect of such crosstalk between the analogue and digital signals can be relatively low, but it can be a significant problem for measurement systems aimed at measuring low amplitude signals or aimed at achieving high accuracy.

The control signals used to switch the multiplexers in the measurement circuitry 25 can include frequency components in the pass-band of the amplification and filtering circuitry 83 which can cause interference with the measurement results. For instance, the polarity modulation signal shown in FIG. 5 and used for controlling the phase of the demodulation signal has an AC frequency component which is two times higher than the frequency of the modulation defined by the $T_{mod}$ period (see FIG. 17). A similar double frequency component is present in the control signals in1 used in the main measurement mode (FIG. 17) or in the control signal in3 used in the breakthrough offset calibration mode (FIG. 26). Unfortunately, this means that the set of multiplexers used for the time division multiplexing of the required input signals in the measurement circuits N and M, simultaneously acts as an unwanted AC generator providing frequency components in the pass band of the amplification and filtering circuitry 83. Because of the differential nature of the measurement circuits N and M, these unwanted signals are reduced to a certain extent. However, some relatively simple changes to the measurement circuits N and M can help to remove the problem.

In particular, FIG. 29 illustrates a modified measurement circuit 51' in which the polarity modulation signal has been removed from the demodulation switch 56 and moved to the front-end multiplexors 55'-1 and 55'-2. At the same time, a new enable control signal (chopper shown in FIG. 30) is introduced to control the demodulation multiplexer 56 in order to disconnect the demodulation switch 56 from the amplification and filtering circuit 83 for a short time at any rising edge of a master clock signal that is used to generate the in1, in2, in3 and polarity control signals. During some of these short times when the demodulation switch 56 is disconnected from the amplification and filtering circuit 83 switching events will happen in the front end multiplexers 55' and 57, but any noise caused by the switching events will be blocked from reaching the amplification and filtering circuit 83 because of the disconnection of the demodulating switch 83 by the chopper control signal. However, there will be moments in time when no switching at the front-end multiplexers 55' or 57 is performed, nevertheless the regular chopper control signal still continues to disconnect the demodulation switch 56 from the amplification and filtering circuit 83 at these rising edges of the master clock signal. Therefore, at first sight, this chopper control signal seems to make the charge injection worse—as the switching of the demodulation switch 56 by the chopper control signal will lead to charge injection into the amplification and filtering circuit 83 at times when there is no such charge injection due to the switching of the multiplexors 55' and 57. Indeed, the total amount of charge injection associated with the switching in the multiplexors utilized in the measurement circuit 51' of this alternative circuit design is actually increased by the introduction of the chopper control signal. However, the frequency spectrum of this charge injection signal is now shifted towards higher frequencies. In particular, there will be a strong peak in the Fourier spectrum of the self-noise of the demodulation switch 56 associated with the charge injection from the chopper control signal at the master clock frequency; and the demodulation control signal ex_shifted will also introduce a strong peak at the demodulation frequency. However both of these frequencies are located far away from the high frequency corner of the bandpass filter 87 of the amplification and filtering circuit 83 and therefore are strongly suppressed in the $AF_{out}$ signal output from the measuring circuit 51'.

FIGS. 30 and 31 show an example of some of the signals used in this alternative embodiment, which utilizes the chopper control signal in order to stop unwanted AC generation from the multiplexors in the pass band of the amplification and filtering circuit 83. As can be seen, the same set of control signals polarity, in1, in2, and in3 are used to control all required switching of the excitation reference signal and of the signals from the detection coils 4, 6 through the measurement circuit 55'. The effect of using a chopper control signal is presented by the gaps in the timeline when no signals are connected to the amplification and filtering circuitry 83.

Automatic Gain Control

The embodiments described above operate with a fixed gain in the amplification and filtering circuit 83. However, in some sensor designs, the target 5 is able to move away from the sensor coils 2, 4 and 6 in a z-direction (out of the page in FIG. 2) and the signal strength in the detection coils 4, 6 can change by about an order of magnitude as a result. In an alternative embodiment, the gain of the amplification and filtering circuit 83 is allowed to vary so that the sensor works in a stable manner with the input signals ranging from large amplitude to small amplitude. The variable gain section allows the gain of the amplification and filtering circuit 83 to be increased when there is a large air-gap between the target 5 and the sensor coils 2, 4 and 6. The adjustment of the gain of such a system should be performed synchronously with the switching between the first part and the second part of a detection cycle T_dc (shown in the FIG. 23). The switching of the gain should be made at the beginning of the first part for measurement circuit N or/and at the beginning of the second part for the measurement circuit M. In this way, the measurement circuit will perform a full cycle of ancillary measurements immediately after the change in the gain and therefore will be fully recalibrated by the time that it is switched to the continuous measurement mode for updating the target position ($\varphi^F$) at each zero crossing event $\varphi 3$ and $\varphi 4$.

The dynamic range of the change in the gain of the system is restricted by the requirement to measure the reference excitation signal both with the highest gain settings and with the lowest gain settings. Thus a dynamic range of about eight times for the variable gain of the system should be a reasonable compromise. The decision algorithm for changing the gain of the amplification and filtering circuit 83 should have some built-in hysteresis and is controlled by the measured peak-to-peak amplitude of the signal AF related to the measurements of the signals obtained from the fine detection coils 6.

SIXTH EMBODIMENT

In the above embodiments, two independent measurement circuits 51-1 and 51-2—measurement circuit N and measurement circuit M—were used in order to provide a measurement system that is capable of performing self-calibration of each individual measurement circuit whilst also providing a relatively high update rate of measurement outputs from the sensor inputs. A sixth embodiment will now be described that uses three independent measurement circuits 51 and that increases the update rate of the measurement outputs whilst also allowing for measurement circuit calibration. FIG. 32 is a schematic block diagram illustrating the main components of the position sensor 1 used in this sixth embodiment to sense the position of a target (not shown). As can be seen from a comparison of FIGS. 1 and 32, the position sensor circuitry in this embodiment has an additional sample switching circuitry block 15 that is used to assist the operation of the ADC 13, which, in this embodiment, is a three channel, relatively slow (but inexpensive), delta-sigma ADC commonly found in microcontrollers 9.

Measurement Circuits

FIG. 33 illustrates the design of the measurement circuitry 25 used in this embodiment, which has two measurement circuits 51-3 (also referred to as measurement circuit N1) and 51-4 (also referred to as measurement circuit N2) that are dedicated to providing measurements from a respective one of the sensor inputs; and one measurement circuit 51-5 (also referred to as measurement circuit M) that receives and provides measurements from all the sensor inputs. More specifically, measurement circuit N1 is dedicated to obtaining measurements of the fine sine sensor input received on sensor inputs 1+/1−; measurement circuit N2 is dedicated to obtaining measurements of the fine cosine sensor input received on sensor inputs 2+/2−; and measurement circuit M obtains measurements from all of the sensor inputs 1+/1−, 2+/2, 3+/3−, 4+/4− and 5+/5−. The outputs from the three measurement circuits 51 are input to the sample switching circuitry 15 and from there are converted into digital measurements by the ADC 13 for subsequent processing by the measurement processing unit 19 (not shown in FIG. 33).

As will be explained in more detail below, the measurement circuitry 25 is designed so that the voltage $V^{FS}$ induced between sensor inputs 1+/1− can be measured by measurement circuit N1 and measurement circuit M around the same point in time so that the microcontroller 9 can determine a difference in the analogue gains between measurement circuit N1 and measurement circuit M. Similarly, the measurement circuitry 25 is designed so that the voltage $V^{FC}$ induced between the sensor inputs 2+/2− can be measured by measurement circuit N2 and measurement circuit M around the same point in time so that the microcontroller 9 can determine a difference in the analogue gains between measurement circuit N2 and measurement circuit M. Together these differences can then be used to remove the effects of any differences in gain between measurement circuit N1 and measurement circuit N2 and thus allow for the accurate determination of the target position (using the ratiometric calculation $\varphi^F = \arctan(V^{FS}/V^{FC})$) using measurements obtained from the two different measurement circuits N1 and N2.

As will become apparent from the explanation given below, since the measurement circuits N1 and N2 do not switch between different sensor inputs, this sixth embodiment allows much more filtering of external and internal noise compared to the first embodiment described above. In this regard, the sixth embodiment is quite similar to the fifth embodiment in which the high frequency corner of the amplification and filtering circuitry 83 is set at a relatively low value very close to the intermediate modulation frequency (equal to the frequency of the polarity control signal). Similarly to the fifth embodiment, this sixth embodiment allows the ratiometric calculation to be updated several times during each period of the polarity control signal. In the specific example described below, the microcontroller 9 updates the ratiometric calculation of of four times during each period of the polarity control signal. This update rate is two times faster than the update rate achieved in the fifth embodiment, but it has a different set of trade-offs. The actual resolution of the measurements achieved in this embodiment is fully determined by the absolute resolution of the ADC 13. The resolution of the measurements achieved in the fifth embodiment is fully determined by the ratio between the update rate frequency and the clock frequency of the capture registers of the timer 105 in the microcontroller 9. Taking into account the typical performance of the currently available microcontrollers 9, at update rate frequencies below 32 kHz, the fifth embodiment provides a better resolution than that provided by the sixth embodiment. Also, as the fifth embodiment uses only two measurement circuits (compared to the three measurement circuits of the sixth embodiment), it provides a significantly cheaper solution, which is more appropriate for applications where the circuitry is integrated into a mixed signal ASIC. However, at very high update rates, such as at a 250 kHz update rate, which are desirable for fast rotary sensors, the resolution of the fifth embodiment drops substantially, whereas the resolution of the sixth embodiment does not change.

FIG. 34 shows a preferred design of the measurement circuits N1 and N2 that is used in this embodiment. As each of the measurement circuits N1 and N2 only receives the sensor signal from one of the detection coils 4, there is no need for the multiplexing switches 55 used in the measurement circuits 25 of the first embodiment (cf FIG. 5) and the input signal is applied directly to the demodulating switch 56. Thus, in measurement circuit N1, the fine sine signal from sensor inputs 1+/1− is applied to the input of the demodulating switch 56-3 and in measurement circuit N2, the fine cosine signal from sensor inputs 2+/2− is applied to the input of the demodulating switch 56-4. As before, the demodulating switch 56 effectively multiplies the input sensor signal with a demodulating control signal (demod_N1/demod_N2) which includes a component (ex_shifted) that demodulates the sensor signal and a respective polarity control signal (polarity_N1/polarity_N2) that re-modulates the sensor signal onto an intermediate modulation frequency. The signal output from each demodulation switch 56 is then input into a respective amplification and filtering circuit 83 (83-3 in measurement circuit N1 and 83-4 in measurement circuit N2). The operation of the demodulating switch 56 and the amplification and filtering circuit 83 in this embodiment is substantially the same as in the first embodiment and will not be described further.

However, an additional control signal (en_N1 for measurement circuit N1 and en_N2 for measurement circuit N2) is provided by the microcontroller 9 for each measurement circuits N1 and N2, to enable and disable the operation of the corresponding demodulating switch 56. The control signal en_N1 is used, effectively, to disconnect the fine sine sensor signal on inputs 1+/1− from measurement circuit N1 in order to allow the time division multiplexing of the fine sine sensor signal through measurement circuit M as well. Similarly, control signal en_N2 is used, effectively, to disconnect the fine cosine sensor signal on inputs 2+/2− from measurement circuit N2 in order to allow the time division multiplexing of the fine cosine sensor signal through measurement circuit M as well.

FIG. 35 shows the form of the measurement circuit M used in this embodiment. As can be seen by comparing FIG. 35 with FIG. 5, measurement circuit M is substantially the same as the measurement circuit used in the first embodiment, except that a control signal en_M is provided that is used, effectively, to disconnect the sensor inputs from measurement circuit M. By making the en_M control signal the reverse of en_N1 and en_N2, conflicts resulting from measurement circuit M trying to process the signal from the fine sine or the fine cosine sensor inputs at the same time as measurement circuit N1/N2 can be avoided. The remaining elements of measurement circuit M are substantially the same as in the first embodiment and so will not be described in further detail.

Sample Switching Circuitry

FIG. 36 shows a preferred design for the sample switching circuitry 15 which is used with the relatively slow three channel delta-sigma ADC 13 which has three independent ADC channels shown as ADC 13-3, 13-4 and 13-5 in FIG. 36. The signals (AF_out) from the three measurement circuits are stored onto a respective one of two capacitors C1 and C2, depending on the position of the corresponding switch 151-3, 151-4 or 151-5. In this embodiment, during half the period of the polarity control signal, the signal AF_out is stored onto capacitor C1 and then during the subsequent half period of the polarity control signal, the signal AF_out is stored onto capacitor C2. The exact timing of the switching between the capacitors is controlled by the control signals sample_swN1 for measurement circuit N1, sample_swN2 for measurement circuit N2 and sample_swM for measurement circuit M. These control signals have the same period as the polarity control signals but are phase shifted relative thereto so that switching between capacitors C1 and C2 happens near the point in time when the corresponding amplified and filtered signal AF_out is at its maximum and minimum values; and this timing depends on the phase shift introduced by the corresponding amplification and filtering circuit 83 and is determined experimentally in advance. Some variation of the phase shift introduced by the different measurement circuits 51 caused by the tolerance of the electronic components utilised in the amplification and filtering circuit 83 will not matter as it will effectively change the relative gains of the measurement circuits and the processing of the measurements by the measurement processing unit 19 (that will be described below) is designed to remove the effects of gain variations between the measurement circuits 51.

The control signals sample_swN1, sample_swN2 and sample_swM also control which capacitor C1 or C2 is connected to the corresponding ADC channel 13-3, 13-4 or 13-5, via the switches 157-3, 157-4 and 157-5. The switches 151 and 157 and/or the connections from them to the capacitors C1 and C2 are arranged so that when the signal AF_out is being stored onto capacitor C1, capacitor C2 is connected to the corresponding ADC channel 13-3, 13-4 and 13-5 and vice versa.

As shown in FIG. 36, the ADC channels 13-3, 13-4 and 13-5 are triggered by the control signals ADC_triggerN1, ADC_triggerN2 and ADC_triggerM respectively. In this embodiment, these control signals have twice the frequency as the sample_sw control signals and are phase delayed relative to the corresponding sample_sw control signal so that: i) after every time the corresponding switching circuit 151 switches from capacitor C1 to capacitor C2, the voltage level stored on capacitor C1 is converted into a digital value and stored in memory 17 for processing by the measurement processing unit 19; and ii) after every time the corresponding switching circuit 151 switches from capacitor C2 to capacitor C1, the voltage level stored on capacitor C2 is converted into a digital value and stored in memory 17 for processing by the measurement processing unit 19.

Timing Diagrams and Example Signals

FIG. 37 is a timing diagram illustrating the control signals used to control measurement circuit N1 and an example signal AF-outN1 output from measurement circuit N1. In particular, FIG. 37 shows the control signals ex_shifted, polarity_N1, demod_N1, en_N1, sample_swN1 and ADC_triggerN1. As can be seen from FIG. 37, the en_N1 control signal has a frequency that is four times that of the polarity_N1 control signal and it is phase aligned with the polarity_N1 control signal so that the rising and falling edges of the polarity_N1 control signal correspond with edges of the en_N1 control signal (although this is not essential). FIG. 37 also shows that the sample_swN1 control signal has the same frequency as the polarity_N1 control signal, although it is phase shifted relative to the polarity_N1 control signal so that the rising and falling edges of the sample_swN1 control signal happen at about the points in time when the AF_outN1 signal is at a maximum or a minimum value. The ADC_triggerN1 control signal has twice the frequency of the sample_swN1 control signal and its phase is set so that its rising edges occur just after the rising and falling edges of the sample_swN1 control signal. In this way, if the ADC channel 13-3 is triggered to make a conversion on each rising edge of the ADC_triggerN1 control signal, then the ADC channel 13-3 will output a sequence of digital values corresponding to the successive positive and negative peaks of the AF_outN1 signal.

As can be seen from FIG. 37, the AF_outN1 signal is less sinusoidal than before. This is because of low frequency harmonics introduced by the en_N1 control signal. However, this does not matter as the signal waveform is still cyclically varying with a period corresponding to that of the polarity_N1 control signal (T_modulation) and the peaks in the AF_out signal will appear at the same times during each period of the polarity_N1 control signal. As explained above, the peak amplitude of the AF_out signal varies approximately sinusoidally with the target position. If the ADC 13 samples just before or just after the peak, it will not matter as the error that is introduced will be reflected as a gain variation of the corresponding measurement circuit 51 and such gain variations are compensated by the measurement processing unit 19 as will be discussed below.

FIG. 38 shows the relative timings of the control signals used to control the other two measurement circuits N2 and M. As shown in FIG. 38, control signal en_N2 (used to control the enabling/disabling of measurement circuit N2) has the same timing as the en_N1 control signal. In this way, measurement circuits N1 and N2 are enabled and disabled together. Control signal en_M used to control the enabling and disabling of measurement circuit M is the inverse of control signals en_N1/en_N2 so that when the signal from the fine sine detection coil is being passed through measurement circuit M, measurement circuit N1 is disabled and vice versa and so that when the signal from the fine cosine detection coil is being passed through measurement circuit M, measurement circuit N2 is disabled and vice versa. As a result, the control signals polarity_M, sample_swM, and ADC_triggerM are shifted by exactly half the period of the control signal en_N1 (or in other words an eighth of the period of the polarity_N1 control signal).

In order to optimise the overall system update rate and to facilitate subsequent processing by the measurement processing unit 19, it is advantageous to shift the timeline of the control signals used to control measurement circuit N2 in relation to the control signals used to control measurement circuit N1. In this embodiment and as shown in FIG. 38, the en_N2 control signal is the same as en_N1 signal, but the control signals polarity_N2, sample_swN2, and ADC_triggerN2 are shifted by one period of the en_N2 signal. In this way, the positive and negative peaks of the AF_outN2 signal will occur a quarter of the polarity modulation period away from the positive and negative peaks of the AF_outN1 signal. Arranging the control signals in this way allows for four target position updates to be calculated every period of the polarity_N1 control signal.

FIG. 39 illustrates typical signals that may be output by the three measurement circuits 51 and showing the relative timings of the positive and negative peaks. As a result of the choice of timings of the control signals used in this embodiment, the timing of when the three ADC channels 13-3, 13-4 and 13-5 convert the values from the three measurement circuits (represented by the arrows in FIG. 39) are spread out over one modulation period; with two measurements of the fine sine sensor signal and two measurements of the fine cosine sensor signal being obtained in one period of the polarity control signal. As will become clear from the description below, each time a new fine sine or a new fine cosine measurement is obtained the measurement processing unit 19 can update the target position information. FIG. 39 also shows the timing of when measurements are obtained from measurement circuit M, and each time a measurement of the fine sine signal is obtained from measurement circuit M, the measurement processing unit 19 can update calibration data that is used to calibrate the relative gains between measurement circuit N1 and measurement circuit M. Similarly, each time a measurement of the fine cosine signal is obtained from measurement circuit M, the measurement processing unit 19 can update calibration data that is used to calibrate the relative gains between measurement circuit N2 and measurement circuit M.

Sensor Input Multiplexing

As discussed above, all the sensor inputs are multiplexed through measurement circuit M in a time division manner and FIG. 40 is a timing diagram illustrating the way in which this is achieved using the control signals in1_M, in2_M and in3_M. Although not illustrated in FIG. 40, each sensor signal is selected for several periods (typically for at least four periods of the polarity_M control signal to allow for transient relaxation of the analogue signals in the measurement circuit M following the switching from one sensor input to another). Normally, only the last three or four measurements from measurement circuit M (before it switches to another sensor input) are used for calculating the midrail level and the amplitude of the sensor signal.

As can be seen from FIG. 40, a detection cycle has six detection intervals (corresponding to i=1 to i=6) and during the detection interval corresponding to i=1, the signal from the fine sine coil (inputs 1+/1−) is selected and passed through to the demodulating switch 56-5; during detection interval corresponding to i=2, the signal from the fine cosine coil (inputs 2+/2−) is selected and passed through to the demodulating switch 56-5; during detection interval corresponding to i=3, the signal from the coarse sine coil (inputs 3+/3−) is selected and passed through to the demodulating switch 56-5; during detection interval corresponding to i=4, the signal from the coarse cosine coil (inputs 4+/4−) is selected and passed through to the demodulating switch 56-5; and during detection intervals corresponding to i=5 and i=6, the reference signal (inputs 5+/5−) is selected and passed through to the demodulating switch 56-5. The two separate measurements for the reference signal (inputs 5+/5−) are performed with a different phase for the ex_shifted signal—ex_0 and ex_90 signals—in order to calculate the exact value of the phase of the reference signal. As explained previously with a reference to the FIG. 14, this phase is used to tune the phase of the excitation clock ex_clock. The multiplexing of the sensor signals through measurement circuit M is similar to the multiplexing performed in the first embodiment and so a detailed description thereof will be omitted. FIG. 40 also shows that during this time, measurement circuit N1 is obtaining measurements of the fine sine sensor signal and measurement circuit N2 is obtaining measurements of the fine cosine sensor signal.

Measurement Processing

Peak Amplitude determination Each time a new digital value is converted by one of the ADC channels 13-3, 13-4 or 13-5 and stored in memory 17, the measurement processing unit 19 updates the peak amplitude of the corresponding AF_out signal (and updates the mid-rail voltage from which that peak amplitude is calculated). The measurement processing unit 19 does this using the last three measurements $V_n$, $V_{n-1}$, and $V_{n-2}$ obtained from that measurement circuit 51, as follows:

$$\hat{V}_{midrail} = 1/2 * [V_{n-1} + 1/2(V_n + V_{n-2})] \quad (284)$$

If desired, this value can be further averaged over time in order to reduce the noise in the calculated value of the midrail voltage. The measurement processing unit 19 then determines the peak amplitude of the corresponding AF_out signal as follows:

$$\hat{V}_n = (-1)^{k} * (V_n - \hat{V}_{midrail}) \quad (285)$$

where $V_n$ is the latest measurement stored in memory 17 for that measurement circuit 51; and the value of the constant k is cycled consecutively between 0 and 1 in order to take into account that ADC 13 is consecutively sampling the maximum and minimum values of the signal AF_out signal.

Calibration of Measurement Circuit N1 to Measurement Circuit M

As in the first embodiment, the measurement processing unit 19 determines the target position ($\varphi^F$) from the following:

$$\varphi^F = \arctan(\hat{V}^{FS}/\hat{V}^{FC}) \quad (286)$$

where $\hat{V}^{FS}$ is the latest amplitude measurement obtained from the fine sine sensor and where $\hat{V}^{CS}$ is the latest amplitude measurement obtained from the fine cosine sensor. If the fine sine and fine cosine amplitude values are those measured by measurement circuits N1 and N2, then the result would be subject to significant noise because measurement circuit N1 will have a different gain to measurement circuit N2. Therefore, in this embodiment, the measurement processing unit 19 uses the measurements obtained from measurement circuit M to determine a respective gain correction (and in some cases offset correction) to be applied to the measurements from measurement circuits N1 and N2. In effect, the measurement processing unit 19 determines a mapping for each of measurement circuit N1 and measurement circuit N2, that maps the measurements made by these measurement circuits to a common measurement circuit (measurement circuit M)—such that the mapped values are the values that measurement circuit M would have output had it made the measurements. Of course, instead of mapping the measurements obtained from measurement circuits N1 and N2 onto measurements that would have been made by measurement circuit M, mapping data could be determined that map the measurements made by measurement circuit N1 to those made by measurement circuit N2 or vice versa. However, mapping onto measurement circuit M is advantageous as it allows other corrections to be made such as the above described breakthrough corrections. The way in which this mapping is achieved will now be explained in more detail.

To determine the mapping between measurement circuit N1 and measurement circuit M, the measurement processing unit 19 gathers and compares measurements made by these two measurement circuits for the same input signal. As explained above, during the detection interval corresponding to i=1, measurement circuit M is configured to obtain measurements from the fine sine inputs 1+/1−. These measurements are time division multiplexed with the measurements obtained from measurement circuit N1 (because of the en_N1 and en_M control signals). As can be seen from FIG. 39, during one period of the polarity modulation signal, measurements from measurement circuit N1 are obtained at times $t_0$ and $t_4$ and measurements from measurement circuit M are obtained at times $t_1$ and $t_5$. If it is assumed that during the time between $t_0$ and $t_4$ the target position does not change or does so with constant speed, then the measurement processing unit 19 can determine an approximation of what measurement circuit N1 would have determined had it made a measurement at time $t_1$ from the following:

$$\hat{V}_{N1}^{FS} = 1/4 V_n^{FS} + 3/4 \hat{V}_{n-1}^{FS} \quad (287)$$

where $\hat{V}_n^{FS}$ is the measurement obtained from measurement circuit N1 at time $t_4$ and $\hat{V}_{n-1}^{FS}$ is the measurement obtained from measurement circuit N1 at time $t_0$.

The pair of the measurements $\hat{V}_{N1}^{FS}$ and $\hat{V}_M^{FS}$ (corresponding to the measurement obtained from measurement circuit M at time $t_1$) is then written into a circular memory (forming part of memory 17). By collecting and grouping (as a calibration set) the most recent such pairs of measurements, the measurement processing unit 19 can find the best fit line that maps between the measurements obtained from the two measurement circuits as follows:

$$\hat{V}_M^{FS} = K_{N1}^{FS} * \hat{V}_{N1}^{FS} + \text{Off}_{N1}^{FS} \quad (288)$$

For large values of $\hat{V}_M^{FS}$ the value of $\text{Off}_{N1}^{FS}$ can be set to zero so that the mapping is defined just by the value of $K_{N1}^{FS}$. With this mapping equation, the measurement processing unit 19 can then convert any new measurement of the fine sine signal obtained from measurement circuit N1 into a measurement obtained from measurement circuit M—even though at that time, measurement circuit M is measuring another sensor input. Further, in the next detection cycle, when measurement circuit M again measures the signal from the fine sine sensor input, another pair of measurements $\hat{V}_{N1}^{FS}$ and $\hat{V}_M^{FS}$ is added to the calibration set (with the oldest pair being discarded from the set); and the value of $K_{N1}^{FS}$ can be updated as follows:

$$K_{N1}^{FS} = \Sigma \hat{V}_{N1}^{FS} * \hat{V}_M^{FS} / \Sigma (\hat{V}_{N1}^{FS})^2; \quad \text{Off}_{N1}^{FS} = 0; \quad (289)$$

where the sum is performed over all of the pairs of measurements in the calibration set. Typically up to 16 of the most recent pairs of measurements $\hat{V}_{N1}^{FS}$ and $\hat{V}_M^{FS}$ are used in the calibration procedure in order to achieve a trade-off between reduced noise in the value of $K_{N1}^{FS}$ and a requirement for a faster update of the mapping data when the signal amplitudes are changing rapidly for a fast moving target 5.

When the amplitude of the measurements $\hat{V}_{N1}^{FS}$ and $\hat{V}_M^{FS}$ drops below a first threshold value $V_{thr1}$, the measurement processing unit 19 keeps the value of $K_{N1}^{FS}$ constant and instead the calibration data set is used to find the best fit for the offset value $\text{Off}_{N1}^{FS}$ using formula:

$$\text{Off}_{N1}^{FS}=1/u*\Sigma(\hat{V}_M^{FS}-K_{N1}^{FS}*\hat{V}_{N1}^{FS}) \qquad (290)$$

Where u—is the number of measurement pairs in the calibration data set. Once the amplitude of the measured values of $\hat{V}_{N1}^{FS}$ and $\hat{V}_M^{FS}$ increases above a second threshold value $V_{thr2}$ (which is greater than the first threshold value), the value of $K_{N1}^{FS}$ is again updated via a best linear fit approach and the value of $\text{Off}_{N1}^{FS}$ is again set equal to zero. In this way it is possible to reduce large dynamic errors for the calculated value of $K_{N1}^{FS}$ for a calibration data set in which most pairs of measurements $\hat{V}_{N1}^{FS}$ and $\hat{V}_M^{FS}$ are close to zero. A typical value for the first threshold $V_{thr1}$ is 5% of the reference voltage applied to the ADC 13 and a typical value for the second threshold $V_{thr2}$ is 8% of the reference voltage applied to the ADC 13.

For a fast moving target, rather than comparing the amplitudes with a threshold, the measurement processing unit 19 may determine when to fix $K_{N1}^{FS}$ and start finding the best offset value ($\text{Off}_{N1}^{FS}$) by continuing to update the value of the coefficient $K_{N1}^{FS}$ until the following condition is met:

$$\Sigma(\hat{V}_{N1}^{FS})^2<u*(\hat{V}_{thr1})^2 \qquad (291)$$

as it is highly likely that even if the last measured value is below the first threshold $V_{thr1}$, most previous values in the calibration data set will be well above the first threshold $V_{thr1}$ and so it is still better to update the value of the coefficient $K_{N1}^{FS}$. However, once all the measurements in the calibration set are below the first threshold $V_{thr1}$, fixing $K_{N1}^{FS}$ and finding the best offset value $\text{Off}_{N1}^{FS}$ becomes more appropriate.

FIG. 41 is a plot illustrating the way in which the measured values of $\hat{V}_{N1}^{FS}$ and $V_M^{FS}$ may vary within different calibration sets 161 and 163. For the measurements 161, the measurement processing unit 19 will set the offset $\text{Off}_{N1}^{FS}$ to zero and will find the value of $K_{N1}^{FS}$ that best fits the pairs of measurements in the calibration set 161. However, for the measurement pairs in calibration set 163, as the amplitude of the measurements is below the first threshold $V_{thr1}$, the value of $K_{N1}^{FS}$ is fixed at its current value and the measurement processing unit 19 determines the value of the offset $\text{Off}_{N1}^{FS}$ that best matches the calibration set 163.

Calibration of Measurement Circuit N1 to Measurement Circuit M

The calibration of the measurements made by measurement circuit N2 to measurement circuit M is similar, but a small modification is required due to the relative timings of the measurements in the two measurement channels. In particular, the measurements of the fine cosine signal from measurement circuit N2 are obtained at times $t_2$ and $t_6$ and in measurement circuit M at time $t_5$. Time $t_5$ is now closer to the latest measurement from measurement circuit N2, and so an approximation of what measurement circuit N2 would have determined had it made its measurement at time $t_5$ can be determined from the following:

$$\hat{V}_{N2}^{FC}=\tfrac{3}{4}\hat{V}_n^{FC}+\tfrac{1}{4}\hat{V}_{n-1}^{FC} \qquad (292)$$

where $\hat{V}_n^{FC}$ is the measurement obtained from measurement circuit N2 at time $t_6$ and $\hat{V}_{n-1}^{FC}$ is the measurement obtained from measurement circuit N2 at time $t_2$.

As before, the measurement processing unit 19 gathers and groups (as a calibration set) the most recent pairs of such measurements ($\hat{V}_{N2}^{FC}$ and $\hat{V}_M^{FC}$), and then the measurement processing unit 19 finds the best fit line that maps between the measurements obtained from the two measurement circuits as follows:

$$\hat{V}_M^{FC}=K_{N2}^{FC}*\hat{V}_{N2}^{FC}+\text{Off}_{N2}^{FC} \qquad (293)$$

As before, the offset $\text{Off}_{N2}^{FC}$ may be set to zero if the amplitude of the measurements is greater than the second threshold; and the gain term $K_{N2}^{FC}$ may be fixed if the measurement amplitude falls below the first threshold.

Measurement Updates

As shown in FIG. 39, during each period of the polarity control signals, measurement circuit N1 will produce a new measurement of $V^{FS}$ at times $t_0$ and $t_4$ and measurement circuit N2 will produce a new measurement of $V^{FC}$ at times $t_2$ and $t_6$. Each time that one of these measurements becomes available, the measurement processing unit can update the position of the target ($\varphi^F$) firstly by mapping the new measurement to measurement circuit M using the stored mapping data:

$$\hat{V}_{corr}^{FS}=K_{N1}^{FS}*\hat{V}^{FS}+\text{Off}_{N1}^{FS} \qquad (294)$$

if the new measurement is from measurement circuit N1; or if the new measurement is from measurement circuit N2, using the stored mapping data:

$$\hat{V}_{corr}^{FC}=K_{N2}^{FC}*\hat{V}^{FC}+\text{Off}_{N2}^{FC} \qquad (295)$$

and then determining the target position using the arctangent function:

$$\varphi^F=\arctan(\hat{V}_{corr}^{FS}/\hat{V}_{corr}^{FC}) \qquad (296)$$

This allows a position update to be obtained four times per period of the polarity control signal.

Dynamic Error Correction

The determined position of the target 5, while accurately reflecting the position for slow moving targets, will have significant dynamic error for fast moving targets 5 due to the fact that the values $V^{FS}$ and $V^{FC}$ are measured at different moments in time. In order to correct for this dynamic error, the measurement processing unit 19 determines two separate rates of change of the value of $\varphi^F$—one derived from position updates obtained when the measurement $V^{FS}$ is obtained before the measurement of $V^{FC}$:

$$\Delta\varphi^F_{12}=\varphi^F_n-\varphi^F_{n-2} \qquad (297)$$

and the other derived from position updates when the measurement $V^{FC}$ is obtained before the measurement of $V^{FS}$:

$$\Delta\varphi^F_{21}=\varphi^F_{n-1}-\varphi^F_{n-3} \qquad (298)$$

These two values $\Delta\varphi^F_{12}$ and $\Delta\varphi^F_{21}$ can be further averaged to obtain a speed parameter:

$$s=\frac{\Delta\varphi_{12}+\Delta\varphi_{21}}{2} \qquad (299)$$

This speed parameter is not exactly equal to the speed of movement of the target 5, as it represents the average rate of change of the calculated phase $\varphi^F$. However, as the calculated phase $\varphi^F$ is substantially linearly related to the position of the target 5 (see FIG. 2), the rate of change of the measured phase will be substantially proportional to the rate of change of the target position (=speed).

$V^{FS}$ Obtained Before $V^{FC}$

Therefore, for the situation in which the target position information is determined using measurement $V^{FS}$ obtained from measurement circuit N1 before the measurement $V^{FC}$ obtained from measurement circuit N2, the peak to peak voltage measurements determined by the measurement processing unit 19, using the raw data obtained from the ADC 13, can be written as:

$$\hat{V}_{corr}^{FS} = A_F \sin[\varphi^F - s/2] \quad (300)$$

$$\hat{V}_{corr}^{FC} = A_F \cos \varphi^F \quad (301)$$

and from this it can be shown that the measurement processing unit 19 should apply the following compensation to $\varphi^F$:

$$\varphi_{comp}^F = \varphi^F + \frac{s}{4}(1 + \cos 2\varphi^F) \quad (302)$$

As can be seen, the compensation that is applied to $\varphi^F$ depends itself on the value of $\varphi^F$ and thus different compensations are performed depending on the position of the target 5 relative to the detection coils 4. This compensation can significantly reduce (by as much as fifty times) the dynamic error in the determined position of the target 5 due to using measurements taken at consecutive times. A similar dynamic compensation on the coarse position measurements can be made using the speed parameter reduced according to the ratio of the number of periods in the coarse and fine scales.

$V^{FC}$ Obtained Before $V^{FS}$

For the situation in which the target position information is determined using measurement $V^{FC}$ obtained from measurement circuit N2 before the measurement $V^{FS}$ obtained from measurement circuit N1, the peak to peak voltage measurements determined by the measurement processing unit 19, using the raw data obtained from the ADC 13, can be written as:

$$\hat{V}_{corr}^{FC} = A_F \cos[\varphi^F - s/2] \quad (303)$$

$$\hat{V}_{corr}^{FS} = A_F \sin \varphi^F \quad (304)$$

and from this it can be shown that the measurement processing unit 19 should apply the following compensation to $\varphi^F$:

$$\varphi_{comp}^F = \varphi^F + \frac{s}{4}(1 - \cos 2\varphi^F) \quad (305)$$

Thus different compensations are performed depending on the order in which the signals from the two fine detection coils are measured by the measurement circuits N1 and N2. This dynamic compensation can be calculated arithmetically or, in order to speed-up the calculations, can be determined in advance and stored in a look-up table. For instance, the compensation can be determined from:

$$\varphi_{comp}^F = \varphi^F + s * K_{12}(\varphi^F) \text{ or} \quad (306)$$

$$\varphi_{comp}^F = \varphi^F + s * K_{21}(\varphi^F) \quad (307)$$

depending on which signal $V^{FS}$ or $V^{FC}$ is measured first. The values of $K_{12}$ and $K_{21}$ are determined from the look-up table using $\varphi^F$ to determine the index to the table, for example as follows:

$$\text{index} = \text{round}\left(\frac{\varphi^F \times 1024}{2\pi}\right) \quad (308)$$

where the look-up table has a length of 1024 with coefficients $K_{12}$ in one column and coefficients $K_{21}$ in another column. This look-up-table would be stored in the non-volatile memory of the microcontroller 9 as part of the dynamic correction data 31. The values of $K_{12}$ and $K_{21}$ for the different entries in the look-up-table can be determined in advance from the following:

$$K_{12}(j) = \frac{1}{4} * \left[1 + \cos\left(\frac{4\pi * j}{1024}\right)\right] \quad (309)$$

$$K_{21}(j) = \frac{1}{4} * \left[1 - \cos\left(\frac{4\pi * j}{1024}\right)\right] \quad (310)$$

Alternatively still, the coefficients $K_{12}$ and $K_{21}$ could be determined experimentally by finding the best linear fit between raw results for $\varphi^F$ and the actual position $\varphi^F_{true}$ at different speeds of the target movement:

$$\varphi_{true}^F = \varphi^F + s * K_{12}(\varphi^F) \text{ or} \quad (311)$$

$$\varphi_{true}^F = \varphi^F + s * K_{21}(\varphi^F) \quad (312)$$

With the best linear fit being performed separately for a set of data with the value $V^{FS}$ measured first (for $K_{12}$), and separately for a set of data with the value of $V^{FC}$ measured first (for $K_{21}$). Once the appropriate values for coefficients $K_{12}$ and $K_{21}$ are found, the coefficients are stored in the lookup table in the memory of the microcontroller 9 and are used to correct the raw target position data ($\varphi^F$) calculated by the measurement processing unit 19.

The above dynamic adjustment for the phase measurement was carried out based on a reasonable assumption that the phase measure $\varphi^F$ was either constant or changing at a nearly constant rate of the change. While this approach provides the best possible compensation for the dynamic error, instead it is possible to adjust the dynamic error based on the less realistic approximation that the rate of the change in the amplitude of the AF_outN1 and AF_outN2 signals is constant. In fact, the amplitude of the signals AF_out signal is varying in accordance with a sinusoidal function of the position of the target and thus is changing in a non-linear manner for a target moving at a constant speed—and so will provide a less accurate correction. However, it can provide a reasonable correction without using look-up tables. Namely, if the target position information is determined using measurement $V^{FS}$ obtained from measurement circuit N1 before measurement $V^{FC}$ is obtained from measurement circuit N2, the last amplitude measurement $V^{FS}_n$ determined by the measurement processing unit 19, using the raw data obtained from the ADC 13, can be corrected for dynamic changes via:

$$\hat{V}_{dyn}^{FS} = \hat{V}_n^{FS} + 1/2 * (\hat{V}_n^{FS} - \hat{V}_{n-1}^{FS}) = 3/2 * \hat{V}_n^{FS} - 1/2 * \hat{V}_{n-1}^{FS} \quad (314)$$

and this new value can be used to calculate the target position information ($\varphi^F = a\tan(V^{FS}_{dyn,corr}/V^{FC}_{corr})$). Alternatively, if the target position information is determined using measurement $V^{FC}$ obtained from measurement circuit N2 before measurement $V^{FS}$ is obtained from measurement circuit N1, the last amplitude measurement $V^{FC}_n$ obtained by the measurement processing unit 19, using the raw data obtained from the ADC 13, can be corrected for dynamic changes via:

$$\hat{V}_{dyn}^{FC} = 3/2 * \hat{V}_n^{FC} - 1/2 * \hat{V}_{n-1}^{FC} \quad (315)$$

and this new value can be used to calculate the answer $\varphi^F = a\tan(V^{FS}_{corr}/V^{FC}_{dyn,corr})$.

Breakthrough Removal

The calculations above did not include the removal of the above described unwanted breakthrough offset caused by direct coupling from the excitation coil 2 to the detection coils 4 and 6, even without the target 5. In a similar way to the way in which the breakthrough offset was removed in the first embodiment, the breakthrough offset can be removed by modifying the calculations as follows:

$$\hat{V}_{corr}^{FS} = K_{N1}^{FS} * \hat{V}^{FS} + \text{Off}_{N1}^{FS} - O^{FS} * V_M^{EX} \quad (316)$$

$$\hat{V}_{corr}^{FC} = K_{N2}^{FS} * \hat{V}^{FC} + \text{Off}_{N2}^{FC} - O^{FC} * V_M^{EX} \quad (317)$$

$$\varphi^F = \arctan(\hat{V}_{corr}^{FS}/\hat{V}_{corr}^{FC}) \quad (318)$$

where $V^{EX}_M$—is the latest amplitude measurement of the excitation reference voltage applied at input 5+/5− of measurement circuit M. The coefficient $O^{FS}$ and $O^{FC}$—are constants determined during a calibration mode in which the signals from inputs 1+/1− and 2+/2− are measured by the measurement circuit M without the target 5 being present. The procedure for this calibration measurement was described previously in the first embodiment and will not be described again.

The measurements obtained from measurement circuit M can also be used to control the phase of the excitation signal in the manner described above with reference to FIGS. 13 and 14.

Gain Adjustment

In some sensor applications the distance between the sensor head 8 and the target 5 is not known in advance and can vary substantially during the sensor operation. As a result, the amplitude of the signals from the pair of fine scale detection coils 6-1 and 6-2 can vary by about one order of magnitude, resulting in an apparent loss of position resolution due to the loss of the resolution when sampling much smaller signals at the input of the ADC 13. This embodiment provides a straightforward algorithm for adjusting the gain of all three independent measurement circuits 51 in order to achieve an optimum analogue signal digitisation. To monitor the required changes for the gain setting, the measurement processing unit 19 determines the combined amplitude in channels N1 and N2 via:

$$(V^F)^2 = (\hat{V}^{FS})^2 + (\hat{V}^{FC})^2 \quad (319)$$

If $V^F$ falls below a first threshold $V^F_{thr1}$ then the measurement processing unit 19 increases the gain in all three measurement circuits N1, N2, and M by a similar amount. If VF is above a second threshold $V^F_{thr2}$ then the measurement processing unit 19 decreases the gain in all three measurement circuits by a similar amount.

Initially the gain setting is changed only in measurement channel M. The coefficients of the current linear mapping between measurement circuits N1 and M and between measurement circuits N2 and M are saved by the measurement processing unit 19 and are used until the calibration data set has been fully refreshed following the change of gain in measurement circuit M. Once a new calibration data set has been determined (following the change of gain), a new linear mapping between measurement circuits N1 and M and a new linear mapping between measurement circuits N2 and M are calculated and used for subsequent measurement updates in the manner explained above.

As a next step, measurement circuit M is switched by the measurement processing unit 19 from a scanning mode (in which the different sensor inputs are switched through measurement circuit M in the manner described above and as shown in FIG. 40) to a fixed measurement mode in which the sensor signals from sensor input pair 1+/1− is passed through measurement circuit M. During this step, the sensor measurements obtained from measurement circuit M are used by the measurement processing unit 19 as the main sensor data for the fine sine measurements and therefore, measurement circuit N1 can be released from sensor measurement and the measurement processing unit 19 can change the gain in measurement circuit N1 and then re-determine the mapping data for measurement circuit N1. Namely, once the gain in measurement circuit N1 has been changed and a new calibration set of pairs of nearly simultaneous measurements from measurement circuits N1 and M has been collected, the measurement processing unit 19 can determine a new linear mapping between channels N1 and M. This new linear mapping reflects any unequal changes of the gain in both channels N1 and M.

As a next step, the measurements from measurement circuit N1 are again used by the measurement processing unit 19 as the source of the main fast update of the sensor output; and measurement channel M remains in the fixed mode but now measuring the sensor signals from the fine cosine inputs 2+/2−; thus freeing up measurement circuit N2 from performing the main sensor measurements for this sensor input. The measurement processing unit 19 can then change the gain in measurement circuit N2. Once the gain in measurement circuit N2 has been changed and a new calibration set of pairs of nearly simultaneous measurements from measurement circuits N2 and M has been collected, the measurement processing unit 19 can determine a new linear mapping between channels N2 and M. This new linear mapping reflects any unequal changes of the gain in both channels N2 and M.

Finally, measurement channel M is returned to its main signal scanning mode in which the different sensor inputs are time division multiplexed there through (as shown in FIG. 40) and is used as discussed above to continuously update both the linear mapping between the measurement circuits N1 and M and between measurement circuits N2 and M, as well as providing data for excitation phase tuning, offset removal, and coarse scale output.

SEVENTH EMBODIMENT

In the sixth embodiment described above, a relatively inexpensive three channel, delta-sigma ADC was used to convert the measurements from the three measurement circuits. This ADC was built in to the microcontroller 9. In the seventh embodiment, instead of using a relatively slow three circuit sigma-delta ADC 13, a much faster single channel ADC 13 is used to convert the measurements from all three analogue measurement circuits N1, N2 and M in a time multiplexed manner. Typically, such fast and high resolution ADCs 13 are available as an external circuit rather than forming part of the microcontroller 9. One problem with this arrangement, however, is that crosstalk can occur between successive conversions, due to finite charge being accumulated at the input sample-and-hold capacitance of the ADC 13.

FIG. 42 is a block diagram of exemplary sample switching circuitry 15 that is used in this embodiment to overcome this problem. As can be seen from FIG. 42, the signals AF_outN1 and AF_outN2 (output from measurement circuits N1 and N2 respectively) together with AF_outM (output from measurement circuit M) and the midrail voltage, are input to a multiplexing switch 157-6. The output from the multiplexing switch 157-6 is input to an optional programmable gain amplifier (PGA) 158 in order to match the amplitude of the signals from the measurement circuits N1, N2, and M to the measurement range of the ADC 13. The position of the multiplexing switch 157-6 is controlled by the sw_1 and sw_2 control signals; and the ADC 13 is triggered to perform a conversion by the ADC_trigger control signal. The amplification and filtering circuitry 83 is designed to have a low output resistance and as a result, the recharging of the input capacitance of the multiplexing switch 157-6 is relatively fast and is fully finished before the sampling of the analogue signals is triggered in the ADC controller 13.

FIG. 43 is a timing diagram illustrating the timing of the various control signals used to control the operation of the measurement circuitry 25 used in this embodiment. As shown in FIG. 43, the enable (en_N1, en_N2 and en_M) and the polarity control signals are the same as those used in the sixth embodiment. The sw_1 and sw_2 control signals have a frequency that is twice that of the polarity control signal. When sw_1 is low and sw_2 is low, the signal from measurement circuit N1 is passed through switch 157-6 to the ADC 13, when sw_1 is high and sw_2 is high, the signal from measurement circuit N2 is passed through switch 157-6 to the ADC 13. When sw_1 is low and sw_2 is high, the signal from measurement circuit M is passed through switch 157-6 to the ADC 13; and when sw_1 is high and sw_2 is low, the signal from the midrail is passed through switch 157-6 to the ADC 13. The ADC is triggered on the rising edge of the ADC_trigger control signal—which has a frequency eight times that of the polarity control signals. In this way, one detection period of the polarity control signal is effectively divided into eight intervals. The phases of the signals sw_1 and sw_2 are aligned so that the switching between signals AF_outN1, AF_out_N2, and AF_outM is performed just after the corresponding AF_out signal has passed through either the maximum or minimum value.

During the first interval (corresponding to i=1), the ADC 13 will convert the signal obtained from measurement circuit M. During this interval, the AF_outM signal is close to its minimum value following the switching of the polarity_M control signal from the high to the low value at the end of the interval k=1—hence the "−" sign in FIG. 43. As can be seen from FIG. 43, there is a delay between the intervals "i" and the corresponding intervals "k". This delay is caused by the delay introduced by the measurement circuit 51. During the second interval (corresponding to i=2), the ADC 13 will convert the signal obtained from measurement circuit N2. During this interval, the AF_outN2 signal is close to its minimum value following the switching of the polarity_N2 control signal from the high to the low value at the end of interval k=2—hence the "−" sign in FIG. 43. During the third interval (corresponding to i=3), the ADC 13 will convert the signal obtained from the global midrail voltage level; this measurement can be used to calibrate the offset value introduced by the PGA 158 and ADC 13 as explained in more detail below. The global midrail voltage is nominally the voltage level midway between Vcc and ground. During the fourth interval (corresponding to i=4), the ADC 13 will convert the signal obtained from measurement circuit N1. During this interval, the AF_outN1 signal is close to its maximum value following the switching of the polarity_N1 control signal from the low to high value at the end of interval k=4—hence the "+" sign in FIG. 43. During the fifth interval (corresponding to i=5), the ADC 13 will convert the signal obtained from measurement circuit M. During this interval, the AF_outM signal is close to its maximum value following the switching of the polarity_M control signal from the low to high value at the end of interval k=5—hence the "+" sign in FIG. 43. During the sixth interval (corresponding to i=6), the ADC 13 will convert the signal obtained from measurement circuit N2. During this interval, the AF_outN2 signal is close to its maximum value following the switching of the polarity_N2 control signal from the low to the high value at the end of interval k=6—hence the "+" sign in FIG. 43. During the seventh interval (corresponding to i=7), the ADC 13 will convert the signal obtained from the midrail voltage level. Finally, during the eighth interval (corresponding to i=8), the ADC 13 will convert the signal obtained from measurement circuit N1. During this interval, the AF_outN1 signal is close to its minimum value following the switching of the polarity_N1 control signal from the high to the low value at the end of interval k=8 hence the "−" sign in FIG. 43.

The relative timings of the switching of the signals through to the ADC 13 is controlled so that the AF_out signals are converted at their peak values (as shown in FIG. 39). The measurements obtained during intervals i=3 and i=7 correspond to the midrail voltage level and are used to measure the offset introduced by the PGA 158 and ADC 13. The fast update of the new offset value introduced by the PGA 158 is specifically useful when switching the gain in the PGA 158 and can be used when updating the local value of the midrail voltage in each measurement channel. Namely, during the normal mode of operation, the gain of the PGA 158 is fixed and the value of the local midrail voltage $V_{midrail}^{N1}$, $V_{midrail}^{N2}$, and $V_{midrail}^{M}$ are calculated according to the equation (284) discussed above. At the same time, the level of the global midrail voltage $V_{midrail}$ is measured by the ADC 13 during intervals with i=3 and i=7. The difference of the local midrail values and the global midrail value is calculated and is averaged as three independent values $\Delta V_{midrail}^{N1} = V_{midrail}^{N1} - V_{midrail}$, $\Delta V_{midrail}^{N2} = V_{midrail}^{N2} - V_{midrail}$, $\Delta V_{midrail}^{M} = V_{midrail}^{M} - V_{midrail}$. At some moment in time the measurement processing unit 19 decides to adjust the gain of the PGA 158. In this embodiment, the new gain setting is introduced just before selecting the midrail voltage measurement mode during intervals i=3 or i=7 and thus the new value of the global midrail voltage $V_{midrail}$ will be updated immediately following the change of the gain in the PGA 158. The new values of the local midrail values $V_{midrail}^{N1}$, $V_{midrail}^{N2}$, and $V_{midrail}^{M}$ can be updated using equation (284) only after three new measurements have been made by the ADC 13 in each measurement circuit. Thus, there is a period of time just after the gain of the PGA has been adjusted, in which the calculation of the amplitude of the signals from each measurement circuit using equation (285) will be carried out using the value of the local midrail voltages calculated just before the gain of the PGA 158 was changed. Using such old values of the local midrail level will introduce a small but undesirable error into the position calculations. To avoid such short term errors just after the gain adjustment, a new set of values $V_{midrail}^{N1} = V_{midrail} + Gain_{new}/Gain_{old} * \Delta V_{midrail}^{N1}$, $V_{midrail}^{N2} = V_{midrail} + Gain_{new}/Gain_{old} * \Delta V_{midrail}^{N2}$, and $V_{midrail}^{M} = V_{midrail} + Gain_{new}/Gain_{old} * \Delta V_{midrail}^{M}$ can be used in equation (285). Once enough measurements have been collected, the local midrail voltage level in each measurement circuit can be calculated again using equation (284). Such arrangement improves the accuracy of the sensor output during the dynamic adjustment of the gain in the PGA 158. The mapping between measurement circuits N1 and M and the mapping between measurement circuits N2 and M remain unaffected by the common mode change in the linear gain of the measurement circuitry and thus it is possible to continue updating the coefficients of these linear mappings without any extra modification during the dynamic adjustment of the gain in the PGA 158.

Of course, in this embodiment as we are measuring the global midrail voltage, equation (285) could be adapted to calculate the amplitude in each measurement circuit using the measured global midrail voltage instead of the local midrail voltage. However, whilst such processing would be more simple, it can lead to minor position errors being introduced into the calculations because each measurement circuit 51 is likely to introduce a small offset to the actual midrail voltage and if the global midrail voltage is used in equation (285) then these small offsets will not be compensated.

The measurements obtained during intervals i=3 and i=7 are taken due to the periodic nature of the control signals—which are easy to generate. Of course, if sample switching circuitry 15 does not include the PGA 158 and if more complex control signals are used, then the measurements from these extra intervals could be avoided.

As shown in the FIG. 43, the ADC_trigger control signal triggers the ADC two times during each of these intervals. The first time the ADC 13 is triggered in order to recharge its internal sample-and-hold capacitor, which typically can have internal capacitance of the order of tens of pF. When the ADC 13 is triggered the second time, it performs a final analogue to digital conversion. With these digital measurements, the measurement processing unit 19 can then determine the position of the target 5 and correct for gain and breakthrough offsets in a similar manner to the sixth embodiment described above.

The possible crosstalk between measurement circuits N1, N2 and M is greatly reduced due to the double sampling scheme which recharges the internal capacitance of the sample-and-hold circuitry off the ADC 13 much more efficiently and thus allows cheaper and lower frequency operational amplifiers in the PGA 158.

With this seventh embodiment and by using currently available SAR (successive approximation) ADC 13 and microcontroller 9, it is practical to provide position updates at a rate of 500 kHz with a resolution of 15-bits for the fine scale position measurement. The fifth embodiment would require a capture/compare timer operating at 8 GHz to achieve a similar update rate and resolution. This is not yet practical with inexpensive microcontrollers and thus the fifth embodiment currently provides benefits only for systems with lower update rate requirements such as with systems operating at an update rate below 100 kHz. However, as faster microcontrollers become available, the fifth embodiment will be able to provide a cost effective solution for higher update rate systems.

Proximity Sensor

All the embodiments described above have described position sensors that used sine and cosine detection coils. The processing circuits and the processing techniques described above can also be used in other types of position sensors—such as proximity sensors. For example, the above embodiments have assumed that there is one set of main ratiometric measurements to be made the determination of the fine target position using the signals from the fine sine and the fine cosine detection coils 6—which should be measured with the fastest possible update rate in order to achieve the best technical specification for the sensor. In addition to the processing of such main sensing signals, there are additional sets of ancillary measurements which must be measured via the same measurement circuits but without the same requirement of providing the fastest possible update rate for the ancillary measurements. Examples of such ancillary measurements discussed above include the ratiometric coarse target position (determined using the signals from the coarse sine detection coil and the coarse cosine detection coil), and the excitation reference signal. However in some types of sensors the role of the main signal measurements and the ancillary signal measurements dynamically changes with target movement. In such circumstances the measurement processing unit 19 should be configured so that it can easily switch from locking to a first pair of signals as the main measurement signals to locking to a second pair of measurement signals as the main measurement signals.

One specific example of a sensor requiring such a capability is a proximity sensor organized as an Inductive Factor 1 sensor. In such sensors, as is well known in the art, at least one detection coil is arranged so that it is fully balanced with respect to the excitation coil—so that in the absence of the target 5, when the excitation coil is energised, no signal is induced in the detection coil. The balance of the detection coil allows improved sensitivity of the sensor as it provides only very small signals when the target 5 is located far away from the sensing coils of the proximity sensor. When the target 5, typically in the form of a metallic plate, moves in to the measurement range of the sensor, the balance of the detection coil with respect to the excitation coil is perturbed and a non-zero signal is measured due to eddy currents induced in the metallic target 5. The amplitude of the induced voltage is practically independent of the conductivity of the material of the target and even its magnetic properties.

The typical form of the response for such a balanced detection coil is shown in the FIG. 44a and is marked as voltage V1. As shown, the sensing voltage V1 has a broad tail extending for large separations between the target 5 and the sensor coils. As the target 5 moves closer to the sensor coils (and the separation between the target 5 and the sensor coils reduces), the signal level induced in the detection coil increases to a peak value before it decays again towards zero. This decay with small separations (typically less than 5 mm) is due to the loss of mutual electromagnetic coupling between the excitation coil and the detection coil due to the screening by the metallic target. The long tail section of this response represents a challenge for extracting good sensitivity for the reading of such sensors for large separations between the metallic target and the sensor coils.

The typical form of the response for a detection coil that is not balanced to the signal from the excitation coil is also shown in the FIG. 44a and is marked as voltage V2. As shown, at large separations, the signal from this unbalanced coil becomes largely insensitive to the separation of the metallic target 5 from the sensor coils, but as the target 5 approaches the unbalanced detection coil, the signal obtained becomes sensitive to the presence of the target 5 at relatively short distances. As described in more detail below, it is possible to engineer the detection coils so that a ratiometric measurement between voltages V1 and V2 can become a monotonic function of the separation between the target 5 and the detection coils in spite of the peaking of the voltage V1 at a distance of about 5 mm from the surface of the sensor.

FIG. 45 illustrates the form of the sensor coils that may be used in such a proximity sensor, having an excitation coil 202 (shown in FIG. 45*a*), an unbalanced detection coil 204 (shown in FIG. 45*c*) and a balanced detection coil 206 (shown in FIG. 45*b*). The coils are substantially planar coils and are typically formed as conductive tracks on a printed circuit board. As shown in FIG. 45*a*, the excitation coil 202 has one or more concentric inner turns 211 and one or more concentric outer turns 213 that are connected in series and wound in the same sense—as represented by the arrows. As shown in FIG. 45*b*, the balanced detection coil 206 has one or more concentric inner turns 215 and one or more concentric outer turns 217. The inner turns 215 are connected in series and wound in the same sense as each other and the outer turns 217 are connected in series and wound in the same sense as each other. The inner turns 215 and the outer turns are connected together in series so that the inner turns 215 are wound in the opposite sense to the outer turns 217. As shown in FIG. 45*c*, the unbalanced detection coil 204 simply comprises one or more concentric turns 219 that are connected in series and wound in the same sense. The number of turns used by each coil illustrated in FIG. 45 is only given to illustrate that these coils will typically be multi-turn coils. In practice, there may be more or fewer turns.

The inner and outer coils of the balanced detection coil 206 are arranged so that the magnetic flux from a remote noise source will produce only a small signal in the detection coil 206. This can be achieved by arranging the diameters and the number of turns between the inner turns 215 and the outer turns 217 so that the square of the average diameter of the outer turns 217 multiplied by the number of outer turns 217 is approximately equal to the square of the average diameter of the inner turns 215 multiplied by the number of inner turns 215. For instance, if the balanced detection coil 206 has four outer turns and the inner diameter of the outer turns is 57 mm then to balance the detection coil 206, ten inner turns can be used with an inner diameter of 36 mm.

The balanced detection coil 206 is also made balanced with respect to the excitation coil 202 shown in FIG. 45*a* by adjusting the number of inner and outer turns of the excitation coil 202 and their positioning relative to the inner and outer turns of the balanced detection coil 206. For instance, the excitation coil 202 may have four outer turns 213 and the outer diameter of the outer turns 213 is equal to 55 mm (very close to the inner diameter of the outer turns 217 of the balanced detection coil 201), and may have eleven inner turns 211 with the outer diameter of the inner turns 211 being 18 mm. With this arrangement, the outer turns 213 of the excitation coil 202 will have a very large mutual inductance with the outer turns 217 of the detection coil 206, and about a two times smaller mutual inductance with the inner turns 215 of the detection coil 206. The inner turns of the excitation coil 202 will behave in the opposite manner—having a large mutual inductance with the inner turns 215 of the detection coil 206, and about a two times smaller mutual inductance with the outer turns 217 of the detection coil 206. Therefore, because the inner turns 215 and the outer turns 217 of the detection coil 206 are wound in the opposite sense, the mutual coupling between the different parts of the excitation coil 202 with the different parts of the balanced detection coil 206 result in a near zero net magnetic coupling between the two coils.

The mutual inductances between the detection coils 204 and 206 and the excitation coil 202 will be changed in the presence of a conductive target 5, which will modify the electromagnetic field generated by the excitation coil 202 due to eddy currents induced in the conductive material of the target 5. As a result, all mutual inductances will start to reduce, however the mutual inductance between the outer turns 217 of the detection coil 206 and the outer turns 213 of the excitation coil 202 will fall at a smaller rate than all other mutual inductance terms (because they are very close together), thus leading to a significant imbalance voltage in the balanced detection coil 206 when the target starts moving towards the sensor coils (perpendicular to the plane of the paper illustrating the sensor coils). However at very short separations between the conductive target 5 and the sensor coils, the imbalance voltage (V1) induced in the detection coil 206 will peak as shown in the FIG. 44*a* and will start to decrease once the target 5 moves even closer to the sensor surface. In the example above, the peak of the voltage V1 will be achieved when the separation between the target 5 and the sensor surface is of the order of 3 mm.

In the example design discussed above, the unbalanced detection coil 204 has eight conductor turns and an outer diameter of approximately 10 mm. The signal (V2) induced in this unbalanced detection coil is caused mainly by the mutual inductance with the inner turns 211 of the excitation coil 202 and, as can be seen from FIG. 44*a*, it shows a strong dependence on the separation of the target 5 from the sensor coils in a region close to the separation where the signal V1 reaches its maximum value. By measuring the value of $\varphi$=a tan(V1/V2), the separation between the target 5 and the sensor coils can be found with good resolution, even at lower separations, as the value of $\varphi$ remains a reasonably good monotonic function in spite of the non-monotonic behaviour of the V1 voltage value. Of course using an arctangent function is not essential, any function of the ratio of the two voltages can be used to provide signals that vary in a monotonic manner with the separation.

As discussed above, the measurement circuitry 25 and the measurement processing unit 19 are designed to calculate such ratiometric functions from such detection coils. Therefore, the above circuitry can also be used in the proximity sensor of this embodiment. In particular, if the two detection coils 204 and 206 are connected to inputs 1+/1− and 2+/2− of the measurement circuitry 25 described in any of the above embodiments, the measurement processing unit 19 will determine the following phase measure:

$$\varphi_0 = \arctan\left(\frac{V_1}{V_2}\right) \quad (320)$$

when it was determining the fine target position information in the above embodiments.

However, as can be seen from the phase plot shown in FIG. 44*b*, the sensitivity to target separation is significantly reduced for larger target separations (typically greater than 16 mm in the above example design). To address this issue, the sensing electronics can also be arranged to measuring the value:

$$\varphi_1 = \arctan\left(\frac{10 \times V_1}{V_2}\right) \quad (321)$$

The simplest way to implement this is to providing a 1:10 resistive divider 220 at the output of the unbalanced detection coil 204, by connecting the output of the divider 220 to the 4+/4− input of the measurement circuitry 25 (which will therefore measure V2/10); and by applying the output from the balanced detection coil 206 also to the 3+/3− input of the measurement circuitry 25. The connection of the two detection coils 204 and 206 to these inputs of the measurement circuitry 25 is illustrated in FIGS. 45b and 33c. In this way, when the measurement processing unit 19 would have measured the coarse position information, in this embodiment, it will measure the above value of $\varphi_1$.

The way in which this second phase measure ($\varphi_1$) varies with the separation between the target 5 and the detection coils 204, 206 is also illustrated in FIG. 44b. As can be seen, this second phase measure achieves a tenfold improvement in the sensor sensitivity at large separations (up to about 35 mm in this example design), but fails to maintain good sensitivity at shorter separations—because the second phase measure ($\varphi_1$) saturates at a value of 90 degree. However, it is possible to combine the two phase measures to provide a reasonably consistent sensitivity across a large range of target separations—using the first phase measure ($\varphi_0$) for smaller separations (in the example design less than about 14 mm) and then using the second phase measure ($\varphi_1$) for larger separations (in the example design greater than about 16 mm), both first ($\varphi_0$) and second ($\varphi_1$) phase measures should be used in the transition region (in the example design greater than about 14 mm and smaller than about 16 mm).

The easiest way to configure the measurement circuitry 25 to perform the different measurements is illustrated in FIG. 46, in which the above described measurement circuits N and M are fully dedicated to either measuring the first phase value $\varphi_0$ (using the signals from inputs 1+/1− and 2+/2−) or to measuring the second phase value $\varphi_1$ (using the signals from inputs 3+/3− and 4+/4−). In this example, measurement circuit N is configured for measuring the first phase value ($\varphi_0$) and measurement circuit M is configured for measuring the second phase value ($\varphi_1$). The amplification in each channel can be further controlled using dynamic Gain adjustment in order to provide the best sensitivity for the simultaneous measurements of signals V1 and V2 in the measurement circuit N; or signals V3 (=V1) and V4 (=V2/10) in measurement circuit M.

The amplitude of the signals measured from the balanced detection coil 206 can also be corrected for any non-zero offset in the balanced detection coil that is observed when the target 5 is not present. The values $$O^N = V1/V2 \tag{322}$$

$$O^M = V3/V4 \tag{323}$$

can be measured and stored in the non-volatile memory of the microcontroller 9 during a calibration procedure that is performed once the sensor has been installed, but with the metallic target 5 removed far away from the surface of the proximity sensor. Subsequently, during the main operating mode, the values can be corrected as follows:

$$\varphi_0^{Corr} = \arctan\left(\frac{V1}{V2} - O^N \times A(\text{seperation})\right) \tag{324}$$

and $$\varphi_1^{Corr} = \arctan\left(\frac{V3}{V4} - O^M \times A(\text{seperation})\right) \tag{325}$$

where A(separation) is the value obtained from a look-up table using the parameter "separation" obtained during the previous measurement update as an index in to the look-up table. The values in the look up table for large values of the separation will be close to one, but they can be reduced for shorter separations. Such dependence can be similar to the dependence of the value of V2 with the separation, as shown in FIG. 44a. The look-up table entries can be obtained by performing test calibrations performed for the same family of proximity sensors, with various values of offset introduced by metallic objects in the close vicinity of the sensor coils.

Optionally, in systems where the target 5 can move quickly towards or away from the detection coils 202 and 206, the dynamic correction techniques described above can also be used in this embodiment in order to compensate for movement between the times when the different measurements are obtained. The resulting phase measures ($\varphi_0^{Comp}$ and $\varphi_1^{Comp}$) can then be applied to their own look-up table to convert each phase value into a corresponding separation:

$$s_0 = B_0(\varphi_0^{Comp}) \tag{326}$$

$$s_1 = B_1(\varphi_1^{Comp}) \tag{327}$$

The look-up tables $B_0$ and $B_1$ are determined from a calibration process of the sensor. The separation values $s_0$ and $s_1$ do not necessarily coincide and a further procedure can be used to calculate a final answer (separation) using weighting functions $w_0$ and $w_1$:

$$\text{separation} = \frac{s_0 \times w_0(s_0) + s_1 \times w_1(s_1)}{w_0(s_0) + w_1(s_1)} \tag{328}$$

The form of the weighting functions $w_0$ and $w_1$ used in this embodiment are shown in the FIG. 47 and they provide a gradual change of the determined separation at around separation $s_{sw}$ (in the example design equal to 15 mm) between the values of so for small separations and the values of $s_1$ for large separations.

The value of separation calculated at this step is used to update the answer to the host interface 21 and also in the next calculation step to select the look-up table coefficient A(separation) used to assist with the more accurate removal of the non-zero breakthrough offset in the measurement system.

Instead of making fully independent measurements according to FIG. 46 a more complex switching over between the two measurements can be achieved using the processing techniques discussed above in the fifth embodiment arrangement. The main difference between this new embodiment and the fifth embodiment is related to the requirement that the measurement circuitry 25 and the microcontroller 9 switches between the two modes of the measurement depending on the last determined separation value. This is illustrated in FIG. 48, which shows that the microcontroller 9 can choose which ratiometric measurement ($\varphi_0$ or $\varphi_1$) should be used as the "main" measurement and which measurement can be used as an ancillary measurement. In particular, FIG. 48 shows that at around the switch-over point $s_{sw}$ the decision of which measurement is used as the main one is changed from one measurement to the other one. To avoid unstable behavior, and as illustrated in FIG. 48, optionally a small amount of hysteresis can be introduced in the decision making process.

FIG. 49 is a timing diagram illustrating the way in which the processing techniques used in the fifth embodiment can be used in this proximity sensor system to allow for the possibility to switch between the determined phase measures $\varphi_0$ and $\varphi_1$ as the main measurement result. FIG. 49 shows the timeline of the control signals used for measuring the $\varphi_0$ value as the main measurement for separations of the target 5 below $s_{sw}$. In this mode of operation an extra time interval is provided during the measurement of the ancillary data (in this illustration phase $\varphi_1$ determined from inputs 3+/3− and 4+/4−) during the time interval corresponding to i=10, in order to provide further calibration of the speed parameter measured for this measurement channel alone. This allows for very accurate compensation for the value $\varphi_1$ due to movement of the target 5. In this illustration, the measurement of the value $\varphi_0$ is updated continuously at the fastest possible update rate as explained in the fifth embodiment described above.

When channels 1+/1− and 2+/2− are measured via the measurement circuit N, the correction for the non-zero offset in the balanced detection coil 206 in the absence of the target 5 is provided via:

$$\frac{V_1}{V_2} = \tan(\varphi^N) \tag{329}$$

$$\varphi_0^{Corr} = \arctan\left(\frac{V1}{V2} - O_0^N \times A(\text{seperation})\right) \tag{330}$$

$$s_0 = B_0(\varphi_0^{Corr}) \tag{331}$$

When channels 3+/3− and 4+/4− are measured via the measurement circuit M, the correction for the non-zero offset in the balanced detection coil 206 in the absence of the target 5 is provided via:

$$\frac{V_3}{V_4} = \tan(\pi/2 - \varphi^M) \tag{332}$$

$$\varphi_1^{Corr} = \arctan\left(\frac{V3}{V4} - O_1^M \times A(\text{seperation})\right) \tag{333}$$

$$s_1 = B_1(\varphi_1^{Corr}) \tag{334}$$

One issue with using the timing illustrated in FIG. 49 is the slow update rate of the measurement of separation $s_1$ (on inputs 3+/3− and 4+/4−) when the measurement of so (on inputs 1+/1− and 2+/2−) is performed at the fastest possible update rate. To counter this, during the last time interval (time interval Otto) an extra measurement of $s_1$ is obtained in measurement circuit N using the polarity- modulation signal—so that there are two consecutive detection intervals ($\Delta t_9$ and $\Delta t_{10}$) where the same polarity modulation signal is used. This allows the measurement processing unit 19 to be able to determine a first speed measure of the target 5 using the $s_1$ values obtained in measurement circuit N from detection intervals $\Delta t_9$ and $\Delta t_{10}$. As the measurement processing unit 19 is repeatedly measuring $s_0$ in adjacent detection intervals using the polarity-modulation signal, the measurement processing unit 19 also determines a second speed measure of the target 5 using the measures of $s_0$ obtained in measurement circuit M from detection intervals $\Delta \Delta_9$ and $\Delta t_{10}$. The two speed measures can then be used to synchronize the value of $s_1$ obtained in the measurement circuit N and the values of $s_0$ obtained at the same detection interval in the measurement circuit M to a common time point (such as the edge of the adjacent modulation period T_dc). A similar procedure for synchronizing signals using dynamic corrections was described above in the fifth embodiment and will not be discussed in further detail here.

Once the values of $s_0$ and $s_1$ have been referenced to a common time point, the measurement processing unit 19 determines the following correction value:

$$\Delta s = s_1 - s_0 \tag{335}$$

which is optionally averaged over a number of detection cycles T_dc to reduce noise. Thereafter, for each fast update of the $s_0$ value that the measurement processing unit 19 makes, it also calculates a 'should-be' value $s_1^{eff}$ as follows:

$$s_1^{eff} = s_0 + \Delta s \tag{336}$$

The measurement processing unit 19 then uses this value of $s_1^{eff}$ to calculate the final answer for the separation:

$$\text{seperation} = \frac{s_0 \times w_0(s_0) + s_1 \times w_1(s_1^{eff})}{w_0(s_0) + w_1(s_1^{eff})} \tag{337}$$

Such a procedure allows the measurement processing unit 19 to calculate the separation with the highest possible update rate corresponding to the update rate of calculating the value of $s_0$. As the target 5 moves, the microcontroller 9 will identify when the determined separation crosses the value of $s_{sw}$ such that there is a need to switch the main measurement mode from processing the signals from inputs 1&2 ($\varphi_0$) to processing the signals from inputs 3&4 ($\varphi_1$) as the main measurement mode. This can be achieved just by inverting the polarity of the control signals in2_N and in2_M at the edge of the detection cycle T_dc. FIG. 50 is a timing diagram illustrating the moment of the switch-over event and further illustrating the capability of the system to continue measuring without any drop of the update rate— outputting the new separation value ($s_1$) as the main data at the highest update rate without losing the capability of applying accurate dynamic corrections to the values of $\varphi_1$. In particular, when $s_1$ is the main measurement, the measurement processing unit 19 determines respective speed measures as before and then determines the correction value $s_0^{eff}$. Thereafter, for each fast update of the $s_1$ value that the measurement processing unit 19 makes, it also calculates a 'should-be' value $s_0^{eff}$ as follows:

$$s_0^{eff} = s_1 - \Delta s \tag{338}$$

The measurement processing unit 19 then uses this value of $s_0^{eff}$ to calculate the final answer for the separation:

$$\text{seperation} = \frac{s_0 \times w_0(s_0^{eff}) + s_1 \times w_1(s_1)}{w_0(s_0^{eff}) + w_1(s_1)} \tag{339}$$

This allows a smooth transition between the answers based on the $s_0$ and $s_1$ values without introducing any micro oscillations at the switching-over points.

Alternatives and Modifications

A detailed description has been given above of a number of position sensors and different processing circuitry and processing techniques used to process the signals obtained from the detection coils. As those skilled in the art will appreciate, many modifications can be made to the above embodiments without departing from the scope of the invention and a number of these modifications will now be described.

In the above embodiment, a polarity control signal was applied to (multiplied with) the signal obtained from the selected detection coil. In most embodiments, this polarity control signal was applied by the demodulating switch 56. In an alternative embodiment, the polarity control signal may be applied to the excitation signal before it is applied to the excitation conductor 5.

In the above embodiments, planar sensor coils were used with the target 5 moving in a parallel plane above the sensor coils. This is not essential to the invention, the sensor coils can be three dimensional coils if desired.

In the above embodiments, substantially planar sensor coils were used to form a linear sensor with the target 5 moving along its length in a parallel plane above the sensor coils. This is not essential to the invention, the sensor coils can extend along any path, including a circular path to form a rotary sensor with the target 5 rotating in a parallel plane above the sensor coils.

In the main embodiments described above, all of the sensor inputs were connected to both measurement circuits. This is not essential. Each measurement circuit may receive a respective subset of all the sensor inputs, although in this case the subsets will typically overlap, with each measurement circuit receiving at least the main sensor signals (such as the sensor signals from the fine detection coils in the above embodiments).

In the proximity sensor described above, the arrangement of the sensor coils illustrated in FIG. 45 is just one of the possible arrangements which achieves balance of the detection coil 206 to magnetic flux from a remote noise sources (background magnetic flux or fields) and a near zero net magnetic coupling between the detection coil 206 and the excitation coil 202. The balance to the magnetic flux from a remote noise source is achieved in coil 206 by arranging the diameters and the number of turns between the inner turns 215 and the outer turns 217 (which are wound in the opposite sense to each other) so that the magnetic flux through the outer turns 217 is practically cancelled by the opposite magnetic flux in the inner turns 215. The inner and outer turns of the detection coil 206 will have mutual inductances to the inner and outer turns of the excitation coil 202. Overall there will be four terms describing the mutual inductance: i) the mutual inductance (L51) between turns 215 and 211, ii) the mutual inductance (L53) between turns 215 and 213, iii) the mutual inductance (L71) between turns 217 and 211, and iv) the mutual inductance (L73) between turns 217 and 213. The net magnetic coupling between the detection coil 206 and excitation coil 202 can therefore be described by a sum of these four mutual inductance terms:

$$L62=L51+L53-L71-L73$$

where the mutual inductance terms L71 and L73 are included with a negative sign reflecting the opposite sense of the winding of turns 217 and 215. The sign of the terms L51 and L71 can be adjusted in respect to the sign of the terms L53 and L73 by changing the sense of the winding direction of the inner turns 211 with respect to the outer turns 213 of the excitation coil 202. In the example of the FIG. 45a the inner turns 211 are wound in the same sense as the outer turns 213, however in some embodiments the winding direction of the outer turns 213 can be reversed, thus changing the net mutual inductance formula to:

$$L62=L51-L53-L71+L73$$

The amplitudes of each mutual inductance term can be further adjusted by adjusting the number of inner and outer turns of the excitation coil 202 and their exact positioning relative to the inner and outer turns of the detection coil 206. This allows the net mutual inductance between the detection coil 206 and the excitation coil 202 to be balanced (zero) without the presence of the metallic target.

In order to increase the sensitivity of the proximity sensor to the presence of the metallic target one of the terms in the mutual inductance L62 should be made less sensitive to the presence of the metallic target than the other terms. In this way, in the presence of the metallic target, the net mutual inductance L62 will become unbalanced, which will result in the voltage V1 being induced in the detection coil 206. The one of the four mutual inductance terms can be made less sensitive to the presence of the metallic target by locating the corresponding two sets of turns to be physically close together. In the example shown in FIG. 45b, the outer turns 213 of the excitation coil 202 and the outer turns of the detection coil 217 are located very close to each other (compared to the separation between the other sets of turns), thus making the mutual inductance L73 less sensitive to the presence of the metallic target compared to the remaining three mutual inductance terms: L51, L53, and L71. For the specific sensor performance shown in FIG. 45b, the diameter of the outer turns 213 of the excitation coil 202 was made slightly smaller than the diameter of the outer turns 217 of the detection coil 206, however this is not essential and the diameter of the outer turns 213 can be made slightly larger than the diameter of the outer turns 217. Alternatively the diameter of the inner turns 211 of the excitation coil 202 can be made very similar to the diameter of the inner turns 215 of the detection coil 206. In this case the diameters of the outer turns 213 and 217 should be made substantially dissimilar so that the mutual inductance between the outer turns of the excitation coil 202 and the outer turns of the detection coil 206 is very sensitive to the presence of the metallic target.

In all the embodiments described above, the sensor coils were fixed and the target 5 moved relative to the sensor coils. In alternative embodiments, the sensor coils may move as well as the target 5 or the sensor coils may move alone and the target 5 may be fixed.

In the above sensor designs, the sensor coils were formed as conductor tracks on a printed circuit board. As those skilled in the art will appreciate the sensor coils can be formed using any conductive material, such as conductive inks which can be printed on an appropriate substrate or conductive wire wound in the appropriate manner. Additionally, it is not essential for the, or each, excitation coil and the, or each, detection coil to be mounted on the same member. For example, two separate printed circuit boards may be provided, one carrying the excitation coil(s) and the other carrying the, or each, detection coil.

In many of the embodiments described above, the target 5 included a resonator that was energised by driving the, or each, excitation coil and a signal was generated in the, or each, detection coil that varied with the position of the target relative to the sensor board. As those skilled in the art will appreciate, the use of such a resonator is not essential. Other electromagnetic devices may be used. For example, a short circuit coil, a metallic screen or a piece of ferrite may be used.

The sensor systems described above used a target that was powered from an excitation coil on a sensor PCB. The exact form of the excitation coil is not important, provided that it powers the target across the measurement positions of interest. Alternatively, current may be directly driven into the target by the processing electronics, for example by wires or slip rings. Alternatively still, the target 7 may be self-powered and may directly generate a target magnetic field that is detected by the detection coils. In this case there would be no need for an excitation coil nor the need for sensing any reference excitation signal nor any need to determine breakthrough offsets.

In the above embodiments, the measurement processing unit determined peak to peak voltages of the signals received from the measurement circuits. These peak to peak voltages were used to compensate for direct breakthrough from the excitation coil to the detection coils. Of course, the measurement processing unit could determine peak voltages instead of peak to peak voltages for such breakthrough correction. However, as ratios of the measured voltages are taken, the answer will be the same since the peak to peak voltage is simply two times the peak voltage in both cases. Therefore, as long as the same measurement is calculated for the different voltages, the result will be the same.

The main embodiments described above used fine detection coils 6-1 and 6-2 that had four repeats per period of the coarse detection coils 4. A similar design approach may be applied to any number of repeats. Similarly, the coarse detection coils 4-1 and 4-2 had one period over the measurement range of the sensor. This is not essential as the coarse detection coils may also be multi-repeat coils, provided the coarse coil repeat is different from the fine detection coil repeat, the microcontroller 9 can combine the measurements from the fine detection coils and the coarse detection coils and determine an unambiguous position measurement.

The main embodiments described above used inductive coupling between the target and the sensor coils. As those skilled in the art will appreciate, the use of such inductive coupling is not essential for operation of the processing electronics. The same measurement electronics described above can be used to process the signals from any ratiometric type of sensor. Examples include, but are not limited to, capacitive ratiometric sensors, optical ratiometric sensors, Hall effect ratiometric rotary sensors, GMR ratiometric rotary sensors, etc.

The main embodiments described above used fine tuning of the phase of the excitation signal. As those skilled in the art will appreciate, instead of tuning the phase of the excitation signal, the measurement electronics can be arranged to fine tune the phase of the demodulation clock(s) instead. For example, in the embodiment described above that used demodulation clocks ex_0 and ex_90, a new clock signal ex_quad with a frequency four times higher than the excitation clock frequency would be generated, filtered, and compared with a DAC level in the comparator 91 in the same manner as was described previously with the reference to FIG. 13. After passing through the first latch 95, the signal from the comparator 91 is reduced in frequency by two and becomes a 50% duty cycle clock ex_double_0 at the Q output of the latch 95 and a 180 degree shifted signal ex_double_180 at the Q– output of the latch 95. By dividing the frequency of the ex_double_0 signal via an additional latch and by dividing frequency of the ex_double_180 signal via an additional latch, two further signals ex_0 and ex_90 are generated. The phases of both these signals (ex_0 and ex_90) are fine-tuned by the level of the analogue voltage from the DAC applied to the comparator 91. However the phase difference between them is very close to 90 degrees and might deviate slightly from this exact value only due to the difference in the parameters of the two extra latches used to generate them.

The main embodiments described above used an excitation signal clock ex_clock generated in the excitation and control signal logic 11 block of the microcontroller 9. As those skilled in the art will appreciate, it is not essential to generate the excitation clock in the microcontroller 9. For instance, the excitation clock can be generated by separate asynchronous electronics and applied separately to the excitation channel of the sensor. In this case an excitation reference TTL-compatible logic signal whose phase and frequency are locked to the external excitation clock signal should be provided to the microcontroller 9 for synchronisation purposes. A multiplying Phased-locked loop (PLL) can optionally be used to generate an ex_quad signal at the frequency four times larger compared to the frequency of the reference excitation clock. Such a PLL will have a digital divider by 4 utilised with a couple of latches for using the divided frequency signal in the Feedback Path of a multiplying PLL. The ex_quad signal can then be used to generate two extra demodulation clock signals ex_0 and ex_90 with fully adjustable phases as described in the previous paragraph. All control signals can be derived from the ex_quad signal and synchronised to its edges. An extra capture/compare timer 115 should be provided in order to provide calibration for the results of the measurements achieved by the main high frequency asynchronous capture/compare timers 115-1 and 115-2. The new capture/compare timer 115-3 is reloaded by the rising edge of the period_ref clock and is stopped by the falling edge of the period_ref clock. This allows the measurement processing unit to determine the number of counts corresponding to half the period of the detection cycle $T_{mod}$, or to the phase π. Thus the results of the counts from the capture/compare timers 115-1 and 115-2 can be accurately recalculated into the phases φ1, φ2, φ3, or φ4 in spite of the asynchronous nature of the high frequency clock used to control these capture/compare timers 115.

The measurement algorithm of the fifth embodiment can also be implemented without the step of sampling the amplitudes of the signals at the output of the amplification and filtering circuitry by the ADC. This is the case when no dynamic adjustment of the gain of the amplification circuitry or no breakthrough correction is required. The sampling of the signal AF_out with the ADC was used to interpret the set of phase measurements recorded in the memory 17-1 by the capture/compare registers 115-1 and 115-2 as shown in FIG. 21. Instead of using an ADC, the output of the comparator 113 can be sampled at the moment in time defined by the same ADC_trigger signal explained with a reference to the FIG. 21 above. Zero value at the output of the comparator 113 will correspond to the minimum in the AF_out signal (below the midrail voltage) and the value close to the rail (logic value of 1) will correspond to the maximum in the AF_out signal (above the midrail voltage). Thus the set of logic 0 and 1 values recorded at the output of the comparator 113 at the moment in time determined by the ADC_trigger signal will allow to unambiguously interpret values recorded in the memory 17-1 in order to sort-out separately values φ1, φ2, φ3, and φ4 related to the rising and falling zero crossing events as had been explained to the embodiment with the reference to FIG. 21. In yet another embodiment the timer 105_1, shown in the FIG. 21 and used for generating the ADC_trigger signal in the fifth embodiment, can instead be used as an additional capture/compare timer configured so that it is reloaded by the polarity_ref signal and is stopped by the rising edge of the output of the comparator 113. The output from such capture/compare timer 105_1 should be stored in a separate memory 17_3 and used together with the sequence recorded in the memory 17_1 by the capture/compare timers 115_1 and 115_2 in order to identify records related to the rising edge of the output of the comparator 113. This way it will allow to sort-out separately values φ1, φ2, φ3, and φ4 related to the rising and falling zero crossing events. A number of position sensors and processing circuits for such position sensors have been described above. The processing circuits include first and second measurement circuits that each process at least one common sensor signal. Measurement processing circuitry is arranged to use the measurements from each measurement circuit, typically in a time interleaved manner, so that whilst the measurement processing circuitry is using the measurements from one measurement circuit, measurements obtained from the other measurement circuit can be used to determine calibrations that can be used to calibrate subsequent measurements obtained from that measurement circuit.

In the above embodiments, a common sensor input is connected to multiple measurement circuits. The circuits were arranged so that at any given time the signal from that common sensor input only passed through one of the measurement circuits. It is possible to pass the signal from the common sensor input through multiple measurement circuits if a buffer amplifier is provided between the sensor input and the measurement circuits. However, this is not preferred as it introduces additional cost to the circuitry.

The sixth embodiment described above used a relatively slow three-channel sigma-delta ADC. Instead, it is possible to use a much lower resolution but much faster three channel SAR ADC embedded in many modern microcontrollers. In this case multiple measurements (preferably as many as 64 measurements) could be made during half of the period of the ADC_trigger signal shown in the FIG. 39. All such measurements will correspond to the analogue voltage of the sample and hold capacitor—either C1 or C2 shown in FIG. 36. All multiple measurements will deviate slightly from each other by one or two counts due to the small degree of internal random noise present during the ADC conversion. By averaging these measurements it is possible to obtain measurements having a resolution that is several bits higher than the original resolution of the fast SAR ADC.

In the sixth embodiment described above, three measurement circuits were provided, with two measurement circuits each receiving a different one of the sensor signals as input. In a modified version of this embodiment, only two measurement circuits may be provided, with measurement circuit M being the same as in the sixth embodiment and with new measurement circuit N receiving sensor signals from inputs 1+/1− and 2+/2−. In this case, measurement circuit N would time division multiplex the sensor signals received from these two sensor inputs and the measurement processing unit would map these to measurement circuit M for calibration/correction purposes. Such an embodiment would be similar to the first embodiment, except measurement circuit N does not receive sensor signals from the coarse detection coils (from inputs 3+/3− and 4+/4−) or from the excitation reference inputs 5+/5−.

In the main embodiments described above, the phase of the excitation signal was continuously adjusted. As those skilled in the art will appreciate, the capability of tuning (adjusting) the phase of the excitation signal is important for resonant target sensors utilised in applications in which there is limited control of the location of arbitrary metallic objects in close proximity to the sensor head. An example of such a sensor is a typical linear sensor in which the sensing surface is open to the external environment. In contrast, a typical rotary sensor is packaged in a metallic enclosure together with the target, and therefore is operating in a much more controlled environment. The fine tuning of the phase of the excitation signal is therefore less important with sensors operating in such a controlled environment and so the cost of the electronics can be reduced by not implementing the above described active phase control of the excitation signal. Instead, the measured value of the phase of the reference signal $\varphi^{Ref}$ can be used during the removal of the breakthrough signals using the formula:

$$V^{FS}_{corr} = V^{FS} - O^{FS} \times V^{EX} \times \cos(\varphi^{Ref} - \varphi_{offset}^{FS}) \quad (340)$$

$$V^{FC}_{corr} = V^{FC} - O^{FC} \times V^{EX} \times \cos(\varphi^{Ref} - \varphi_{offset}^{FC}) \quad (341)$$

where $V^{EX}$ is the magnitude of the reference signal, $\varphi_{offset}^{FS}$ and $\varphi_{offset}^{FC}$ are phase angles between the reference and breakthrough offset signals measured during the calibration stage, and coefficients $O^{FS}$ and $O^{FC}$ are ratios between the magnitudes of the breakthrough offset signals and the reference signal measured during the calibration stage. The above formulas 340 and 341 can be used for the correction of the breakthrough offset in the sensor signals and would be used in place of previously discussed formulas 7, 8, 9, 10, 88, 89, 92, 93, 156, 157, 276, 277, 316, and 317.

The invention claimed is:

1. Processing circuitry for use in processing sensor signals, the processing circuitry comprising:
   a first measurement circuit configured to receive a plurality of sensor signals from a plurality of sensor inputs and configured to pass the plurality of sensor signals through the first measurement circuit in a time division manner in a sequence of time intervals to generate a first time division sequence of sensor measurements in response thereto;
   a second measurement circuit configured to receive at least one sensor signal and configured to pass the at least one sensor signal through the second measurement circuit to generate sensor measurements in response thereto;
   a third measurement circuit configured to receive at least one sensor signal and configured to pass the at least one sensor signal through the third measurement circuit to generate sensor measurements in response thereto; and
   measurement processing circuitry configured to process the sensor measurements generated by the first, second and third measurement circuits to determine and output sensor results;
   wherein the first and second measurement circuits are both configured to receive a sensor signal from at least one common sensor input and to output respective common sensor measurements in response thereto;
   wherein the first and second measurement circuits are arranged so the sensor signal from the at least one common sensor input is not passed through the first and second measurement circuits at the same time;
   wherein the measurement processing circuitry is configured to use said common sensor measurements to determine first mapping data that relates sensor measurements obtained from said second measurement circuit to sensor measurements obtained from said first measurement circuit;
wherein the first and third measurement circuits are both configured to receive a sensor signal from at least one common sensor input and to output respective common sensor measurements in response thereto;
wherein the first and third measurement circuits are arranged so the sensor signal from the at least one common sensor input is not passed through the first and third measurement circuits at the same time; and
wherein the measurement processing circuitry is configured to use common sensor measurements obtained from the first and third measurement circuits to determine second mapping data that relates sensor measurements obtained from said third measurement circuit to sensor measurements obtained from said first measurement circuit.

2. Processing circuitry according to claim 1, wherein the measurement processing circuitry is arranged to determine a sensor result using at least one sensor measurement obtained from said second measurement circuit and said first mapping data.

3. Processing circuitry according to claim 1, wherein said plurality of sensor inputs includes auxiliary sensor inputs; and wherein calibration data for correcting sensor results obtained using sensor measurements obtained from the second measurement circuit is determined using sensor measurements obtained from the first measurement circuit when sensor signals from said auxiliary sensor inputs are passed through the first measurement circuit.

4. Processing circuitry according to claim 1, wherein the measurement processing circuitry is arranged to determine a sensor result using a sensor measurement obtained from said second measurement circuit, a sensor measurement obtained from said third measurement circuit and said first and second mapping data.

5. Processing circuitry according to claim 1, wherein the measurement processing circuitry is arranged i) to use the first mapping data to determine a first main sensor measurement using the common sensor measurement obtained from the second measurement circuit; ii) to use the second mapping data to determine a second main sensor measurement using the common sensor measurement obtained from the third measurement circuit; iii) to perform a ratiometric calculation of the first main sensor measurement and the second main sensor measurement to determine a ratiometric result; and iv) to determine and output a sensor result using the ratiometric result.

6. A position sensor comprising:
a plurality of detection elements and a target, at least one of: i) the detection elements; and ii) the target, being moveable relative to the other such that signals are generated in the detection elements that depend on the relative position of the target and the detection elements; and
processing circuitry according to claim 1 for processing the signals from the detection elements and for determining and outputting position information relating to the relative position of the target and the detection elements.

7. A position sensor according to claim 6, which is a linear or rotary position sensor or a proximity sensor.

8. A position sensor according to claim 6, wherein the detection elements are one of: inductive detection elements, capacitive detection elements or Hall Effect detection elements.

9. A position sensing method for sensing the position of a sensor target characterised by using the processing circuitry of claim 1.

10. Processing circuitry according to claim 1, wherein each measurement circuit is arranged to generate a respective sensor measurement for first and second sensor signals received from first and second main sensor inputs and wherein the measurement processing circuitry is configured to determine a value of a first ratiometric function using the sensor measurements generated by the first measurement circuit and a value of a second ratiometric function using the sensor measurements generated by the second measurement circuit and to determine sensor results using the determined values.

11. Processing circuitry according to claim 1, wherein each measurement circuit is arranged to generate a respective sensor measurement signal using first and second sensor signals received from first and second main sensor inputs, which sensor measurement signal varies in dependence upon a ratio of the first and second sensor signals and wherein the measurement processing circuitry is configured to process the sensor measurement signals to determine values of said ratio and to determine sensor results using the determined values.

12. Processing circuitry for use in processing sensor signals, the processing circuitry comprising:
a first measurement circuit configured to receive a plurality of sensor signals from a plurality of sensor inputs and configured to pass the plurality of sensor signals through the first measurement circuit in a time division manner in a sequence of time intervals to generate a first time division sequence of sensor measurements in response thereto;
a second measurement circuit configured to receive at least one sensor signal and configured to pass the at least one sensor signal through the second measurement circuit to generate sensor measurements in response thereto; and
measurement processing circuitry configured to process the sensor measurements generated by the first and second measurement circuits to determine and output sensor results;
wherein the first and second measurement circuits are both configured to receive a sensor signal from at least one common sensor input and to output respective common sensor measurements in response thereto;
wherein the first and second measurement circuits are arranged so the sensor signal from the at least one common sensor input is not passed through the first and second measurement circuits at the same time;
wherein the measurement processing circuitry is configured to use said common sensor measurements to determine first mapping data that relates sensor measurements obtained from said second measurement circuit to sensor measurements obtained from said first measurement circuit;
wherein each measurement circuit has an auxiliary mode of operation and a main sensor mode of operation, wherein when the first measurement circuit is configured to operate in the main sensor mode of operation, the second measurement circuit is configured to operate in the auxiliary mode of operation and vice versa, wherein when operating in the main sensor mode of operation, a measurement circuit is configured to pass the sensor signals obtained from at least one main sensor input there through without passing sensor signals from auxiliary sensor inputs there through and wherein when operating in the auxiliary mode of operation, a measurement circuit is configured to pass signals obtained from the auxiliary sensor inputs and sensor signals obtained from the at least one main sensor input there through in a time division manner;

wherein the measurement processing circuitry is configured to determine calibration data for a measurement circuit using sensor measurements of the sensor signals obtained from the at least one main sensor input when the measurement circuit is operating in said auxiliary mode of operation and is configured to apply the calibration data to sensor results obtained from the measurement circuit when operating in said main sensor mode of operation; and wherein the calibration data determined for one measurement circuit depends on a speed measure determined from sensor results obtained using sensor measurements from the other measurement circuit.

13. Processing circuitry according to claim 12, wherein each measurement circuit introduces a phase offset in the sensor results, which phase offset depends on motion of a sensor target and wherein the determined calibration data for a measurement circuit is for cancelling the phase offset introduced into the sensor results by the measurement circuit.

14. Processing circuitry for use in processing sensor signals, the processing circuitry comprising:

a first measurement circuit configured to receive a plurality of sensor signals from a plurality of sensor inputs and configured to pass the plurality of sensor signals through the first measurement circuit in a time division manner in a sequence of time intervals to generate a first time division sequence of sensor measurements in response thereto;

a second measurement circuit configured to receive at least one sensor signal and configured to pass the at least one sensor signal through the second measurement circuit to generate sensor measurements in response thereto; and measurement processing circuitry configured to process the sensor measurements generated by the first and second measurement circuits to determine and output sensor results;

wherein the first and second measurement circuits are both configured to receive a sensor signal from at least one common sensor input and to output respective common sensor measurements in response thereto;

wherein the first and second measurement circuits are arranged so the sensor signal from the at least one common sensor input is not passed through the first and second measurement circuits at the same time; and wherein the measurement processing circuitry is configured to use said common sensor measurements to determine first mapping data that relates sensor measurements obtained from said second measurement circuit to sensor measurements obtained from said first measurement circuit;

a first analogue to digital converter, (ADC), circuitry for converting sensor measurements obtained from the first measurement circuit to digital data and second analogue to digital converter circuitry for converting sensor measurements obtained from the second measurement circuit, wherein the measurement processing circuitry is configured to dynamically adjust a timing of a conversion performed by the first ADC circuitry in dependence upon a speed measure determined using sensor measurements obtained from the second measurement circuit.

15. Processing circuitry according to claim 14, wherein the measurement processing circuitry is configured to dynamically adjust a timing of a conversion performed by the second ADC circuitry in dependence upon a speed measure determined using sensor measurements obtained from the first measurement circuit.

* * * * *